(12) United States Patent
Chao et al.

(10) Patent No.: US 12,182,373 B2
(45) Date of Patent: Dec. 31, 2024

(54) TECHNIQUES FOR MANAGING DISPLAY USAGE

(71) Applicant: Apple Inc., Cupertino, CA (US)

(72) Inventors: Edward Chao, Palo Alto, CA (US); Kevin W. Chen, Cupertino, CA (US); Aurelio Guzman, San Jose, CA (US); Paul T. Nixon, Los Altos, CA (US); Kevin M. Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/546,630

(22) Filed: Dec. 9, 2021

(65) Prior Publication Data

US 2022/0342514 A1 Oct. 27, 2022

Related U.S. Application Data

(60) Provisional application No. 63/180,568, filed on Apr. 27, 2021.

(51) Int. Cl.
| | |
|---|---|
| *G06F 3/0481* | (2022.01) |
| *G06F 1/3206* | (2019.01) |
| *G06F 9/451* | (2018.01) |
| *G01C 21/36* | (2006.01) |
| *G04F 10/00* | (2006.01) |
| *G04G 13/02* | (2006.01) |

(52) U.S. Cl.
CPC .......... *G06F 3/0481* (2013.01); *G06F 1/3206* (2013.01); *G06F 9/451* (2018.02); *G01C 21/3626* (2013.01); *G04F 10/00* (2013.01); *G04G 13/02* (2013.01); *G09G 2320/0257* (2013.01); *G09G 2320/046* (2013.01); *G09G 2354/00* (2013.01)

(58) Field of Classification Search
CPC ............... G06F 3/04847; G06F 3/0483; G06F 3/04842; G06F 3/0486; G06F 9/452; G06F 1/3228; G06F 1/329; G06F 2203/04804; G06F 9/451; G06F 3/0481
See application file for complete search history.

(56) References Cited

U.S. PATENT DOCUMENTS

| | | |
|---|---|---|
| 872,200 A | 11/1907 | Rowe |
| 3,148,500 A | 9/1964 | Thomas |
| 4,205,628 A | 6/1980 | Null |
| 4,355,380 A | 10/1982 | Huguenin et al. |
| 4,597,674 A | 7/1986 | Thompson, III |

(Continued)

FOREIGN PATENT DOCUMENTS

| | | |
|---|---|---|
| AU | 2010249319 A1 | 6/2012 |
| AU | 2015101019 A4 | 9/2015 |

(Continued)

OTHER PUBLICATIONS

Applicant-Initiated Interview Summary received for U.S. Appl. No. 17/591,184, mailed on Feb. 27, 2023, 2 pages.

(Continued)

*Primary Examiner* — Patrick F Riegler
*Assistant Examiner* — Alvaro R Calderon, IV
(74) *Attorney, Agent, or Firm* — DLA Piper LLP (US)

(57) ABSTRACT

The present disclosure generally relates to techniques and user interfaces for transitioning between a standard display mode and a low power display mode.

42 Claims, 38 Drawing Sheets

(56) References Cited

U.S. PATENT DOCUMENTS

| | | |
|---|---|---|
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,408,275 A | 4/1995 | Song et al. |
| 5,455,808 A | 10/1995 | Grupp et al. |
| 5,500,835 A | 3/1996 | Born |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,297,795 B1 | 10/2001 | Kato et al. |
| 6,353,449 B1 | 3/2002 | Gregg et al. |
| 6,359,839 B1 | 3/2002 | Schenk et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,683,653 B1 | 1/2004 | Miyake et al. |
| 6,690,623 B1 | 2/2004 | Maano |
| 6,728,533 B2 | 4/2004 | Ishii et al. |
| 6,806,893 B1 | 10/2004 | Kolawa et al. |
| 6,809,724 B1 | 10/2004 | Shiraishi et al. |
| 6,871,076 B2 | 3/2005 | Samn et al. |
| 6,982,695 B1 | 1/2006 | Canova et al. |
| 7,036,025 B2 | 4/2006 | Hunter |
| 7,113,809 B2 | 9/2006 | Noesgaard et al. |
| 7,203,380 B2 | 4/2007 | Chiu et al. |
| 7,257,254 B2 | 8/2007 | Tunney et al. |
| 7,302,650 B1 | 11/2007 | Allyn et al. |
| 7,378,954 B2 | 5/2008 | Wendt et al. |
| 7,479,949 B2 | 1/2009 | Jobs et al. |
| 7,515,509 B2 | 4/2009 | Klein et al. |
| 7,515,903 B1 | 4/2009 | Cast |
| 7,619,615 B1 | 11/2009 | Donoghue et al. |
| 7,637,204 B2 | 12/2009 | Sumser et al. |
| 7,716,057 B2 | 5/2010 | Horvitz |
| 7,751,285 B1 | 7/2010 | Cain et al. |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,041,968 B2 * | 10/2011 | Tupman ............... G06F 1/3203 |
| | | 455/343.1 |
| 8,046,617 B2 | 10/2011 | Fleck et al. |
| 8,238,876 B2 | 8/2012 | Teng et al. |
| 8,245,143 B2 | 8/2012 | Yach et al. |
| 8,364,855 B2 | 1/2013 | James et al. |
| 8,405,663 B2 | 3/2013 | Wikkerink et al. |
| 8,462,997 B2 | 6/2013 | Soldan et al. |
| 8,595,649 B2 | 11/2013 | Sherrard et al. |
| 8,635,475 B2 | 1/2014 | Lin et al. |
| 8,725,842 B1 | 5/2014 | Al-Nasser |
| 8,768,648 B2 | 7/2014 | Panther et al. |
| 8,775,844 B1 * | 7/2014 | Peterson ............... G06F 1/3206 |
| | | 713/323 |
| 8,847,903 B2 | 9/2014 | Stokes et al. |
| 8,854,925 B1 | 10/2014 | Lee et al. |
| 8,924,894 B2 | 12/2014 | Yaksick et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,171,268 B1 | 10/2015 | Penilla et al. |
| 9,173,052 B2 | 10/2015 | Hauser et al. |
| 9,197,738 B2 | 11/2015 | Peev et al. |
| 9,237,855 B2 | 1/2016 | Hong et al. |
| 9,239,605 B1 | 1/2016 | Nanda et al. |
| 9,259,615 B2 | 2/2016 | Weast et al. |
| 9,292,310 B2 | 3/2016 | Chaudhri et al. |
| 9,369,537 B1 | 6/2016 | Mathew et al. |
| 9,377,762 B2 | 6/2016 | Hoobler et al. |
| 9,436,269 B2 | 9/2016 | Yang |
| 9,448,685 B1 | 9/2016 | Somin et al. |
| 9,459,781 B2 | 10/2016 | Kocienda et al. |
| 9,542,070 B2 | 1/2017 | Xu et al. |
| 9,547,425 B2 | 1/2017 | Kocienda et al. |
| 9,557,806 B2 | 1/2017 | Väyrynen |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,606,695 B2 | 3/2017 | Matas |
| 9,609,230 B1 | 3/2017 | Bakshi et al. |
| 9,625,987 B1 * | 4/2017 | LaPenna ............... G06F 1/3265 |
| 9,635,255 B1 | 4/2017 | Baldwin |
| 9,651,922 B2 | 5/2017 | Hysek et al. |
| 9,753,436 B2 | 9/2017 | Ely et al. |
| 9,756,172 B2 * | 9/2017 | Piemonte ............ H04M 1/72454 |
| 9,794,397 B2 | 10/2017 | Min et al. |
| 9,939,872 B2 * | 4/2018 | Graham ............... G06F 1/1694 |
| 10,019,599 B1 | 7/2018 | Moran et al. |
| 10,062,133 B1 | 8/2018 | Mishra et al. |
| 10,183,622 B2 | 1/2019 | Taguchi et al. |
| 10,268,432 B2 | 4/2019 | Kyung |
| 10,275,148 B2 | 4/2019 | Matas et al. |
| 10,282,078 B2 | 5/2019 | Choi |
| 10,303,289 B2 | 5/2019 | Sepulveda et al. |
| 10,304,347 B2 | 5/2019 | Wilson et al. |
| 10,317,977 B2 | 6/2019 | Yang |
| 10,356,070 B2 | 7/2019 | Cha et al. |
| 10,459,887 B1 * | 10/2019 | Dvortsov ............... G06F 3/0362 |
| 10,489,508 B2 | 11/2019 | Zhai et al. |
| 10,620,590 B1 | 4/2020 | Guzman et al. |
| 10,643,246 B1 | 5/2020 | Suprasadachandran Pillai |
| 10,649,644 B2 | 5/2020 | Ma |
| 10,684,592 B2 | 6/2020 | Chang et al. |
| 10,721,711 B2 | 7/2020 | Kirov et al. |
| 10,761,702 B2 | 9/2020 | Block et al. |
| 10,788,797 B1 | 9/2020 | Guzman et al. |
| 10,807,005 B2 | 10/2020 | Dugan et al. |
| 10,817,981 B1 | 10/2020 | Belkin |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,009,833 B2 | 5/2021 | Essery |
| 11,023,090 B2 | 6/2021 | Xu et al. |
| 11,050,873 B2 | 6/2021 | Kim et al. |
| 11,061,372 B1 | 7/2021 | Chen et al. |
| 11,435,887 B1 | 9/2022 | Mirho et al. |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0099452 A1 | 7/2002 | Kawai |
| 2002/0131331 A1 | 9/2002 | Molander et al. |
| 2003/0002391 A1 | 1/2003 | Biggs et al. |
| 2003/0027621 A1 | 2/2003 | Libby et al. |
| 2003/0052928 A1 | 3/2003 | Williams |
| 2003/0067497 A1 | 4/2003 | Pichon et al. |
| 2003/0107603 A1 | 6/2003 | Clapper |
| 2003/0135769 A1 | 7/2003 | Loughran |

(56) References Cited

U.S. PATENT DOCUMENTS

| | | |
|---|---|---|
| 2003/0140309 A1 | 7/2003 | Saito et al. |
| 2003/0164847 A1 | 9/2003 | Zaima et al. |
| 2003/0169306 A1 | 9/2003 | Makipaa et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0047244 A1 | 3/2004 | Iino et al. |
| 2004/0066710 A1 | 4/2004 | Yuen et al. |
| 2004/0075699 A1 | 4/2004 | Franchi et al. |
| 2004/0075700 A1 | 4/2004 | Liu et al. |
| 2004/0083474 A1 | 4/2004 | Mckinlay et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear et al. |
| 2005/0124389 A1* | 6/2005 | Yang ............... H04B 1/1615 455/574 |
| 2005/0139852 A1 | 6/2005 | Chen et al. |
| 2005/0156873 A1 | 7/2005 | Walter et al. |
| 2005/0168566 A1 | 8/2005 | Tada et al. |
| 2005/0188856 A1 | 9/2005 | Sumser et al. |
| 2005/0190653 A1 | 9/2005 | Chen |
| 2005/0195173 A1 | 9/2005 | Mckay |
| 2005/0198319 A1 | 9/2005 | Chan et al. |
| 2005/0200611 A1 | 9/2005 | Goto et al. |
| 2005/0261031 A1 | 11/2005 | Seo et al. |
| 2005/0272462 A1 | 12/2005 | Okamoto |
| 2005/0278757 A1 | 12/2005 | Grossman et al. |
| 2006/0007785 A1 | 1/2006 | Fernandez et al. |
| 2006/0020904 A1 | 1/2006 | Aaltonen et al. |
| 2006/0035628 A1 | 2/2006 | Miller et al. |
| 2006/0085765 A1 | 4/2006 | Peterson et al. |
| 2006/0087502 A1* | 4/2006 | Karidis ............... G06F 1/3218 345/211 |
| 2006/0092770 A1 | 5/2006 | Demas |
| 2006/0123362 A1 | 6/2006 | Keely |
| 2006/0128419 A1 | 6/2006 | Shimizu et al. |
| 2006/0129948 A1 | 6/2006 | Hamzy et al. |
| 2006/0166708 A1 | 7/2006 | Kim et al. |
| 2006/0214935 A1 | 9/2006 | Boyd et al. |
| 2006/0277469 A1 | 12/2006 | Chaudhri et al. |
| 2007/0004451 A1 | 1/2007 | C. Anderson |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0055947 A1 | 3/2007 | Ostojic et al. |
| 2007/0057775 A1 | 3/2007 | O'Reilly et al. |
| 2007/0094330 A1 | 4/2007 | Russell et al. |
| 2007/0101279 A1 | 5/2007 | Chaudhri et al. |
| 2007/0113181 A1 | 5/2007 | Blattner et al. |
| 2007/0146344 A1 | 6/2007 | Martin et al. |
| 2007/0192718 A1 | 8/2007 | Voorhees et al. |
| 2007/0211042 A1 | 9/2007 | Kim et al. |
| 2007/0213955 A1 | 9/2007 | Ishida et al. |
| 2007/0226653 A1 | 9/2007 | Moore et al. |
| 2007/0236475 A1 | 10/2007 | Wherry |
| 2007/0239754 A1 | 10/2007 | Schnitman et al. |
| 2007/0250772 A1 | 10/2007 | Milosevski |
| 2007/0261537 A1 | 11/2007 | Eronen et al. |
| 2007/0277127 A1 | 11/2007 | Carlson et al. |
| 2007/0279190 A1 | 12/2007 | Lugt et al. |
| 2007/0287140 A1 | 12/2007 | Liebowitz |
| 2008/0005599 A1* | 1/2008 | Theocharous ......... G06F 1/3209 713/300 |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0098031 A1 | 4/2008 | Ducharme |
| 2008/0127268 A1 | 5/2008 | Bergeron et al. |
| 2008/0130421 A1 | 6/2008 | Akaiwa et al. |
| 2008/0143729 A1* | 6/2008 | Wyatt ............... G09G 5/18 345/501 |
| 2008/0150959 A1 | 6/2008 | Marui et al. |
| 2008/0151700 A1 | 6/2008 | Inoue et al. |
| 2008/0167834 A1 | 7/2008 | Herz et al. |
| 2008/0168396 A1 | 7/2008 | Matas et al. |
| 2008/0168402 A1 | 7/2008 | Blumenberg |
| 2008/0170058 A1 | 7/2008 | Ahn et al. |
| 2008/0174606 A1* | 7/2008 | Rengarajan ............ G09G 5/003 345/531 |
| 2008/0186808 A1 | 8/2008 | Lee |
| 2008/0192021 A1 | 8/2008 | Lim et al. |
| 2008/0195961 A1 | 8/2008 | Bae et al. |
| 2008/0201438 A1 | 8/2008 | Mandre et al. |
| 2008/0201647 A1 | 8/2008 | Lagerstedt et al. |
| 2008/0215240 A1 | 9/2008 | Howard et al. |
| 2008/0224988 A1 | 9/2008 | Whang |
| 2008/0246778 A1 | 10/2008 | Ham et al. |
| 2008/0247519 A1 | 10/2008 | Abella et al. |
| 2008/0270934 A1 | 10/2008 | Firebaugh et al. |
| 2009/0005882 A1 | 1/2009 | Boyer et al. |
| 2009/0012988 A1 | 1/2009 | Brown |
| 2009/0016168 A1 | 1/2009 | Smith |
| 2009/0016492 A1 | 1/2009 | Tsuchiya |
| 2009/0017800 A1 | 1/2009 | Middleton |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0066533 A1 | 3/2009 | Park et al. |
| 2009/0068984 A1 | 3/2009 | Burnett |
| 2009/0070675 A1 | 3/2009 | Li |
| 2009/0077497 A1 | 3/2009 | Cho et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0195497 A1 | 8/2009 | Fitzgerald et al. |
| 2009/0199130 A1 | 8/2009 | Tsern et al. |
| 2009/0249247 A1 | 10/2009 | Tseng et al. |
| 2009/0259958 A1 | 10/2009 | Ban |
| 2009/0262088 A1 | 10/2009 | Moll-Carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0315834 A1 | 12/2009 | Nurmi et al. |
| 2009/0319467 A1 | 12/2009 | Berg et al. |
| 2009/0327886 A1 | 12/2009 | Whytock et al. |
| 2010/0015774 A1 | 1/2010 | Shimamune et al. |
| 2010/0016771 A1 | 1/2010 | Jardine et al. |
| 2010/0026640 A1 | 2/2010 | Kim et al. |
| 2010/0060586 A1 | 3/2010 | Pisula et al. |
| 2010/0062905 A1 | 3/2010 | Rottler et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0088597 A1 | 4/2010 | Shin et al. |
| 2010/0100841 A1 | 4/2010 | Shin et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0146463 A1 | 6/2010 | Cho et al. |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0205563 A1 | 8/2010 | Haapsaari et al. |

(56) References Cited

U.S. PATENT DOCUMENTS

| | | |
|---|---|---|
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0248688 A1 | 9/2010 | Teng et al. |
| 2010/0257469 A1 | 10/2010 | Kim et al. |
| 2010/0281374 A1 | 11/2010 | Schulz et al. |
| 2010/0289723 A1 | 11/2010 | London |
| 2010/0309149 A1 | 12/2010 | Blumenberg et al. |
| 2011/0000968 A1 | 1/2011 | Phillips et al. |
| 2011/0003616 A1 | 1/2011 | Gorsica et al. |
| 2011/0003621 A1 | 1/2011 | Atsumi |
| 2011/0003665 A1* | 1/2011 | Burton .................... G01S 19/19 482/8 |
| 2011/0004835 A1 | 1/2011 | Yanchar et al. |
| 2011/0022294 A1 | 1/2011 | Apley |
| 2011/0023415 A1 | 2/2011 | Davlin et al. |
| 2011/0025719 A1 | 2/2011 | Yanase et al. |
| 2011/0029870 A1 | 2/2011 | May et al. |
| 2011/0047014 A1 | 2/2011 | De Angelo |
| 2011/0061010 A1 | 3/2011 | Wasko |
| 2011/0070924 A1 | 3/2011 | Kim et al. |
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0115721 A1 | 5/2011 | Li et al. |
| 2011/0117902 A1 | 5/2011 | Chang et al. |
| 2011/0119610 A1 | 5/2011 | Hackborn et al. |
| 2011/0128311 A1 | 6/2011 | Wakatsuki et al. |
| 2011/0129311 A1 | 6/2011 | Itoh |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202834 A1 | 8/2011 | Mandryk et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0248992 A1 | 10/2011 | Van et al. |
| 2011/0256848 A1 | 10/2011 | Bok et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0013552 A1 | 1/2012 | Ahn |
| 2012/0017180 A1 | 1/2012 | Flik et al. |
| 2012/0019152 A1 | 1/2012 | Bamhoefer et al. |
| 2012/0028707 A1 | 2/2012 | Raitt et al. |
| 2012/0036220 A1 | 2/2012 | Dare et al. |
| 2012/0047447 A1 | 2/2012 | Haq |
| 2012/0059787 A1 | 3/2012 | Brown et al. |
| 2012/0062470 A1 | 3/2012 | Chang et al. |
| 2012/0077554 A1 | 3/2012 | Ahn et al. |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0098639 A1 | 4/2012 | Ijäs |
| 2012/0110438 A1 | 5/2012 | Peraza et al. |
| 2012/0113762 A1 | 5/2012 | Frost |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0127198 A1 | 5/2012 | Gundavarapu |
| 2012/0150327 A1 | 6/2012 | Altman et al. |
| 2012/0151341 A1 | 6/2012 | Ko et al. |
| 2012/0154156 A1 | 6/2012 | Kuntzel |
| 2012/0176413 A1 | 7/2012 | Kulik et al. |
| 2012/0182226 A1 | 7/2012 | Tuli |
| 2012/0197523 A1 | 8/2012 | Kirsch |
| 2012/0210263 A1 | 8/2012 | Perry et al. |
| 2012/0212495 A1 | 8/2012 | Butcher et al. |
| 2012/0218201 A1 | 8/2012 | Tamas et al. |
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0320081 A1 | 12/2012 | Kim et al. |
| 2012/0323933 A1 | 12/2012 | He et al. |
| 2012/0324390 A1 | 12/2012 | Tao et al. |
| 2013/0007665 A1 | 1/2013 | Chaudhri et al. |
| 2013/0019175 A1 | 1/2013 | Kotler et al. |
| 2013/0021236 A1 | 1/2013 | Bender et al. |
| 2013/0030892 A1 | 1/2013 | Liu et al. |
| 2013/0036377 A1 | 2/2013 | Colley |
| 2013/0044072 A1 | 2/2013 | Kobayashi et al. |
| 2013/0044080 A1 | 2/2013 | Chiang |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111550 A1 | 5/2013 | Naveh et al. |
| 2013/0111579 A1 | 5/2013 | Newman et al. |
| 2013/0116967 A1 | 5/2013 | Akcasu et al. |
| 2013/0121119 A1 | 5/2013 | Umamoto |
| 2013/0132888 A1 | 5/2013 | Tijssen |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0157646 A1 | 6/2013 | Ferren et al. |
| 2013/0162611 A1 | 6/2013 | Lim et al. |
| 2013/0176293 A1 | 7/2013 | Pantfoerder |
| 2013/0185813 A1 | 7/2013 | Shim et al. |
| 2013/0191785 A1 | 7/2013 | Wu et al. |
| 2013/0205194 A1 | 8/2013 | Decker et al. |
| 2013/0212487 A1 | 8/2013 | Cote et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0234964 A1 | 9/2013 | Kim et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0332721 A1 | 12/2013 | Chaudhri et al. |
| 2013/0332856 A1 | 12/2013 | Sanders et al. |
| 2013/0345978 A1 | 12/2013 | Lush et al. |
| 2013/0345980 A1 | 12/2013 | Van Os et al. |
| 2014/0013414 A1 | 1/2014 | Bruck et al. |

(56) References Cited

U.S. PATENT DOCUMENTS

| | | |
|---|---|---|
| 2014/0013945 A1 | 1/2014 | Tanaka et al. |
| 2014/0022183 A1 | 1/2014 | Ayoub et al. |
| 2014/0037109 A1 | 2/2014 | Ban |
| 2014/0043367 A1 | 2/2014 | Sakaino et al. |
| 2014/0047525 A1 | 2/2014 | Bonhoff |
| 2014/0055495 A1 | 2/2014 | Kim et al. |
| 2014/0059493 A1 | 2/2014 | Kim |
| 2014/0063049 A1* | 3/2014 | Armstrong-Muntner ................... H04N 23/74 345/619 |
| 2014/0068755 A1 | 3/2014 | King et al. |
| 2014/0074570 A1 | 3/2014 | Hope et al. |
| 2014/0080465 A1 | 3/2014 | Cho |
| 2014/0082533 A1 | 3/2014 | Kelley et al. |
| 2014/0086123 A1* | 3/2014 | Deivasigamani ........................... H04W 52/0216 370/311 |
| 2014/0094224 A1 | 4/2014 | Lozovoy et al. |
| 2014/0101169 A1 | 4/2014 | Kurata et al. |
| 2014/0120988 A1 | 5/2014 | Gunn et al. |
| 2014/0125620 A1 | 5/2014 | Panther et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0155031 A1 | 6/2014 | Lee et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0171132 A1 | 6/2014 | Ziemianska et al. |
| 2014/0173439 A1 | 6/2014 | Gutierrez et al. |
| 2014/0179272 A1 | 6/2014 | Zhang et al. |
| 2014/0189056 A1 | 7/2014 | St. Clair et al. |
| 2014/0189578 A1 | 7/2014 | Shuttleworth et al. |
| 2014/0189584 A1 | 7/2014 | Weng et al. |
| 2014/0192244 A1 | 7/2014 | Ishihara et al. |
| 2014/0195476 A1 | 7/2014 | Sxhmidt |
| 2014/0200691 A1 | 7/2014 | Lee et al. |
| 2014/0201655 A1 | 7/2014 | Mahaffey et al. |
| 2014/0210708 A1 | 7/2014 | Simmons et al. |
| 2014/0210801 A1* | 7/2014 | Li ............................. G09G 5/37 345/204 |
| 2014/0229752 A1 | 8/2014 | Lee et al. |
| 2014/0244009 A1 | 8/2014 | Mestas |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0256298 A1 | 9/2014 | Moss et al. |
| 2014/0258935 A1 | 9/2014 | Nishida et al. |
| 2014/0267103 A1 | 9/2014 | Chaudhri |
| 2014/0267303 A1 | 9/2014 | Larkin et al. |
| 2014/0276244 A1 | 9/2014 | Kamyar |
| 2014/0282103 A1 | 9/2014 | Jerry |
| 2014/0282153 A1 | 9/2014 | Christiansen et al. |
| 2014/0282207 A1 | 9/2014 | Wouhaybi et al. |
| 2014/0282254 A1 | 9/2014 | Feiereisen et al. |
| 2014/0285699 A1 | 9/2014 | Kato et al. |
| 2014/0289660 A1 | 9/2014 | Min |
| 2014/0293755 A1 | 10/2014 | Geiser et al. |
| 2014/0302834 A1 | 10/2014 | Jones |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0310643 A1* | 10/2014 | Karmanenko ........ G06F 1/1626 455/566 |
| 2014/0317543 A1 | 10/2014 | Kim |
| 2014/0320434 A1 | 10/2014 | Pantel |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0342792 A1 | 11/2014 | Markus |
| 2014/0344723 A1 | 11/2014 | Malik et al. |
| 2014/0344820 A1* | 11/2014 | Kumar .................. G06F 9/4843 718/103 |
| 2014/0344951 A1 | 11/2014 | Brewer |
| 2014/0347275 A1 | 11/2014 | Jung et al. |
| 2014/0359124 A1 | 12/2014 | Adimatyam et al. |
| 2014/0359477 A1 | 12/2014 | Chen |
| 2014/0361955 A1 | 12/2014 | Goncalves |
| 2014/0362105 A1 | 12/2014 | Kocienda et al. |
| 2014/0371887 A1 | 12/2014 | Hoffman et al. |
| 2014/0380229 A1 | 12/2014 | Volodin et al. |
| 2015/0002735 A1 | 1/2015 | Moskovchenko |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0055197 A1 | 2/2015 | Romanoff et al. |
| 2015/0058651 A1 | 2/2015 | Choi et al. |
| 2015/0061988 A1 | 3/2015 | Galu, Jr. |
| 2015/0062052 A1 | 3/2015 | Bernstein et al. |
| 2015/0062130 A1 | 3/2015 | Ho |
| 2015/0067596 A1 | 3/2015 | Brown et al. |
| 2015/0071043 A1 | 3/2015 | Kubota |
| 2015/0081474 A1 | 3/2015 | Kostka et al. |
| 2015/0082193 A1 | 3/2015 | Wallace et al. |
| 2015/0082446 A1 | 3/2015 | Flowers et al. |
| 2015/0083970 A1 | 3/2015 | Koh et al. |
| 2015/0100621 A1 | 4/2015 | Pan |
| 2015/0105125 A1 | 4/2015 | Min et al. |
| 2015/0106221 A1* | 4/2015 | Tapley ............... G06Q 30/0641 705/27.1 |
| 2015/0106752 A1 | 4/2015 | Yang |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0128042 A1 | 5/2015 | Churchill et al. |
| 2015/0128078 A1 | 5/2015 | Oh et al. |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0163210 A1 | 6/2015 | Meyers et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0220265 A1 | 8/2015 | Takahashi |
| 2015/0220299 A1 | 8/2015 | Kim et al. |
| 2015/0228048 A1* | 8/2015 | Heo ...................... G06F 1/329 345/520 |
| 2015/0241939 A1 | 8/2015 | Im et al. |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254875 A1 | 9/2015 | Zhang |
| 2015/0261284 A1* | 9/2015 | Lee ...................... G06F 1/206 713/323 |
| 2015/0262548 A1 | 9/2015 | Lin |
| 2015/0277545 A1 | 10/2015 | Flowers et al. |
| 2015/0277996 A1 | 10/2015 | Bank et al. |
| 2015/0286285 A1 | 10/2015 | Pantelopoulos et al. |
| 2015/0286372 A1 | 10/2015 | Swindell et al. |
| 2015/0286391 A1 | 10/2015 | Jacobs et al. |

(56) References Cited

U.S. PATENT DOCUMENTS

| | | |
|---|---|---|
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0309535 A1 | 10/2015 | Connor |
| 2015/0317945 A1 | 11/2015 | Andress et al. |
| 2015/0339261 A1 | 11/2015 | Jha et al. |
| 2015/0346694 A1 | 12/2015 | Hoobler et al. |
| 2015/0346824 A1* | 12/2015 | Chen .................. H04N 5/144 345/156 |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0378592 A1 | 12/2015 | Kim |
| 2015/0379476 A1 | 12/2015 | Chaudhri et al. |
| 2016/0004345 A1 | 1/2016 | Imana |
| 2016/0004393 A1 | 1/2016 | Faaborg et al. |
| 2016/0018872 A1 | 1/2016 | Tu et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0041597 A1 | 2/2016 | Graham et al. |
| 2016/0044091 A1 | 2/2016 | Doumet |
| 2016/0044442 A1 | 2/2016 | Pacelli et al. |
| 2016/0048161 A1 | 2/2016 | Carceroni et al. |
| 2016/0048283 A1 | 2/2016 | Yang et al. |
| 2016/0049106 A1* | 2/2016 | Connell ............... G06F 1/3206 345/207 |
| 2016/0054710 A1 | 2/2016 | Jo et al. |
| 2016/0054892 A1 | 2/2016 | Kim et al. |
| 2016/0058336 A1 | 3/2016 | Blahnik et al. |
| 2016/0058337 A1 | 3/2016 | Blahnik et al. |
| 2016/0058375 A1 | 3/2016 | Rothkopf |
| 2016/0062450 A1 | 3/2016 | Han et al. |
| 2016/0062540 A1 | 3/2016 | Yang et al. |
| 2016/0062570 A1 | 3/2016 | Dascola et al. |
| 2016/0062572 A1 | 3/2016 | Yang et al. |
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0077718 A1 | 3/2016 | Kwon et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0134737 A1 | 5/2016 | Pulletikurty |
| 2016/0134840 A1 | 5/2016 | Mcculloch |
| 2016/0142763 A1 | 5/2016 | Kim et al. |
| 2016/0162112 A1 | 6/2016 | Lee et al. |
| 2016/0165037 A1 | 6/2016 | Youn et al. |
| 2016/0165038 A1 | 6/2016 | Lim et al. |
| 2016/0170731 A1 | 6/2016 | Maddern et al. |
| 2016/0179353 A1 | 6/2016 | Iskander |
| 2016/0180568 A1 | 6/2016 | Bullivant et al. |
| 2016/0180780 A1 | 6/2016 | Chen et al. |
| 2016/0187995 A1 | 6/2016 | Rosewall |
| 2016/0188179 A1 | 6/2016 | Roh |
| 2016/0188181 A1 | 6/2016 | Smith |
| 2016/0189328 A1 | 6/2016 | Vranjes et al. |
| 2016/0191511 A1 | 6/2016 | Tijerina et al. |
| 2016/0192324 A1 | 6/2016 | Zhang et al. |
| 2016/0205167 A1 | 7/2016 | Kolam et al. |
| 2016/0205241 A1 | 7/2016 | Atsumi |
| 2016/0205244 A1* | 7/2016 | Dvortsov .............. H04M 19/04 455/414.1 |
| 2016/0205267 A1 | 7/2016 | Vaughn et al. |
| 2016/0217601 A1 | 7/2016 | Tsuda et al. |
| 2016/0252978 A1 | 9/2016 | Yoo et al. |
| 2016/0259518 A1 | 9/2016 | King et al. |
| 2016/0259535 A1 | 9/2016 | Fleizach et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0313908 A1 | 10/2016 | Matas et al. |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0332025 A1 | 11/2016 | Repka |
| 2016/0342327 A1 | 11/2016 | Chi et al. |
| 2016/0357151 A1* | 12/2016 | Block ................... G04G 9/00 |
| 2016/0357282 A1* | 12/2016 | Block ................... G06F 3/14 |
| 2016/0357354 A1 | 12/2016 | Chen et al. |
| 2016/0357386 A1 | 12/2016 | Choi |
| 2016/0357394 A1 | 12/2016 | Tae et al. |
| 2016/0357413 A1* | 12/2016 | Block ................ G06F 40/186 |
| 2016/0358311 A1 | 12/2016 | Chen et al. |
| 2017/0004798 A1* | 1/2017 | Park ................... G09G 3/3677 |
| 2017/0011210 A1 | 1/2017 | Cheong et al. |
| 2017/0039535 A1 | 2/2017 | Park et al. |
| 2017/0040001 A1* | 2/2017 | Zhang .................. G09G 5/18 |
| 2017/0045993 A1 | 2/2017 | Oh et al. |
| 2017/0046024 A1 | 2/2017 | Dascola et al. |
| 2017/0046052 A1 | 2/2017 | Lee et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0070716 A1 | 3/2017 | Kim et al. |
| 2017/0075305 A1 | 3/2017 | Ryu et al. |
| 2017/0075316 A1 | 3/2017 | Berdinis et al. |
| 2017/0075563 A1 | 3/2017 | Bauer et al. |
| 2017/0082983 A1 | 3/2017 | Katzer et al. |
| 2017/0109011 A1 | 4/2017 | Jiang |
| 2017/0123571 A1 | 5/2017 | Huang et al. |
| 2017/0123603 A1 | 5/2017 | Chang |
| 2017/0123640 A1 | 5/2017 | Wilson et al. |
| 2017/0127354 A1 | 5/2017 | Garland et al. |
| 2017/0134321 A1 | 5/2017 | Ushio et al. |
| 2017/0149795 A1 | 5/2017 | Day, II |
| 2017/0160898 A1* | 6/2017 | Lee ..................... G06F 3/0418 |
| 2017/0164292 A1* | 6/2017 | Santamaria ............ H04L 67/14 |
| 2017/0176950 A1 | 6/2017 | Jung et al. |
| 2017/0186399 A1 | 6/2017 | Moritani et al. |
| 2017/0209766 A1 | 7/2017 | Riley et al. |
| 2017/0212648 A1 | 7/2017 | Choi et al. |
| 2017/0230236 A1 | 8/2017 | Kim et al. |
| 2017/0236497 A1* | 8/2017 | Huitema ............... G04G 21/08 345/173 |
| 2017/0255169 A1 | 9/2017 | Lee et al. |
| 2017/0257426 A1 | 9/2017 | Wilbur et al. |
| 2017/0266494 A1 | 9/2017 | Crankson et al. |
| 2017/0269715 A1 | 9/2017 | Kim et al. |
| 2017/0269792 A1 | 9/2017 | Xu et al. |
| 2017/0277136 A1* | 9/2017 | Minami ................ G06F 3/1423 |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0325196 A1 | 11/2017 | Cho et al. |
| 2017/0329477 A1 | 11/2017 | Sachidanandam et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357413 A1* | 12/2017 | Green ................. G06F 3/04883 |
| 2017/0357426 A1 | 12/2017 | Wilson et al. |
| 2017/0357427 A1 | 12/2017 | Wilson et al. |
| 2017/0357495 A1* | 12/2017 | Crane .................. G06F 9/451 |
| 2017/0358276 A1 | 12/2017 | Mese et al. |
| 2017/0371394 A1* | 12/2017 | Chan .................. G06F 1/3218 |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0074462 A1 | 3/2018 | Helder et al. |
| 2018/0081515 A1 | 3/2018 | Block et al. |
| 2018/0088537 A1 | 3/2018 | Murai |

(56) References Cited

U.S. PATENT DOCUMENTS

| | | |
|---|---|---|
| 2018/0088733 A1* | 3/2018 | Syed .................... G06F 1/3215 |
| 2018/0088797 A1 | 3/2018 | Mcatee et al. |
| 2018/0097925 A1 | 4/2018 | Ryu et al. |
| 2018/0120927 A1 | 5/2018 | Ma et al. |
| 2018/0121060 A1* | 5/2018 | Jeong .................... G06F 3/0488 |
| 2018/0136810 A1 | 5/2018 | Martin et al. |
| 2018/0150212 A1 | 5/2018 | Chen et al. |
| 2018/0150443 A1* | 5/2018 | Singleton .............. H04L 67/306 |
| 2018/0157452 A1 | 6/2018 | Nelson et al. |
| 2018/0174550 A1* | 6/2018 | Zhang .................... G06F 1/3265 |
| 2018/0181078 A1 | 6/2018 | Imamura |
| 2018/0181381 A1 | 6/2018 | Michaely et al. |
| 2018/0188925 A1 | 7/2018 | Na et al. |
| 2018/0246635 A1 | 8/2018 | Baer et al. |
| 2018/0246639 A1 | 8/2018 | Han et al. |
| 2018/0260080 A1 | 9/2018 | Cho |
| 2018/0261183 A1 | 9/2018 | Gou et al. |
| 2018/0275739 A1 | 9/2018 | Minami et al. |
| 2018/0288560 A1 | 10/2018 | Naik et al. |
| 2018/0316783 A1 | 11/2018 | Ye et al. |
| 2018/0321842 A1 | 11/2018 | Lee et al. |
| 2018/0329587 A1 | 11/2018 | Ko et al. |
| 2018/0335927 A1 | 11/2018 | Anzures et al. |
| 2018/0336866 A1 | 11/2018 | Triverio et al. |
| 2018/0341389 A1* | 11/2018 | Kim ...................... G06F 3/0488 |
| 2018/0343023 A1 | 11/2018 | Park et al. |
| 2018/0348844 A1* | 12/2018 | Lingutla ............... G06F 1/3209 |
| 2018/0352435 A1 | 12/2018 | Donley et al. |
| 2018/0366068 A1* | 12/2018 | Liu ........................ G06V 40/171 |
| 2018/0374429 A1 | 12/2018 | Nakamura |
| 2019/0018445 A1* | 1/2019 | Watanabe ............. G06F 1/3265 |
| 2019/0050045 A1 | 2/2019 | Jha et al. |
| 2019/0069244 A1 | 2/2019 | Jeon et al. |
| 2019/0079576 A1* | 3/2019 | Liu ........................ G06F 3/04166 |
| 2019/0121300 A1 | 4/2019 | Peterson et al. |
| 2019/0121523 A1 | 4/2019 | Block et al. |
| 2019/0139207 A1 | 5/2019 | Jeong et al. |
| 2019/0163142 A1 | 5/2019 | Chang et al. |
| 2019/0180221 A1 | 6/2019 | Greenberger et al. |
| 2019/0182749 A1 | 6/2019 | Breaux et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0237003 A1 | 8/2019 | Cao et al. |
| 2019/0250813 A1 | 8/2019 | Block et al. |
| 2019/0268771 A1 | 8/2019 | Seo et al. |
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0324620 A1 | 10/2019 | Gu et al. |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |
| 2020/0050332 A1 | 2/2020 | Yang et al. |
| 2020/0068095 A1 | 2/2020 | Nabetani |
| 2020/0073122 A1* | 3/2020 | Rothkopf .............. G02B 27/017 |
| 2020/0089302 A1* | 3/2020 | Kim ...................... G06F 1/3265 |
| 2020/0110946 A1 | 4/2020 | Kline et al. |
| 2020/0125037 A1 | 4/2020 | Jo et al. |
| 2020/0133206 A1 | 4/2020 | Jo et al. |
| 2020/0228646 A1 | 7/2020 | Hotes et al. |
| 2020/0242228 A1 | 7/2020 | Farraro et al. |
| 2020/0249632 A1 | 8/2020 | Olwal et al. |
| 2020/0264567 A1 | 8/2020 | Ok et al. |
| 2020/0279539 A1 | 9/2020 | Triverio et al. |
| 2020/0319348 A1* | 10/2020 | Oshita .................... G04R 20/00 |
| 2020/0327862 A1* | 10/2020 | Sinha .................... G09G 5/003 |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379413 A1 | 12/2020 | Chen et al. |
| 2020/0408521 A1 | 12/2020 | Lyons et al. |
| 2021/0042028 A1 | 2/2021 | Block et al. |
| 2021/0048929 A1 | 2/2021 | Agnoli et al. |
| 2021/0132780 A1 | 5/2021 | Kyung |
| 2021/0149694 A1 | 5/2021 | Guzman et al. |
| 2021/0201732 A1* | 7/2021 | Ranjan .................. G09G 3/20 |
| 2021/0208903 A1 | 7/2021 | Zhang et al. |
| 2021/0216654 A1 | 7/2021 | Ko et al. |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349583 A1 | 11/2021 | Guzman et al. |
| 2021/0349611 A1 | 11/2021 | Chen et al. |
| 2021/0349741 A1 | 11/2021 | Guzman et al. |
| 2022/0157184 A1 | 5/2022 | Wilson et al. |
| 2022/0184309 A1* | 6/2022 | Rosinko ................ G08B 21/02 |
| 2022/0198984 A1 | 6/2022 | Connor et al. |
| 2022/0206681 A1 | 6/2022 | Mcatee et al. |
| 2022/0214785 A1 | 7/2022 | Giv |
| 2022/0221964 A1 | 7/2022 | Ko et al. |
| 2022/0229537 A1 | 7/2022 | Chen et al. |
| 2022/0236867 A1 | 7/2022 | Chen et al. |
| 2022/0276780 A1 | 9/2022 | Ko et al. |
| 2022/0351702 A1 | 11/2022 | Triverio et al. |
| 2023/0004270 A1 | 1/2023 | Chen et al. |
| 2023/0008229 A1 | 1/2023 | Chen et al. |
| 2023/0035532 A1 | 2/2023 | Chen et al. |
| 2023/0071987 A1* | 3/2023 | Zeng ...................... G09G 5/363 |
| 2023/0078153 A1 | 3/2023 | Yang et al. |
| 2023/0082876 A1 | 3/2023 | Guzman et al. |
| 2023/0368750 A1 | 11/2023 | Stack et al. |
| 2024/0118783 A1 | 4/2024 | Chen et al. |
| 2024/0257786 A1 | 8/2024 | Triverio et al. |

FOREIGN PATENT DOCUMENTS

| | | |
|---|---|---|
| AU | 2015101639 A4 | 12/2015 |
| CA | 2356232 A1 | 3/2002 |
| CA | 2781636 A1 | 7/2010 |
| CA | 2800123 C | 7/2016 |
| CA | 2986980 A1 | 5/2019 |
| CH | 707412 A2 | 6/2014 |
| CN | 1337638 A | 2/2002 |
| CN | 1397904 A | 2/2003 |
| CN | 1536511 A | 10/2004 |
| CN | 1610866 A | 4/2005 |
| CN | 1870796 A | 11/2006 |
| CN | 1932590 A | 3/2007 |
| CN | 1997957 A | 7/2007 |
| CN | 101273324 A | 9/2008 |
| CN | 101382438 A | 3/2009 |
| CN | 100492288 C | 5/2009 |
| CN | 101432722 A | 5/2009 |
| CN | 101505320 A | 8/2009 |
| CN | 101584124 A | 11/2009 |
| CN | 101627349 A | 1/2010 |
| CN | 101702112 A | 5/2010 |
| CN | 101819486 A | 9/2010 |
| CN | 101939740 A | 1/2011 |
| CN | 101981987 A | 2/2011 |
| CN | 102067070 A | 5/2011 |
| CN | 102376265 A | 3/2012 |
| CN | 102681648 A | 9/2012 |
| CN | 102687176 A | 9/2012 |
| CN | 102750070 A | 10/2012 |
| CN | 102831404 A | 12/2012 |
| CN | 103019567 A | 4/2013 |
| CN | 103154954 A | 6/2013 |
| CN | 103281419 A | 9/2013 |
| CN | 103294197 A | 9/2013 |
| CN | 103399480 A | 11/2013 |
| CN | 103399661 A | 11/2013 |
| CN | 103544920 A | 1/2014 |
| CN | 103562832 A | 2/2014 |
| CN | 103607660 A | 2/2014 |
| CN | 103631496 A | 3/2014 |
| CN | 103649897 A | 3/2014 |

(56) References Cited

FOREIGN PATENT DOCUMENTS

| | | | |
|---|---|---|---|
| CN | 103853328 A | 6/2014 |
| CN | 103902165 A | 7/2014 |
| CN | 103914238 A | 7/2014 |
| CN | 103929662 A | 7/2014 |
| CN | 103973899 A | 8/2014 |
| CN | 203773233 U | 8/2014 |
| CN | 104281405 A | 1/2015 |
| CN | 104487929 A | 4/2015 |
| CN | 104501043 A | 4/2015 |
| CN | 104580576 A | 4/2015 |
| CN | 104978904 A | 10/2015 |
| CN | 105045079 A | 11/2015 |
| CN | 105204620 A | 12/2015 |
| CN | 105204931 A | 12/2015 |
| CN | 105260049 A | 1/2016 |
| CN | 105264479 A | 1/2016 |
| CN | 105335087 A | 2/2016 |
| CN | 105388966 A | 3/2016 |
| CN | 105389078 A | 3/2016 |
| CN | 105389107 A | 3/2016 |
| CN | 105430154 A | 3/2016 |
| CN | 105453016 A | 3/2016 |
| CN | 105516824 A | 4/2016 |
| CN | 105677179 A | 6/2016 |
| CN | 205608658 U | 9/2016 |
| CN | 106056848 A | 10/2016 |
| CN | 106486044 A | 3/2017 |
| CN | 106598201 A | 4/2017 |
| CN | 106605201 A | 4/2017 |
| CN | 107239101 A | 10/2017 |
| CN | 107430489 A | 12/2017 |
| CN | 107643677 A | 1/2018 |
| CN | 107870560 A | 4/2018 |
| CN | 108255049 A | 7/2018 |
| CN | 109196469 A | 1/2019 |
| CN | 109313655 A | 2/2019 |
| CN | 109690445 A | 4/2019 |
| CN | 110708581 A | 1/2020 |
| CN | 110471582 B | 10/2021 |
| DE | 202017105858 U1 | 3/2018 |
| EP | 0579093 A1 | 1/1994 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1832969 A2 | 9/2007 |
| EP | 1855170 A2 | 11/2007 |
| EP | 1988432 A1 | 11/2008 |
| EP | 2120115 A2 | 11/2009 |
| EP | 2175367 A2 | 4/2010 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2360902 A2 | 8/2011 |
| EP | 2413577 A2 | 2/2012 |
| EP | 2423810 A1 | 2/2012 |
| EP | 2426902 A1 | 3/2012 |
| EP | 2565602 A1 | 3/2013 |
| EP | 2600215 A1 | 6/2013 |
| EP | 2629483 A1 | 8/2013 |
| EP | 2449434 B1 | 3/2014 |
| EP | 2738640 A2 | 6/2014 |
| EP | 2869292 A2 | 5/2015 |
| EP | 2942932 A1 | 11/2015 |
| EP | 2990887 A2 | 3/2016 |
| EP | 2993602 A1 | 3/2016 |
| EP | 3056949 A1 | 8/2016 |
| EP | 3101958 A1 | 12/2016 |
| EP | 3376342 A1 | 9/2018 |
| EP | 3401770 A1 | 11/2018 |
| EP | 3465408 B1 | 8/2020 |
| EP | 3896560 A1 | 10/2021 |
| GB | 2475669 A | 6/2011 |
| JP | 49-134364 A | 12/1974 |
| JP | 53-31170 A | 3/1978 |
| JP | 54-92359 A | 7/1979 |
| JP | 56-621 A | 1/1981 |
| JP | 3007616 U | 2/1995 |
| JP | 8-110955 A | 4/1996 |
| JP | 9-251084 A | 9/1997 |
| JP | 10-143636 A | 5/1998 |
| JP | 10-506472 A | 6/1998 |
| JP | 11-109066 A | 4/1999 |
| JP | 11-160470 A | 6/1999 |
| JP | 11-232013 A | 8/1999 |
| JP | 2000-162349 A | 6/2000 |
| JP | 3062531 B2 | 7/2000 |
| JP | 2001-144884 A | 5/2001 |
| JP | 2001-147282 A | 5/2001 |
| JP | 2001-273064 A | 10/2001 |
| JP | 2001-313886 A | 11/2001 |
| JP | 2001-318852 A | 11/2001 |
| JP | 2002-73486 A | 3/2002 |
| JP | 2002-507718 A | 3/2002 |
| JP | 2002-251238 A | 9/2002 |
| JP | 2002-259046 A | 9/2002 |
| JP | 2002-271451 A | 9/2002 |
| JP | 2003-9404 A | 1/2003 |
| JP | 2003-196593 A | 7/2003 |
| JP | 2003-233616 A | 8/2003 |
| JP | 2003-296246 A | 10/2003 |
| JP | 2004-28918 A | 1/2004 |
| JP | 2004-184396 A | 7/2004 |
| JP | 2004-251719 A | 9/2004 |
| JP | 2005-016962 A | 1/2005 |
| JP | 2005-521890 A | 7/2005 |
| JP | 2005-339017 A | 12/2005 |
| JP | 2006-101505 A | 4/2006 |
| JP | 2006-287949 A | 10/2006 |
| JP | 2006-293340 A | 10/2006 |
| JP | 2007-150831 A | 6/2007 |
| JP | 2008-175800 A | 7/2008 |
| JP | 2009-147889 A | 7/2009 |
| JP | 2009-293960 A | 12/2009 |
| JP | 2010-124181 A | 6/2010 |
| JP | 2010-257051 A | 11/2010 |
| JP | 3168099 U | 6/2011 |
| JP | 2011-159172 A | 8/2011 |
| JP | 2011-166679 A | 8/2011 |
| JP | 2011-203707 A | 10/2011 |
| JP | 2011-217000 A | 10/2011 |
| JP | 2012-32306 A | 2/2012 |
| JP | 2012-53642 A | 3/2012 |
| JP | 2012-505478 A | 3/2012 |
| JP | 2012-109778 A | 6/2012 |
| JP | 2012-147432 A | 8/2012 |
| JP | 2012-517630 A | 8/2012 |
| JP | 2012-189422 A | 10/2012 |
| JP | 2012-203537 A | 10/2012 |
| JP | 2012-203832 A | 10/2012 |
| JP | 2012-531607 A | 12/2012 |
| JP | 2013-3671 A | 1/2013 |
| JP | 2013-011931 A | 1/2013 |
| JP | 2013-29925 A | 2/2013 |
| JP | 2013-92989 A | 5/2013 |
| JP | 2013-146557 A | 8/2013 |
| JP | 2013-232230 A | 11/2013 |
| JP | 2014-35766 A | 2/2014 |
| JP | 2014-123197 A | 7/2014 |
| JP | 2014-143575 A | 8/2014 |
| JP | 2014-519126 A | 8/2014 |
| JP | 2014-216868 A | 11/2014 |
| JP | 5630676 B2 | 11/2014 |
| JP | 2015-210587 A | 11/2015 |
| JP | 2016-13151 A | 1/2016 |
| JP | 2016-020931 A | 2/2016 |
| JP | 2016-085364 A | 5/2016 |
| JP | 2016-120890 A | 7/2016 |
| JP | 2017-527026 A | 9/2017 |
| JP | 2017-531225 A | 10/2017 |
| JP | 2017-531230 A | 10/2017 |
| JP | 2018-514838 A | 6/2018 |

(56) References Cited

FOREIGN PATENT DOCUMENTS

| | | |
|---|---|---|
| JP | 2018-113544 A | 7/2018 |
| JP | 2018-116067 A | 7/2018 |
| JP | 2020-169845 A | 10/2020 |
| KR | 10-2004-0107472 A | 12/2004 |
| KR | 10-2004-0107489 A | 12/2004 |
| KR | 20-0425314 Y1 | 9/2006 |
| KR | 10-2007-0025292 A | 3/2007 |
| KR | 10-2008-0058246 A | 6/2008 |
| KR | 10-0864578 B1 | 10/2008 |
| KR | 10-2009-0112132 A | 10/2009 |
| KR | 10-2010-0025846 A | 3/2010 |
| KR | 10-2010-0025853 A | 3/2010 |
| KR | 10-2011-0093729 A | 8/2011 |
| KR | 10-2012-0132134 A | 12/2012 |
| KR | 10-2013-0109466 A | 10/2013 |
| KR | 10-2014-0025552 A | 3/2014 |
| KR | 10-2014-0064687 A | 5/2014 |
| KR | 10-2014-0074824 A | 6/2014 |
| KR | 10-2014-0120470 A | 10/2014 |
| KR | 10-2015-0008996 A | 1/2015 |
| KR | 10-2015-0038711 A | 4/2015 |
| KR | 10-2015-0057307 A | 5/2015 |
| KR | 10-2015-0081140 A | 7/2015 |
| KR | 10-2015-0093090 A | 8/2015 |
| KR | 10-2016-0026314 A | 3/2016 |
| KR | 10-2016-0030832 A | 3/2016 |
| KR | 10-2016-0066813 A | 6/2016 |
| KR | 10-2016-0076957 A | 7/2016 |
| KR | 10-2017-0032471 A | 3/2017 |
| KR | 10-2017-0076452 A | 7/2017 |
| KR | 10-2017-0081391 A | 7/2017 |
| KR | 10-2017-0082698 A | 7/2017 |
| KR | 10-2018-0011581 A | 2/2018 |
| KR | 10-2018-0078355 A | 7/2018 |
| KR | 10-1875907 B1 | 7/2018 |
| KR | 10-2019-0020850 A | 3/2019 |
| KR | 10-2019-0035800 A | 4/2019 |
| KR | 10-2019-0071285 A | 6/2019 |
| KR | 10-2019-0114034 A | 10/2019 |
| RU | 2269812 C2 | 2/2006 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | 1348803 B | 9/2011 |
| TW | 201232486 A | 8/2012 |
| TW | 201419115 A | 5/2014 |
| WO | 98/40795 A1 | 9/1998 |
| WO | 01/71433 A1 | 9/2001 |
| WO | 02/054157 A1 | 7/2002 |
| WO | 2003/048872 A1 | 6/2003 |
| WO | 2003/085460 A2 | 10/2003 |
| WO | 2006/012343 A2 | 2/2006 |
| WO | 2006/112641 A1 | 10/2006 |
| WO | 2006/131780 A1 | 12/2006 |
| WO | 2007/018881 A2 | 2/2007 |
| WO | 2007/043222 A1 | 4/2007 |
| WO | 2007/124364 A2 | 11/2007 |
| WO | 2008/083360 A1 | 7/2008 |
| WO | 2008/085402 A1 | 7/2008 |
| WO | 2008/114491 A1 | 9/2008 |
| WO | 2009/053775 A1 | 4/2009 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2011/099819 A2 | 8/2011 |
| WO | 2011/145256 A1 | 11/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2013/169882 A2 | 11/2013 |
| WO | 2014/024366 A1 | 2/2014 |
| WO | 2014/078114 A1 | 5/2014 |
| WO | 2014/081181 A1 | 5/2014 |
| WO | 2014/105274 A1 | 7/2014 |
| WO | 2014/105278 A1 | 7/2014 |
| WO | 2014/189197 A1 | 11/2014 |
| WO | 2014/200730 A1 | 12/2014 |
| WO | 2015/023419 A1 | 2/2015 |
| WO | 2015/029313 A1 | 3/2015 |
| WO | 2015/034960 A1 | 3/2015 |
| WO | 2015/034965 A1 | 3/2015 |
| WO | 2015/065402 A1 | 5/2015 |
| WO | 2015/163536 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/025395 A2 | 2/2016 |
| WO | 2016/032076 A1 | 3/2016 |
| WO | 2016/036427 A1 | 3/2016 |
| WO | 2016/036472 A1 | 3/2016 |
| WO | 2016/036522 A2 | 3/2016 |
| WO | 2016/039587 A1 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144977 A1 | 9/2016 |
| WO | 2017/000522 A1 | 1/2017 |
| WO | 2017/027526 A1 | 2/2017 |
| WO | 2017/062621 A1 | 4/2017 |
| WO | 2017/213777 A1 | 12/2017 |
| WO | 2017/213899 A1 | 12/2017 |
| WO | 2017/213937 A1 | 12/2017 |
| WO | 2018/048700 A1 | 3/2018 |
| WO | 2018/057271 A1 | 3/2018 |
| WO | 2018/213451 A1 | 11/2018 |
| WO | 2019/200350 A1 | 10/2019 |
| WO | 2019/217086 A2 | 11/2019 |
| WO | 2019/217249 A2 | 11/2019 |
| WO | 2020/117189 A1 | 6/2020 |
| WO | 2020/236148 A1 | 11/2020 |
| WO | 2021/050190 A1 | 3/2021 |

OTHER PUBLICATIONS

Applicant-Initiated Interview Summary received for U.S. Appl. No. 17/676,034, mailed on Feb. 27, 2023, 4 pages.
Corrected Notice of Allowance received for U.S. Appl. No. 16/935,002, mailed on Mar. 2, 2023, 2 pages.
Notice of Allowance received for U.S. Appl. No. 17/556, 165, mailed on Feb. 21, 2023, 12 pages.
Notice of Allowance received for U.S. Appl. No. 17/591,184, mailed on Feb. 22, 2023, 5 pages.
Office Action received for Japanese Patent Application No. 2020-137007, mailed on Feb. 10, 2023, 4 pages (2 pages of English Translation and 2 pages of Official Copy).
Examiner's Answer to Appeal Brief received for U.S. Appl. No. 15/405,122, mailed on Jan. 11, 2023, 16 pages.
Office Action received for Chinese Patent Application No. 201910924197.0, mailed on Nov. 30, 2022, 13 pages (6 pages of English Translation and 7 pages of Official Copy).
Office Action received for Chinese Patent Application No. 202110783860.7, mailed on Nov. 15, 2022, 8 pages (2 pages of English Translation and 6 pages of Official Copy).
Office Action received for Korean Patent Application No. 10-2020-0123857, mailed on Dec. 16, 2022, 8 pages (4 pages of English Translation and 4 pages of Official Copy).
Advisory Action received for U.S. Appl. No. 17/031,765, mailed on Dec. 12, 2022, 7 pages.
Applicant-Initiated Interview Summary received for U.S. Appl. No. 16/389,722, mailed on Nov. 4, 2022, 4 pages.

(56) References Cited

OTHER PUBLICATIONS

Applicant-Initiated Interview Summary received for U.S. Appl. No. 17/031,671, mailed on Dec. 9, 2022, 5 pages.
Applicant-Initiated Interview Summary received for U.S. Appl. No. 17/031,765, mailed on Nov. 16, 2022, 5 pages.
Applicant-Initiated Interview Summary received for U.S. Appl. No. 17/556,165, mailed on Oct. 28, 2022, 4 pages.
Brief Communication Regarding Oral Proceedings received for European Patent Application No. 17810723.1, mailed on Nov. 11, 2022, 11 pages.
Corrected Notice of Allowance received for U.S. Appl. No. 17/341,839, mailed on Oct. 26, 2022, 2 pages.
Decision to Refuse received for Japanese Patent Application No. 2020-159824, mailed on Sep. 30, 2022, 6 pages (3 pages of English Translation and 3 pages of Official Copy).
Final Office Action received for U.S. Appl. No. 17/031,671, mailed on Nov. 15, 2022, 27 pages.
Intention to Grant received for European Patent Application No. 21177569.7, mailed on Oct. 27, 2022, 8 pages.
International Preliminary Report on Patentability received for PCT Patent Application No. PCT/US2021/031212, mailed on Nov. 24, 2022, 16 pages.
International Preliminary Report on Patentability received for PCT Patent Application No. PCT/US2021/031669, mailed on Nov. 24, 2022, 12 pages.
International Search Report and Written Opinion received for PCT Patent Application No. PCT/US2022/026371, mailed on Oct. 12, 2022, 16 pages.
International Search Report and Written Opinion received for PCT Patent Application No. PCT/US2022/029279, mailed on Nov. 9, 2022, 16 pages.
Invitation to Pay Additional Fees and Partial International Search Report received for PCT Patent Application No. PCT/US2022/029279, mailed on Sep. 15, 2022, 9 pages.
Minutes of the Oral Proceedings received for European Patent Application No. 17810723.1, mailed on Dec. 9, 2022, 7 pages.
Non-Final Office Action received for U.S. Appl. No. 17/158,936, mailed on Nov. 30, 2022, 17 pages.
Non-Final Office Action received for U.S. Appl. No. 17/713,016, mailed on Oct. 27, 2022, 25 pages.
Notice of Acceptance received for Australian Patent Application No. 2021245228, mailed on Oct. 4, 2022, 3 pages.
Notice of Acceptance received for Australian Patent Application No. 2022220279, mailed on Sep. 27, 2022, 3 pages.
Notice of Allowance received for Chinese Patent Application No. 202111457936.3, mailed on Nov. 7, 2022, 4 pages (1 page of English Translation and 3 pages of Official Copy).
Notice of Allowance received for Japanese Patent Application No. 2020-124605, mailed on Dec. 5, 2022, 4 pages (1 page of English Translation and 3 pages of Official Copy).
Notice of Allowance received for Japanese Patent Application No. 2022-512865, mailed on Oct. 3, 2022, 4 pages (1 page of English Translation and 3 pages of Official Copy).
Notice of Allowance received for Korean Patent Application No. 10-2020-0123852, mailed on Nov. 28, 2022, 7 pages (2 pages of English Translation and 5 pages of Official Copy).
Notice of Allowance received for Korean Patent Application No. 10-2020-0123887, mailed on Nov. 28, 2022, 7 pages (2 pages of English Translation and 5 pages of Official Copy).
Notice of Allowance received for Korean Patent Application No. 10-2021-7036016, mailed on Sep. 28, 2022, 7 pages (2 pages of English Translation and 5 pages of Official Copy).
Notice of Allowance received for U.S. Appl. No. 16/418,786, mailed on Nov. 22, 2022, 6 pages.
Notice of Allowance received for U.S. Appl. No. 17/317,042, mailed on Nov. 9, 2022, 10 pages.
Notice of Allowance received for U.S. Appl. No. 17/341,839, mailed on Dec. 2, 2022, 6 pages.
Notice of Allowance received for U.S. Appl. No. 17/341,839, mailed on Oct. 5, 2022, 5 pages.

Office Action received for Australian Patent Application No. 2021250863, mailed on Oct. 6, 2022, 6 pages.
Office Action received for European Patent Application No. 19724997.2, mailed on Oct. 27, 2022, 5 pages.
Office Action received for European Patent Application No. 20730136.7, mailed on Oct. 6, 2022, 11 pages.
Office Action received for European Patent Application No. 21169911.1, mailed on Dec. 1, 2022, 4 pages.
Office Action received for Japanese Patent Application No. 2021-023661, mailed on Oct. 3, 2022, 8 pages (4 pages of English Translation and 4 pages of Official Copy).
Office Action received for Korean Patent Application No. 10-2022-7019205, mailed on Sep. 21, 2022, 6 pages (2 pages of English Translation and 4 pages of Official Copy).
Result of Consultation received for European Patent Application No. 17810723.1, mailed on Nov. 30, 2022, 3 pages.
Hoffman, Chris, "5+ Cool Uses for Android's Daydream Mode", retrieved from—https://www.howtogeek.com/170990/5-cool-uses-for-androids-daydream-mode, Jul. 12, 2017, 8 pages.
Spears, Ann, "dimming screen before/instead of screensaver?", retrieved from—https://discussions.apple.com/thread/339700, Jan. 28, 2006, 1 page.
Applicant-Initiated Interview Summary received for U.S. Appl. No. 17/738,940, mailed on Mar. 7, 2023, 4 pages.
Extended European Search Report received for European Patent Application No. 22188724.3, mailed on Mar. 2, 2023, 14 pages.
Intention to Grant received for European Patent Application No. 21169911.1, mailed on Mar. 6, 2023, 9 pages.
Lee et al., "PASS: Reducing Redundant Notifications between a Smartphone and a Smartwatch for Energy Saving", IEEE Transactions on Mobile Computing, vol. 19, Jul. 23, 2019, pp. 2656-2669.
Lyons Kent, "Smartwatch Innovation: Exploring a Watch-First Model", Pervasive Computing, Jan. 2016, pp. 10-13.
Notice of Allowance received for Korean Patent Application No. 10-2020-0123857, mailed on Feb. 21, 2023, 6 pages (1 page of English Translation and 5 pages of Official Copy).
Notice of Allowance received for U.S. Appl. No. 17/515,143, mailed on Mar. 13, 2023, 10 pages.
Notice of Allowance received for U.S. Appl. No. 17/941,962, mailed on Mar. 10, 2023, 11 pages.
Pre-Appeal Review Report received for Japanese Patent Application No. 2020-159823, mailed on Jan. 12, 2023, 4 pages (2 pages of English Translation and 2 pages of Official Copy).
Advisory Action received for U.S. Appl. No. 16/792,096, mailed on Nov. 18, 2021, 4 pages.
"Adyclock—Night Alarm Clock", App for android, Google play store page: https://web.archive.org/web/20130924223153/https://play.google.com/store/apps/details?id=com.adyclock&hl=en, Sep. 24, 2013, 2 pages.
2Raz Tech&Moto, "Sony Smartwatch 2 Update—New Feartures and Watchface Creator !!! New !!! ", Online available at: https://www.youtube.com/watch?v=k3jjBv7QZSk, May 8, 2014, 3 pages.
Advisory Action received for U.S. Appl. No. 14/815,898, mailed on Aug. 30, 2016, 3 pages.
Advisory Action received for U.S. Appl. No. 14/841,606, mailed on Feb. 28, 2019, 3 pages.
Advisory Action received for U.S. Appl. No. 14/846,511, mailed on Oct. 22, 2019, 5 pages.
Advisory Action received for U.S. Appl. No. 14/846,511, mailed on Sep. 19, 2018, 8 pages.
Advisory Action received for U.S. Appl. No. 15/421,865, mailed on Apr. 16, 2020, 7 pages.
Advisory Action received for U.S. Appl. No. 15/554,204, mailed on Mar. 12, 2020, 3 pages.
Advisory Action received for U.S. Appl. No. 16/389,722, mailed on Mar. 9, 2021, 5 pages.
Advisory Action received for U.S. Appl. No. 16/582,020, mailed on Aug. 3, 2020, 4 pages.
Airshow, "Airshow App for Mobile Devices", 2012, 4 pages.
Andro Dollar, "Huawei Watch Gt Always on Mode Update is Finally Here! ????", Online Available at: https://www.youtube.com/watch?v=AJw_FIAf7v4, Jun. 6, 2019, 4 pages.

(56) References Cited

OTHER PUBLICATIONS

Android Central, "Beweather Weather App for Android", Available online at: <https://www.youtube.com/watch?v=G2EY2K-XkSI>, Sep. 1, 2011, 1 page.
Android Central, "Changing the Watchface on Your Android Wear Device", Retrieved from: https://www.youtube.com/watch?v=YYwFe2K_qil, Jul. 2, 2014, 4 pages.
Android Tips, "Create a Minimal Lock Screen with Widgetlocker", Online Available at: http://appstap192.blogspot.com/2012/01/create-minimal-lock-screen-with.html, Jan. 18, 2012, 6 pages.
Androidika, "Butterfly 3d Live Wallpaper 1.0 Apk", Available at: <http://net-suckga-ilauncher2.apk-dl.com/butterfly-3d-live-wallpaper>, Feb. 26, 2013, 7 pages.
Aod Too Dim. I've Answered My Own Question to Help Others, Online Available: https://forums.androidcentral.com/samsung-galaxy-s9-s9-plus/874444-aod-too-dim-ive-answered-my-own-question-help-others.html, Mar. 11, 2018, 3 pages.
Applicant Initiated Interview Summary received for U.S. Appl. No. 14/846,511, mailed on Apr. 20, 2020, 4 pages.
Applicant Initiated Interview Summary received for U.S. Appl. No. 15/713,544, mailed on Apr. 6, 2020, 7 pages.
Initiated Interview Summary received for U.S. Appl. No. 15/713,544, mailed on Oct. 24, 2019, 4 pages.
Initiated Interview Summary received for U.S. Appl. No. 16/389,722, mailed on Jul. 7, 2020, 5 pages.
Initiated Interview Summary received for U.S. Appl. No. 16/582,020, mailed on Jul. 9, 2021, 4 pages.
Initiated Interview Summary received for U.S. Appl. No. 16/582,020, mailed on Jul. 14, 2020, 5 pages.
Initiated Interview Summary received for U.S. Appl. No. 16/582,020, mailed on Mar. 25, 2020, 5 pages.
Initiated Interview Summary received for U.S. Appl. No. 16/584,445, mailed on Mar. 17, 2020, 5 pages.
Interview received for U.S. Appl. No. 16/585,399, mailed on Mar. 25, 2020, 3 pages.
Initiated Interview received for U.S. Appl. No. 17/031,671, mailed on Aug. 2, 2021, 5 pages.
Interview received for U.S. Appl. No. 17/031,671, mailed on Nov. 8, 2021, 5 pages.
Interview received for U.S. Appl. No. 15/405,122, mailed on Dec. 22, 2020, 5 pages.
Applicant-initiated Interview Summary received for U.S. Appl. No. 15/405,122, mailed on Jul. 7, 2021, 4 pages.
Applicant-initiated Interview Summary received for U.S. Appl. No. 15/405,122, mailed on May 21, 2020, 5 pages.
Applicant-initiated Interview Summary received for U.S. Appl. No. 15/421,865, mailed on Dec. 15, 2020, 6 pages.
Applicant-initiated Interview Summary received for U.S. Appl. No. 15/421,865, mailed on Feb. 3, 2020, 5 pages.
Applicant-initiated Interview Summary received for U.S. Appl. No. 15/421,865, mailed on Jun. 30, 2021, 6 pages.
Applicant-initiated Interview Summary received for U.S. Appl. No. 15/554,204, mailed on Jan. 31, 2020, 3 pages.
Applicant-initiated Interview Summary received for U.S. Appl. No. 15/554,204, mailed on Oct. 11, 2019, 5 pages.
Applicant-initiated Interview Summary received for U.S. Appl. No. 15/798,235, mailed on Feb. 3, 2020, 3 pages.
Applicant-initiated Interview Summary received for U.S. Appl. No. 16/389,722, mailed on Feb. 11, 2021, 4 pages.
Applicant-initiated Interview Summary received for U.S. Appl. No. 16/389,722, mailed on Sep. 7, 2021, 4 pages.
Applicant-initiated Interview Summary received for U.S. Appl. No. 16/401,934, mailed on Feb. 23, 2021, 8 pages.
Applicant-initiated Interview Summary received for U.S. Appl. No. 16/418,786, mailed on Mar. 30, 2021, 4 pages.
Applicant-initiated Interview Summary received for U.S. Appl. No. 16/584,281, mailed on Mar. 9, 2020, 5 pages.
Applicant-initiated Interview Summary received for U.S. Appl. No. 16/584,281, mailed on Sep. 14, 2020, 6 pages.
Applicant-initiated Interview Summary received for U.S. Appl. No. 16/585,714, mailed on Jul. 20, 2020, 5 pages.
Applicant-initiated Interview Summary received for U.S. Appl. No. 16/585,721, mailed on Aug. 31, 2020, 5 pages.
Applicant-initiated Interview Summary received for U.S. Appl. No. 16/585,721, mailed on Mar. 13, 2020, 5 pages.
Applicant-initiated Interview Summary received for U.S. Appl. No. 16/659,507, mailed on Nov. 17, 2020, 3 pages.
Applicant-Initiated Interview Summary received for U.S. Appl. No. 16/792,096, mailed on May 17, 2021, 6 pages.
Applicant-Initiated Interview Summary received for U.S. Appl. No. 16/792,096, mailed on Oct. 18, 2021, 6 pages.
Applicant-initiated Interview Summary received for U.S. Appl. No. 16/861,651, mailed on Mar. 25, 2021, 6 pages.
Applicant-initiated Interview Summary received for U.S. Appl. No. 16/861,651, mailed on Sep. 3, 2021, 5 pages.
Applicant-initiated Interview Summary received for U.S. Appl. No. 16/935,002, mailed on Sep. 21, 2021, 4 pages.
Applicant-initiated Interview Summary received for U.S. Appl. No. 16/943,737, mailed on Sep. 7, 2021, 4 pages.
Applicant-initiated Interview Summary received for U.S. Appl. No. 16/997,588, mailed on Jan. 29, 2021, 3 pages.
Applicant-initiated Interview Summary received for U.S. Appl. No. 16/997,588, mailed on May 12, 2021, 2 pages.
Applicant-initiated Interview Summary received for U.S. Appl. No. 17/031,654, mailed on Feb. 1, 2021, 2 pages.
Applicant-Initiated Interview Summary received for U.S. Appl. No. 17/031,765, mailed on Dec. 15, 2021, 4 pages.
Applicant-initiated Interview Summary received for U.S. Appl. No. 17/031,765, mailed on Sep. 22, 2021, 5 pages.
Applicant-initiated Interview Summary received for U.S. Appl. No. 17/041,350, mailed on Aug. 18, 2021, 2 pages.
Applicant-initiated Interview Summary received for U.S. Appl. No. 17/068,386, mailed on Sep. 21, 2021, 2 pages.
Avdonin, Nikita, "Astroviewer 3d", Available at: https: jjwww.youtube.comjwatch?v=zY0tslx3JHY/, Nov. 5, 2013, 2 pages.
Baar, Marius, "Fitbit Ace—Unboxing, Setup and 24-hour Test", YouTube [online] [video], Retrieved from: https://youtu.be/ekvkfqOyrls. See especially 4:44., Oct. 24, 2018, 3 pages.
Barbosa, Jonathan, "Weather Clock 2.1 for Android", APKPure, Online Available at: https://apkpure.com/weather-clock/com.urbandroid.wclock, Oct. 15, 2015, 3 pages.
Big Phil TV, "Gear S3 Watch Faces with Great Always on Display (a O D)", Available online at: https://www.youtube.com/watch?v=2cxMnrMiGU8, Apr. 5, 2017, 3 pages.
Bogdanov, Alexei, "Skmei 1016", XP054977588, Available online at: URL: https://www.youtube.com/watch?v=E4q4Fug05Fw, Jun. 21, 2014, 2 pages (Official Copy only) (See Communication under 37 CFR § 1.98(a) (3)).
Bond, John-Michael, "The 4 Best Free Flashlight Apps for Android and IOS", Online Available at: https://www.dailydot.com/debug/best-free-flashlight-apps/, 8 pages.
Brief Communication Regarding Oral Proceedings received for European Patent Application No. 15730925.3, mailed on Feb. 18, 2020, 7 pages.
Brief Communication Regarding Oral Proceedings received for European Patent Application No. 172061772, mailed on Nov. 21, 2019, 5 pages.
Brightness on Lock Screen, Online Available at: https://www.reddit.com/r/galaxys10/comments/b4d5fb/brightness_on_lock_screen/, 2019, 1 page.
Cancellation of Oral Proceedings received for European Patent Application No. 17206177.2, mailed on Dec. 4, 2019, 2 pages.
Castellini, Rick, "Google Earth", Retrieved from: https://www.youtube.com/watch?v=bgjMSBXsFZQ, Feb. 12, 2013, 3 pages.
Cengic, Suad, "Samsung Gear S3—Display Always On! Cool!", Available online at: https://www.youtube.com/watch?v=ceeDinbPwOY, Mar. 10, 2017, 3 pages.
Certificate of Examination received for Australian Patent Application No. 2018101947, mailed on Feb. 18, 2019, 2 pages.
Certificate of Examination received for Australian Patent Application No. 2020102158, mailed on Jun. 8, 2021, 2 pages.

(56) References Cited

OTHER PUBLICATIONS

Clark, Josh, "Designing Great Iphone Apps", O'Reilly Japan Co., O'Reilly Tim, vol. 1, May 24, 2012, 5 pages (Official Copy only) (See Communication under 37 CFR § 1.98(a) (3)).
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 15/183,663, mailed on Feb. 25, 2019, 3 pages.
Corrected Notice of Allowance received for U.S. Appl. No. 15/183,663, mailed on Mar. 27, 2019, 2 pages.
Corrected Notice of Allowance received for U.S. Appl. No. 15/355,956, mailed on Jan. 3, 2020, 2 pages.
Corrected Notice of Allowance received for U.S. Appl. No. 15/554,204, mailed on Aug. 19, 2020, 3 pages.
Corrected Notice of Allowance received for U.S. Appl. No. 15/791,829, mailed on Jan. 16, 2020, 2 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 16/582,020, mailed on Aug. 11, 2021, 2 pages.
Cyr, Jim, "Apple Watch-Customize Modular Watch Face", Available online at: https://www.youtube.com/watch?v=02W93HbKIK8, May 13, 2015, 2 pages.
Dan, "Get This Look: 'minimal' Zooper Widget", Online Available at: https://www.androidguys.com/featured/customize/get-look-minimal-zooper-widget/, Mar. 7, 2014, 2 pages.
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for U.S. Appl. No. 14/815,890, mailed on Nov. 24, 2020, 13 pages.
Decision on Appeal received for U.S. Appl. No. 15/713,544, mailed on Dec. 14, 2021, 10 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Danish Patent Application No. PA201770387, mailed on Aug. 30, 2018, 2 pages.
Decision to Grant received for Danish Patent Application No. PA201770397, mailed on Feb. 6, 2018, 2 pages.
Decision to Grant received for Danish Patent Application No. PA201770791, mailed on Jul. 7, 2020, 2 pages.
Decision to Grant received for Danish Patent Application No. PA201970596, mailed on Feb. 26, 2021, 2 pages.
Decision to Grant received for Danish Patent Application No. PA201970597, mailed on Aug. 19, 2021, 2 pages.
Decision to Grant received for Danish Patent Application No. PA202070609, mailed on May 3, 2021, 2 pages.
Decision to Grant received for European Patent Application No. 15730925.3, mailed on Dec. 9, 2021, 2 pages.
Decision to Grant received for European Patent Application No. 15747595.5, mailed on Jul. 16, 2020, 2 pages.
Decision to Grant received for European Patent Application No. 17206177.2, mailed on Aug. 6, 2020, 2 pages.
Decision to Grant received for European Patent Application No. 18172554.0, mailed on Jul. 30, 2020, 2 pages.
Decision to Refuse received for European Patent Application No. 15730924.6, mailed on Mar. 15, 2019, 12 pages.

Deluxe Moon-guide, Available online at: https://web.archive.org/web/20130520161057/http://www.lifewaresolutions.com/deluxe_moon_guide_ip.html, May 20, 2013, 5 pages.
Digital Alarm Clock App for Android, Goggle play store digital alarm clock description page, Mar. 25, 2015, 3 pages.
Disrapptive, "Flashlight for Android Wear", Available online at: https://www.youtube.com/watch?v=HVNxxUI57BM, 6 pages.
Disrapptive, "Flashlight for Android Wear", Online Available at: <https://www.youtube.com/watch?v=HVNxxUI57BM>, 5 pages.
Droid Life, "How To: Use Always-on Apps with Android Wear", Available online at: https://www.youtube.com/watch?v=_-xYB9EBTaA, Jun. 26, 2015, 3 pages.
Ebpman Tech Reviews, "LG G3 Tips: How to Customize the Clock Face", Available online at: https://www.youtube.com/watch?v=evraMWFb1fY, Jul. 25, 2014, 1 page.
Elecont, "Weather Clock—Hourly Forecast Description", Accurate 10-day weather. Forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
European Search Report received for European Patent Application No. 17206177.2, mailed on Apr. 30, 2018, 4 pages.
European Search Report received for European Patent Application No. 20172197.4, mailed on Jul. 28, 2020, 4 pages.
Evgenyevich, Sergey, "Earth & Moon in Hd Gyro 3d", Available at: https://www.youtube.com/watch?v=IRwNcaSYrls/, Dec. 1, 2013, 2 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/846,511, mailed on Jun. 14, 2021, 15 pages.
Examiner's Answer to Appeal Brief received for U.S. Appl. No. 15/713,544, mailed on Apr. 5, 2021, 15 pages.
Examiner's Answer to Appeal Brief received for U.S. Appl. No. 15/713,544, mailed on Apr. 9, 2021, 15 pages.
Extended European Search Report received for European Patent Application No. 16762356.0, mailed on Nov. 9, 2018, 10 pages.
Extended European Search Report received for European Patent Application No. 16837432.0, mailed on Mar. 11, 2019, 10 pages.
Extended European Search Report received for European Patent Application No. 17810723.1, mailed on Nov. 12, 2019, 9 pages.
Extended European Search Report received for European Patent Application No. 17853656.1, mailed on Jul. 3, 2019, 9 pages.
Extended European Search Report received for European Patent Application No. 18172554.0, mailed on Aug. 3, 2018, 10 pages.
Extended European Search Report received for European Patent Application No. 20180900.1, mailed on Sep. 18, 2020, 7 pages.
Extended European Search Report received for European Patent Application No. 20185974.1, mailed on Oct. 28, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.
Feist, Jonathan, "Android Customization—How to Create a Custom Clock Widget Using Zooper Widget", Available Online at: https://www.androidauthority.com/zooper-widget-clock-366476/, May 15, 2014, 10 pages.
Feldman, Ari, "Excerpts From: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,879, mailed on Mar. 24, 2016, 46 pages.
Final Office Action received for U.S. Appl. No. 14/815,890, mailed on Feb. 26, 2018, 20 pages.
Final Office Action received for U.S. Appl. No. 14/815,890, mailed on May 14, 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016, 19 pages.
Final Office Action received for U.S. Appl. No. 14/821,667, mailed on Apr. 26, 2018, 13 pages.

(56) References Cited

OTHER PUBLICATIONS

Final Office Action received for U.S. Appl. No. 14/841,606, mailed on Sep. 7, 2018, 34 pages.
Final Office Action received for U.S. Appl. No. 14/846,511 mailed on May 10, 2018, 21 pages.
Final Office Action received for U.S. Appl. No. 14/846,511, mailed on Aug. 11, 2020, 25 pages.
Final Office Action received for U.S. Appl. No. 14/846,511, mailed on Jun. 5, 2019, 24 pages.
Final Office Action received for U.S. Appl. No. 15/405,122, mailed on Jan. 21, 2020, 36 pages.
Final Office Action received for U.S. Appl. No. 15/405,122, mailed on Nov. 5, 2021, 45 pages.
Final Office Action received for U.S. Appl. No. 15/421,865, mailed on Dec. 2, 2019, 19 pages.
Final Office Action received for U.S. Appl. No. 15/421,865, mailed on Mar. 19, 2021, 20 pages.
Final Office Action received for U.S. Appl. No. 15/554,204, mailed on Oct. 31, 2019, 22 pages.
Final Office Action received for U.S. Appl. No. 15/713,544, mailed on Jul. 19, 2019, 20 pages.
Final Office Action received for U.S. Appl. No. 15/713,544, mailed on May 20, 2020, 14 pages.
Final Office Action received for U.S. Appl. No. 15/791,829, mailed on Mar. 7, 2019, 23 pages.
Final Office Action received for U.S. Appl. No. 15/798,235, mailed on Oct. 9, 2018, 45 pages.
Final Office Action received for U.S. Appl. No. 15/798,235, mailed on Oct. 18, 2019, 25 pages.
Final Office Action received for U.S. Appl. No. 15/881,544, mailed on Jan. 29, 2019, 14 pages.
Final Office Action received for U.S. Appl. No. 16/389,722, mailed on Dec. 6, 2021, 19 pages.
Final Office Action received for U.S. Appl. No. 16/389,722, mailed on Dec. 8, 2020, 18 pages.
Final Office Action received for U.S. Appl. No. 16/401,934, mailed on Jun. 14, 2021, 30 pages.
Final Office Action received for U.S. Appl. No. 16/418,786, mailed on Jan. 13, 2021, 14 pages.
Final Office Action received for U.S. Appl. No. 16/582,020, mailed on Apr. 28, 2020, 31 pages.
Final Office Action received for U.S. Appl. No. 16/584,281, mailed on Apr. 15, 2020, 26 pages.
Final Office Action received for U.S. Appl. No. 16/585,721, mailed on Apr. 1, 2020, 28 pages.
Final Office Action received for U.S. Appl. No. 16/792,096, mailed on Aug. 9, 2021, 17 pages.
Final Office Action received for U.S. Appl. No. 16/861,651, mailed on Apr. 20, 2021, 14 pages.
Final Office Action received for U.S. Appl. No. 16/997,588, mailed on Mar. 30, 2021, 23 pages.
Final Office Action received for U.S. Appl. No. 17/031,671, mailed on Sep. 7, 2021, 27 pages.
Final Office Action received for U.S. Appl. No. 17/031,765, mailed on Oct. 29, 2021, 34 pages.
Final Office Action received for U.S. Appl. No. 17/041,350, mailed on Sep. 17, 2021, 25 pages.
First Action Interview received for U.S. Appl. No. 14/815,890, mailed on Aug. 12, 2016, 3 pages.
Fitbit Surge Fitness Watch, Manual version 1.0, May 7, 2015, 48 pages.
Fuchphone Extras, "Lg G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda, Kazuhiro, "Xperia Z1 Perfect Manual", Sotec Co., Ltd., No. 1, Nov. 15, 2013, pp. 217-218.
Gazer, "Iphone 4s Super Manual", Shuwa System Co., Saito Kazukuni, vol. 1, Jun. 6, 2013, 7 pages (Official Copy only) (See Communication under 37 CFR § 1.98(a) (3)).
Geary, David, "Programming Html5 Canvas", O'Reilly Japan, Inc., No. 1, Jul. 23, 2014, pp. 327-330.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.
Google Earth on Android—Androidcentral.com, Available online at:—https://www.youtube.com/watch?v=1WxN1RunrE4, Feb. 22, 2010, 1 page.
Gottabemobile, "How to Change Watch Faces on Android Wear", available online at URL: https://www.youtube.com/watch?v=B8iRGkGq6a8, Jul. 9, 2014, 4 pages.
Haidar, Rawand, "How to Use Android Wear Smartwatch as a Flashlight!", Available online at: <https://howto.highonandroid.com/android-wear-tutorials/how-to-use-android-wear-smartwatch-as-a-flashlight-flashlight-app/>, 6 pages.
Hollywoodfrodo, "FREE Flashlight Android App by Asus Best Flashlight App on Google Play", Online Available at: <https://www.youtube.corn/watch?v=K_kFa7PoVsc>, 3 pages.
Huawei Watch FAQS-en_us-V2.8, Available Online at: Online available at: https://maplindownloads.s3-eu-west-1.amazonaws.com/A27WH-9512.pdf, 135 pages.
Intention to Grant received for Danish Patent Application No. PA201570496, mailed on Feb. 17, 2016, 6 pages.
Intention to Grant received for Danish Patent Application No. PA201770387, mailed on Apr. 4, 2018, 2 pages.
Intention to Grant received for Danish Patent Application No. PA201770387, mailed on May 24, 2018, 2 pages.
Intention to Grant received for Danish Patent Application No. PA201770397, mailed on Aug. 18, 2017, 7 pages.
Intention to Grant received for Danish Patent Application No. PA201770791, mailed on Feb. 19, 2020, 2 pages.
Intention to Grant received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for Danish Patent Application No. PA202070609, mailed on Jan. 14, 2021, 2 pages.
Intentiom to Grant received for European Patent Application No. 15730925.3, mailed on Aug. 16, 2021, 10 pages.
Intention to Grant received for European Patent Application No. 15730925.3, mailed on May 28, 2020, 10 pages.
Intention to Grant received for European Patent Application No. 15747595.5, mailed on Feb. 17, 2020, 8 pages.
Intention to Grant received for European Patent Application No. 17206177.2, mailed on Feb. 24, 2020, 8 pages.
Intention to Grant received for European Patent Application No. 18172554.0, mailed on Feb. 17, 2020, 8 pages.
Preliminary Report on Patentability received for PCT Application No. PCT/US2016/037686, mailed on Mar. 1, 2018, 12 pages.
Preliminary Report on Patentability received for PCT Patent Application No. PCT/US2015/034604, mailed on Feb. 16, 2017, 21 pages.
Preliminary Report on Patentability received for PCT Patent Application No. PCT/US2015/034606, mailed on Feb. 16, 2017, 11 pages.
Preliminary Report on Patentability received for PCT Patent Application No. PCT/US2015/034607, mailed on Feb. 16, 2017, 18 pages.
Preliminary Report on Patentability received for PCT Patent Application No. PCT/US2015/044473, mailed on Mar. 2, 2017, 20 pages.
Preliminary Report on Patentability received for PCT Patent Application No. PCT/US2015/044485, mailed on Mar. 2, 2017, 20 pages.
Preliminary Report on Patentability received for PCT Patent Application No. PCT/US2015/053353, mailed on Sep. 21, 2017, 15 pages.

(56) References Cited

OTHER PUBLICATIONS

Preliminary Report on Patentability received for PCT Patent Application No. PCT/US2015/054223, mailed on Dec. 14, 2017, 18 pages.
Preliminary Report on Patentability received for PCT Patent Application No. PCT/US2016/021403, mailed on Sep. 21, 2017, 21 pages.
Preliminary Report on Patentability received for PCT Patent Application No. PCT/US2016/035090, mailed on Dec. 14, 2017, 14 pages.
Preliminary Report on Patentability received for PCT Patent Application No. PCT/US2017/034834, mailed on Dec. 20, 2018, 9 pages.
Preliminary Report on Patentability received for PCT Patent Application No. PCT/US2017/049793, mailed on Apr. 4, 2019, 15 pages.
Preliminary Report on Patentability received for PCT Patent Application No. PCT/US2018/032164, mailed on Nov. 21, 2019, 11 pages.
Preliminary Report on Patentability received for PCT Patent Application No. PCT/US2018/032385, mailed on Nov. 28, 2019, 10 pages.
Preliminary Report on Patentability received for PCT Patent Application No. PCT/US2019/030770, mailed on Nov. 19, 2020, 14 pages.
Preliminary Report on Patentability received for PCT Patent Application No. PCT/US2020/030079, mailed on Nov. 18, 2021, 12 pages.
Preliminary Report on Patentability received for PCT Patent Application No. PCT/US2020/031536, mailed on Nov. 18, 2021, 11 pages.
Preliminary Report on Patentability received for PCT Patent Application No. PCT/US2020/031575, mailed on Nov. 18, 2021, 9 pages.
Search Report and Written Opinion received for PCT Application No. PCT/US2015/034604, mailed on Nov. 9, 2015, 30 pages.
Search Report and Written Opinion received for PCT Patent Application No. PCT/US2015/034606, mailed on Dec. 2, 2015, 17 pages.
Search Report and Written Opinion received for PCT Patent Application No. PCT/US2015/034607, mailed on Dec. 1, 2015, 23 pages.
Search Report and Written Opinion received for PCT Patent Application No. PCT/US2015/044473, mailed on Feb. 12, 2016, 24 pages.
Search Report and Written Opinion received for PCT Patent Application No. PCT/US2015/044485, mailed on Feb. 9, 2016, 27 pages.
Search Report and Written Opinion received for PCT Patent Application No. PCT/US2015/053353, mailed on May 9, 2016, 21 pages.
Search Report and Written Opinion received for PCT Patent Application No. PCT/US2015/054223, mailed on Jul. 6, 2016, 25 pages.
Search Report and Written Opinion received for PCT Patent Application No. PCT/US2016/021403, mailed on May 12, 2016, 23 pages.
Search Report and Written Opinion received for PCT Patent Application No. PCT/US2016/035090, mailed on Oct. 4, 2016, 17 pages.
Search Report and Written Opinion received for PCT Patent Application No. PCT/US2016/037686, mailed on Sep. 9, 2016, 19 pages.
Search Report and Written Opinion received for PCT Patent Application No. PCT/US2017/034834, mailed on Aug. 23, 2017, 10 pages.
Search Report and Written Opinion received for PCT Patent Application No. PCT/US2017/049793, mailed on Dec. 27, 2017, 19 pages.
Search Report and Written Opinion received for PCT Patent Application No. PCT/US2018/032164, mailed on Oct. 18, 2018, 16 pages.
International Search Report and Written Opinion received for PCT Patent Application No. PCT/US2018/032385 mailed on Aug. 3, 2018, 14 pages.
International Search Report and Written Opinion received for PCT Patent Application No. PCT/US2019/030770, mailed on Oct. 31, 2019, 23 pages.
International Search Report and Written Opinion received for PCT Patent Application No. PCT/US2020/030079, mailed on Sep. 4, 2020, 18 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/031575, mailed on Aug. 20, 2020, 14 pages.
International Search Report and Written Opinion received for PCT Patent Application No. PCT/US2020/045814, mailed on Jan. 20, 2021, 16 pages.
International Search Report and Written Opinion received for PCT Patent Application No. PCT/US2021/031212, mailed on Sep. 21, 2021, 21 pages.
International Search Report and Written Opinion received for PCT Patent Application No. PCT/US2021/031669, mailed on Oct. 13, 2021, 17 pages.
Internet Blog Post, "[pc] Pre-customization of Black Desert's Characters", Online Available at:—<https://blog.naver.com/hsh6051/220209813968>, Dec. 14, 2014, 41 pages (21 pages of English Translation and 20 pages of Official Copy).
Inventerium, "Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604 mailed on Sep. 4, 2015, 6 pages.
Invitation to Additional Fees and Partial International Search Report received for PCT Patent Application No. PCT/US2015/034606 mailed on Sep. 9, 2015, 6 pages.
Invitation to Pay Additional Fee received for European Patent Application No. 15747595.5, mailed on Feb. 9, 2018, 6 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/044473, mailed on Nov. 3, 2015, 5 pages.
Invitation to Pay Additional Fees received for PCT Patent Application No. PCT/US2015/044485, mailed on Nov. 3, 2015, 7 pages.
Invitation to Pay Additional Fees received for PCT Patent Application No. PCT/US2015/053353, mailed on Jan. 21, 2016, 7 pages.
Invitation to Pay Additional Fees received for PCT Patent Application No. PCT/US2015/054223, mailed on Mar. 9, 2016, 9 pages.
Invitation to Pay Additional Fees received for PCT Patent Application No. PCT/US2016/035090, mailed on Jul. 15, 2016, 2 pages.
Invitation to Pay Additional Fees received for PCT Patent Application No. PCT/US2017/049793, mailed on Nov. 3, 2017, 2 pages.
Invitation to Pay Additional Fees received for PCT Patent Application No. PCT/US2018/032164, mailed on Aug. 21, 2018, 10 pages.
Invitation to Pay Additional Fees received for PCT Patent Application No. PCT/US2019/030770, mailed on Jul. 26, 2019, 12 pages.
Invitation to Pay Additional Fees received for PCT Patent Application No. PCT/US2020/030079, mailed on Jul. 14, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/045814, mailed on Nov. 18, 2020, 11 pages.
Invitation to Pay Additional Fees received for PCT Patent Application No. PCT/US2021/031212, mailed on Jul. 28, 2021, 19 pages.
Invitation to Pay Additional Fees received for PCT Patent Application No. PCT/US2021/031669, mailed on Aug. 19, 2021, 9 pages.
Invitation to Pay Search Fees received for European Patent Application No. 20761084.1, mailed on Dec. 7, 2021, 3 pages.
ISO 9241-13:1998, "Ergonomic Requirements for Office Work with Visual Display Terminals (vdts)", Part 13: User guidance, International Standard ISO, Zuerich, CH, vol. 9241-13, Jul. 15, 1998, 40 pages.
Jean, "Our Pact Parental Control Review", Available online at: https://www.bewebsmart.com/parental-controls/our-pact-parental-control-review/, Jun. 25, 2016, 25 pages.

(56) References Cited

OTHER PUBLICATIONS

Kenney, Briley, "How to Customize a Smartwatch and Other Personalization Questions", Available online at: https://smartwatches.org/learn/customize-smartwatch/, Jan. 23, 2014, 3 pages.
Kidizoom Smartwatch, Available online at: https://www.vtechnl.com/media/downloads/Kidizoom-Smart-Watch.pdf, Jun. 24, 2014, 23 pages.
Kubo, et al., "Watch Commander: A Gesture-based Invocation System for Rectangular Smartwatches using B2B-Swipe", UIST'16 Adjunct, Available online at: https://dl.acm.org/doi/pdf/10.1145/2984751.2985697, pp. 37-39.
Living Earth, Available at: http;//www.livingearthapp.com/, 2014, 6 pages.
Looking for a Launcher that Changes the Default Homescreen or Widgets Based on Wifi, Location, or Other Context., 2015, 2 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
Minutes of Oral Proceedings received for European Patent Application No. 16762356.0, mailed on Dec. 17, 2021, 5 pages.
Ms Excel 2013, Jan. 29, 2013, 2 pages.
My Mate Vince, "Setting Up the Fitbit Alta Hr Activity Tracker on Apple Ios", Online available at: https://youtu.be/FdwRF4IfvFc, Jun. 18, 2017, 3 pages.
Nerdtalk, "The Best Android Clock Widgets", Available at: https://www.youtube.com/watch?v=E1bAprWByfU, Apr. 25, 2011, 1 page.
New, but Unsigned—Easy Stopwatch for Symbian, XP55393563, Available online at: http://www.allaboutsymbian.com/flow/item/19490_New_but_unsigned-Easy_StopWatc.php, Mar. 15, 2014, 15 pages.
Night Display (Alarm Clock) App, Google Play Store Night Display (Alarm Clock) Description page, available at: https://web.archive.org/web/20141007124222/https://play.google.com/store/apps/details?id =com.srk.nighttimedisplay&hl=en, Oct. 7, 2014, pp. 1-3.
Non-Final Office Action received for U.S. Appl. No. 14/815,879, mailed on Dec. 15, 2016, 33 pages.
Non-Final Office Action received for U.S. Appl. No. 14/815,879, mailed on Nov. 6, 2015, 35 pages.
Non-Final Office Action received for U.S. Appl. No. 14/815,890, mailed on Dec. 18, 2018, 21 pages.
Non-Final Office Action received for U.S. Appl. No. 14/815,890, mailed on Jun. 6, 2017, 19 pages.
Non-Final Office Action received for U.S. Appl. No. 14/815,890, mailed on Oct. 19, 2015, 5 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Non-Final Office Action received for U.S. Appl. No. 14/821,667, mailed on Feb. 4, 2019, 13 pages.
Non-Final Office Action received for U.S. Appl. No. 14/821,667, mailed on Jul. 14, 2017, 12 pages.
Non-Final Office Action received for U.S. Appl. No. 14/839,889, mailed on Mar. 7, 2017, 26 pages.
Non-Final Office Action received for U.S. Appl. No. 14/841,606, mailed on Dec. 7, 2017, 30 pages.
Non-Final Office Action received for U.S. Appl. No. 14/841,606, mailed on May 8, 2019, 28 pages.
Non-Final Office Action received for U.S. Appl. No. 14/846,511 mailed on Jan. 7, 2020, 25 pages.
Non-Final Office Action received for U.S. Appl. No. 14/846,511 mailed on Oct. 27, 2017, 15 pages.
Non-Final Office Action received for U.S. Appl. No. 14/846,511, mailed on Nov. 30, 2018, 22 pages.
Non-Final Office Action received for U.S. Appl. No. 15/183,663, mailed on Jul. 9, 2018, 13 pages.
Non-Final Office Action received for U.S. Appl. No. 15/355,956, mailed on May 31, 2019, 32 pages.
Non-Final Office Action received for U.S. Appl. No. 15/405,122, mailed on Apr. 2, 2021, 35 pages.
Non-Final Office Action received for U.S. Appl. No. 15/405,122, mailed on May 31, 2019, 43 pages.
Non-Final Office Action received for U.S. Appl. No. 15/405,122, mailed on Sep. 24, 2020, 30 pages.
Non-Final Office Action received for U.S. Appl. No. 15/421,865, mailed on Mar. 21, 2019, 18 pages.
Non-Final Office Action received for U.S. Appl. No. 15/421,865, mailed on Oct. 7, 2020, 20 pages.
Non-Final Office Action received for U.S. Appl. No. 15/554,204, mailed on Apr. 17, 2019, 19 pages.
Non-Final Office Action received for U.S. Appl. No. 15/713,544, mailed on Dec. 11, 2019, 19 pages.
Non-Final Office Action received for U.S. Appl. No. 15/713,544, mailed on Jan. 24, 2019, 16 pages.
Non-Final Office Action received for U.S. Appl. No. 15/791,829, mailed on Nov. 8, 2018, 18 pages.
Non-Final Office Action received for U.S. Appl. No. 15/798,235, mailed on Apr. 24, 2019, 25 pages.
Non-Final Office Action received for U.S. Appl. No. 15/798,235, mailed on Mar. 14, 2018, 58 pages.
Non-Final Office Action received for U.S. Appl. No. 15/881,544, mailed on Jun. 7, 2018, 15 pages.
Non-Final Office Action received for U.S. Appl. No. 16/389,722, mailed on Apr. 3, 2020, 15 pages.
Non-Final Office Action received for U.S. Appl. No. 16/389,722, mailed on Jun. 3, 2021, 17 pages.
Non-Final Office Action received for U.S. Appl. No. 16/401,934, mailed on Dec. 11, 2020, 26 pages.
Non-Final Office Action received for U.S. Appl. No. 16/418,786, mailed on Apr. 24, 2020, 16 pages.
Non-Final Office Action received for U.S. Appl. No. 16/418,786, mailed on Oct. 4, 2021, 10 pages.
Non-Final Office Action received for U.S. Appl. No. 16/582,020, mailed on Apr. 5, 2021, 29 pages.
Non-Final Office Action received for U.S. Appl. No. 16/582,020, mailed on Jan. 13, 2020, 39 pages.
Non-Final Office Action received for U.S. Appl. No. 16/584,281, mailed on Dec. 10, 2019, 23 pages.
Non-Final Office Action received for U.S. Appl. No. 16/584,445, mailed on Dec. 26, 2019, 19 pages.
Non-Final Office Action received for U.S. Appl. No. 16/585,399, mailed on Jan. 23, 2020, 28 pages.
Non-Final Office Action received for U.S. Appl. No. 16/585,714, mailed on Apr. 16, 2020, 18 pages.
Non-Final Office Action received for U.S. Appl. No. 16/585,721, mailed on Dec. 27, 2019, 25 pages.
Non-Final Office Action received for U.S. Appl. No. 16/659,507, mailed on Oct. 7, 2020, 16 pages.
Non-Final Office Action received for U.S. Appl. No. 16/792,096, mailed on Feb. 12, 2021, 16 pages.
Non-Final Office Action received for U.S. Appl. No. 16/861,651, mailed on Nov. 27, 2020, 11 pages.
Non-Final Office Action received for U.S. Appl. No. 16/861,651, mailed on Sep. 30, 2021, 16 pages.
Non-Final Office Action received for U.S. Appl. No. 16/935,002, mailed on Jun. 25, 2021, 20 pages.
Non-Final Office Action received for U.S. Appl. No. 16/943,737, mailed on Jun. 25, 2021, 18 pages.
Non-Final Office Action received for U.S. Appl. No. 16/997,588, mailed on Dec. 14, 2020, 21 pages.
Non-Final Office Action received for U.S. Appl. No. 17/031,654, mailed on Nov. 19, 2020, 12 pages.
Non-Final Office Action received for U.S. Appl. No. 17/031,671, mailed on Apr. 30, 2021, 27 pages.
Non-Final Office Action received for U.S. Appl. No. 17/031,765, mailed on Jun. 28, 2021, 32 pages.
Non-Final Office Action received for U.S. Appl. No. 17/041,350, mailed on Jun. 10, 2021, 24 pages.

(56) References Cited

OTHER PUBLICATIONS

Non-Final Office Action received for U.S. Appl. No. 17/068,386, mailed on Jul. 15, 2021, 16 pages.
Non-Final Office Action received for U.S. Appl. No. 17/068,386, mailed on Oct. 28, 2021, 20 pages.
Non-Final Office Action received for U.S. Appl. No. 17/317,042, mailed on Nov. 10, 2021, 13 pages.
Non-Final received for U.S. Appl. No. 17/078,896, mailed on Dec. 24, 2021, 17 pages.
Notice of Acceptance received for Australian Patent Application No. 2015298710, mailed on Oct. 8, 2019, 3 pages.
Notice of Acceptance received for Australian Patent Application No. 2016229847, mailed on Sep. 12, 2018, 3 pages.
Notice of Acceptance received for Australian Patent Application No. 2017277813, mailed on Jun. 16, 2020, 3 pages.
Notice of Acceptance received for Australian Patent Application No. 2017330211, mailed on May 11, 2020, 3 pages.
Notice of Acceptance received for Australian Patent Application No. 2018201089, mailed May 28, 2021, 3 pages.
Notice of Acceptance received for Australian Patent Application No. 2018279037, mailed May 13, 2020, 3 pages.
Notice of Acceptance received for Australian Patent Application No. 2019208225, mailed Jan. 21, 2021, 3 pages.
Notice of Acceptance received for Australian Patent Application No. 2019267413, mailed Nov. 23, 2021, 3 pages.
Notice of Acceptance received for Australian Patent Application No. 2020204506, mailed Apr. 8, 2021, 3 pages.
Notice of Acceptance received for Australian Patent Application No. 2020239670, mailed Jul. 2, 2021, 3 pages.
Notice of Acceptance received for Australian Patent Application No. 2020309093, mailed on Jul. 8, 2021, 3 pages.
Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Allowance received for Chinese Patent Application No. 201510479088.4, mailed on Jan. 21, 2021, 2 pages (1 page of English Translation and 1 page of Official Copy).
Notice of Allowance received for Chinese Patent Application No. 201510481525.6, mailed on May 27, 2019, 2 pages (1 page of English Translation and 1 page of Official Copy).
Notice of Allowance received for Chinese Patent Application No. 201510483268.X, mailed on Nov. 6,2019, 2 pages (1 page of English Translation and 1 page of Official Copy).
Notice of Allowance received for Chinese Patent Application No. 201510483305.7, mailed on Jan. 8, 2019, 3 pages (1 page of English Translation and 2 pages of Official Copy).
Notice of Allowance received for Chinese Patent Application No. 201510484514.3, mailed on Jun. 6, 2019, 2 pages (1 page of English Translation and 1 page of Official Copy).
Notice of Allowance received for Chinese Patent Application No. 201520594249.X, mailed on Jul. 12, 2016, 4 pages (2 pages of English Translation and 2 pages of Official Copy).
Notice of Allowance received for Chinese Patent Application No. 201680013193.1, mailed on May 7, 2021, 5 pages (1 page of English Translation and 4 pages of Official Copy).
Notice of Allowance received for Chinese Patent Application No. 201680047983.1, mailed on Apr. 28, 2021, 3 pages (1 page of English Translation and 2 pages of Official Copy).
Notice of Allowance received for Chinese Patent Application No. 201780033973.7, mailed on Jul. 7, 2021, 5 pages (1 page of English Translation and 4 pages of Official Copy).
Notice of Allowance received for Chinese Patent Application No. 201810037665.8, mailed on Jul. 9, 2019, 4 pages (1 page of English Translation and 3 pages of Official Copy).
Notice of Allowance received for Chinese Patent Application No. 201910906898.1, mailed on Oct. 28, 2021, 4 pages (1 page of English Translation and 3 pages of Official Copy).
Notice of Allowance received for Danish Patent Application No. PA201570495, mailed on Feb. 22, 2017, 1 page.
Notice of Allowance received for Danish Patent Application No. PA201570496, mailed on Apr. 18, 2016, 2 pages.
Notice of Allowance received for Japanese Patent Application No. 2017-505450, mailed on Mar. 9, 2018, 10 pages (7 pages of English Translation and 3 pages of Official Copy).
Notice of Allowance received for Japanese Patent Application No. 2017-505842, mailed on Mar. 16, 2020, 4 pages (1 page of English Translation and 3 pages of Official Copy).
Notice of Allowance received for Japanese Patent Application No. 2017-505847, mailed on May 20, 2019, 4 pages (1 page of English Translation and 3 pages of Official Copy).
Notice of Allowance received for Japanese Patent Application No. 2017-545918, mailed on Jul. 22, 2019, 4 pages (1 page of English Translation and 3 pages of Official Copy).
Notice of Allowance received for Japanese Patent Application No. 2018-074971, mailed on Apr. 23, 2019, 4 pages (1 page of English Translation and 3 pages of Official Copy).
Notice of Allowance received for Japanese Patent Application No. 2018-537840, mailed on Mar. 19, 2020, 4 pages (1 page of English Translation and 3 pages of Official Copy).
Notice of Allowance received for Japanese Patent Application No. 2019-096219, mailed on Jun. 26, 2020, 4 pages (1 page of English Translation and 3 pages of Official Copy).
Notice of Allowance received for Japanese Patent Application No. 2019-151358, mailed on Jan. 22, 2021, 4 pages (1 page of English Translation and 3 pages of Official Copy).
Notice of Allowance received for Japanese Patent Application No. 2019-511611, mailed on Jul. 20, 2020, 4 pages (1 page of English Translation and 3 pages of Official Copy).
Notice of Allowance received for Japanese Patent Application No. 2020-074878, mailed on May 28, 2021, 4 pages (1 page of English Translation and 3 pages of Official Copy).
Notice of Allowance received for Japanese Patent Application No. 2020-551465, mailed on Jun. 28, 2021, 4 pages (1 page of English Translation and 3 pages of Official Copy).
Notice of Allowance received for Korean Patent Application No. 10-2017-7005939, mailed on Mar. 30, 2018, 5 pages (2 pages of English Translation and 3 pages of Official Copy).
Notice of Allowance received for Korean Patent Application No. 10-2018-7018904, mailed on Jun. 26, 2020, 4 pages (1 page of English Translation and 3 pages of Official Copy).
Notice of Allowance received for Korean Patent Application No. 10-2018-7022101, mailed on Oct. 14, 2019, 4 pages (1 page of English Translation and 3 pages of Official Copy).
Notice of Allowance received for Korean Patent Application No. 10-2019-7005734, mailed on Oct. 20, 2020, 4 pages (1 page of English Translation and 3 pages of Official Copy).
Notice of Allowance received for Korean Patent Application No. 10-2019-7029673, mailed on Aug. 3, 2021, 3 pages (1 page of English Translation and 2 pages of Official Copy).
Notice of Allowance received for Korean Patent Application No. 10-2020-7001340, mailed on May 10, 2021, 5 pages (2 pages of English Translation and 3 pages of Official Copy).
Notice of Allowance received for Korean Patent Application No. 10-2020-7026036, mailed on Jul. 26, 2021, 4 pages (1 page of English Translation and 3 pages of Official Copy).
Notice of Allowance received for Korean Patent Application No. 10-2020-7028759, mailed on Oct. 19, 2021, 4 pages (1 page of English Translation and 3 pages of Official Copy).
Notice of Allowance received for Korean Patent Application No. 10-2021-7002083, mailed on Jun. 18, 2021, 5 pages (2 page of English Translation and 3 pages of Official Copy).
Notice of Allowance received for Korean Patent Application No. 10-2021-7002597, mailed on Feb. 25, 2021, 5 pages (1 page of English Translation and 4 pages of Official Copy).
Notice of Allowance received for Korean Patent Application No. 10-2021-7013453, mailed on Aug. 11, 2021, 5 pages (2 pages of English Translation and 3 pages of Official Copy).
Notice of Allowance received for Korean Patent Application No. 10-2021-7013454, mailed on Aug. 12, 2021, 4 pages (1 page of English Translation and 3 pages of Official Copy).

(56) References Cited

OTHER PUBLICATIONS

Notice of Allowance received for Taiwanese Patent Application No. 104124962, mailed on Jul. 27, 2017, 3 pages (Official Copy only) (See Communication under 37 CFR § 1.98(a) (3)).
Notice of Allowance received for Taiwanese Patent Application No. 104124963, mailed on Sep. 28, 2017, 5 pages (1 page of English Translation of Search report and 4 pages of Official Copy).
Notice of Allowance received for Taiwanese Patent Application No. 104124995, mailed on Jul. 27, 2017, 3 pages (Official Copy only) (See Communication under 37 CFR § 1.98(a) (3)).
Notice of Allowance received for Taiwanese Patent Application No. 104124997, mailed on Jun. 16, 2017, 5 pages (1 page of English Translation of Search report and 4 pages of Official Copy).
Notice of Allowance received for Taiwanese Patent Application No. 104124998 mailed on Mar. 31, 2017, 3 pages (Official Copy only) (See Communication Under 37 CFR § 1.98(a) (3)).
Notice of Allowance received for Taiwanese Patent Application No. 104134740, mailed on Dec. 8, 2016, 5 pages (1 page of English Translation of Search Report and 4 pages of Official Copy).
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/821,667, mailed on Jun. 12, 2019, 9 pages.
Notice of Allowance received for U.S. Appl. No. 14/839,889, mailed on Oct. 30, 2017, 16 pages.
Notice of Allowance received for U.S. Appl. No. 15/183,663, mailed on Jan. 17, 2019, 6 pages.
Notice of Allowance received for U.S. Appl. No. 15/355,956, mailed on Nov. 22, 2019, 29 pages.
Notice of Allowance received for U.S. Appl. No. 15/554,204, mailed on Jul. 13, 2020, 10 pages.
Notice of Allowance received for U.S. Appl. No. 15/791,829, mailed on Oct. 4, 2019, 9 pages.
Notice of Allowance received for U.S. Appl. No. 15/798,235, mailed on Apr. 1, 2020, 8 pages.
Notice of Allowance received for U.S. Appl. No. 15/798,235, mailed on Sep. 22, 2020, 8 pages.
Notice of Allowance received for U.S. Appl. No. 15/798,257, mailed on May 22, 2019, 14 pages.
Notice of Allowance received for U.S. Appl. No. 15/881,544, mailed on Jun. 26, 2019, 6 pages.
Notice of Allowance received for U.S. Appl. No. 15/881,544, mailed on Nov. 7, 2019, 5 pages.
Notice of Allowance received for U.S. Appl. No. 16/401,934, mailed on Nov. 1, 2021, 11 pages.
Notice of Allowance received for U.S. Appl. No. 16/418,786, mailed on Dec. 9, 2021, 9 pages.
Notice of Allowance received for U.S. Appl. No. 16/582,020, mailed on Jul. 27, 2021, 29 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.
Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of Allowance received for U.S. Appl. No. 16/584,445, mailed on Jun. 24, 2020, 5 pages.
Notice of Allowance received for U.S. Appl. No. 16/584,445, mailed on May 29, 2020, 5 pages.
Notice of Allowance received for U.S. Appl. No. 16/584,445, mailed on Oct. 21, 2020, 6 pages.
Notice of Allowance received for U.S. Appl. No. 16/585,366, mailed on Jan. 2, 2020, 6 pages.
Notice of Allowance received for U.S. Appl. No. 16/585,399, mailed on Jul. 21, 2020, 9 pages.
Notice of Allowance received for U.S. Appl. No. 16/585,714, mailed on Jan. 8, 2021, 8 pages.
Notice of Allowance received for U.S. Appl. No. 16/585,714, mailed on Jan. 27, 2021, 2 pages.
Notice of Allowance received for U.S. Appl. No. 16/585,714, mailed on Sep. 25, 2020, 15 pages.
Notice of Allowance received for U.S. Appl. No. 16/585,721, mailed on Oct. 30, 2020, 9 pages.
Notice of Allowance received for U.S. Appl. No. 16/585,721, mailed on Sep. 30, 2020, 15 pages.
Notice of Allowance received for U.S. Appl. No. 16/659,507, mailed on Feb. 24, 2021, 7 pages.
Notice of Allowance received for U.S. Appl. No. 16/867,002, mailed on Aug. 20, 2021, 12 pages.
Notice of Allowance received for U.S. Appl. No. 16/997,588, mailed on Sep. 30, 2021, 12 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Notice of Allowance received for U.S. Appl. No. 17/087,845, mailed on Oct. 28, 2021, 9 pages.
Nova Launcher—Lock Screen Edit, Online Available at: https://forums.androidcentral.com/ask-question/835057-nova-launcher-lock-screen-edit.html, Sep. 2017, 2 pages.
Nova, "Tour of the Solar System", Retrieved from: http://www.pbs.org/wgbh/nova/space/tour-solar-system.html, May 24, 2013, 14 pages.
Obara, Yuuta, "Iphone Application Selection for Univesity Students", Shuwa System Co., Saito Kazukuni, vol. 1, May 16, 2013, 4 pages (Official Copy only) (See Communication under 37 CFR § 1.98(a) (3)).
Octoba, "Just Install It—Utilizing Method for Android Application Business", ASCII Media Works Co. Takano Kiyoshi, vol. 1, Apr. 25, 2013, 6 pages (Official Copy only) (See Communication under 37 CFR § 1.98(a) (3)).
Office Action and Search Report received for Danish Patent Application No. PA201970598, mailed on Jan. 28, 2020, 6 pages.
Office Action received for Australian Patent Application No. 2015101019, issued on Oct. 14, 2015, 3 pages.
Office Action received for Australian Patent Application No. 2015101019, issued on Apr. 7, 2016, 4 pages.
Office Action received for Australian Patent Application No. 2015101019, mailed on Feb. 12, 2016, 4 pages.
Office Action received for Australian Patent Application No. 2015101020, mailed on Oct. 26, 2015, 8 pages.
Office Action received for Australian Patent Application No. 2015101021, issued on Apr. 26, 2016, 4 pages.
Office Action received for Australian Patent Application No. 2015101021, issued on Oct. 28, 2015, 10 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.

(56) References Cited

OTHER PUBLICATIONS

Office Action received for Australian Patent Application No. 2016100411, mailed on Jun. 10, 2016, 3 pages.
Office Action received for Australian Patent Application No. 2016100476, mailed on Jun. 9, 2016, 4 pages.
Office Action received for Australian Patent Application No. 2016100765, issued on Aug. 5, 2016, 2 pages.
Office Action received for Australian Patent Application No. 2016100765, mailed on Dec. 16, 2016, 3 pages.
Office Action received for Australian Patent Application No. 2016229847, mailed on Jul. 3, 2018, 4 pages.
Office Action received for Australian Patent Application No. 2017277813, mailed on Jun. 11, 2019, 3 pages.
Office Action received for Australian Patent Application No. 2017277813, mailed on Mar. 20, 2020, 4 pages.
Office Action received for Australian Patent Application No. 2017330211, mailed on Dec. 5, 2019, 3 pages.
Office Action received for Australian Patent Application No. 2018100179, mailed on Jun. 4, 2018, 4 pages.
Office Action received for Australian Patent Application No. 2018100179, mailed on Nov. 20, 2018, 7 pages.
Office Action received for Australian Patent Application No. 2018100179, mailed on Sep. 14, 2018, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2018206770, mailed on Apr. 30, 2019, 4 pages.
Office Action received for Australian Patent Application No. 2018206770, mailed on Jul. 16, 2019, 5 pages.
Office Action received for Australian Patent Application No. 2018206770, mailed on Jul. 25, 2018, 5 pages.
Office Action received for Australian Patent Application No. 2018206770, mailed on Mar. 5, 2019, 3 pages.
Office Action received for Australian Patent Application No. 2018279037, mailed on Jan. 17, 2020, 4 pages.
Office Action received for Australian Patent Application No. 2018279037, mailed on Jun. 18, 2019, 5 pages.
Office Action received for Australian Patent Application No. 2019208225, mailed on Dec. 21, 2020, 3 pages.
Office Action received for Australian Patent Application No. 2019208225, mailed on Mar. 20, 2020, 3 pages.
Office Action received for Australian Patent Application No. 2019267413, mailed on Jun. 29, 2021, 3 pages.
Office Action received for Australian Patent Application No. 2020102158, mailed on Apr. 27, 2021, 5 pages.
Office Action received for Australian Patent Application No. 2020102158, mailed on Dec. 8, 2020, 9 pages.
Office Action received for Australian Patent Application No. 2020204506, mailed on Dec. 7, 2020, 6 pages.
Office Action received for Australian Patent Application No. 2020217354, mailed on Jul. 22, 2021, 3 pages.
Office Action received for Australian Patent Application No. 2020239670, mailed on Mar. 3, 2021, 4 pages.
Office Action received for Australian Patent Application No. 2020239749, mailed on Jul. 16, 2021, 5 pages.
Office Action received for Australian Patent Application No. 2020239774, mailed on Jun. 28, 2021, 8 pages.
Office Action received for Australian Patent Application No. 2020239774, mailed on Oct. 5, 2021, 3 pages.
Office Action received for Australian Patent Application No. 2020309093, mailed on Jan. 21, 2021, 3 pages.
Office Action received for Australian Patent Application No. 2021202834, mailed on May 28, 2021, 2 pages.
Office Action received for Chinese Patent Application No. 201510479088.4, mailed on Apr. 22, 2020, 7 pages (3 pages of English Translation and 4 pages of Official Copy).
Office Action received for Chinese Patent Application No. 201510479088.4, mailed on Mar. 12, 2018, 20 pages (6 pages of English Translation and 14 pages of Official Copy).
Office Action received for Chinese Patent Application No. 201510479088.4, mailed on May 7, 2019, 6 pages (3 pages of English Translation and 3 pages of Official Copy).
Office Action received for Chinese Patent Application No. 201510481525.6, mailed on Aug. 29, 2018, 10 pages (5 pages of English Translation and 5 pages of Official Copy).
Office Action received for Chinese Patent Application No. 201510481525.6, mailed on Nov. 29, 2017, 9 pages (3 pages of English Translation and 6 pages of Official Copy).
Office Action received for Chinese Patent Application No. 201510483268.X, mailed on Apr. 16, 2019, 6 pages (3 pages of English Translation and 3 pages of Official Copy).
Office Action received for Chinese Patent Application No. 201510483268.X, mailed on Dec. 1, 2017, 11 pages (5 pages of English Translation and 6 pages of Official Copy).
Office Action received for Chinese Patent Application No. 201510483268.X, mailed on Oct. 19, 2018, 10 pages (5 pages of English Translation and 5 pages of Official Copy).
Office Action received for Chinese Patent Application No. 201510483305.7, mailed on Aug. 31, 2018, 10 pages (5 pages of English Translation and 5 pages of Official Copy).
Office Action received for Chinese Patent Application No. 201510483305.7, mailed on Dec. 1, 2017, 13 pages (5 pages of English Translation and 8 pages of Official Copy).
Office Action received for Chinese Patent Application No. 201510484514.3, mailed on Apr. 4, 2018, 12 pages (5 pages of English Translation and 7 pages of Official Copy).
Office Action received for Chinese Patent Application No. 201510484514.3, mailed on Dec. 24, 2018, 13 pages (6 pages of English Translation and 7 pages of Official Copy).
Office Action received for Chinese Patent Application No. 201520594249.X, mailed on Dec. 9, 2015, 4 pages (2 pages of English Translation and 2 pages of Official Copy).
Office Action received for Chinese Patent Application No. 201520594249.X, mailed on Mar. 25, 2016, 3 pages (1 page of English Translation and 2 pages of Official Copy).
Office Action received for Chinese Patent Application No. 201520595384.6, mailed on Dec. 9, 2015, 4 pages. (2 pages of English Translation and 2 pages of Official Copy).
Office Action received for Chinese Patent Application No. 201520595384.6, mailed on Dec. 30, 2016, 2 pages (Official Copy only) (See Communication under 37 CFR § 1.98(a) (3)).
Office Action received for Chinese Patent Application No. 201520595384.6, mailed on Jul. 22, 2016, 3 pages (1 page of English Translation and 2 pages of Official Copy).
Office Action received for Chinese Patent Application No. 201520595384.6, mailed on Mar. 25, 2016, 3 pages (1 page of English Translation and 2 pages of Official Copy).
Office Action received for Chinese Patent Application No. 201520595385.0, mailed on Dec. 9, 2015, 4 pages (2 pages of English Translation and 2 pages of Official Copy.
Office Action received for Chinese Patent Application No. 201520595385.0, mailed on Dec. 30, 2016, 2 pages (Official Copy only) (See Communication under 37 CFR § 1.98(a) (3)).
Office Action received for Chinese Patent Application No. 201520595385.0, mailed on Jul. 22, 2016, 3 pages (1 page of English Translation and 2 pages of Official Copy).
Office Action received for Chinese Patent Application No. 201520595385.0, mailed on Mar. 25, 2016, 3 pages (1 page of English Translation and 2 pages of Official Copy).
Office Action received for Chinese Patent Application No. 201520595408.8, mailed on Dec. 9, 2015, 4 pages (2 pages of English Translation and 2 pages of Official Copy).
Office Action Received for Chinese Patent Application No. 201520595408.8, mailed on Dec. 30, 2016, 2 pages (Official Copy only) (See Communication under 37 CFR § 1.98(a) (3)).
Office Action received for Chinese Patent Application No. 201520595408.8, mailed on Jul. 25, 2016, 3 pages (1 page of English Translation and 2 pages of Official Copy).

(56) References Cited

OTHER PUBLICATIONS

Office Action received for Chinese Patent Application No. 201520595408.8, mailed on Mar. 25, 2016, 3 pages (1 page of English Translation and 2 pages of Official Copy).
Office Action received for Chinese Patent Application No. 201520595538.1, mailed on Dec. 9, 2015, 4 pages (2 pages of English Translation and 2 pages of Official Copy).
Office Action received for Chinese Patent Application No. 201520595538.1, mailed on Dec. 30, 2016, 2 pages (Official Copy only) (See Communication under 37 CFR § 1.98(a) (3)).
Office Action received for Chinese Patent Application No. 201520595538.1, mailed on Jul. 22, 2016, 3 pages (1 page of English Translation and 2 pages of Official Copy).
Office Action received for Chinese Patent Application No. 201520595538.1, mailed on Mar. 25, 2016, 3 pages (1 page of English Translation and 2 pages of Official Copy).
Office Action received for Chinese Patent Application No. 201680013193.1, mailed on Feb. 1, 2021, 8 pages (3 pages of English Translation and 5 pages of Official Copy).
Office Action received for Chinese Patent Application No. 201680013193.1, mailed on Mar. 25, 2020, 21 pages (8 pages of English Translation and 13 pages of Official Copy).
Office Action received for Chinese Patent Application No. 201680013193.1, mailed on Sep. 7, 2020, 6 pages (3 pages of English Translation and 3 pages of Official Copy).
Office Action received for Chinese Patent Application No. 201680047983.1, mailed on Feb. 1, 2021, 6 pages (3 pages of English Translation and 3 pages of Official Copy).
Office Action received for Chinese Patent Application No. 201680047983.1, mailed on Jul. 1, 2020, 6 pages (3 pages of English Translation and 3 pages of Official Copy).
Office Action received for Chinese Patent Application No. 201680047983.1, mailed on Mar. 18, 2019, 18 pages (6 pages of English Translation and 12 pages of Official Copy).
Office Action received for Chinese Patent Application No. 201680047983.1, mailed on Nov. 28, 2019, 9 pages (4 pages of English Translation and 5 pages of Official Copy).
Office Action received for Chinese Patent Application No. 201780002643.1, mailed on Aug. 2, 2021, 20 pages (6 pages of English Translation and 14 pages of Official Copy).
Office Action received for Chinese Patent Application No. 201780002643.1, mailed on Dec. 31, 2020, 26 pages (6 pages of English Translation and 20 pages of Official Copy).
Office Action received for Chinese Patent Application No. 201780002643.1, mailed on Jun. 17, 2020, 30 pages (10 pages of English Translation and 20 pages of Official Copy).
Office Action received for Chinese Patent Application No. 201780033973.7, mailed on Jan. 22, 2021, 27 pages (11 pages of English Translation and 16 pages of Official Copy).
Office Action received for Chinese Patent Application No. 201810037665.8, mailed on Dec. 7, 2018, 10 pages (5 pages of English Translation and 5 pages of Official Copy).
Office Action received for Chinese Patent Application No. 201810467061.7, mailed on Aug. 15, 2019, 13 pages (7 pages of English Translation and 6 pages of Official Copy).
Office Action received for Chinese Patent Application No. 201810467061.7, mailed on Feb. 22, 2019, 19 pages (10 pages of English Translation and 9 pages of Official Copy).
Office Action received for Chinese Patent Application No. 2018104670617, mailed on Feb. 18, 2020, 12 pages (6 pages of English Translation and 6 pages of Official Copy).
Office Action received for Chinese Patent Application No. 201910906898.1, mailed on Jun. 23, 2021, 6 pages (3 pages of English Translation and 3 pages of Official Copy).
Office Action received for Chinese Patent Application No. 201910906898.1, mailed on Sep. 9, 2020, 8 pages (3 pages of English Translation and 5 pages of Official Copy).
Office Action received for Chinese Patent Application No. 202110194015.6, mailed on Sep. 28, 2021, 13 pages (6 pages of English Translation and 7 pages of Official Copy).
Office Action received for Chinese Patent Application No. 202110453180.9, mailed on Nov. 8, 2021, 21 pages (11 pages of English Translation and 10 pages of Official Copy).
Office Action received for Chinese Patent Application No. 202110454541.1, mailed on Oct. 20, 2021, 19 pages (10 pages of English Translation and 9 pages of Official Copy).
Office Action received for Danish Patent Application No. PA201570495, mailed on Dec. 9, 2016, 2 pages.
Office Action received for Danish Patent Application No. PA201570495, mailed on May 4, 2016, 8 pages.
Office Action received for Danish Patent Application No. PA201570495, mailed on Oct. 29, 2015, 7 pages.
Office Action received for Danish Patent Application No. PA201570496, mailed on Oct. 29, 2015, 6 pages.
Office Action received for Danish Patent Application No. PA201570497, mailed on Feb. 21, 2017, 3 pages.
Office Action received for Danish Patent Application No. PA201570497, mailed on May 17, 2016, 6 pages.
Office Action received for Danish Patent Application No. PA201570497, mailed on Nov. 15, 2016, 2 pages.
Office Action received for Danish Patent Application No. PA201570497, mailed on Oct. 24, 2017, 2 pages.
Office Action received for Danish Patent Application No. PA201570497, mailed on Oct. 30, 2015, 6 pages.
Office Action received for Danish Patent Application No. PA201570498, mailed on Feb. 6, 2017, 2 pages.
Office Action received for Danish Patent Application No. PA201570498, mailed on Jun. 2, 2016, 8 pages.
Office Action received for Danish Patent Application No. PA201570498, mailed on Oct. 26, 2017, 5 pages.
Office Action received for Danish Patent Application No. PA201570498, mailed on Oct. 30, 2015, 7 pages.
Office Action received for Danish Patent Application No. PA201570499, mailed on Feb. 14, 2017, 2 pages.
Office Action received for Danish Patent Application No. PA201570499, mailed on Jun. 16, 2016, 8 pages.
Office Action received for Danish Patent Application No. PA201570499, mailed on Jun. 19, 2018, 4 pages.
Office Action received for Danish Patent Application No. PA201570499, mailed on Nov. 1, 2017, 6 pages.
Office Action received for Danish Patent Application No. PA201570499, mailed on Nov. 3, 2015, 7 pages.
Office Action received for Danish Patent Application No. PA201570768, mailed on Sep. 13, 2016, 8 pages.
Office Action received for Danish Patent Application No. PA201570770, mailed on Apr. 7, 2017, 7 pages.
Office Action received for Danish Patent Application No. PA201570770, mailed on Mar. 17, 2016, 9 pages.
Office Action received for Danish Patent Application No. PA201570770, mailed on Sep. 12, 2016, 6 pages.
Office Action received for Danish Patent Application No. PA201770387, mailed on Feb. 1, 2018., 3 Pages.
Office Action received for Danish Patent Application No. PA201770791, mailed on Jan. 31, 2018, 8 pages.
Office Action received for Danish Patent Application No. PA201770791, mailed on Jul. 13, 2018, 2 pages.
Office Action received for Danish Patent Application No. PA201770791, mailed on Jun. 11, 2019, 3 pages.
Office Action received for Danish Patent Application No. PA201970596, mailed on May 6, 2020, 4 pages.
Office Action received for Danish Patent Application No. PA201970597, mailed on Oct. 29, 2020, 4 pages.
Office Action received for Danish Patent Application No. PA201970598, mailed on Apr. 15, 2021, 6 pages.
Office Action received for Danish Patent Application No. PA201970598, mailed on Oct. 9, 2020, 4 pages.
Office Action received for Danish Patent Application No. PA201970599, mailed on Jan. 23, 2020, 6 pages.
Office Action received for Danish Patent Application No. PA201970599, mailed on Mar. 1, 2021, 4 pages.
Office Action received for Danish Patent Application No. PA201970599, mailed on May 27, 2020, 4 pages.

(56) References Cited

OTHER PUBLICATIONS

Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070623, mailed on Aug. 24, 2021, 3 pages.
Office Action received for Danish Patent Application No. PA202070624, mailed on Jun. 16, 2021, 5 pages.
Office Action received for Danish Patent Application No. PA202070625, mailed on Jun. 16, 2021, 3 pages.
Office Action received for European Patent Application No. 15730924.6, mailed on Dec. 12, 2017, 8 pages.
Office Action received for European Patent Application No. 15730925.3, mailed on Apr. 12, 2018, 8 pages.
Office Action received for European Patent Application No. 15730925.3, mailed on Feb. 27, 2019, 5 pages.
Office Action received for European Patent Application No. 15747595.5, mailed on Apr. 15, 2019, 4 pages.
Office Action received for European Patent Application No. 15747595.5, mailed on Jun. 27, 2018, 8 pages.
Office Action received for European Patent Application No. 16762356.0, mailed on Dec. 11, 2020, 7 pages.
Office Action received for European Patent Application No. 16837432.0, mailed on Jan. 10, 2020, 7 pages.
Office Action received for European Patent Application No. 16837432.0, mailed on Jan. 27, 2021, 7 pages.
Office Action received for European Patent Application No. 17206177.2, mailed on May 15, 2018, 6 pages.
Office Action received for European Patent Application No. 17810723.1, mailed on Jul. 9, 2021, 8 pages.
Office Action received for European Patent Application No. 17853656.1, mailed on Mar. 25, 2021, 8 pages.
Office Action received for European Patent Application No. 18172554.0, mailed on Jul. 12, 2019, 10 Pages.
Office Action received for European Patent Application No. 20172197.4, mailed on Aug. 5, 2020, 6 pages.
Office Action received for European Patent Application No. 20172197.4, mailed on Jul. 8, 2021, 5 pages.
Office Action received for German Patent Application No. 112015003083.2, mailed on Mar. 9, 2018, 12 pages (5 pages of English Translation and 7 pages of Official Copy).
Office Action received for Indian Patent Application No. 202017041557, mailed on Dec. 8, 2021, 8 pages.
Office Action received for Japanese Patent Application No. 2017-505450, mailed on Jun. 20, 2017, 8 pages (4 pages of English Translation and 4 pages of Official Copy).
Office Action received for Japanese Patent Application No. 2017-505842, mailed on Feb. 22, 2019, 11 pages (6 pages of English Translation and 5 pages of Official Copy).
Office Action received for Japanese Patent Application No. 2017-505842, mailed on Sep. 9, 2019, 7 pages (3 pages of English Translation and 4 pages of Official Copy).
Office Action received for Japanese Patent Application No. 2017-505847, mailed on Feb. 12, 2019, 13 pages (6 pages of English Translation and 7 pages of Official Copy).
Office Action received for Japanese Patent Application No. 2017-545918, mailed on Sep. 14, 2018, 12 pages (7 pages of English Translation and 5 pages of Official Copy).
Office Action received for Japanese Patent Application No. 2018-074971, mailed on Jan. 28, 2019, 6 pages (3 pages of English Translation and 3 pages of Official Copy).
Office Action received for Japanese Patent Application No. 2018-537840, mailed on Jul. 8, 2019, 15 pages (8 pages of English Translation and 7 pages of Official Copy).
Office Action received for Japanese Patent Application No. 2019-151358, mailed on Oct. 2, 2020, 5 pages (2 pages of English Translation and 3 pages of Official Copy).
Office Action received for Japanese Patent Application No. 2019-511611, mailed on Feb. 28, 2020, 4 pages (2 pages of English Translation and 2 pages of Official Copy).
Office Action received for Japanese Patent Application No. 2020-074878, mailed on Sep. 7, 2020, 13 pages (7 pages of English Translation and 6 pages of Official Copy).
Office Action received for Japanese Patent Application No. 2020-124605, mailed on Sep. 3, 2021, 5 pages (2 pages of English Translation and 3 pages of Official Copy).
Office Action received for Japanese Patent Application No. 2020-137007, mailed on Jun. 21, 2021, 7 pages (3 pages of English Translation and 4 pages of Official Copy).
Office Action received for Korean Patent Application No. 10-2017-7005939, mailed on Jun. 30, 2017, 6 pages (2 pages of English Translation and 4 pages of Official Copy).
Office Action received for Korean Patent Application No. 10-2017-7024570, mailed on Jul. 10, 2019, 6 pages (3 pages of English Translation and 3 pages of Official Copy).
Office Action received for Korean Patent Application No. 10-2017-7024570, mailed on Sep. 28, 2018, 14 pages (6 pages of English Translation and 8 pages of Official Copy).
Office Action received for Korean Patent Application No. 10-2018-7018904, mailed on Aug. 20, 2019, 8 pages (3 pages of English Translation and 5 pages of Official Copy).
Office Action received for Korean Patent Application No. 10-2018-7022101, mailed on Feb. 14, 2019, 15 pages (6 pages of English Translation and 9 pages of Official Copy).
Office Action received for Korean Patent Application No. 10-2018-7022101, mailed on Jul. 9, 2019, 10 pages (5 pages of English Translation and 5 pages of Official Copy).
Office Action received for Korean Patent Application No. 10-2019-7005734, mailed on Feb. 24, 2020, 13 pages (7 pages of English Translation and 6 pages of Official Copy).
Office Action received for Korean Patent Application No. 10-2019-7005734, mailed on Jul. 14, 2020, 8 pages (4 pages of English Translation and 4 pages of Official Copy).
Office Action received for Korean Patent Application No. 10-2019-7029673, mailed on Apr. 8, 2021, 7 pages (3 pages of English Translation and 4 pages of Official Copy).
Office Action received for Korean Patent Application No. 10-2019-7029673, mailed on Nov. 5, 2019, 10 pages (4 pages of English Translation and 6 pages of Official Copy).
Office Action received for Korean Patent Application No. 10-2019-7029673, mailed on Sep. 3, 2020, 9 pages (4 pages of English Translation and 5 pages of Official Copy).
Office Action received for Korean Patent Application No. 10-2020-7001340, mailed on Mar. 26, 2021, 13 pages (6 pages of English Translation and 7 pages of Official Copy).
Office Action received for Korean Patent Application No. 10-2020-7001340, mailed on Sep. 24, 2020, 19 pages (8 pages of English Translation and 11 pages of Official Copy).
Office Action received for Korean Patent Application No. 10-2020-7026036, mailed on Dec. 7, 2020, 8 pages (3 pages of English Translation and 5 pages of Official Copy).
Office Action received for Korean Patent Application No. 10-2020-7028759, mailed on Jun. 29, 2021, 12 pages (5 pages of English Translation and 7 pages of Official Copy).
Office Action received for Korean Patent Application No. 10-2021-7002083, mailed on Feb. 10, 2021, 7 pages (3 pages of English Translation and 4 pages of Official Copy).
Office Action received for Korean Patent Application No. 10-2021-7013453, mailed on Jun. 5, 2021, 6 pages (2 pages of English Translation and 4 pages of Official Copy).
Office Action received for Korean Patent Application No. 10-2021-7013454, mailed on Jun. 5, 2021, 6 pages (2 pages of English Translation and 4 pages of Official Copy).
Office Action received for Korean Patent Application No. 10-2021-7025301, mailed on Oct. 15, 2021, 5 pages (2 pages of English Translation and 3 pages of Official Copy).
Office Action received for Korean Patent Application No. 10-2021-7030552, mailed on Nov. 22, 2021, 14 pages (8 pages of English Translation and 6 pages of Official Copy).

(56) References Cited

OTHER PUBLICATIONS

Office Action received for Korean Patent Application No. 10-2021-7036016, mailed on Nov. 10, 2021, 13 pages (6 pages of English Translation and 7 pages of Official Copy).
Office Action received for Korean Patent Application No. 10-2021-7036246, mailed on Nov. 26, 2021, 5 pages (2 pages of English Translation and 3 pages of Official Copy).
Office Action received for Netherland Patent Application No. 2015245, mailed on Jan. 24, 2017, 11 pages (1 page of English Translation and 10 pages of Official Copy).
Office Action received for Netherlands Patent Application No. 2015239, mailed on Oct. 28, 2016, 13 pages (5 pages of English Translation and 8 pages of Official Copy).
Office Action received for Taiwanese Patent Application No. 104124962, issued on Nov. 29, 2016, 6 pages (3 pages of English Translation and 3 pages of Official Copy).
Office Action received for Taiwanese Patent Application No. 104124963, mailed on Jan. 5, 2017, 11 pages (5 pages of English Translation and 6 pages of Official Copy).
Office Action received for Taiwanese Patent Application No. 104124995, issued on Dec. 1, 2016, 6 pages (3 pages of English Translation and 3 pages of Official Copy).
Office Action received for Taiwanese Patent Application No. 104124997, issued on Dec. 8, 2016, 12 pages (5 pages of English Translation and 7 pages of Official Copy).
Office Action received for Taiwanese Patent Application No. 104124998, mailed on Nov. 29, 2016, 6 pages (3 pages of English Translation and 3 pages of Official Copy).
Office Action received for Taiwanese Patent Application No. 104126627, issued on Nov. 29, 2016, 9 pages (4 pages of English Translation and 5 pages of Official Copy).
Office Action received for Taiwanese Patent Application No. 104126627, mailed on Aug. 30, 2018, 22 pages (9 pages of English Translation and 13 pages of Official Copy).
Office Action received for Taiwanese Patent Application No. 104126627, mailed on Dec. 20, 2018, 4 pages (2 pages of English Translation and 2 pages of Official Copy).
Office Action received for Taiwanese Patent Application No. 104126627, mailed on Oct. 16, 2017, 7 pages (3 pages of English Translation and 4 pages of Official Copy).
Office Action received for Taiwanese Patent Application No. 104132636, issued on Dec. 13, 2018, 26 pages (9 pages of English Translation and 17 pages of Official Copy).
Office Action received for Taiwanese Patent Application No. 104132636, issued on Mar. 23, 2017, 25 pages (10 pages of English Translation and 15 pages of Official Copy).
Office Action received for Taiwanese Patent Application No. 104132636, issued on Oct. 31, 2017, 10 pages (4 pages of English Translation and 6 pages of Official Copy).
Omar Romero, "Sony Smartwatch 2 Custom Watchfaces Tutorial", Retrieved From: https://www.youtube.com/watch?v=8odbxqwSQR8, May 1, 2014, 2 pages.
Online Alarm Clock, https://web.archive.org/web/20150505081746/http://www.online-stopwatch.com/online-alarm-clock, May 5, 2015, 2 pages.
Pa201570497, "Link to Wayback Machine with Link to Google Play Showing Different Layouts of Complications Associated with a Clock Face", Available online at: https://play.google.com/store/apps/details?id=com.levelup.beautifulwidgets.free&hl=da, Sep. 9, 2013, 6 pages.
Pentax K20d Operating Manual, available online at: http://www.ricoh-imaging.eu/en/operating-manuals-download.html 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Phlam, Dev, "Clockwork Tomato Presentation", Retrieved from the Internet: URL: https://www.youtube.com/watch?v=2IQDx9REn0E, Apr. 29, 2016, 6 pages.
Phonebuff, "Hybrid Stopwatch & Timer Android App Review", Available Online at: https://www.youtube.com/watch?v=B43oCFPiWvY, Apr. 4, 2012, 7 pages.
Pre-interview First Office Action received for U.S. Appl. No. 14/815,890, mailed on May 26, 2016, 4 pages.
Record of Oral Hearing received for U.S. Appl. No. 14/815,890, mailed on Nov. 20, 2020, 18 pages.
Rehman, A, "Install Android 4.2 Gesture-based Keyboard & Clock App on JellyBean 4.1 or Higher", Excerpts From, Available online at: http://www.addictivetips.com/android/install-android-4-2-keyboard-clock-app-apk-on-jelly-bean-4-1-x/, Nov. 3, 2012, 4 pages.
Restriction Requirement received for U.S. Appl. No. 14/815,890, mailed on Feb. 22, 2016, 5 pages.
Result of Consultation received for European Patent Application No. 15730925.3, mailed on Nov. 24, 2020, 4 pages.
Result of Consultation received for European Patent Application No. 16762356.0, mailed on Nov. 29, 2021, 3 pages.
Rosa et al., "Stripe Generator—a Free Tool for the Web Design Community", Available online at: http://www.stripegenerator.com/, Mar. 28, 2019, 10 pages.
Rowinski, Dan, "Why the All-in-one Smartwatch Isn't Happening Any Time Soon", Online Available at: https://web.archive.org/web/20140123074218if_/https://readwrite.com/2014/01/20/smartwatch-wearable-fitness-remote-control/, Jan. 20, 2014, 6 pages.
Search Report and Opinion received for Danish Patent Application No. PA201770387, mailed on Oct. 12, 2017., 8 pages.
Search Report and Opinion received for Danish Patent Application No. PA201970596, mailed on Dec. 4, 2019, 11 pages.
Search Report and Opinion received for Danish Patent Application No. PA201970597, mailed on Dec. 18, 2019, 10 pages.
Search Report and Opinion received for Danish Patent Application No. PA201970598, mailed on Oct. 31, 2019, 9 pages.
Search Report and Opinion received for Danish Patent Application No. PA201970599, mailed on Nov. 8, 2019, 12 pages.
Search Report and Opinion received for Danish Patent Application No. PA202070610, mailed on Jan. 8, 2021, 9 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Search Report and Opinion received for Netherland Patent Application No. 2015232, mailed on Jan. 25, 2017, 9 pages (1 page of English Translation and 8 pages of Official Copy).
Search Report and Opinion received for Netherlands Patent Application No. 2015242, issued on Jul. 4, 2017, 20 pages (10 pages of English Translation of Search Opinion and 10 pages of Official Copy).
Search Report and Opinion received for Netherlands Patent Application No. 2018531, Issued on Jul. 27, 2017, 14 pages (6 pages of English Translation and 8 pages of Official Copy).
Search Report received for Danish Patent Application No. 201570768, mailed on Mar. 17, 2016, 11 pages.
Search Report received for Netherlands Patent Application No. 2015236, mailed on Apr. 21, 2021, 19 pages (13 pages of English Translation and 6 pages of Official Copy).
Shiota, Shinji, "Windows 7 Dojo", Weekly ASCII, Ascii Mediaworks Inc., vol. 798, Aug. 31, 2010, 3 pages.
Singh, Lovepreet, "Samsung Galaxy Watch: How to Change Watch Face—Tips and Tricks", Online available at: https://www.youtube.com/watch?pp=desktop&v=IN7gPxTZ1qU, Dec. 4, 2018, 1 page.
Smartwatch, "App Earth Space Hd Live Wallpaper Apk for Smart Watch", Version 1.7, Android version 2.2, Aug. 27, 2013, 1 page.
Solar Walk Free, Vito Technology Jun. 19, 2014, 9 pages.
Sony, "Live View™ Micro Display", Extended User Guide, Aug. 2010, 27 pages.
Sony, "Sony Smartwatch", User Guide, Dec. 2011, 18 pages.
Stateoftech, "Samsung Galaxy Gear Tips—Installing and Customizing Clock Faces", Online available at: https://www.youtube.com/watch?v=p2GzpL3xlUo, Dec. 12, 2013, 3 pages.

(56) References Cited

OTHER PUBLICATIONS

Stateoftech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 16762356.0, mailed on May 10, 2021, 10 pages.
Summons to Attend Oral Proceedings received for European Patent Application No. 17206177.2, mailed on Jun. 3, 2019, 8 pages.
Sun Set, "Sun Set Solar Image Clock", Available at: https://web.archive.orgjweb/20140719005410/http://www.sunsetclock.com/, 2013, 5 pages.
Supplemental Notice of Allowance received for U.S. Appl. No. 14/815,890, mailed on Mar. 10, 2021, 2 pages.
Supplemental Notice of Allowance received for U.S. Appl. No. 16/585,399, mailed on Aug. 26, 2020, 2 pages.
Supplemental Notice of Allowance received for U.S. Appl. No. 16/867,002, mailed on Sep. 9, 2021, 2 pages.
Supplemental Notice of Allowance received for U.S. Appl. No. 16/997,588, mailed on Oct. 22, 2021, 4 pages.
Talkandroid, "Android Wear Walkthrough", Available online at: https://www.youtube.com/watch?v=4xntpZac4sw, Jun. 30, 2014, 1 page.
Techcloud, "How to Create Custom Watch Face for Samsung Galaxy Gear Smartwatch Just in Few Seconds", Online available at:—https://www.youtube.com/watch?v=6rO-_SREDjQ, Oct. 9, 2013, 3 pages.
The Simply Alarm App for Pebble, Available online at: https://web.archive.org/web/20150517070400/http://www.rebootsramblings.ca/n/sahhelp/ https://www.youtube.com/watch?v=IVp1scQPw08, May 17, 2015, 1 page.
Theunlockr, "How to Change the Watch Face on the Galaxy Gear", Online available at: https://www.youtube.com/watch?v=Z7EBG5aBiZg, Jan. 3, 2014, 3 pages.
Tweedie, Steven, "Create and Customize Your Own Emojis with 'makemoji' for Iphone", Available online at: http://www.businessinsider.com/create-custom-emojis-with-makemoji-app-2014-8, Aug. 19, 2014, 6 pages.
Uikit User Interface Catalog: Page Controls, Available online at: https://web.archive.org/web/20140703123442/https://developer.apple.com/, Dec. 16, 2013, 4 pages.
Ultitorch For, Online Available at <https://apkgk.com/com.qasq.torchpro>, 4 pages.
Vidstube, "Bitmoji Clockface on Fitbit Versa Sense/versa 3/versa 2", Available online at: https://www.youtube.com/watch?v=4V_xDnSLeHE, Jun. 30, 2019, 1 page.
Viticci, Frederico, "Checking Time Zones with Living Earth—Macstories", Available at: https://www.macstories.net/reviews/checking-time-zones-with-living-earth/, Dec. 11, 2013, pp. 1-5.
Wade, Cliff, "Get the Most Out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the Most Out of Nova Launcher: Changing Icon Sizes", Online available at: https://www.androidguys.com/tips-tools/get-nova-launcher-changing-icon-sizes/, Nov. 16, 2015, 6 pages.
Wade, Cliff, "Get the Most Out of Nova Launcher: Customizing the Dock (contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The Watch Every Father Needs: M-i-c-k-e-y, M-o-u-s-e. Mickey Mouse . . .?", Online Available at: https://forums.watchuseek.com/f2/watch-every-father-needs-m-i- c-k-e-y-m-o-u-s-e-mickey-mouse-855069.html, 2013, 3 pages.
Wearablezone, "How to Set Up Your Fitbit Profile", Online available at: https://youtu.be/jsWPtcDWiJM, Jun. 6, 2016, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-defacto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Woolsey, Amanda, "How to Customize the Clock on the Apple Watch", Available online at: https://www.youtube.com/watch?v=t-3Bckdd9B4>, Apr. 25, 2015, 1 page.
Xdream, "Ticktalk Video User Manual", YouTube [online] [video], Online available at: https://youtu.be/jYhq3DwmVzo, Mar. 17, 2017, 3 pages.
Xperia ZL2 SOL25, "Instruction Manual", Detailed version, KDDI Corporation, No. 1, vol. 1, Jun. 2014, 4 pages.
Zelgadis, "Reuse Animations—Synfig Animation Studio", Available online at: https://wiki.synfig.org/index.php?title=Doc: Reuse_Animations&oldid=18173, May 20, 2013, 5 pages.
Zephyrnix, "Steam's In-game Home Menu", Online Available at: https://www.youtube.com/watch?v=jLoRFiPkcUw, see 0;00-1;06., Feb. 15, 2011, 3 pages.
Zukerman, Erez, "6 Beautiful, Interesting & Versatile Timer Apps [android]", available at: http://www.makeuseof.com/tag/beautiful-interesting-versatile-timer-apps-android/, May 18, 2012, 5 pages.
Non-Final Office Action received for U.S. Appl. No. 17/681,584, mailed on Jan. 18, 2023, 12 pages.
Notice of Acceptance received for Australian Patent Application No. 2021250863, mailed on Jan. 13, 2023, 3 pages.
Notice of Allowance received for Japanese Patent Application No. 2022-139320, mailed on Jan. 6, 2023, 4 pages (1 page of English Translation and 3 pages of Official Copy).
Notice of Allowance received for Korean Patent Application No. 10-2022-7019205, mailed on Jan. 5, 2023, 8 pages (2 pages of English Translation and 6 pages of Official Copy).
Applicant-Initiated Interview Summary received for U.S. Appl. No. 17/158,936, mailed on Dec. 28, 2022, 4 pages.
Final Office Action received for U.S. Appl. No. 17/591,184, mailed on Dec. 23, 2022, 10 pages.
Intention to Grant received for European Patent Application No. 17810723.1, mailed on Dec. 16, 2022, 9 pages.
Non-Final Office Action received for U.S. Appl. No. 17/738,940, mailed on Dec. 22, 2022, 31 pages.
Notice of Allowance received for Korean Patent Application No. 10-2022-7014529, mailed on Dec. 13, 2022, 8 pages (2 pages of English Translation and 6 pages of Official Copy).
Notice of Allowance received for Korean Patent Application No. 10-2022-7027441, mailed on Dec. 2, 2022, 7 pages (2 pages of English Translation and 5 pages of Official Copy).
Notice of Allowance received for U.S. Appl. No. 17/515,143, mailed on Dec. 16, 2022, 11 pages.
Office Action received for European Patent Application No. 20761084.1, mailed on Dec. 14, 2022, 5 pages.
Poppinga et al., "Sensor-Based Identification of Opportune Moments for Triggering Notifications", IEEE CS, Mar. 14, 2014, pp. 22-29.
Pradhan et al., "Understanding and Managing Notifications", IEEE Infocom 2017—IEEE Conference on Computer Communications, May 1, 2017, 9 pages.
Advisory Action received for U.S. Appl. No. 15/405,122, mailed on Apr. 18, 2022, 5 pages.
Advisory Action received for U.S. Appl. No. 16/935,002, mailed on May 6, 2022, 3 pages.
Advisory Action received for U.S. Appl. No. 16/943,737, mailed on Jun. 1, 2022, 6 pages.
Applicant Initiated Interview Summary received for U.S. Appl. No. 17/031,671, mailed on Jun. 13, 2022, 7 pages.
Applicant-Initiated Interview Summary received for U.S. Appl. No. 16/418,786, mailed on May 9, 2022, 2 pages.

(56) References Cited

OTHER PUBLICATIONS

Applicant-Initiated Interview Summary received for U.S. Appl. No. 16/943,737, mailed on Apr. 29, 2022, 6 pages.
Applicant-Initiated Interview Summary received for U.S. Appl. No. 17/031,765, mailed on May 23, 2022, 5 pages.
Applicant-Initiated Interview Summary received for U.S. Appl. No. 17/078,896, mailed on Apr. 25, 2022, 2 pages.
Applicant-Initiated Interview Summary received for U.S. Appl. No. 17/317,042, mailed on Apr. 29, 2022, 2 pages.
Applicant-initiated Interview Summary received for U.S. Appl. No. 17/341,839, mailed on Apr. 29, 2022, 2 pages.
Applicant-Initiated Interview Summary received for U.S. Appl. No. 17/373,163, mailed on Apr. 11, 2022, 2 pages.
Corrected Notice of Allowance received for U.S. Appl. No. 16/418,786, mailed on Jun. 23, 2022, 2 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/373,163, mailed on Jun. 27, 2022, 5 pages.
Decision to Grant received for European Patent Application No. 167623560, mailed on Apr. 26, 2022, 2 pages.
Intention to Grant received for European Patent Application No. 201859741, mailed on Apr. 28, 2022, 8 pages.
International Preliminary Report on Patentability received for PCT Patent Application No. PCT/US2020/045814, mailed on Mar. 17, 2022, 12 pages.
Non-Final Office Action received for U.S. Appl. No. 16/418,786, mailed on Mar. 28, 2022, 14 pages.
Non-Final Office Action received for U.S. Appl. No. 17/031,671, mailed on Apr. 1, 2022, 32 pages.
Non-Final Office Action received for U.S. Appl. No. 17/031,765, mailed on Mar. 29, 2022, 33 pages.
Non-Final Office Action received for U.S. Appl. No. 17/341,839, mailed on Mar. 17, 2022, 14 pages.
Notice of Acceptance received for Australian Patent Application No. 2020217354, mailed on May 31, 2022, 3 pages.
Notice of Acceptance received for Australian Patent Application No. 2020239749, mailed on May 27, 2022, 3 pages.
Notice of Acceptance received for Australian Patent Application No. 2020250323, mailed on Feb. 28, 2022, 3 pages.
Notice of Acceptance received for Australian Patent Application No. 2021202797, mailed on May 9, 2022, 3 pages.
Notice of Allowance received for Chinese Patent Application No. 2021101940156, mailed on Mar. 9, 2022, 6 pages (3 pages of English Translation and 3 pages of Official Copy).
Notice of Allowance received for Chinese Patent Application No. 2021104545411, mailed on May 31, 2022, 6 pages (3 pages of English Translation and 3 pages of Official Copy).
Notice of Allowance received for Japanese Patent Application No. 2020-159825, mailed on Mar. 25, 2022, 5 pages (1 page of English Translation and 4 pages of Official Copy).
Notice of Allowance received for Japanese Patent Application No. 2021-565837, mailed on May 16, 2022, 4 pages (1 page of English Translation and 3 pages of Official Copy).
Notice of Allowance received for Korean Patent Application No. 10-2021-7025301, mailed on Mar. 16, 2022, 4 pages (1 page of English Translation and 3 pages of Official Copy).
Notice of Allowance received for Korean Patent Application No. 10-2021-7030552, mailed on May 6, 2022, 5 pages (2 pages of English Translation and 3 pages of Official Copy).
Notice of Allowance received for Korean Patent Application No. 10-2021-7036246, mailed on Mar. 2, 2022, 5 pages (1 page of English Translation and 4 pages of Official Copy).
Notice of Allowance received for Korean Patent Application No. 10-2021-7036678, mailed on Mar. 7, 2022, 5 pages (1 page of English Translation and 4 pages of Official Copy).
Notice of Allowance received for Korean Patent Application No. 10-2022-7001721, mailed on Feb. 28, 2022, 5 pages (1 page of English Translation and 4 pages of Official Copy).
Notice of Allowance received for U.S. Appl. No. 16/418,786, mailed on Jun. 14, 2022, 9 pages.
Notice of Allowance received for U.S. Appl. No. 16/997,588, mailed on Mar. 18, 2022, 9 pages.
Notice of Allowance received for U.S. Appl. No. 17/078,896, mailed on May 13, 2022, 8 pages.
Notice of Allowance received for U.S. Appl. No. 17/373,163, mailed on May 11, 2022, 8 pages.
Office Action received for Australian Patent Application No. 2021203216, mailed on Mar. 7, 2022, 8 pages.
Office Action received for Australian Patent Application No. 2022202292, mailed on May 10, 2022, 2 pages.
Office Action received for Chinese Patent Application No. 201810467061.7, mailed on Apr. 11, 2022, 19 pages (11 pages of English Translation and 8 pages of Official Copy).
Office Action received for Chinese Patent Application No. 201810467061.7, mailed on Jun. 22, 2022, 15 pages (1 page of English Translation and 14 pages of Official Copy).
Office Action received for Chinese Patent Application No. 202110783860.7, mailed on Mar. 10, 2022, 15 pages (5 pages of English Translation and 10 pages of Official Copy).
Office Action received for Danish Patent Application No. PA202070610, mailed on Mar. 14, 2022, 7 pages.
Office Action received for Danish Patent Application No. PA202070623, mailed on May 23, 2022, 3 pages.
Office Action received for European Patent Application No. 17853656.1, mailed on May 3, 2022, 7 pages.
Office Action received for European Patent Application No. 20761084.1, mailed on May 9, 2022, 9 pages.
Office Action received for European Patent Application No. 21169911.1, mailed on Jun. 3, 2022, 5 pages.
Office Action received for European Patent Application No. 21177569.7, mailed on Jun. 9, 2022, 5 pages.
Office Action received for Indian Patent Application No. 202118025047, mailed on Apr. 26, 2022, 6 pages.
Office Action received for Japanese Patent Application No. 2020-124605, mailed on May 13, 2022, 6 pages (3 pages of English Translation and 3 pages of Official Copy).
Office Action received for Japanese Patent Application No. 2020-137007, mailed on May 9, 2022, 8 pages (4 pages of English Translation and 4 pages of Official Copy).
Office Action received for Japanese Patent Application No. 2020-159824, mailed on Dec. 17, 2021, 13 pages (7 pages of English Translation and 6 pages of Official Copy).
Office Action received for Korean Patent Application No. 10-2020-0123852, mailed on Jun. 9, 2022, 10 pages (4 pages of English Translation and 6 pages of Official Copy).
Office Action received for Korean Patent Application No. 10-2020-0123857, mailed on Jun. 9, 2022, 12 pages (5 pages of English Translation and 7 pages of Official Copy).
Office Action received for Korean Patent Application No. 10-2020-0123887, mailed on Jun. 9, 2022, 5 pages (2 pages of English Translation and 3 pages of Official Copy).
Office Action received for Korean Patent Application No. 10-2020-7032187, mailed on Jun. 10, 2022, 16 pages (7 pages of English Translation and 9 pages of Official Copy).
Result of Consultation received for European Patent Application No. 20185974.1, mailed on Apr. 4, 2022, 4 pages.
Supplemental Notice of Allowance received for U.S. Appl. No. 16/867,002, mailed on Mar. 16, 2022, 2 pages.
Supplemental Notice of Allowance received for U.S. Appl. No. 16/997,588, mailed on Apr. 20, 2022, 4 pages.
Jurick et al., "iPhone Hacks", Tips & Tools for Unlocking the Power of Your iPhone & iPod touch, Online:URL:https://api.pageplace.de/preview/DT0400.9780596550974_A23629666/preview-9780596550974_A23629666.pdf >, Apr. 2009, 49 pages.
Advisory Action received for U.S. Appl. No. 16/861,651, mailed on Jul. 29, 2022, 4 pages.
Applicant-Initiated Interview Summary received for U.S. Appl. No. 16/418,786, mailed on Sep. 23, 2022, 2 pages.

(56) References Cited

OTHER PUBLICATIONS

Applicant-Initiated Interview Summary received for U.S. Appl. No. 17/341,839, mailed on Sep. 16, 2022, 2 pages.
Applicant-Initiated Interview Summary received for U.S. Appl. No. 17/591,184, mailed on Sep. 23, 2022, 2 pages.
Corrected Notice of Allowance received for U.S. Appl. No. 17/373,163, mailed on Jul. 15, 2022, 5 pages.
Decision to Grant received for European Patent Application No. 20185974.1, mailed on Aug. 19, 2022, 3 pages.
Extended European Search Report received for European Patent Application No. 22173249.8, mailed on Aug. 19, 2022, 15 pages.
Final Office Action received for U.S. Appl. No. 15/421,865, mailed on Jul. 12, 2022, 27 pages.
Final Office Action received for U.S. Appl. No. 17/031,765, mailed on Sep. 12, 2022, 37 pages.
Final Office Action received for U.S. Appl. No. 17/341,839, mailed on Jul. 18, 2022, 15 pages.
Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.
Intention to Grant received for Danish Patent Application No. PA202070623, mailed on Jul. 20, 2022, 2 pages.
Invitation to Pay Search Fees received for European Patent Application No. 20730136.7, mailed on Jul. 1, 2022, 4 pages.
Lein et al., "Patternizer", Available online at : https://patternizer.com/, Apr. 2016, 5 pages.
Non-Final Office Action received for U.S. Appl. No. 16/389,722, mailed on Jul. 7, 2022, 16 pages.
Non-Final Office Action received for U.S. Appl. No. 16/418,786, mailed on Aug. 1, 2022, 18 pages.
Non-Final Office Action received for U.S. Appl. No. 17/556,165, mailed on Sep. 7, 2022, 15 pages.
Non-Final Office Action received for U.S. Appl. No. 17/591,184, mailed on Aug. 4, 2022, 18 pages.
Notice of Acceptance received for Australian Patent Application No. 2021203216, mailed on Jul. 26, 2022, 3 pages.
Notice of Acceptance received for Australian Patent Application No. 2022202292, mailed on Jul. 6, 2022, 3 pages.
Notice of Allowance received for Danish Patent Application No. PA202070623, mailed on Sep. 20, 2022, 2 pages.
Notice of Allowance received for Japanese Patent Application No. 2020-562622, mailed on Aug. 26, 2022, 4 pages (1 page of English Translation and 3 pages of Official Copy).
Notice of Allowance received for Japanese Patent Application No. 2021-105941, mailed on Jul. 4, 2022, 4 pages (1 page of English Translation and 3 pages of Official Copy).
Notice of Allowance received for Japanese Patent Application No. 2021-122610, mailed on Aug. 5, 2022, 4 pages (1 page of English Translation and 3 pages of Official Copy).
Notice of Allowance received for U.S. Appl. No. 17/317,042, mailed on Jul. 26, 2022, 12 pages.
Notice of Allowance received for U.S. Appl. No. 17/373,163, mailed on Jul. 27, 2022, 8 pages.
Office Action received for Australian Patent Application No. 2021245228, mailed on Aug. 31, 2022, 2 pages.
Office Action received for Chinese Patent Application No. 202110453180.9, mailed on Jun. 16, 2022, 14 pages (7 pages of English Translation and 7 pages of Official Copy).
Office Action received for Chinese Patent Application No. 202111457936.3, mailed on Jul. 5, 2022, 18 pages (9 pages of English Translation and 9 pages of Official Copy).
Office Action received for Danish Patent Application No. PA202070625, mailed on Sep. 23, 2022, 4 pages.
Office Action received for European Patent Application No. 20729346.5, mailed on Jul. 28, 2022, 9 pages.
Office Action received for Indian Patent Application No. 202017048447, mailed on Sep. 5, 2022, 6 pages.
Office Action received for Japanese Patent Application No. 2020-159823, mailed on Aug. 15, 2022, 6 pages (3 pages of English Translation and 3 pages of Official Copy).
Office Action received for Korean Patent Application No. 10-2022-7027441, mailed on Aug. 24, 2022, 11 pages (6 pages of English Translation and 5 pages of Official Copy).
Programmatically download APK from google play store, retrieved from the Internet: https://stackoverflow.com/questions/13703982/prog ram maticallydownload-apk-from-google-play-store/13704021#13704021, Dec. 10, 2012, 2 pages.
Summons to Attend Oral Proceedings received for European Patent Application No. 17810723.1, mailed on Jul. 5, 2022, 8 pages.
Invitation to Pay Additional Fees received for PCT Patent Application No. PCT/US2022/026371, mailed on Aug. 18, 2022, 9 pages.
Examiner's Answer to Appeal Brief received for U.S. Appl. No. 16/861,651, mailed on Jan. 18, 2023, 16 pages.
Non-Final Office Action received for U.S. Appl. No. 17/068,386, mailed on Jan. 30, 2023, 20 pages.
Non-Final Office Action received for U.S. Appl. No. 17/676,034, mailed on Jan. 24, 2023, 15 pages.
Office Action received for Chinese Patent Application No. 202110453180.9, mailed on Dec. 26, 2022, 13 pages (8 pages of English Translation and 5 pages of Official Copy).
Office Action received for European Patent Application No. 20730136.7, mailed on Jan. 19, 2023, 4 pages.
Summons to Attend Oral Proceedings received for European Patent Application No. 20729346.5, mailed on Jan. 23, 2023, 11 pages.
Applicant-Initiated Interview Summary received for U.S. Appl. No. 15/405,122, mailed on Mar. 1, 2022, 4 pages.
Applicant-Initiated Interview Summary received for U.S. Appl. No. 15/421,865, mailed on Feb. 28, 2022, 5 pages.
Applicant-Initiated Interview Summary received for U.S. Appl. No. 16/389,722, mailed on Feb. 18, 2022, 5 pages.
Applicant-Initiated Interview Summary received for U.S. Appl. No. 16/861,651, mailed on Dec. 29, 2021, 5 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/068,386, mailed on Jan. 13, 2022, 2 pages.
Board Decision received for Chinese Patent Application No. 201780002643.1, mailed on Dec. 15, 2021, 2 pages (1 page of English Translation and 1 page of Official Copy).
Corrected Notice of Allowance received for U.S. Appl. No. 15/713,544, mailed on Feb. 3, 2022, 2 pages.
Corrected Notice of Allowance received for U.S. Appl. No. 15/713,544, mailed on Feb. 10, 2022, 2 pages.
Corrected Notice of Allowance received for U.S. Appl. No. 15/713,544, mailed on Feb. 23, 2022, 2 pages.
Corrected Notice of Allowance received for U.S. Appl. No. 16/401,934, mailed on Dec. 23, 2021, 3 pages.
Corrected Notice of Allowance received for U.S. Appl. No. 16/401,934, mailed on Feb. 28, 2022, 3 pages.
Corrected Notice of Allowance received for U.S. Appl. No. 16/418,786, mailed on Jan. 5, 2022, 3 pages.
Corrected Notice of Allowance received for U.S. Appl. No. 16/792,096, mailed on Jan. 11, 2022, 3 pages.
Decision on Appeal received for U.S. Appl. No. 14/846,511, mailed on Dec. 29, 2021, 20 pages.
Final Office Action received for U.S. Appl. No. 16/861,651, mailed on Jan. 26, 2022, 16 pages.
Final Office Action received for U.S. Appl. No. 16/935,002, mailed on Jan. 5, 2022, 25 pages.
Final Office Action received for U.S. Appl. No. 16/943,737, mailed on Feb. 4, 2022, 24 pages.
Final Office Action received for U.S. Appl. No. 17/068,386, mailed on Mar. 3, 2022, 29 pages.
Ilovex, ""Stripe Generator", a tool that makes it easy to create striped materials", Online available at: https://www.ilovex.co.jp/blog/system/webconsulting/stripe-generator.html, May 2, 2012, 3 pages (Official Copy Only). {See Communication under 37 CFR § 1.98(a) (3)}.
Intention to Grant received for European Patent Application No. 16762356.0, mailed on Dec. 23, 2021, 8 pages.

(56) References Cited

OTHER PUBLICATIONS

Kasai, Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages (Official Copy only). {See Communication under 37 CFR § 1.98(a) (3)}.
Non-Final Office Action received for U.S. Appl. No. 15/421,865, mailed on Dec. 29, 2021, 23 pages.
Non-Final Office Action received for U.S. Appl. No. 17/373,163, maiied on Jan. 27, 2022, 14 pages.
Notice of Acceptance received for Australian Patent Application No. 2020239774, mailed on Jan. 5, 2022, 3 pages.
Notice of Acceptance received for Australian Patent Application No. 2020269232, mailed on Dec. 16, 2021, 3 pages.
Notice of Allowance received for Chinese Patent Application No. 2017800026431, mailed on Jan. 6, 2022, 5 pages (1 page of English Translation and 4 pages of Official Copy).
Notice of Allowance received for Korean Patent Application No. 10-2021-7034748, mailed on Jan. 27, 2022, 6 pages (2 pages of English Translation and 4 pages of Official Copy).
Notice of Allowance received for U.S. Appl. No. 15/713,544, mailed on Jan. 14, 2022, 5 pages.
Notice of Allowance received for U.S. Appl. No. 16/401,934, mailed on Feb. 2, 2022, 8 pages.
Notice of Allowance received for U.S. Appl. No. 16/792,096, mailed on Dec. 29, 2021, 11 pages.
Notice of Allowance received for U.S. Appl. No. 16/867,002, mailed on Mar. 1, 2022, 7 pages.
Notice of Allowance received for U.S. Appl. No. 17/041,350, mailed on Feb. 24, 2022, 6 pages.
Notice of Allowance received for U.S. Appl. No. 17/087,845, mailed on Mar. 3, 2022, 9 pages.
Office Action received for Australian Patent Application No. 2020217354, mailed on Jan. 17, 2022, 5 pages.
Office Action received for Australian Patent Application No. 2020239749, mailed on Jan. 21, 2022, 4 pages.
Office Action received for Australian Patent Application No. 2020250323, mailed on Dec. 14, 2021, 2 pages.
Office Action received for Australian Patent Application No. 2021202797, mailed on Feb. 4, 2022, 5 pages.
Office Action received for Danish Patent Application No. PA202070624, mailed on Feb. 4, 2022, 4 pages.
Office Action received for Danish Patent Application No. PA202070625, mailed on Feb. 8, 2022, 2 pages.
Office Action received for European Patent Application No. 20180900.1, mailed on Feb. 14, 2022, 8 pages.
Office Action received for European Patent Application No. 20729346.5, mailed on Jan. 17, 2022, 8 pages.
Office Action received for Japanese Patent Application No. 2020-124605, mailed on Dec. 17, 2021, 2 pages (1 page of English Translation and 1 page of Official Copy).
Office Action received for Japanese Patent Application No. 2020-159823, mailed on Dec. 23, 2021, 8 pages (4 pages of English Translation and 4 pages of Official Copy).
Office Action received for Japanese Patent Application No. 2020-159825, mailed on Dec. 10, 2021, 4 pages (2 pages of English Translation and 2 pages of Official Copy).
Office Action received for Japanese Patent Application No. 2020-562622, mailed on Jan. 7, 2022, 13 pages (6 pages of English Translation and 7 pages of Official Copy).
Office Action received for Japanese Patent Application No. 2021-023661, mailed on Feb. 25, 2022, 6 pages (3 pages of English Translation and 3 pages of Official Copy).
Office Action received for Korean Patent Application No. 10-2021-7036678, mailed on Dec. 22, 2021, 6 pages (2 pages of English Translation and 4 pages of Official Copy).
Applicant-Initiated Interview Summary received for U.S. Appl. No. 17/713,016, mailed on Feb. 14, 2023, 4 pages.
Non-Final Office Action received for U.S. Appl. No. 17/746,807, mailed on Feb. 2, 2023, 14 pages.
Non-Final Office Action received for U.S. Appl. No. 17/948,578, mailed on Feb. 2, 2023, 13 pages.
Notice of Allowance received for U.S. Appl. No. 16/935,002, mailed on Feb. 15, 2023, 15 pages.
Applicant-Initiated Interview Summary received for U.S. Appl. No. 17/031,765, mailed on May 3, 2023, 6 pages.
Final Office Action received for U.S. Appl. No. 17/068,386, mailed on May 8, 2023, 23 pages.
Final Office Action received for U.S. Appl. No. 17/746,807, mailed on Apr. 26, 2023, 16 pages.
Notice of Allowance received for U.S. Appl. No. 17/941,962, mailed on May 3, 2023, 10 pages.
Office Action received for European Patent Application No. 20180900.1, mailed on May 3, 2023, 6 pages.
Applicant-Initiated Interview Summary received for U.S. Appl. No. 17/031,765, mailed on Apr. 17, 2023, 4 pages.
Applicant-Initiated Interview Summary received for U.S. Appl. No. 17/068,386, mailed on Apr. 24, 2023, 2 pages.
Corrected Notice of Allowance received for U.S. Appl. No. 17/941,962, mailed on Apr. 14, 2023, 6 pages.
Final Office Action received for U.S. Appl. No. 17/681,584, mailed on Apr. 20, 2023, 15 pages.
Intention to Grant received for European Patent Application No. 16837432.0, mailed on Apr. 14, 2023, 8 pages.
Non-Final Office Action received for U.S. Patent Application No. 17/591, 184, mailed on Apr. 21, 2023, 15 pages.
Notice of Allowance received for Chinese Patent Application No. 201910924197.0, mailed on Apr. 5, 2023, 3 pages (2 pages of English Translation and 1 page of Official Copy).
Notice of Allowance received for Japanese Patent Application No. 2021-023661, mailed on Apr. 10, 2023, 4 pages (1 page of English Translation and 3 pages of Official Copy).
Notice of Allowance received for U.S. Appl. No. 17/713,016, mailed on Apr. 18, 2023, 10 pages.
Office Action received for Australian Patent Application No. 2022218607, mailed on Apr. 14, 2023, 3 pages.
Summons to Attend Oral Proceedings received for European Patent Application No. 20172197.4, mailed on Apr. 14, 2023, 8 pages.
Applicant Initiated Interview Summary received for U.S. Appl. No. 17/681,584, mailed on Mar. 24, 2023, 2 pages.
Corrected Notice of Allowance received for U.S. Appl. No. 16/935,002, mailed on Mar. 28, 2023, 2 pages.
Droid Life, "20+ Galaxy S9, S9+ Tips and Tricks", Available Online at: https://www.youtube.com/watch?v=sso0mYTfV6w, Mar. 22, 2018, pp. 1-33.
Final Office Action received for U.S. Appl. No. 16/389,722, mailed on Mar. 17, 2023, 14 pages.
Final Office Action received for U.S. Appl. No. 17/713,016, mailed on Mar. 15, 2023, 6 pages.
Gauging Gadgets, "How to Customize Watch Faces—Garmin Venu Tutorial", Online Available at: https://www.youtube.com/watch?v=dxajKKulaP0, Jan. 7, 2020, 14 pages.
Intention to Grant received for European Patent Application No. 20761084.1, mailed on Mar. 27, 2023, 10 pages.
Non-Final Office Action received for U.S. Appl. No. 16/943,737, mailed on Mar. 28, 2023, 28 pages.
Non-Final Office Action received for U.S. Appl. No. 17/031,671, mailed on Mar. 17, 2023, 34 pages.
Non-Final Office Action received for U.S. Appl. No. 17/031,765, mailed on Mar. 28, 2023, 31 pages.
Non-Final Office Action received for U.S. Appl. No. 17/697,749, mailed on Mar. 27, 2023, 20 pages.
Notice of Allowance received for Korean Patent Application No. 10-2020-0123852, mailed on Mar. 9, 2023, 7 pages (2 pages of English Translation and 5 pages of Official Copy).
Office Action received for Australian Patent Application No. 2022201419, mailed on Mar. 20, 2023, 3 pages.
Office Action received for Australian Patent Application No. 2022202583, mailed on Mar. 24, 2023, 4 pages.
Applicant Initiated Interview Summary received for U.S. Appl. No. 17/746,807, mailed on Mar. 31, 2023, 2 pages.
Applicant-Initiated Interview Summary received for U.S. Appl. No. 17/948,578, mailed on Apr. 11, 2023, 3 pages.

(56) References Cited

OTHER PUBLICATIONS

Corrected Notice of Allowance received for U.S. Appl. No. 17/515,143, mailed on Mar. 29, 2023, 2 pages.
Decision to Grant received for European Patent Application No. 21177569.7, mailed on Apr. 6, 2023, 3 pages.
Final Office Action received for U.S. Appl. No. 17/158,936, mailed on Apr. 7, 2023, 18 pages.
Applicant-Initiated Interview Summary received for U.S. Appl. No. 16/389,722, mailed on May 31, 2023, 4 pages.
Applicant-Initiated Interview Summary received for U.S. Appl. No. 17/031,671, mailed on May 23, 2023, 3 pages.
Applicant-Initiated Interview Summary received for U.S. Appl. No. 17/697,749, mailed on May 30, 2023, 3 pages.
Applicant-Initiated Interview Summary received for U.S. Appl. No. 17/941,962, mailed on May 30, 2023, 2 pages.
Office Action received for Australian Patent Application No. 2022203957, mailed on May 12, 2023, 5 pages.
Office Action received for Korean Patent Application No. 10-2023-7011744, mailed on May 15, 2023, 11 pages (5 pages of English Translation and 6 pages of Official Copy).
Advisory Action received for U.S. Appl. No. 17/158,936, mailed on Jul. 24, 2023, 4 pages.
Applicant-Initiated Interview Summary received for U.S. Appl. No. 17/676,034, mailed on Sep. 18, 2023, 2 pages.
Applicant-Initiated Interview Summary received for U.S. Appl. No. 17/681,584, mailed on Jun. 6, 2023, 2 pages.
Decision to Grant received for European Patent Application No. 20761084.1, mailed on Jul. 27, 2023, 4 pages.
Decision to Grant received for European Patent Application No. 21169911.1, mailed on Jun. 29, 2023, 3 pages.
Extended European Search Report received for European Patent Application No. 23176305.3, mailed on Sep. 13, 2023, 8 pages.
Final Office Action received for U.S. Appl. No. 17/676,034, mailed on Jul. 24, 2023, 19 pages.
Final Office Action received for U.S. Appl. No. 17/697,749, mailed on Aug. 10, 2023, 8 pages.
Notice of Acceptance received for Australian Patent Application No. 2022287595, mailed on Aug. 29, 2023, 3 pages.
Notice of Allowance received for Japanese Patent Application No. 2020-137007, mailed on May 29, 2023, 5 pages (1 page of English Translation & 4 pages of Official Copy).
Notice of Allowance received for Korean Patent Application No. 10-2023-7011744, mailed on Sep. 4, 2023, 8 pages (2 pages of English Translation and 6 pages of Official Copy).
Office Action received for Australian Patent Application No. 2022228204, mailed on Jul. 27, 2023, 5 pages.
Office Action received for Australian Patent Application No. 2022287595, mailed on Jul. 20, 2023, 3 pages.
Hoffman Chris, "5+ Cool Uses for Android's Daydream Mode", Online Available at: https://www.howtogeek.com/170990/5-cool-uses-for-androids-daydream-mode/, Jul. 12, 2017, 8 pages.
Office Action received for Indian Patent Application No. 202118025048, mailed on Sep. 22, 2023, 8 pages.
Office Action received for Japanese Patent Application No. 2022-174879, mailed on Dec. 8, 2023, 8 pages (4 pages of English Translation and 4 pages of Official Copy).
Applicant-Initiated Interview Summary received for U.S. Appl. No. 17/676,034, mailed on Oct. 31, 2023, 2 pages.
International Preliminary Report on Patentability received for PCT Patent Application No. PCT/US2022/026371, mailed on Nov. 9, 2023, 11 pages.
Applicant-Initiated Interview Summary received for U.S. Appl. No. 17/697,749, mailed on Oct. 10, 2023, 5 pages.
Houben et al., "WatchConnect: A Toolkit for Prototyping Smartwatch-Centric Cross-Device Applications", Proceedings of the 33rd Annual ACM Conference on Human Factors in Computing Systems, Online available at: https://dl.acm.org/doi/10.1145/2702123.2702215, 2015, pp. 1247-1256.
Non-Final Office Action received for U.S. Appl. No. 17/676,034, mailed on Oct. 11, 2023, 23 pages.
International Search Report and Written Opinion received for PCT Patent Application No. PCT/US2023/021409, mailed on Nov. 9, 2023, 23 pages.
Invitation to Pay Additional Fees and Partial International Search Report received for PCT Patent Application No. PCT/US2023/021409, mailed on Sep. 19, 2023, 17 pages.
Notice of Allowance received for U.S. Appl. No. 17/676,034, mailed on Nov. 17, 2023, 9 pages.
Office Action received for Chinese Patent Application No. 202210265746.X, mailed on Oct. 11, 2023, 13 pages (6 pages of English Translation and 7 pages of Official Copy).
Non-Final Office Action received for U.S. Appl. No. 17/681,584, mailed on Sep. 19, 2023, 16 pages.
Office Action received for Japanese Patent Application No. 2023-560221, mailed on Jun. 28, 2024, 6 pages (3 pages of English Translation and 3 pages of Official Copy).
103399661, CN, A, Cited by the Chinese Patent Office in an Office Action for related Patent Application No. 202210263607.3 on Oct. 23, 2023.
105045079, CN, A, Cited by the Chinese Patent Office in an Office Action for related Patent Application No. 202210263607.3 on Oct. 23, 2023.
105204620, CN, A, Cited by the Chinese Patent Office in an Office Action for related Patent Application No. 202210263607.3 on Oct. 23, 2023.
105516824, CN, A, Cited by the Chinese Patent Office in an Office Action for related Patent Application No. 202210263607.3 on Oct. 23, 2023.
2007-150831, JP, A, Cited by the Japanese Patent Office in an Office Action for related Patent Application No. 2024-067669 on Jul. 12, 2024.
2011-166679, JP, A, Cited by the Japanese Patent Office in an Office Action for related Patent Application No. 2023-105300 on Oct. 4, 2024.
2011-203707, JP, A, Cited by the Japanese Patent Office in an Office Action for related Patent Application No. 2024-067669 on Jul. 12, 2024.
2016-120890, JP, A, Cited by the Japanese Patent Office in an Office Action for related Patent Application No. 2023-105300 on Oct. 4, 2024.
10-2014-0120470, KR, A, Cited by the Chinese Patent Office in an Office Action for related Patent Application No. 202210265746.X on Apr. 25, 2024.
10-2015-0057307, KR, A, Cited by the Korean Patent Office in an Office Action for related Patent Application No. 10-2023-7040267 on Dec. 5, 2023.
Applicant-Initiated Interview Summary received for U.S. Appl. No. 17/158,936, mailed on May 29, 2024, 4 pages.
Applicant-Initiated Interview Summary received for U.S. Appl. No. 17/697,749, mailed on Feb. 22, 2024, 5 pages.
DRE SM, "Android 8 | How to use Picture in Picture (with YouTube)", available online at: https://youtu.be/H4w4EdlzqEg?si=OZJm2exdqF27hDBC, Nov. 27, 2017, 8 pages.
Final Office Action received for U.S. Appl. No. 17/158,936, mailed on Aug. 19, 2024, 25 pages.
Gotta Be Mobile, "How to Use Picture-in-Picture Mode on Android 8.0 Oreo", available online at: https://www.youtube.com/watch?v=305V9aP3BEs, Oct. 31, 2017, 1 page.
Gupta Information Systems in English, "Enable Picture in Picture Mode on Android Oreo 8.0 (See Updated Method in Description)", available online at: https://www.youtube.com/watch?v=whcee_eSwtc, May 19, 2017, 1 page.
Knight, Jon, "Use the New Picture-in-Picture Mode in Android O", Gadget Hacks, Retrieved from: https://android.gadgethacks.com/how-to/use-new-picture-picture-mode-android-o-0178324/, Jun. 23, 2017, 6 pages.
Non-Final Office Action received for U.S. Appl. No. 17/158,936, mailed on Mar. 26, 2024, 20 pages.
Non-Final Office Action received for U.S. Appl. No. 17/697,749, mailed on Dec. 4, 2023, 21 pages.
Non-Final Office Action received for U.S. Appl. No. 18/543,837, mailed on Aug. 29, 2024, 11 pages.

(56) References Cited

OTHER PUBLICATIONS

Notice of Allowance received for Chinese Patent Application No. 202210265746.X, mailed on Apr. 25, 2024, 4 pages (1 page of English Translation and 3 pages of Official Copy).

Notice of Allowance received for Japanese Patent Application No. 2022-174879, mailed on Mar. 22, 2024, 5 pages (1 page of English Translation and 4 pages of Official Copy).

Notice of Allowance received for Korean Patent Application No. 10-2023-7040267, mailed on Dec. 5, 2023, 8 pages (2 pages of English Translation and 6 pages of Official Copy).

Notice of Allowance received for U.S. Appl. No. 17/697,749, mailed on Apr. 10, 2024, 5 pages.

Notice of Hearing received for Indian Patent Application No. 202118025047, mailed on Mar. 14, 2024, 2 pages.

Office Action received for Australian Patent Application No. 2022228204, mailed on Feb. 15, 2024, 3 pages.

Office Action received for Australian Patent Application No. 2022228204, mailed on Jul. 3, 2024, 6 pages.

Office Action received for Chinese Patent Application No. 202210263607.3, mailed on Apr. 15, 2024, 12 pages (4 pages of English Translation and 8 pages of Official Copy).

Office Action received for Chinese Patent Application No. 202210263607.3, mailed on Oct. 23, 2023, 18 pages (7 pages of English Translation and 11 pages of Official Copy).

Office Action received for European Patent Application No. 17853656.1, mailed on Apr. 24, 2024, 7 pages.

Office Action received for European Patent Application No. 20180900.1, mailed on Dec. 21, 2023, 5 pages.

Office Action received for Indian Patent Application No. 202118025046, mailed on Mar. 18, 2024, 6 pages.

Office Action received for Japanese Patent Application No. 2023-105300, mailed on Oct. 4, 2024, 8 pages (4 pages of English Translation and 4 pages of Official Copy).

Office Action received for Japanese Patent Application No. 2024-067669, mailed on Jul. 12, 2024, 5 pages (2 pages of English Translation and 3 pages of Official Copy).

Office Action received for Korean Patent Application No. 10-2024-7007452, mailed on Apr. 1, 2024, 17 pages (9 pages of English Translation and 8 pages of Official Copy).

Play video from youtube in picture-in-picture mode, available online at: https://stackoverflow.com/questions/54043791/play-video-from-youtube-in-picture-in-picture-mode, Jan. 4, 2019, 5 pages.

Result of Consultation received for European Patent Application No. 20180900.1, mailed on May 6, 2024, 7 pages.

Supplemental Notice of Allowance received for U.S. Appl. No. 17/676,034, mailed on Feb. 14, 2024, 4 pages.

Supplemental Notice of Allowance received for U.S. Appl. No. 17/676,034, mailed on Mar. 4, 2024, 10 pages.

Supplemental Notice of Allowance received for U.S. Appl. No. 17/697,749, mailed on Apr. 17, 2024, 2 pages.

Supplemental Notice of Allowance received for U.S. Appl. No. 17/697,749, mailed on Jun. 14, 2024, 2 pages.

* cited by examiner

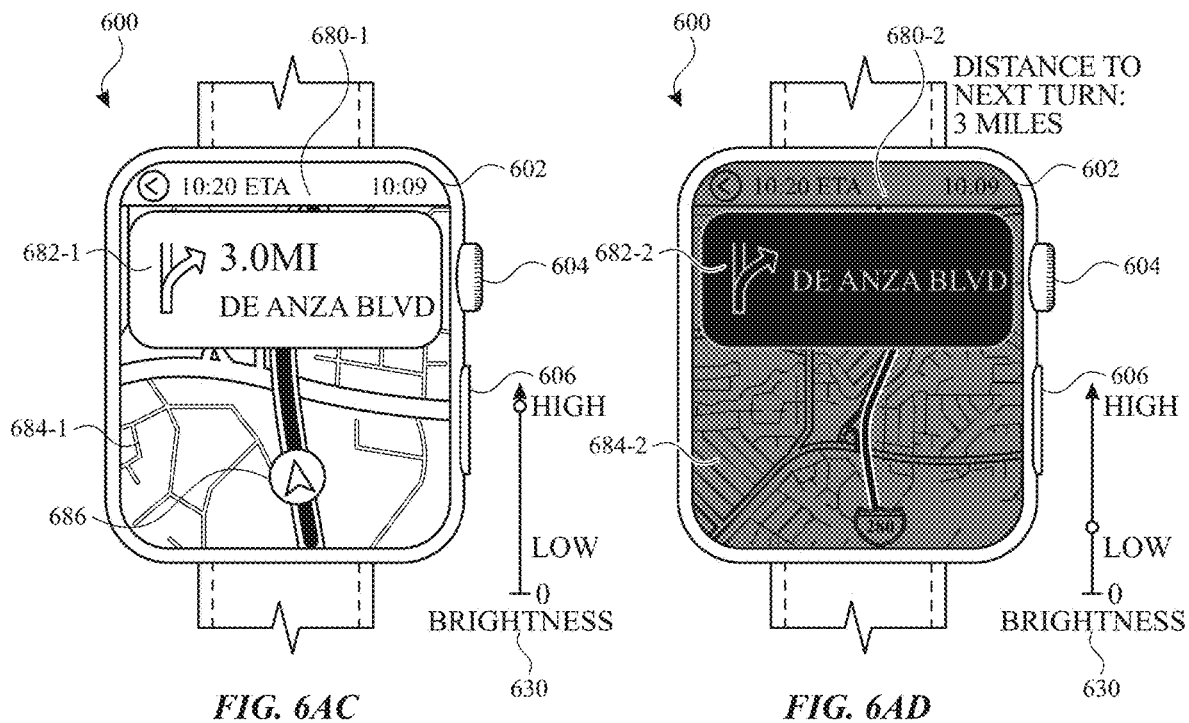
*FIG. 6AC*  *FIG. 6AD*
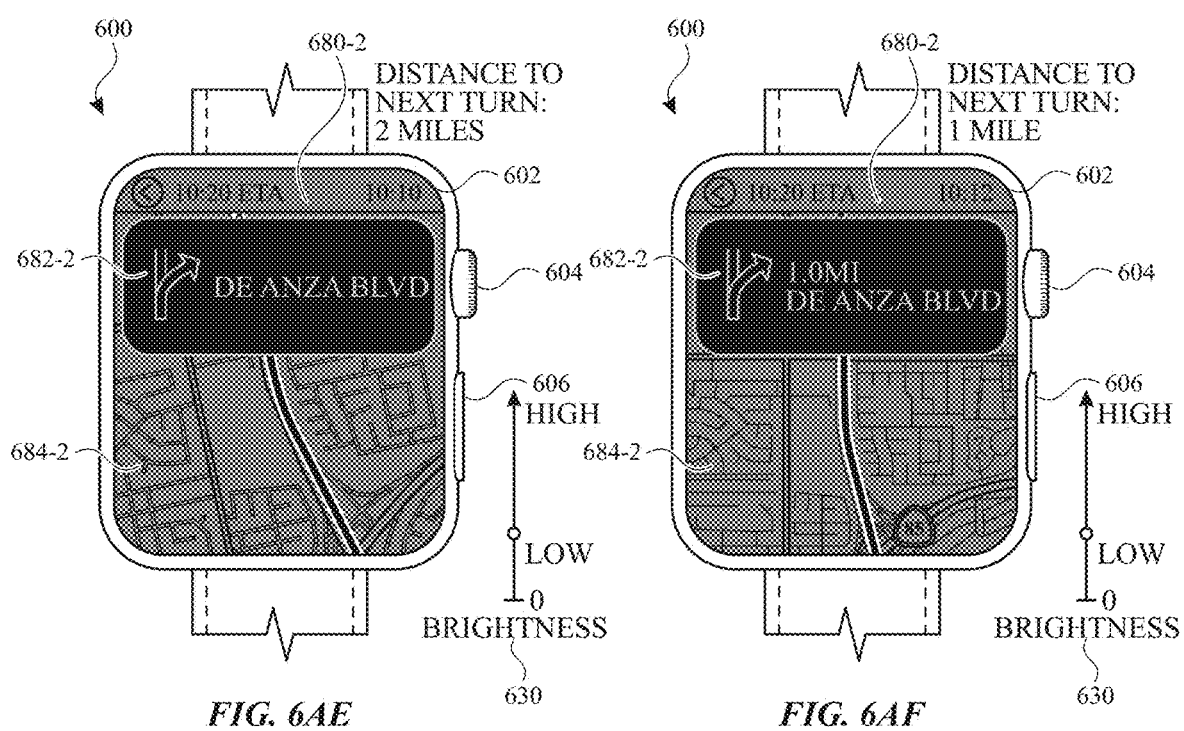
*FIG. 6AE*  *FIG. 6AF*

700

702
While the computer system is in a first mode:

704
Display, via the display generation component, a first user interface that includes one or more user interface elements including a first user interface element, where the user interface is associated with a first application.

706
While displaying the first user interface in the first mode:

708
Detect that the computer system has met one or more criteria for transitioning from the first mode to a second mode, wherein the second mode is a lower power mode.

710
In response to detecting that the computer system has met one or more criteria for transitioning from the first mode to the second mode:

712
Enter the second mode, including displaying a second user interface that is associated with the first application where the second user interface corresponds to the first user interface and is displayed at a location that occupies at least a portion of a display region that was occupied by the first user interface and includes one or more user interface elements including a second user interface element.

*FIG. 7A*

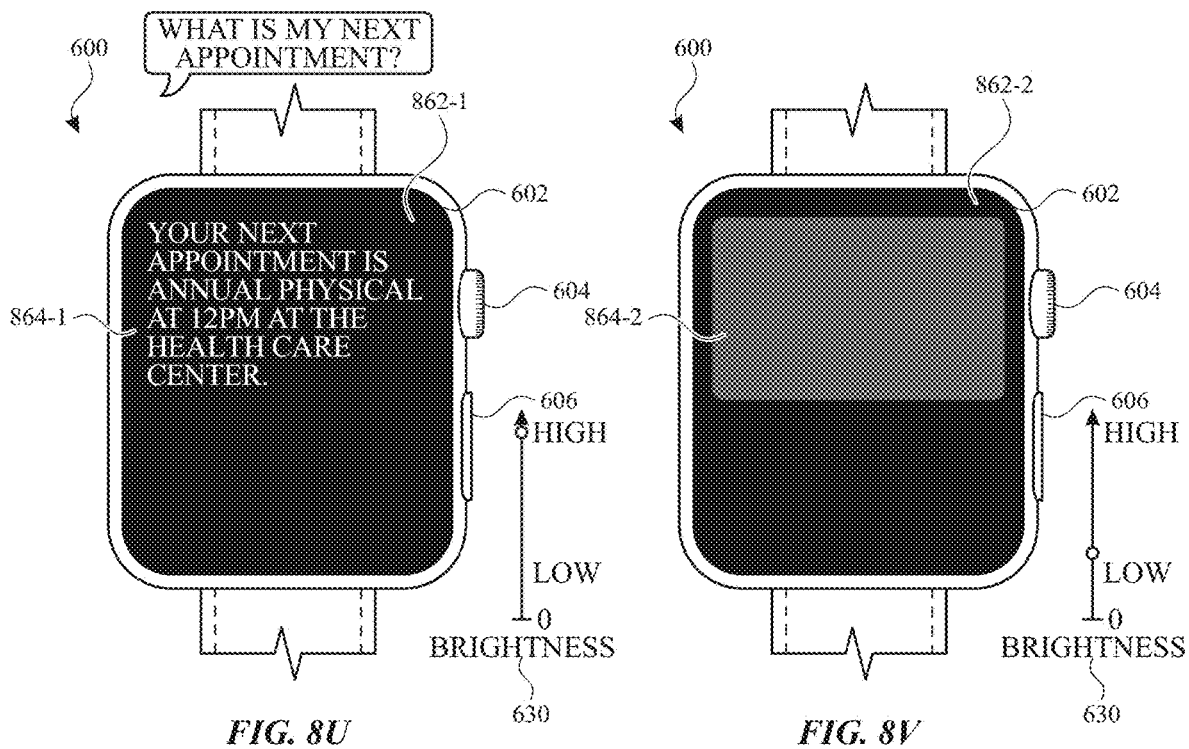

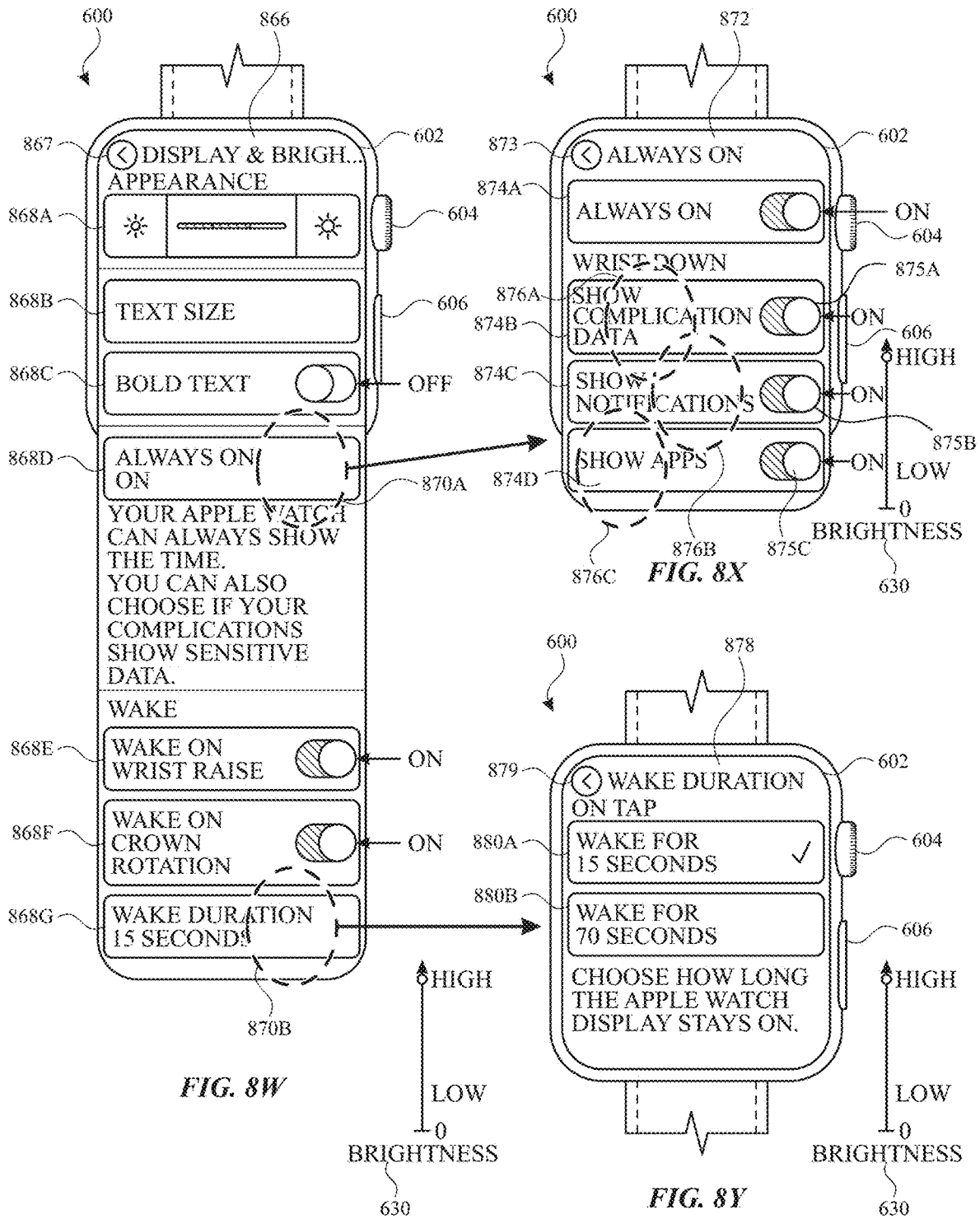

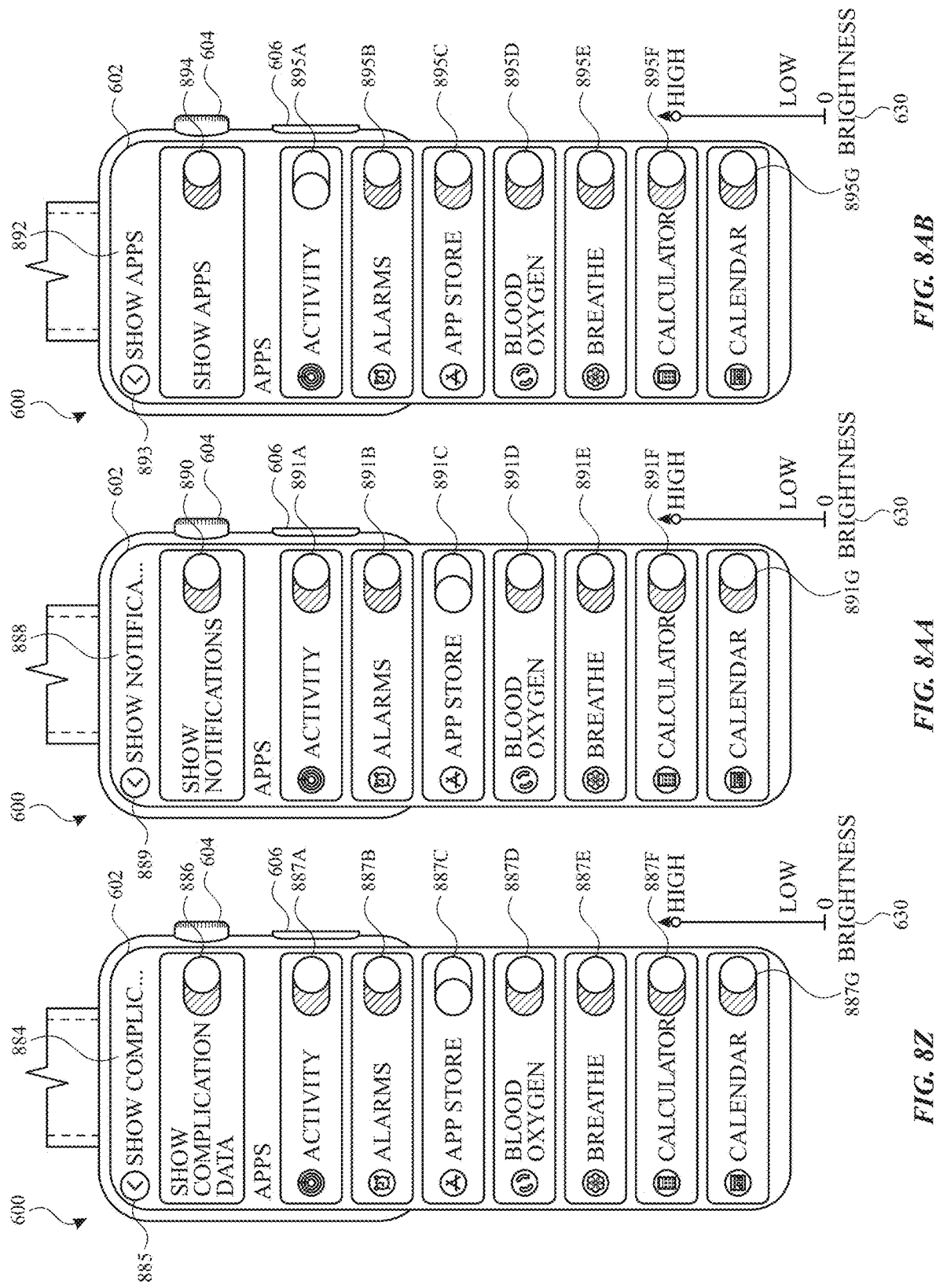

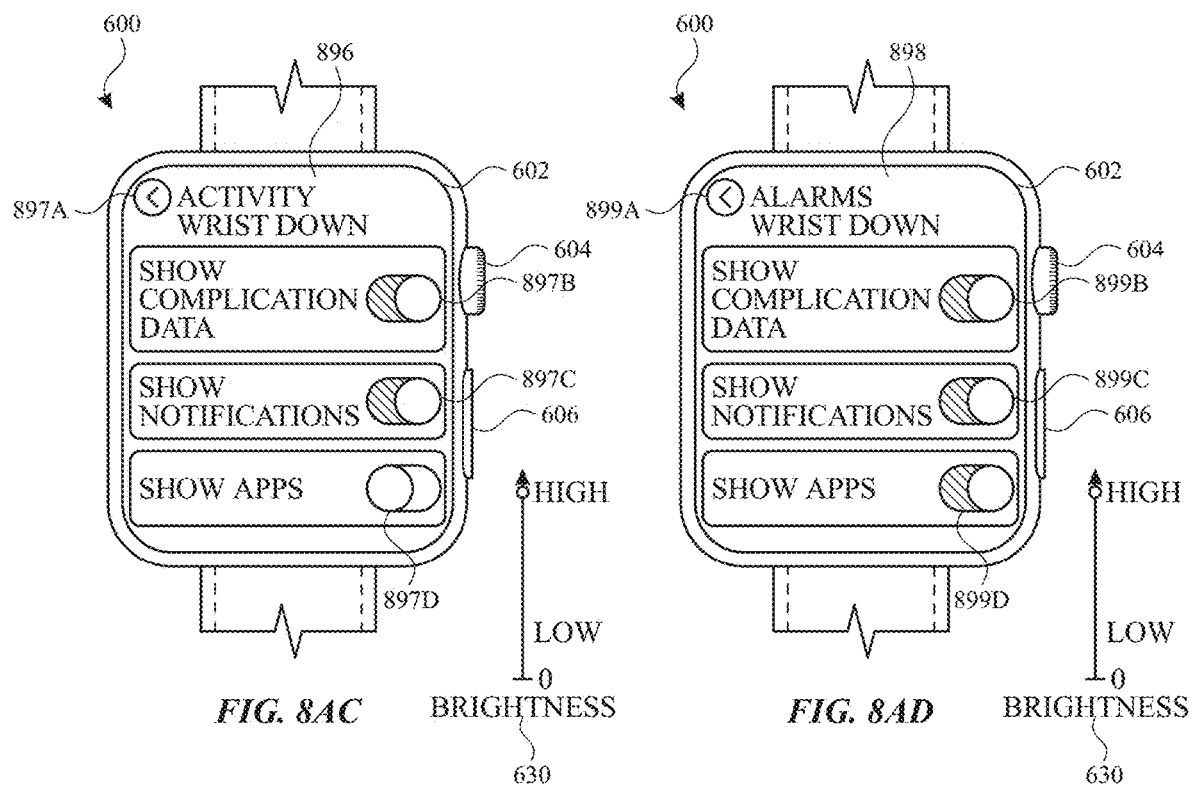

900

902
While the computer system is in a first mode:

904
Display, via the display generation component, a first user interface that is associated with a first application and that includes a plurality of user interface elements including a first user interface element depicting a first set of information.

906
While displaying the first user interface:

908
Detect that the computer system has met one or more criteria for transitioning from the first mode to a second mode.

910
In response to detecting that the computer system has met the one or more criteria for transitioning from the first mode to the second mode:

912
In accordance with a determination that the first application is authorized to display the first set of information while the computer system is in the second mode:

914
Display a second user interface associated with the first application, wherein: the second user interface corresponds to the first user interface and is displayed at a location that occupies at least a portion of a display region that was occupied by the first user interface, the second user interface is darker than the first user interface, and the second user interface includes a second user interface element depicting the first set of information.

1102
While the computer system is in a first mode:

1104
Display, via the display generation component, a first user interface that is associated with a first application and that includes a first set of one or more user interface elements including a first user interface element, wherein the appearance of the first user interface element is periodically updated at a first update frequency, and the first user interface is displayed at a first zoom level.

1106
While displaying the first user interface:

1108
Detect that the computer system has met one or more criteria for transitioning from the first mode to a second mode.

1110
In response to detecting that the computer system has met the one or more criteria for transitioning from the first mode to the second mode:

1112
Display a second user interface that is different from the first user interface and is associated with the first application, wherein: the second user interface corresponds to the first user interface and is displayed at a location that occupies at least a portion of a display region that was occupied by the first user interface, the second user interface includes a second set of one or more user interface elements including a second user interface element, the appearance of the second user interface element is periodically updated at a second update frequency that is different from the first update frequency and corresponds to a lower update frequency than the first update frequency, and the second user interface is displayed at a second zoom level different from the first zoom level.

1114
The second zoom level represents a zoomed out zoom level relative to the first zoom level.

1116
The first user interface comprises a first geographic map.

1118
The second user interface comprises a second geographic map that uses a different color scheme than the first geographic map.

1120
The first geographic map comprises a location indicator user interface element indicative of a current location of the computer system within the first geographic map; and the second geographic map does not include the location indicator user interface element.

*FIG. 11B*

TECHNIQUES FOR MANAGING DISPLAY USAGE

CROSS-REFERENCE TO RELATED APPLICATION

This application claims priority to U.S. Provisional Patent Application Ser. No. 63/180,568, entitled "TECHNIQUES FOR MANAGING DISPLAY USAGE," filed on Apr. 27, 2021, the contents of which are hereby incorporated by reference in their entirety.

FIELD

The present disclosure relates generally to computer user interfaces, and more specifically to techniques for displaying user interfaces with managed display usage.

BACKGROUND

Electronic devices may include screens for displaying user interfaces. Over time, non-uniform use of screens may lead to discoloration of portions of the screen and decreased quality of displayed images.

BRIEF SUMMARY

Some techniques for displaying user interfaces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces with managed display usage. Such methods and interfaces optionally complement or replace other methods for managing display usage. Such methods improve image quality (e.g., reduce deterioration of image quality) of displayed user interfaces as an electronic device ages and improve the durability of display devices used to display user interfaces. In addition, such methods and interfaces reduce the cognitive burden on a user and produce a more efficient human-machine interface. For battery-operated computing devices, such methods and interfaces conserve power and increase the time between battery charges. Furthermore, such methods and interfaces also reduce the number of unnecessary, extraneous, or repetitive inputs required at computing devices, such as smartphones and smartwatches.

In accordance with some embodiments, a method is described. The method comprises: at a computer system that is in communication with a display generation component: while the computer system is in a first mode, displaying, via the display generation component, a first user interface that includes one or more user interface elements including a first user interface element, where the user interface is associated with a first application; while displaying the first user interface in the first mode, detecting that the computer system has met one or more criteria for transitioning from the first mode to a second mode, wherein the second mode is a tower power mode; in response to detecting that the computer system has met one or more criteria for transitioning from the first mode to the second mode, entering the second mode, including displaying a second user interface that is associated with the first application where the second user interface corresponds to the first user interface and is displayed at a location that occupies at least a portion of a display region that was occupied by the first user interface and includes one or more user interface elements including a second user interface element; and while the computer system is in the second mode, updating an appearance of the second user interface element periodically while maintaining the computer system in the second mode, wherein: in accordance with a determination that one or more time-sensitive update criteria are not satisfied, the appearance of the second user interface element is periodically updated at a first update frequency; and in accordance with a determination that the one or more time-sensitive update criteria are satisfied, the appearance of the second user interface element is periodically updated at a second update frequency different from the first update frequency, wherein the second update frequency is greater than the first update frequency.

In accordance with some embodiments, a non-transitory computer-readable storage medium is described. The non-transitory computer-readable storage medium stores one or more programs configured to be executed by one or more processors of a computer system that is in communication with a display generation component, and the one or more programs include instructions for: while the computer system is in a first mode, displaying, via the display generation component, a first user interface that includes one or more user interface elements including a first user interface element, where the user interface is associated with a first application; while displaying the first user interface in the first mode, detecting that the computer system has met one or more criteria for transitioning from the first mode to a second mode, wherein the second mode is a lower power mode; in response to detecting that the computer system has met one or more criteria for transitioning from the first mode to the second mode, entering the second mode, including displaying a second user interface that is associated with the first application where the second user interface corresponds to the first user interface and is displayed at a location that occupies at least a portion of a display region that was occupied by the first user interface and includes one or more user interface elements including a second user interface element; and while the computer system is in the second mode, updating an appearance of the second user interface element periodically while maintaining the computer system in the second mode, wherein: in accordance with a determination that one or more time-sensitive update criteria are not satisfied, the appearance of the second user interface element is periodically updated at a first update frequency; and in accordance with a determination that the one or more time-sensitive update criteria are satisfied, the appearance of the second user interface element is periodically updated at a second update frequency different from the first update frequency, wherein the second update frequency is greater than the first update frequency.

In accordance with some embodiments, a transitory computer-readable storage medium is described. The transitory computer-readable storage medium stores one or more programs configured to be executed by one or more processors of a computer system that is in communication with a display generation component, and the one or more programs include instructions for: while the computer system is in a first mode, displaying, via the display generation component, a first user interface that includes one or more user interface elements including a first user interface element, where the user interface is associated with a first application; while displaying the first user interface in the first mode, detecting that the computer system has met one or more criteria for transitioning from the first mode to a second mode, wherein the second mode is a lower power mode; in response to detecting that the computer system has met one or more criteria for transitioning from the first mode to the second mode, entering the second mode, including displaying a second user interface that is associated with the first application where the second user interface corresponds to the first user interface and is displayed at a location that occupies at least a portion of a display region that was occupied by the first user interface and includes one or more user interface elements including a second user interface element; and while the computer system is in the second mode, updating an appearance of the second user interface element periodically while maintaining the computer system in the second mode, wherein: in accordance with a determination that one or more time-sensitive update criteria are not satisfied, the appearance of the second user interface element is periodically updated at a first update frequency; and in accordance with a determination that the one or more time-sensitive update criteria are satisfied, the appearance of the second user interface element is periodically updated at a second update frequency different from the first update frequency, wherein the second update frequency is greater than the first update frequency.

In accordance with some embodiments, a computer system is described. The computer system is in communication with a display generation component, and comprises one or more processors; and memory storing one or more programs configured to be executed by the one or more processors, the one or more programs including instructions for: while the computer system is in a first mode, displaying, via the display generation component, a first user interface that includes one or more user interface elements including a first user interface element, where the user interface is associated with a first application; while displaying the first user interface in the first mode, detecting that the computer system has met one or more criteria for transitioning from the first mode to a second mode, wherein the second mode is a lower power mode; in response to detecting that the computer system has met one or more criteria for transitioning from the first mode to the second mode, entering the second mode, including displaying a second user interface that is associated with the first application where the second user interface corresponds to the first user interface and is displayed at a location that occupies at least a portion of a display region that was occupied by the first user interface and includes one or more user interface elements including a second user interface element; and while the computer system is in the second mode, updating an appearance of the second user interface element periodically while maintaining the computer system in the second mode, wherein: in accordance with a determination that one or more time-sensitive update criteria are not satisfied, the appearance of the second user interface element is periodically updated at a first update frequency; and in accordance with a determination that the one or more time-sensitive update criteria are satisfied, the appearance of the second user interface element is periodically updated, at a second update frequency different from the first update frequency, wherein the second update frequency is greater than the first update frequency.

In accordance with some embodiments, a computer system is described. The computer system is in communication with a display generation component, and comprises: means for displaying, while the computer system is in a first mode, via the display generation component, a first user interface that includes one or more user interface elements including a first user interface element, where the user interface is associated with a first application; means for detecting, while displaying the first user interface in the first mode, that the computer system has met one or more criteria for transitioning from the first mode to a second mode, wherein the second mode is a lower power mode; means for, in response to detecting that the computer system has met one or more criteria for transitioning from the first mode to the second mode, entering the second mode, including means for displaying a second user interface that is associated with the first application where the second user interface corresponds to the first user interface and is displayed at a location that occupies at least a portion of a display region that was occupied by the first user interface and includes one or more user interface elements including a second user interface element; and means for updating, while the computer system is in the second mode, an appearance of the second user interface element periodically while maintaining the computer system in the second mode, wherein: in accordance with a determination that one or more time-sensitive update criteria are not satisfied, the appearance of the second user interface element is periodically updated at a first update frequency; and in accordance with a determination that the one or more time-sensitive update criteria are satisfied, the appearance of the second user interface element is periodically updated at a second update frequency different from the first update frequency, wherein the second update frequency is greater than the first update frequency.

In accordance with some embodiments, a method is described. The method comprises: at a computer system that is in communication with a display generation component: while the computer system is in a first mode, displaying, via the display generation component, a first user interface that is associated with a first application and that includes a plurality of user interface elements including a first user interface element depicting a first set of information; while displaying the first user interface, detecting that the computer system has met one or more criteria for transitioning from the first mode to a second mode; and in response to detecting that the computer system has met the one or more criteria for transitioning from the first mode to the second mode: in accordance with a determination that the first application is authorized to display the first set of information while the computer system is in the second mode, displaying a second user interface associated with the first application, wherein: the second user interface corresponds to the first user interface and is displayed at a location that occupies at least a portion of a display region that was occupied by the first user interface, the second user interface is darker than the first user interface, and the second user interface includes a second user interface element depicting the first set of information; and in accordance with a determination that the first application is not authorized to display the first set of information while the computer system is in the second mode, displaying a third user interface different from the first user interface and the second user interface, wherein: the third user interface is displayed at a location that occupies at least a portion of the display region that was occupied by the first user interface, and the third user interface does not include the first set of information.

In accordance with some embodiments, a non-transitory computer-readable storage medium is described. The non-transitory computer-readable storage medium stores one or more programs configured to be executed by one or more processors of a computer system that is in communication with a display generation component, and the one or more programs include instructions for: while the computer system is in a first mode, displaying, via the display generation component, a first user interface that is associated with a first application and that includes a plurality of user interface elements including a first user interface element depicting a first set of information; while displaying the first user interface, detecting that the computer system has met one or more criteria for transitioning from the first mode to a second mode; and in response to detecting that the computer system has met the one or more criteria for transitioning from the first mode to the second mode: in accordance with a determination that the first application is authorized to display the first set of information while the computer system is in the second mode, displaying a second user interface associated with the first application, wherein: the second user interface corresponds to the first, user interface and is displayed at a location that occupies at least a portion of a display region that was occupied by the first user interface, the second user interface is darker than the first user interface, and the second user interface includes a second user interface element depicting the first set of information; and in accordance with a determination that the first application is not authorized to display the first set of information while the computer system is in the second mode, displaying a third user interface different from the first user interface and the second user interface, wherein: the third user interface is displayed at a location that occupies at least a portion of the display region that was occupied by the first user interface, and the third user interface does not include the first set of information.

In accordance with some embodiments, a transitory computer-readable storage medium is described. The transitory computer-readable storage medium stores one or more programs configured to be executed by one or more processors of a computer system that is in communication with a display generation component, and the one or more programs include instructions for: while the computer system is in a first mode, displaying, via the display generation component, a first user interface that is associated with a first application and that includes a plurality of user interface elements including a first user interface element depicting a first set of information; while displaying the first user interface, detecting that the computer system has met one or more criteria for transitioning from the first mode to a second mode; and in response to detecting that the computer system has met the one or more criteria for transitioning from the first mode to the second mode: in accordance with a determination that the first application is authorized to display the first set of information while the computer system is in the second mode, displaying a second user interface associated with the first application, wherein: the second user interface corresponds to the first user interface and is displayed at a location that occupies at least a portion of a display region that was occupied by the first user interface, the second user interface is darker than the first user interface, and the second user interface includes a second user interface element depicting the first set of information; and in accordance with a determination that the first application is not authorized to display the first set of information while the computer system is in the second mode, displaying a third user interface different from the first user interface and the second user interface, wherein: the third user interface is displayed at a location that occupies at least a portion of the display region that was occupied by the first user interface, and the third user interface does not include the first set of information.

In accordance with some embodiments, a computer system is described. The computer system is in communication with a display generation component, and comprises one or more processors; and memory storing one or more programs configured to be executed by the one or more processors, the one or more programs including instructions for: while the computer system is in a first mode, displaying, via the display generation component, a first user interface that is associated with a first application and that includes a plurality of user interface elements including a first user interface element depicting a first set of information; while displaying the first user interface, detecting that the computer system has met one or more criteria for transitioning from the first mode to a second mode; and in response to detecting that the computer system has met the one or more criteria for transitioning from the first mode to the second mode: in accordance with a determination that the first application is authorized to display the first set of information while the computer system is in the second mode, displaying a second user interface associated with the first application, wherein: the second user interface corresponds to the first user interface and is displayed at a location that occupies at least a portion of a display region that was occupied by the first user interface, the second user interface is darker than the first user interface, and the second user interface includes a second user interface element depicting the first set of information; and in accordance with a determination that the first application is not authorized to display the first set of information while the computer system is in the second mode, displaying a third user interface different from the first user interface and the second user interface, wherein: the third user interface is displayed at a location that occupies at least a portion of the display region that was occupied by the first user interface, and the third user interface does not include the first set of information.

In accordance with some embodiments, a computer system is described. The computer system is in communication with a display generation component, and comprises: means for displaying, while the computer system is in a first mode, via the display generation component, a first user interface that is associated with a first application and that includes a plurality of user interface elements including a first user interface element depicting a first set of information; means for detecting, while displaying the first user interface, that the computer system has met one or more criteria for transitioning from the first mode to a second mode; and means for, in response to detecting that the computer system has met the one or more criteria for transitioning from the first mode to the second mode: in accordance with a determination that the first application is authorized to display the first set of information while the computer system is in the second mode, displaying a second user interface associated with the first application, wherein: the second user interface corresponds to the first user interface and is displayed at a location that occupies at least a portion of a display region that was occupied by the first user interface, the second user interface is darker than the first user interface, and the second user interface includes a second user interface element depicting the first set of information; and in accordance with a determination that the first application is not authorized to display the first set of information while the computer system is in the second mode, displaying a third user interface different from the first user interface and the second user interface, wherein: the third user interface is displayed at a location that occupies at least a portion of the display region that was occupied by the first user interface, and the third user interface does not include the first set of information.

In accordance with some embodiments, a method is described. The method comprises: at a computer system that is in communication with a display generation component: while the computer system is in a first mode, displaying, via the display generation component, a first user interface that is associated with a first application and that includes a first set of one or more user interface elements including a first user interface element, wherein: the appearance of the first user interface element is periodically updated at a first update frequency, and the first user interface is displayed at a first zoom level; while displaying the first user interface, detecting that the computer system has met one or more criteria for transitioning from the first mode to a second mode; and in response to detecting that the computer system has met the one or more criteria for transitioning from the first mode to the second mode, displaying a second user interface that is different from the first user interface and is associated with the first application, wherein: the second user interface corresponds to the first user interface and is displayed at a location that occupies at least a portion of a display region that was occupied by the first user interface, the second user interface includes a second set of one or more user interface elements including a second user interface element, the appearance of the second user interface element is periodically updated at a second update frequency that is different from the first update frequency and corresponds to a lower update frequency than the first update frequency, and the second user interface is displayed at a second zoom level different from the first zoom level.

In accordance with some embodiments, a non-transitory computer-readable storage medium is described. The non-transitory computer-readable storage medium stores one or more programs configured to be executed by one or more processors of a computer system that is in communication with a display generation component, and the one or more programs include instructions for: while the computer system is in a first mode, displaying, via the display generation component, a first user interface that is associated with a first application and that includes a first set of one or more user interface elements including a first user interface element, wherein: the appearance of the first user interface element is periodically updated at a first update frequency, and the first user interface is displayed at a first zoom level; while displaying the first user interface, detecting that the computer system has met one or more criteria for transitioning from the first mode to a second mode; and in response to detecting that the computer system has met the one or more criteria for transitioning from the first mode to the second mode, displaying a second user interface that is different from the first user interface and is associated with the first application, wherein: the second user interface corresponds to the first user interface and is displayed at a location that occupies at least a portion of a display region that was occupied by the first user interface, the second user interface includes a second set of one or more user interface elements including a second user interface element, the appearance of the second user interface element is periodically updated at a second update frequency that is different from the first update frequency and corresponds to a lower update frequency than the first update frequency, and the second user interface is displayed at a second zoom level different from the first zoom level.

In accordance with some embodiments, a transitory computer-readable storage medium is described. The transitory computer-readable storage medium stores one or more programs configured to be executed by one or more processors of a computer system that is in communication with a display generation component, and the one or more programs include instructions for: while the computer system is in a first mode, displaying, via the display generation component, a first user interface that is associated with a first application and that includes a first set of one or more user interface elements including a first user interface element, wherein: the appearance of the first user interface element is periodically updated at a first update frequency, and the first user interface is displayed at a first zoom level; while displaying the first user interface, detecting that the computer system has met one or more criteria for transitioning from the first mode to a second mode; and in response to detecting that the computer system has met the one or more criteria for transitioning from the first mode to the second mode, displaying a second user interface that is different from the first user interface and is associated with the first application, wherein: the second user interface corresponds to the first user interface and is displayed at a location that occupies at least a portion of a display region that was occupied by the first user interface, the second user interface includes a second set of one or more user interface elements including a second user interface element, the appearance of the second user interface element is periodically updated at a second update frequency that is different from the first update frequency and corresponds to a lower update frequency than the first update frequency, and the second user interface is displayed at a second zoom level different from the first zoom level.

In accordance with some embodiments, a computer system is described. The computer system is in communication with a display generation component, and comprises one or more processors; and memory storing one or more programs configured to be executed by the one or more processors, the one or more programs including instructions for: while the computer system is in a first mode, displaying, via the display generation component, a first user interface that is associated with a first application and that includes a first set of one or more user interface elements including a first user interface element, wherein: the appearance of the first user interface element is periodically updated at a first update frequency, and the first user interface is displayed at a first zoom level; while displaying the first user interface, detecting that the computer system has met one or more criteria for transitioning from the first mode to a second mode; and in response to detecting that the computer system has met the one or more criteria for transitioning from the first mode to the second mode, displaying a second user interface that is different from the first user interface and is associated with the first application, wherein: the second user interface corresponds to the first user interface and is displayed at a location that occupies at least a portion of a display region that was occupied by the first user interface, the second user interface includes a second set of one or more user interface elements including a second user interface element, the appearance of the second user interface element is periodically updated at a second update frequency that is different from the first update frequency and corresponds to a lower update frequency than the first update frequency, and the second user interface is displayed at a second zoom level different from the first zoom level.

In accordance with some embodiments, a computer system is described. The computer system is in communication with a display generation component, and comprises: a means for displaying while the computer system is in a first mode, via the display generation component, a first user interface that is associated with a first application and that includes a first set of one or more user interface elements including a first user interface element, wherein: the appearance of the first user interface element is periodically updated at a first update frequency, and the first user interface is displayed at a first zoom level; means for detecting, while displaying the first user interface, that the computer system has met one or more criteria for transitioning from the first mode to a second mode; and means for, in response to detecting that the computer system has met the one or more criteria for transitioning from the first mode to the second mode, displaying a second user interface that is different from the first user interface and is associated with the first application, wherein: the second user interface corresponds to the first user interface and is displayed at a location that occupies at least a portion of a display region that was occupied by the first user interface, the second user interface includes a second set of one or more user interface elements including a second user interface element, the appearance of the second user interface element is periodically updated at a second update frequency that is different from the first update frequency and corresponds to a lower update frequency than the first update frequency, and the second user interface is displayed at a second zoom level different from the first zoom level.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing display usage, thereby increasing the effectiveness, efficiency, and user satisfaction with such devices. Such methods and interfaces may complement or replace other methods for managing display usage.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7B illustrate a flow diagram depicting a method for managing display usage in accordance with some embodiments.

FIGS. 9A-9B illustrate a flow diagram depicting a method for managing display usage in accordance with some embodiments.

FIGS. 11A-11B illustrate a flow diagram depicting a method for managing display usage in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing display usage. For example, prolonged display of user interfaces that include non-moving graphical objects (e.g., static images) over time causes screen burn-in or image ghosting. This is particularly true for portable multifunction devices with reduced-sized displays, since elements of a displayed user interface are often displayed repetitively at fixed positions on a display. Techniques that thoughtfully manage what is included on a user interface, how it is displayed, and when it is displayed minimize screen burn-in and image ghosting. Such techniques can reduce the cognitive burden on a user who accesses user interfaces, thereby enhancing productivity. Further, such techniques can reduce processor and battery power otherwise wasted on redundant user inputs and excessive display brightness, and improve the wear characteristics of display devices used to display user interfaces.

Figure 6A:
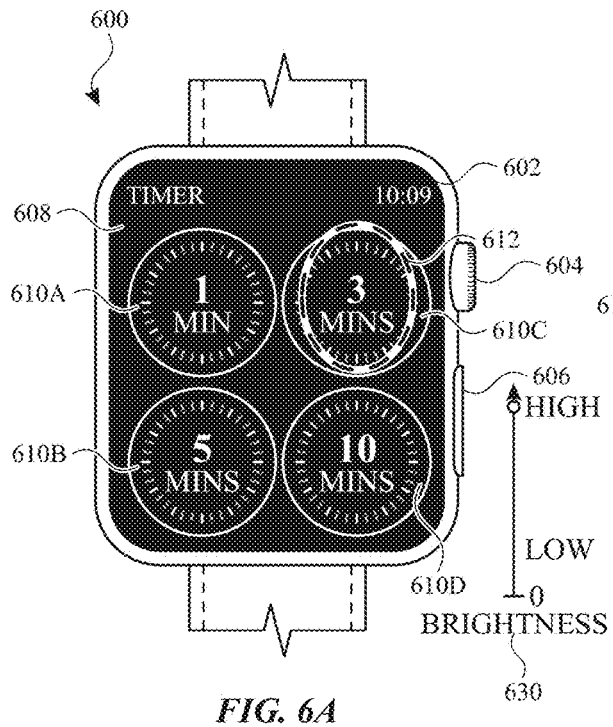
FIGS. 6A-6AK illustrate exemplary user interfaces with managed display usage in accordance with some embodiments.
Figure 7B:
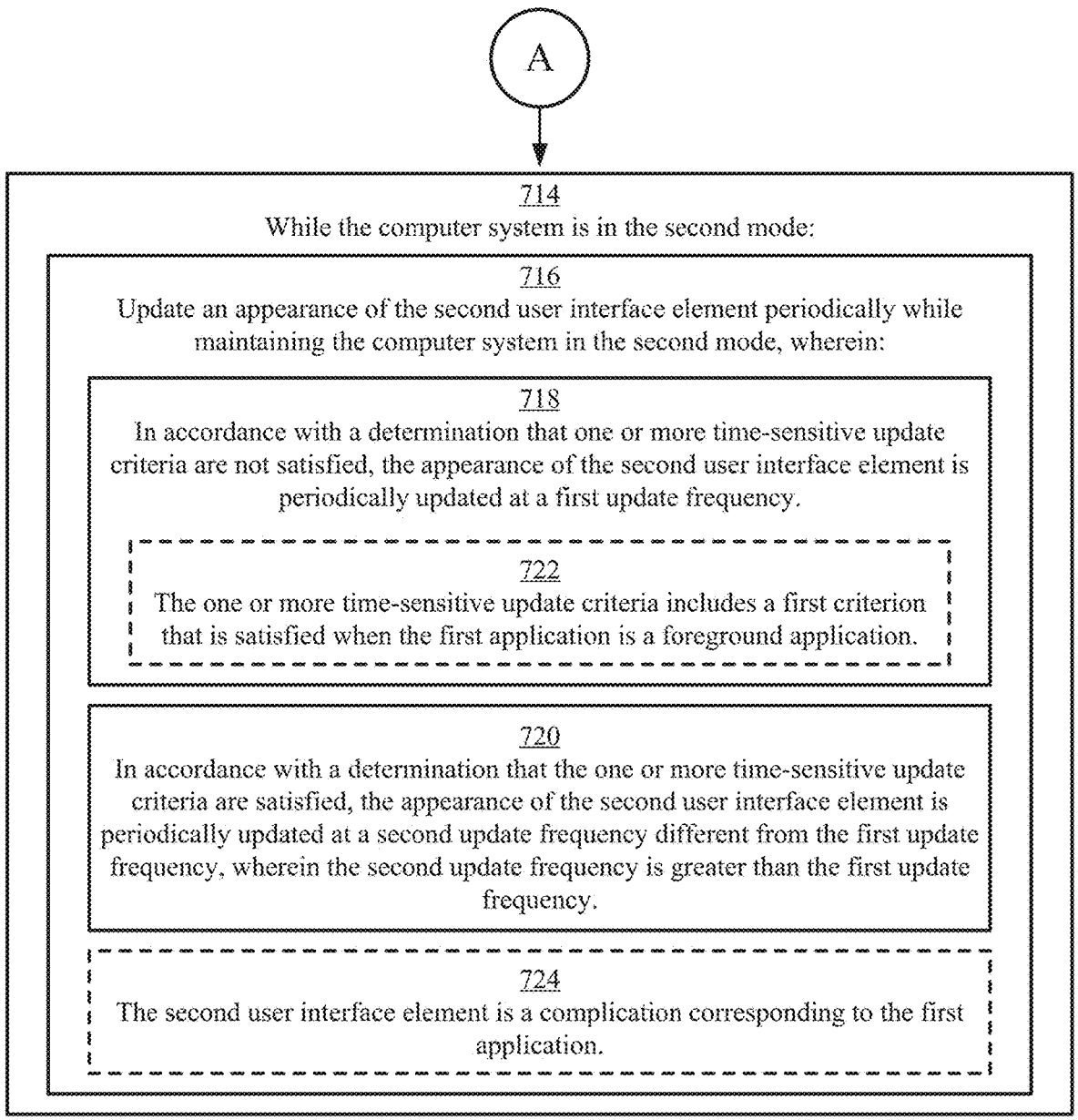
Figures 8A, 8B:
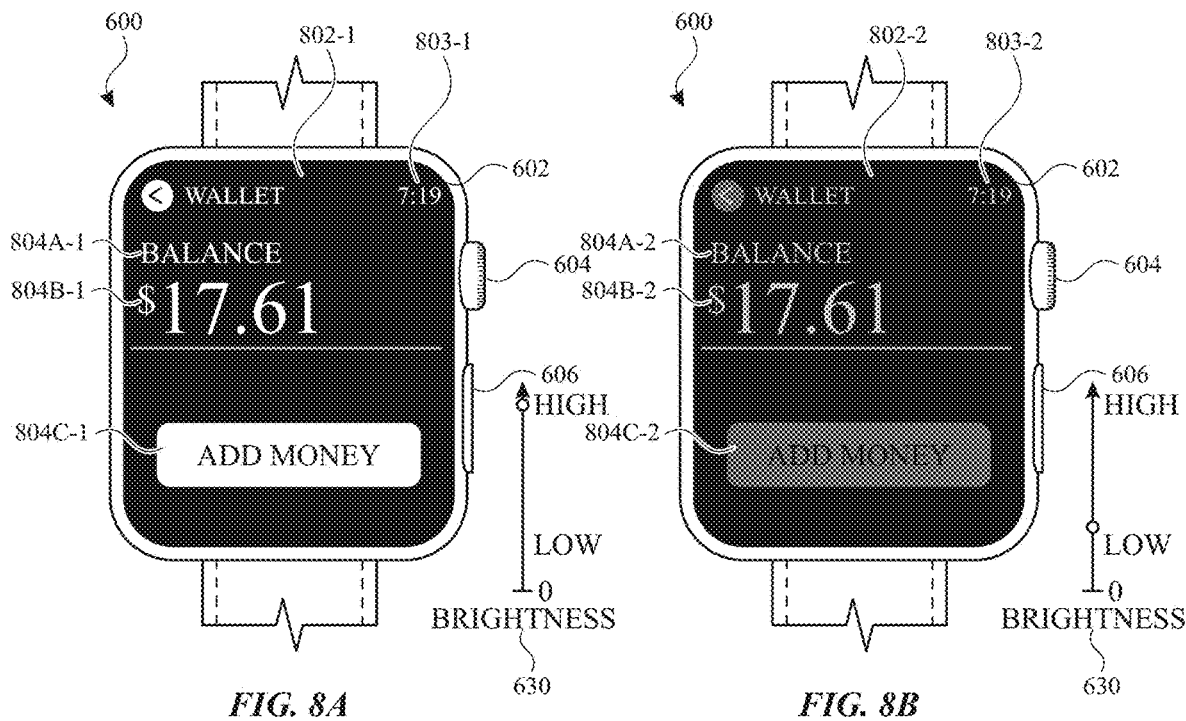
FIGS. 8A-8AD illustrate exemplary user interfaces with managed display usage in accordance with some embodiments.
Figure 9B:
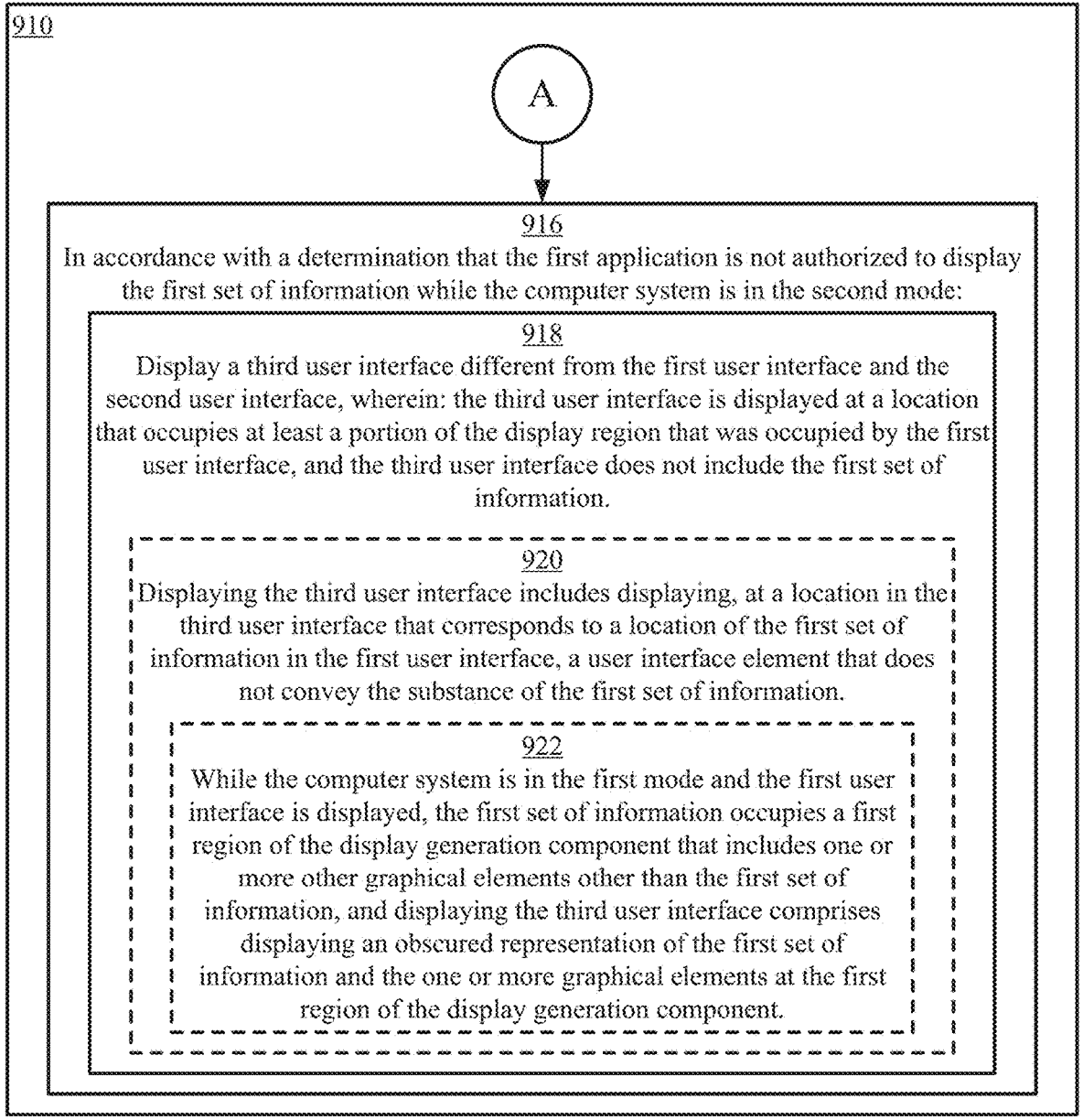

Below, FIGS. 1A-1B, 2, 3, 4A-4B, and 5A-5B provide a description of exemplary devices for performing the techniques for managing display usage. FIGS. 6A-6AK illustrate exemplary user interfaces with managed display usage. FIGS. 7A-7B are a flow diagram illustrating methods for managing display usage in accordance with some embodiments. The user interfaces in FIGS. 6A-6AK are used to illustrate the processes described below, including the processes in FIGS. 7A-7B. FIGS. 8A-8AD illustrate exemplary user interfaces with managed display usage. FIGS. 9A-9B are a flow diagram illustrating methods for managing display usage in accordance with some embodiments. The user interfaces in FIGS. 8A-8AD are used to illustrate the processes described below, including the processes in FIGS. 9A-9B. FIGS. 10A-10K illustrate exemplary user interfaces with managed display usage. FIGS. 11A-11B are a flow diagram illustrating methods for managing display usage in accordance with some embodiments. The user interfaces in FIGS. 10A-10K are used to illustrate the processes described below, including the processes in FIGS. 11A-11B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the terms "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
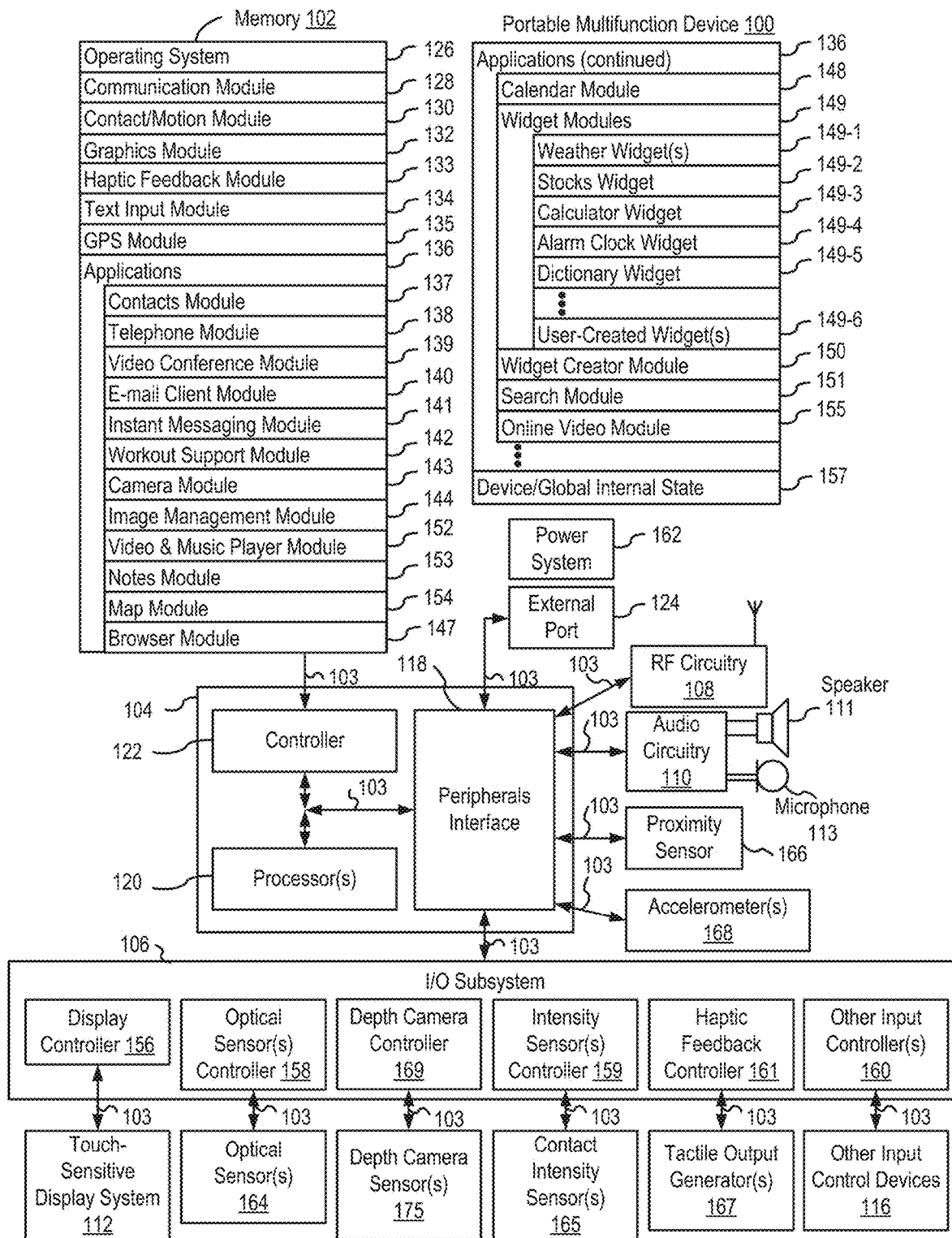
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111, Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive input Devices," filed Jan. 18, 2005; (6) U.S. patent application Ser. No. 11/228,758, "Virtual Input Device Placement On A Touch Screen User interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed. Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," Which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
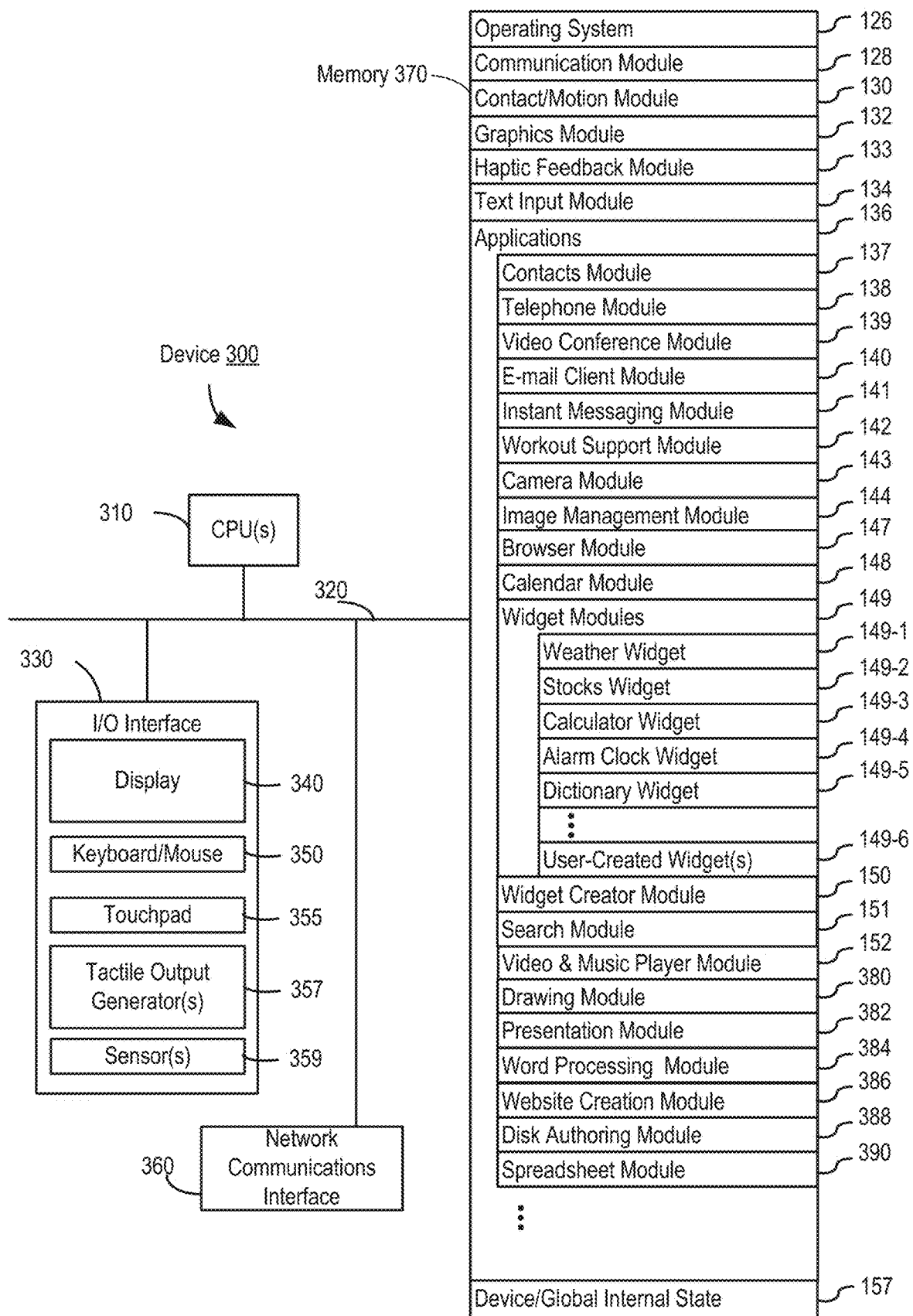
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module 130 (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RI circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module which merges video player module and music player module;
- Notes module 153;
- Map module 54; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address hook or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced. Messaging Service (EMS). As used herein, "instant messaging" refers to both telephony-based messages (e.g., messages sent using SMS or MMS) and Internet-based messages (e.g., messages sent using XMPP, SIMPLE, or MIPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
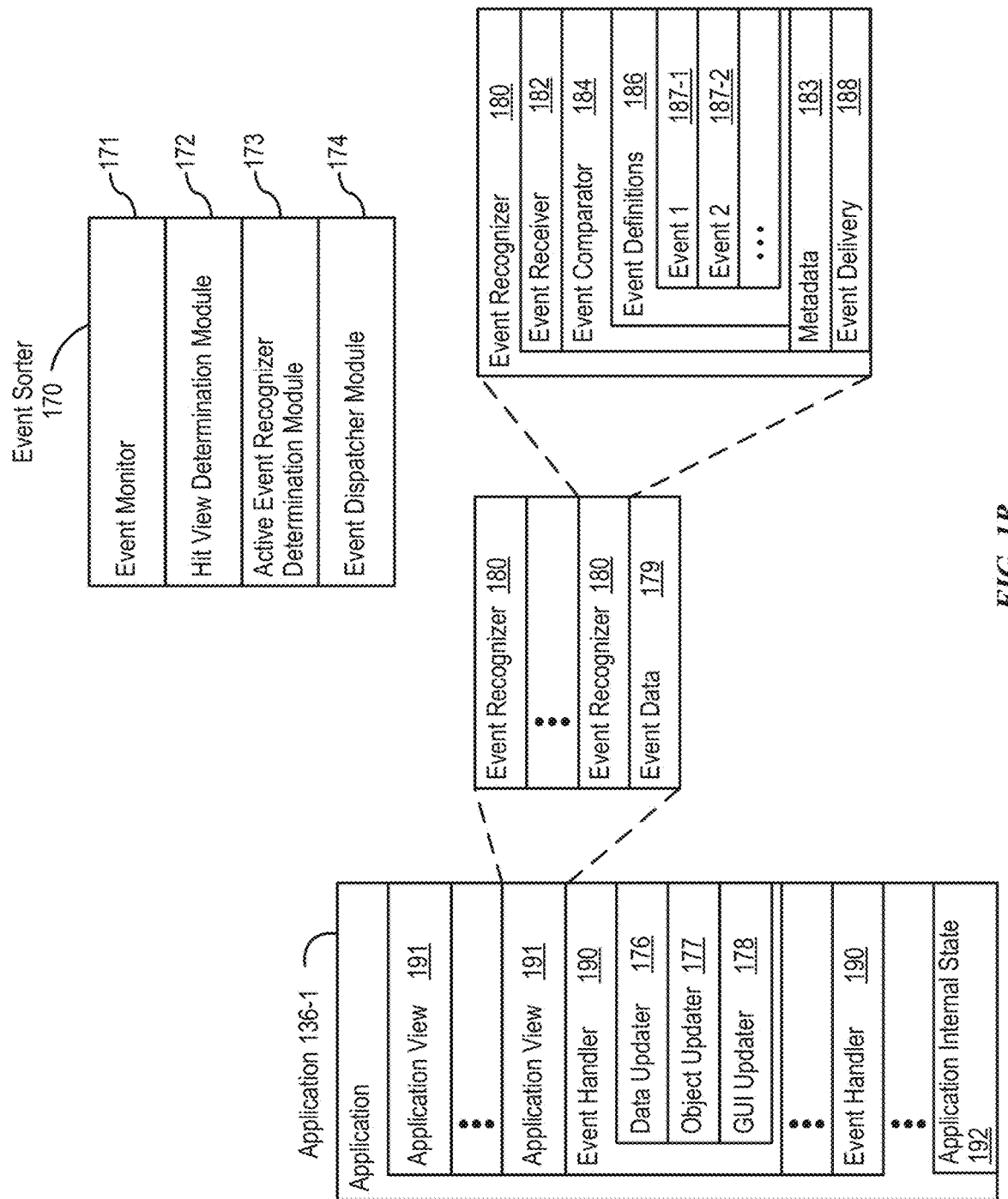
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2. (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
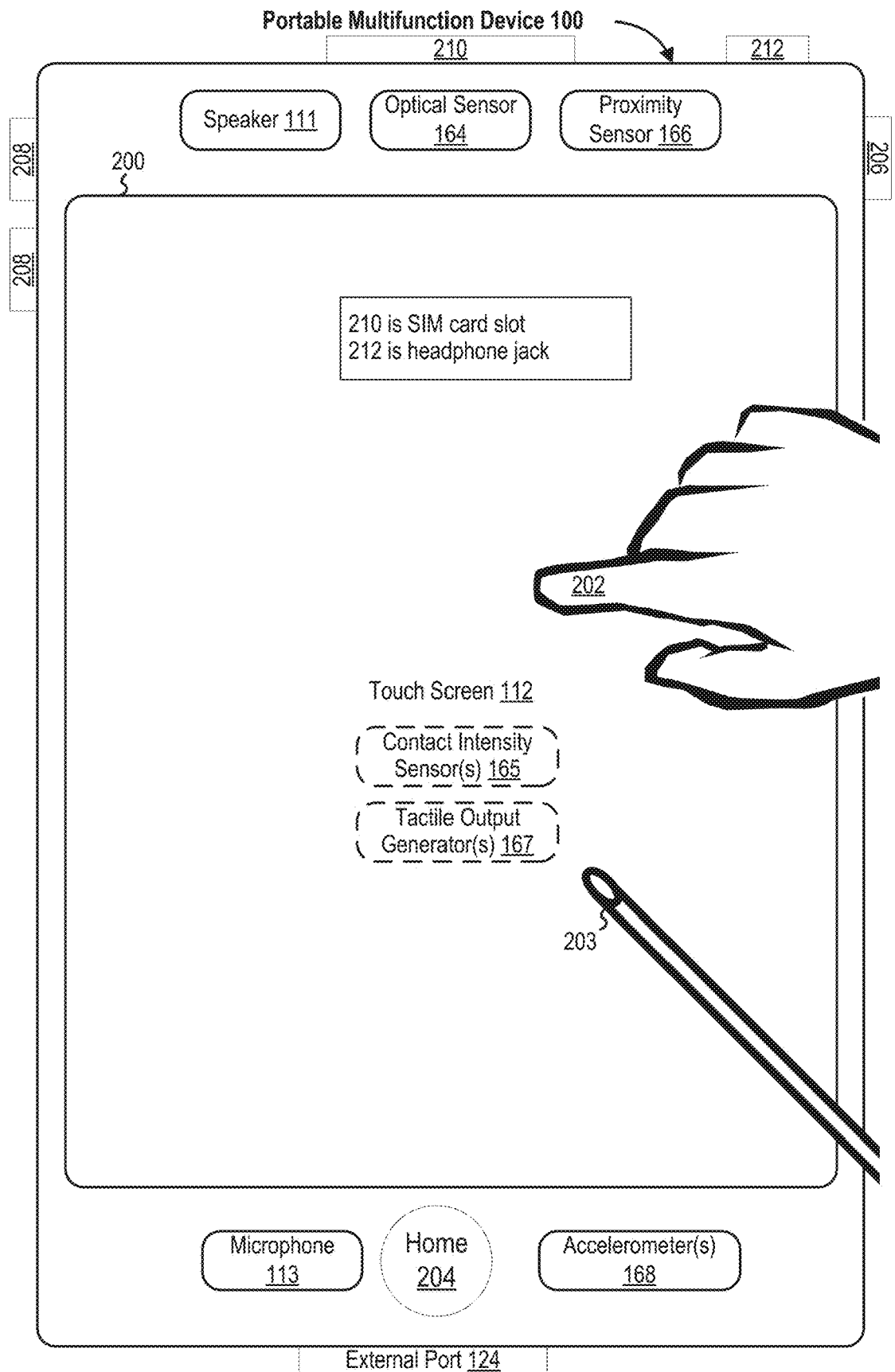
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100, FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
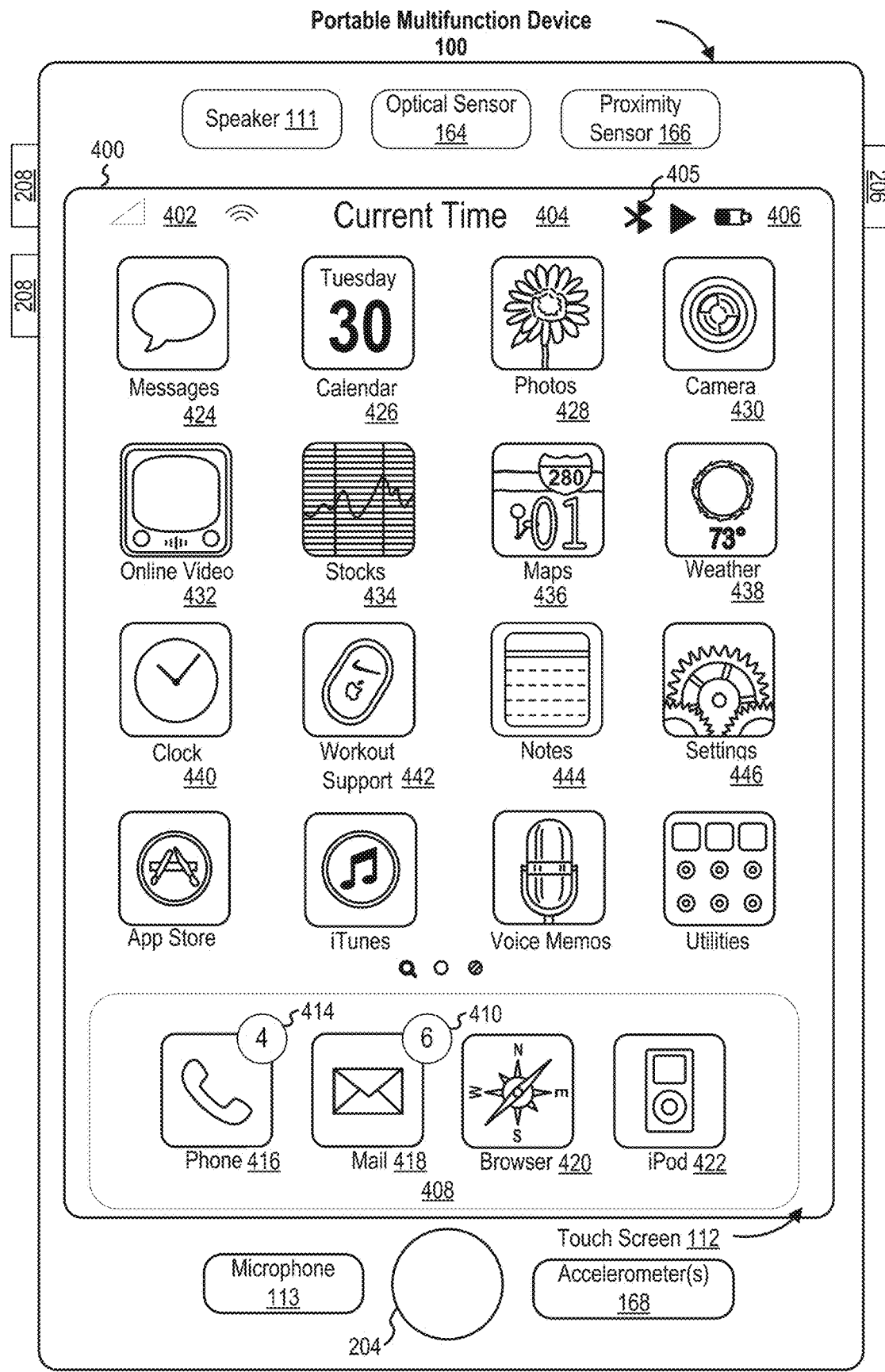
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar,"
  Icon 428 for image management module 144, labeled "Photos,"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather,"
  Icon 440 for alarm clock widget 149-4, labeled "Clock;"
  Icon 442 for workout support module 142, labeled "Workout Support;"
  Icon 444 for notes module 153, labeled "Notes," and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
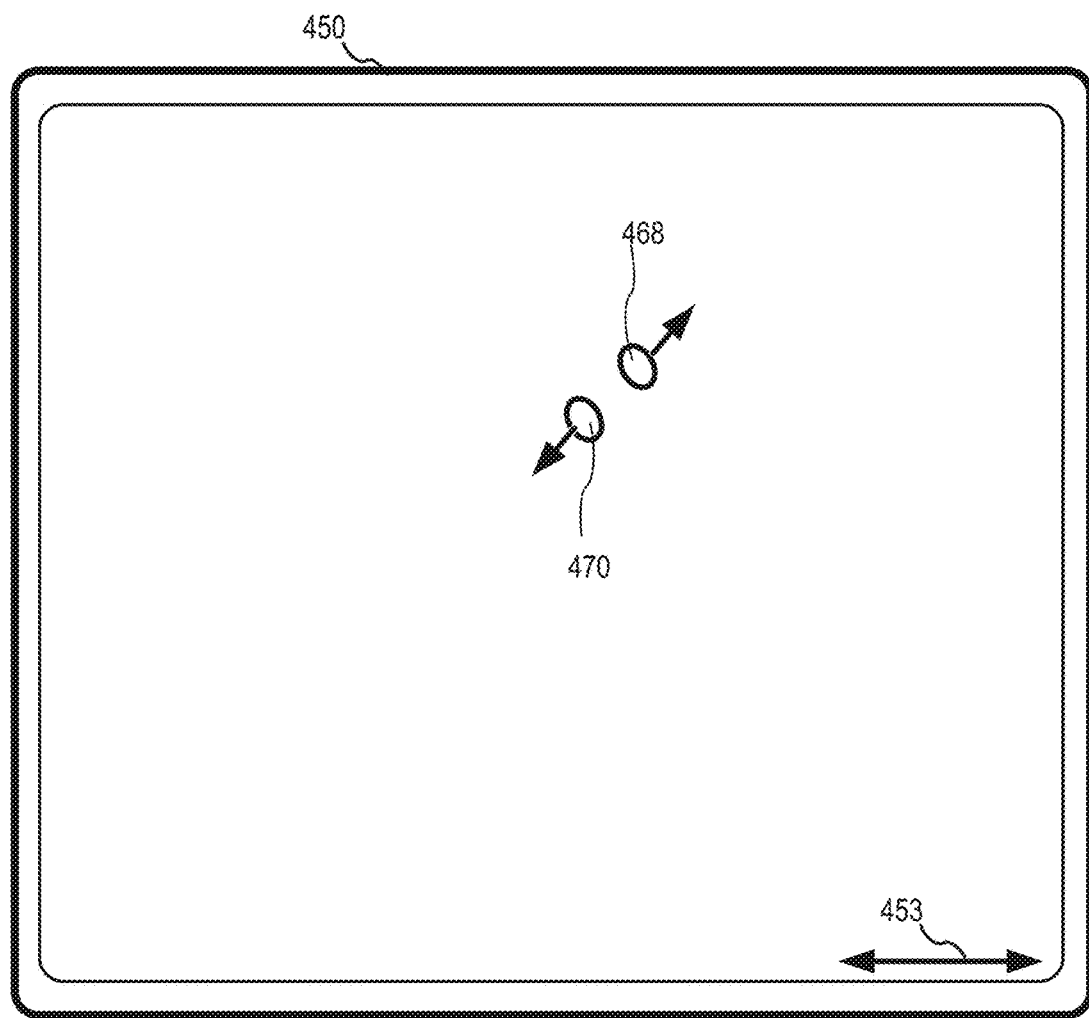
FIG. 4B illustrates an exemplary user interface for a multifunction device with a touch-sensitive surface that is separate from the display in accordance with some embodiments.
Figure 4B:
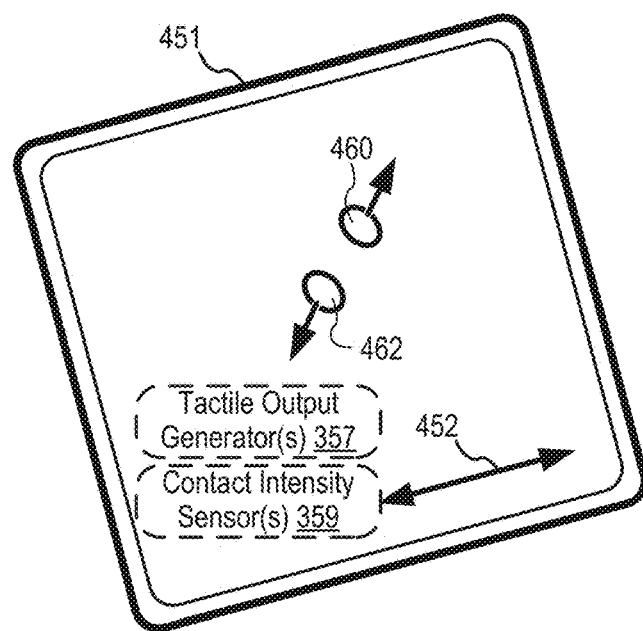

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
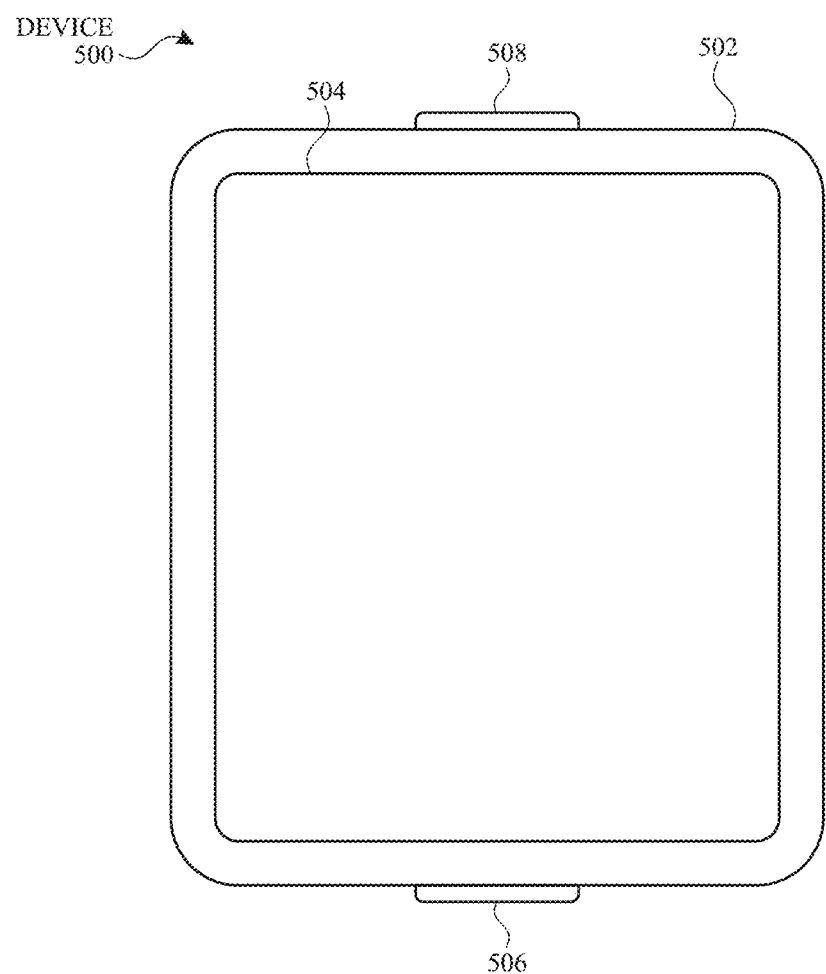
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No, PCT/US2013/069483, titled "Device, Method, and Graphical User Interface for Transitioning Between Touch Input to Display Output Relationships," filed Nov. 11, 2013, published as WIPO) Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
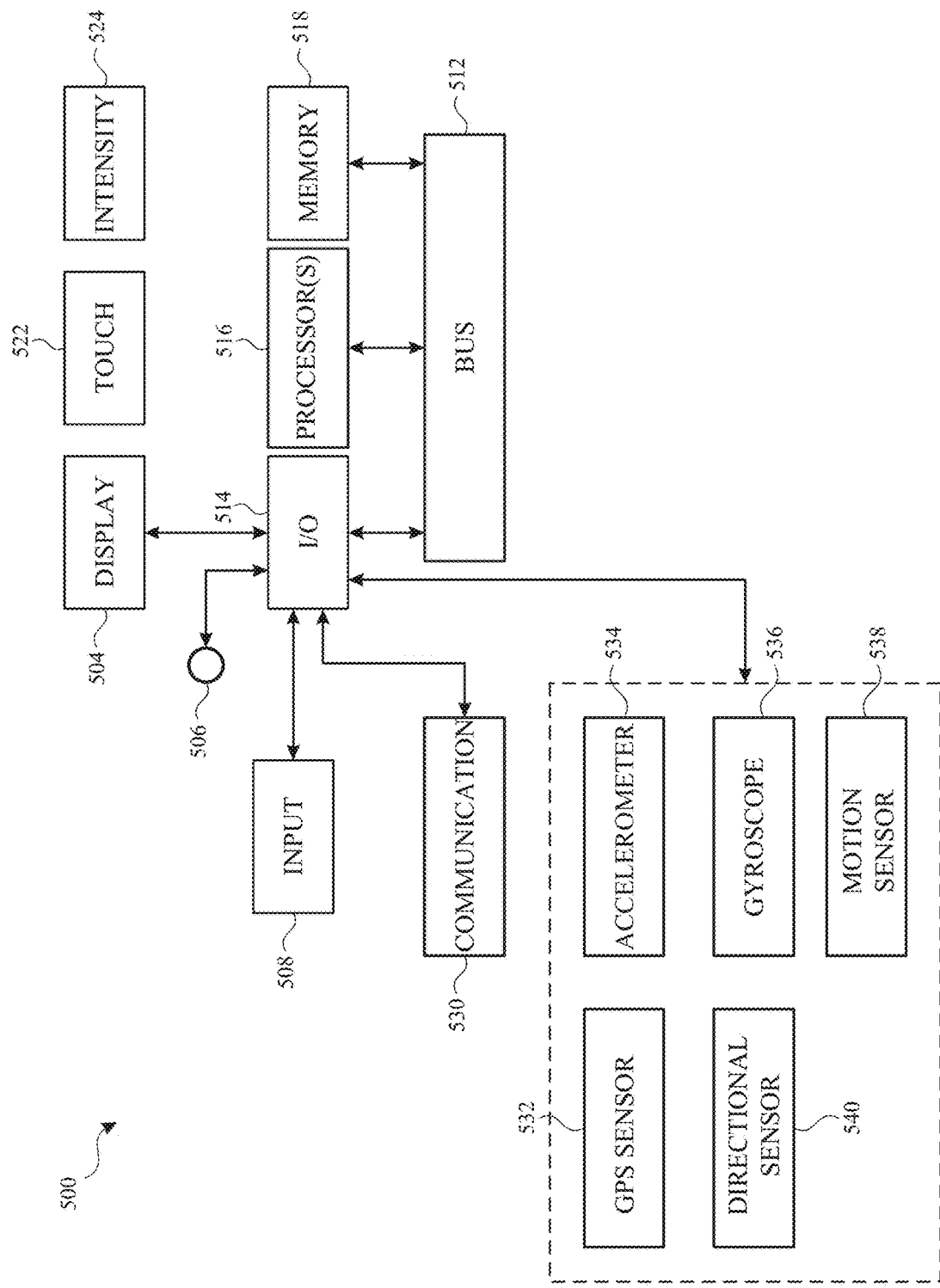
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-1100 (FIGS. 7A-7B, 9A-9B, 11A-11B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized, relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AK illustrate exemplary user interfaces with managed display usage, in accordance with some embodiments. The user interfaces in these figures are used to illustrate the processes described below, including the processes in FIGS. 7A-7B.

In particular, FIGS. 6A-6AK illustrate techniques for managing display usage by altering one or more aspects (e.g., visual characteristics) of a display user interface upon determining that the device has met mode change criteria. In some embodiments, the mode change criteria are one or more criteria that are indicative of reduced user activity or reduced user interaction with the electronic device (e.g., reduced user activity (e.g., physical movement) for a predetermined period of time; a lack of user input for a predetermined period of time; and/or detecting a predefined gesture, such as a cover gesture over the display, corresponding to a request to transition modes). In some embodiments, detecting that the device has met the criteria includes one or more of: receiving data from one or more sensors (e.g., accelerometer, gyroscope, proximity sensor) corresponding to a user gesture (e.g., wrist-down, wrist-up, palm over display), receiving data from one or more sensors indicating user activity below a threshold activity level, and/or determining a predetermined period of time has elapsed without detecting user input at one or more input devices (e.g., touch-screen, rotatable input mechanism, depressible input mechanism). In some embodiments, a predefined period of time associated with mode change criteria differs depending on how display of the presently displayed user interface was initiated (e.g., a longer predefined period a of time for a tap input and shorter predefined period a of time for a wrist raise).

Upon determining that mode change criteria have been met, the device transitions from a first mode to a second mode (e.g., a low power mode). In some embodiments, while operating in the second mode, device 600 conserves energy by operating one or more processors of the device at a reduced load, such as by waking (e.g., enabling or turning on) one or more processors of the device at increased intervals (e.g., a reduced rate; less often) compared to operation in the first mode. In some embodiments, a processor includes hardware (e.g., a microprocessor or the like). In some embodiments, a processor includes one or more software components (e.g., software modules for performing various functions; a module for displaying information from applications on a display device; a module for processing sensor data received by the device, a module for performing calculations necessary to perform or implement various features of the device, etc.).

Figure 6B:
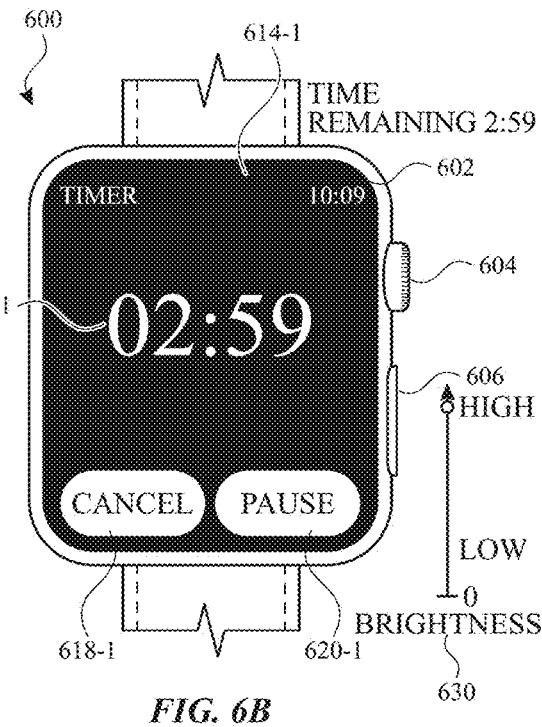

Among the visual characteristics described below that may be altered upon transitioning device modes is the overall brightness of a displayed user interface (e.g., average pixel luminance (APL), average lumen output, total lumen output, average illuminance, and/or total illuminance of the pixels comprising the user interface on the display; brightness expressed in nits, lux, and/or lumens). To illustrate this, FIGS. 6A-6AK (as well as FIGS. 8A-8AD, and 10A-10K) include brightness scale 630 indicating a brightness level at which each respective user interface is displayed by device 600 on display 602. For example, as represented by the difference between respective brightness scales (e.g., position of circular indicator relative to the top ("HIGH") and bottom ("LOW") ends of each scale), clock face user interface 608-1 of FIG. 6I is displayed at a higher brightness level (e.g., greater luminance) than clock face user interface 608-2 of FIG. 6J.

Throughout this disclosure, the concept of brightness levels are also discussed with respect to individual graphical elements or groups of graphical elements included in various clock face user interfaces (e.g., affordances, graphical elements included within affordances, complications, clock face elements, backgrounds, indicators, etc.) displayed by device 600 on display 602. Similar to the brightness level of a clock face user interface, the brightness level of a graphical element as displayed within a clock face user interface on display 602 may also by varied (e.g., using the techniques described below). Please note, however, that as depicted throughout the figures described below, brightness scale 630 reflects an overall brightness level of a respective clock face user interface (e.g., the entire clock face user interface being displayed, not the brightness level of individual graphical elements or groups of graphical elements within the respective clock face user interface), unless otherwise noted. Furthermore, brightness scale 630 is not part of any user interface displayed on device 600.

In addition to brightness scale 630, the relative displayed brightness of a clock face user interface and elements constituting the clock face user interfaces described below (e.g., graphical objects displayed in or on the user interface, backgrounds, etc.) are also represented by the depicted shading intensities in each figure (e.g., white or lighter greys indicating more brightly displayed elements; darker greys indicating less brightly displayed elements).

In some embodiments, brightness levels can be adjusted (increased or decreased) using alpha blending. In some embodiments, decreasing a brightness level includes using alpha blending without altering a backlight of the electronic device to create a simulated or real backlight level. For instance, the device can alpha blend image data representing a clock face user interface (or a portion of a clock face user interface such as an affordance or complication) with an increasingly opaque black masking layer to increasingly dim the clock face user interface as displayed on the screen (e.g., so that the user interface fades to black).

In some embodiments, a brightness level of a graphical object in a clock face user interface is changed by altering the shape or composition of the graphical object itself. For example, the brightness of a white clock hand by may decreased by reducing the thickness of the clock hand (e.g., removing white pixels from the element). In some embodiments, a brightness level of a graphical object is altered (e.g., reduced or dimmed) by replacing solid-colored regions of the object with a similarly colored outlines of the solid-colored regions. In some embodiments, a brightness level of a graphical object is reduced or dimmed by altering its colors, for example, by replacing lighter colors (e.g., white, light greys, yellows, etc.) with darker colors (black, dark greys, blues, etc.). Any combination of the brightness altering techniques described above or similar techniques well-known in the art, may be used for adjusting brightness levels of graphical objects and clock face user interfaces in accordance with the embodiments described below.

In general, different brightness levels can be achieved using various techniques, which can be employed separately or concurrently. In some embodiments, the brightness level of a graphical element is changed by changing (e.g., brightening, dimming) the brightness of some (or all) pixels of the graphical element. In some embodiments, the brightness level of the graphical element is changed by modifying the graphical element so that fewer (or more) pixels are lit up, such as by thinning (or thickening) lines of the graphical element, and removing (or adding) a background of the graphical element, reducing (or enlarging) a size of the graphical element.

Turning now to FIG. 6A, device 600 includes display 602, rotatable and depressible input mechanism 604 (e.g., rotatable and depressible in relation to a housing or frame of the device 600), and button 606. In the embodiments described below, device 600 is a wearable device, such as a smartwatch. In some embodiments, device 600 is a smart phone, a tablet, or other computing system including a display device (e.g., display screen, projection device, and the like). In some embodiments, device 600 includes one or more features of devices 100, 300 or 500.

FIGS. 6A-6J illustrate an example scenario involving a timer application running on device 600. At FIG. 6A, while operating in a standard display mode (e.g., a higher power consumption display mode), device 600 displays timer selection user interface 608 (e.g., a higher power consumption user interface) on display 602 at a standard display brightness level. In some embodiments, while device 600 continues to operate in the standard display mode, the brightness level of the standard display mode is reduced in response to detecting reduced ambient light levels at one or more sensors of device 600 (e.g., lower ambient light levels result in lower display brightness levels, while still maintaining device 600 in the standard display mode).

As illustrated in FIG. 6A, timer selection user interface 608 includes selectable timer user interface objects 610A-610D. Each selectable timer user interface object 610A-610D corresponds to a respective duration of time (e.g., object 610A corresponds to 1 minute, object 610B corresponds to 3 minutes, object 610C corresponds to 5 minutes, and object 610D corresponds to 10 minutes). Each selectable timer user interface object 610A-610D) is selectable to cause device 600 to initiate a countdown timer in the timer application, the countdown timer having a duration equal to the duration of time associated with the selected object.

At FIG. 6A, while displaying timer selection user interface 608, device 600 detects input 612 (e.g., a tap input and/or a non-tap input) at a location corresponding to selectable timer user interface object 610B. At FIG. 6B, in response to detecting input 612, device 600 ceases display of timer selection user interface 608 and displays timer user interface 614-1. At FIG. 6B, device 600 continues to operate in the standard display mode (e.g., the higher power consumption display mode), and displays timer user interface 614-1 (e.g., a higher power consumption user interface) on display 602 at a standard display brightness level. As illustrated in FIG. 6B, timer user interface 614-1 includes a plurality of affordances, including timer indication 616-1, cancel button 618-1, and pause button 620-1. Timer indication 616-1 depicts how much time is remaining in a countdown timer. In FIG. 6B, timer indication 616-1 indicates that there are two minutes and 59 seconds remaining. Cancel button 618-1 is selectable to cancel the countdown timer. Pause button 620-1 is selectable to pause the countdown timer. In some embodiments, if pause button 620-1 is selected, device 600 replaces pause button 620-1 with a resume button that is selectable to resume the countdown timer.

In FIG. 6B, while device 600 is operating in the standard display mode, device 600 periodically updates timer indication 616-1 (e.g., updates timer user interface 614-1 and/or updates one or more elements of timer user interface 614-1) at a first update frequency (e.g., more than once per second, every half second, every tenth of a second, and/or every hundredth of a second). In some embodiments, while device 600 is operating in the standard display mode, device 600 also periodically updates other elements of timer user interface 614-1 (e.g., cancel button 618-1 and/or pause button 620-1) at the first update frequency. In some embodiments, while device 600 is operating in the standard display mode, device 600 periodically updates other elements of timer user interface 614-1 (e.g., cancel button 618-1 and/or pause button 620-1) at a different update frequency from timer indication 616-1.

Figure 6C:
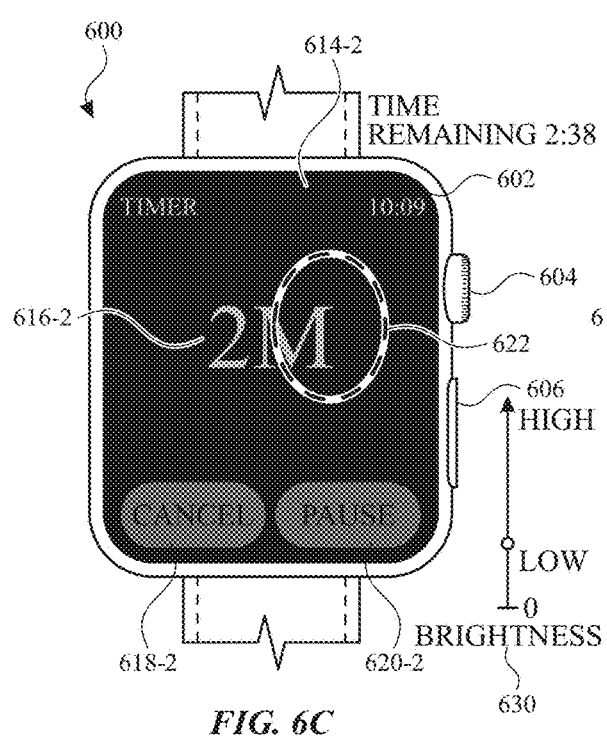

FIG. 6C illustrates device 600 after determining that one or more mode change criteria have been met (e.g., detecting a wrist-down gesture using, for example, motion sensors; and/or no input of certain types for a threshold duration of time) and, in response, transitioning out of the standard display mode and into a low power display mode (e.g., from a higher power consumption mode to a lower power consumption mode). In some embodiments, after determining that one or more mode change criteria have been met, device 600 displays an animation (e.g., a sequence of frames or images) illustrating a higher power consumption user interface (e.g., timer user interface 614-1) morphing into a corresponding lower power consumption user interface (e.g., timer user interface 614-2). In some embodiments, device 600 displays a plurality of animation frames (e.g., transitional interfaces) while operating in a transitional state between device modes (e.g., a standard power display mode and a low power display mode).

At FIG. 6C, while operating in the low power display mode, device 600 displays timer user interface 614-2 (e.g., a lower power consumption user interface) on display 602. Timer user interface 614-2 is displayed at a lower brightness level than timer user interface 614-1 (e.g., the overall brightness level or the average of the brightness values of pixels constituting timer user interface 614-2 on display 602 is less than the brightness level of timer user interface 614-1 on display 602 as depicted in FIG. 6B). In some embodiments, timer user interface 614-2 is displayed at a fixed percentage of the brightness level at which device 600 displays timer user interface 614-1. In some embodiments, timer user interface 614-2 is displayed at a brightness level based at least in part on an ambient light level detected by one or more sensors of device 600 (e.g., higher ambient light levels result in higher brightness levels while in low power display mode).

Corresponding elements in timer user interface 614-2 are displayed by device 600 differently than they were previously displayed in timer user interface 614-1. In FIG. 6C, timer indication 616-2 is displayed at a lower brightness level (e.g., in a darker color) than timer indication 616-1 was displayed (e.g., timer indication 616-2 is displayed in gray, while timer indication 616-1 was displayed in white). Similarly, cancel button 618-2 and pause button 620-2 are also displayed in different (e.g., darker) colors than cancel button 618-1 and pause button 620-1 were previously displayed.

In some embodiments, the change in brightness levels between corresponding elements (e.g., affordances and/or objects) in timer user interfaces 614-1 and 614-2 are not uniform (e.g., timer indication 616-1 is changed from white to a first color in timer indication 616-2, and button 618-1 is changed from white to a second, different color in button 618-2). In some embodiments, device 600 displays one or more elements in timer user interface 614-2 at a reduced size compared to their corresponding elements in timer user interface 614-1.

In addition to displaying timer indication 616-2 at a lower brightness level, device 600 displays timer indication 616-2 at a lower level of precision (e.g., a lower level of accuracy) than timer indication 616-1. As was shown in FIG. 6B, timer indication 616-1 was previously shown at a first level of precision (e.g., in FIG. 6B, in minutes and seconds). In FIG. 6C, timer indication 616-2 is shown at a second level of precision (e.g., minutes) that is less precise than the first level of precision. In FIG. 6C, there are 2 minutes and 38 seconds remaining in the countdown timer, but timer indication 616-2 is shown as 2 minutes (e.g., rounded down to 2 minutes or only displaying the minutes value).

Furthermore, as discussed above, while device 600 was operating in the standard display mode, device 600 periodically updated timer indication 616-1 at a first update frequency. In FIG. 6C, while device 600 is operating in the low power display mode, device 600 periodically updates timer indication 616-2 at a second update frequency that is less than the first update frequency (e.g., the second update frequency corresponds to less frequent updates than the first update frequency) (e.g., every 10 seconds, every 30 seconds, and/or every minute). In some embodiments, while device 600 is operating in the low power display mode, device 600 also periodically updates other elements of timer user interface 614-2. (e.g., cancel button 618-2 and/or pause button 620-2) at the second update frequency. In some embodiments, while device 600 is operating in the low power display mode, device 600 periodically updates other elements of timer user interface 614-2 (e.g., cancel button 618-2 and/or pause button 620-2) at different update frequencies from timer indication 616-2. Updating timer indication 616-2 at a decreased frequency while device 600 is operating in the low power display mode further decreases power consumption in the low power display mode.

At FIG. 6C, while operating in the low power display mode and displaying timer user interface 614-2, device 600 detects input 622 (e.g., a tap input and/or a non-tap input).

Figure 6D:
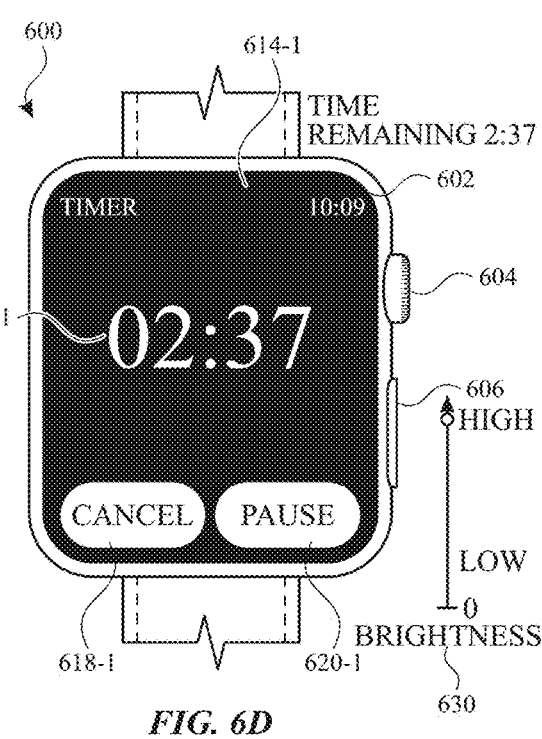

At FIG. 6D, in response to detecting input 622, device 600 transitions from the low power display mode to the standard display mode, and replaces display of timer user interface 614-2 with timer user interface 614-1. Timer user interface 614-1 is displayed at a higher brightness level than timer user interface 614-2 (e.g., the overall brightness level or the average of the brightness values of pixels constituting timer user interface 614-1 on display 602 is greater than the brightness level of timer user interface 614-2 on display 602 as depicted in FIG. 6C). For example, timer indication 616-1, cancel button 618-1, and pause button 620-1 are displayed at a higher brightness level (e.g., displayed with brighter colors) than corresponding elements in timer user interface 614-2 (e.g., timer indication 616-2, cancel button 618-2, pause button 620-1). It can also be seen that timer indication 616-1 is displayed at the first level of precision (e.g., seconds), which is a greater level of precision than the second level of precision that was applied in displaying timer indication 616-2 (e.g., minutes). In FIG. 6D, device 600 periodically updates timer indication 616-1 at the first update frequency, which is greater than the second update frequency.

Figure 6E:
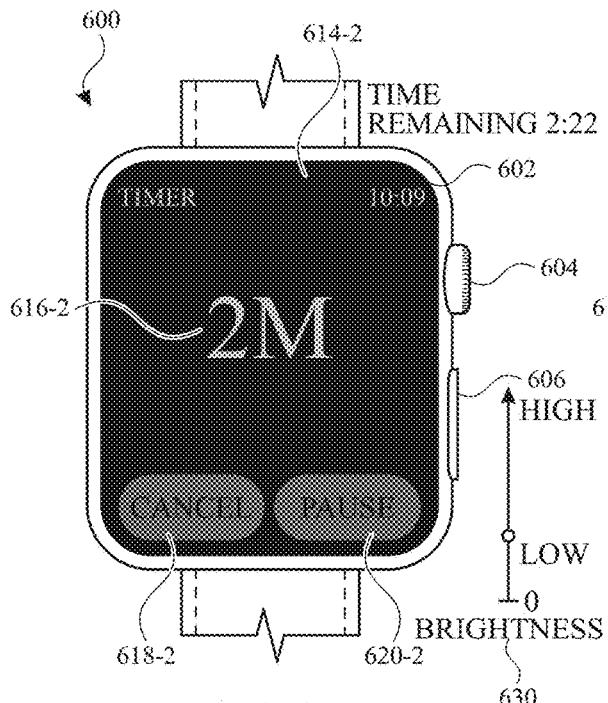

FIG. 6E illustrates device 600 after determining that one or more mode change criteria have been met (e.g., detecting a wrist-down gesture using, for example, motion sensors; and/or no input of certain types for a threshold duration of time) and, in response, transitioning out of the standard display mode and into the low power display mode. In FIG. 6E, in response to determining that the one or more mode change criteria have been met, device 600 replaces display of timer user interface 614-1 with timer user interface 614-2. As discussed above, while device 600 is operating in the low power display mode, device 600 displays timer indication 616-2 at the second level of precision that is less precise than the first level of precision that was applied in displaying timer indication 616-1, and periodically updates timer indication 616-2 at a second update frequency that is less than the first update frequency.

Figure 6F:
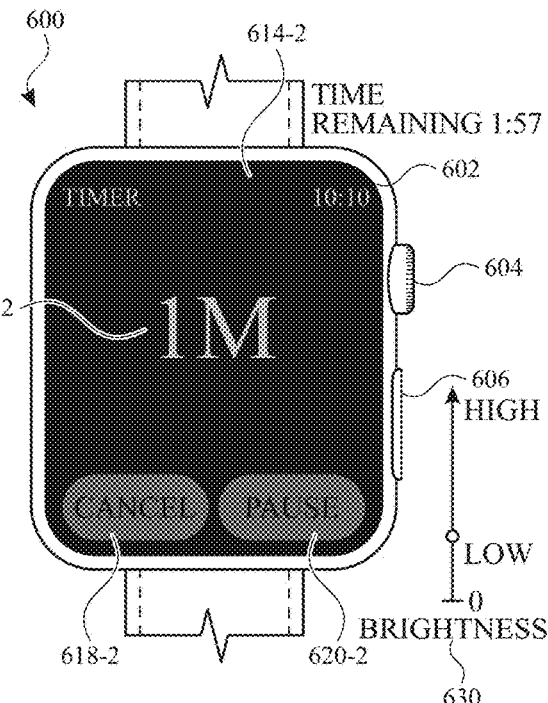

At FIG. 6F, device 600 periodically updates timer indication 616-2 according to the second update frequency. In the depicted example, the second update frequency is 25 seconds. From FIG. 6E to FIG. 6F, 25 seconds have elapsed, and in FIG. 6F, there is 1 minute and 57 seconds remaining in the countdown timer. Accordingly, device 600 updates timer indication 616-2 to display "1M." The next update of timer indication 616-2 occurs when there is 1 minute and 32 seconds remaining in the countdown timer. However, because there is still between 1 minute and 32 seconds remaining, timer indication 616-2 continues to display "1M." A next update of timer indication 616-2 occurs when there is 1 minute and 7 seconds remaining in the countdown timer. Again, because there is still between 1 minute and 2 minutes remaining, timer indication 616-2 continues to display "1M."

In some embodiments, while device 600 is operating in the low power mode, user interface objects, such as timer indication 616-2, are updated at different update frequencies based on whether one or more time-sensitive update criteria are met. For example, in FIGS. 6E and 6F, time-sensitive update criteria are not met, and device 600 periodically updates timer indication 616-2 at the second update frequency. However, as discussed below with reference to FIG. 6G, in some embodiments, if one or more time-sensitive update criteria are met, device 600, while continuing to operate in the low power display mode, periodically updates tinier indication 616-2 at a third update frequency that is greater than (e.g., more frequent than) the second update frequency.

Figure 6G:
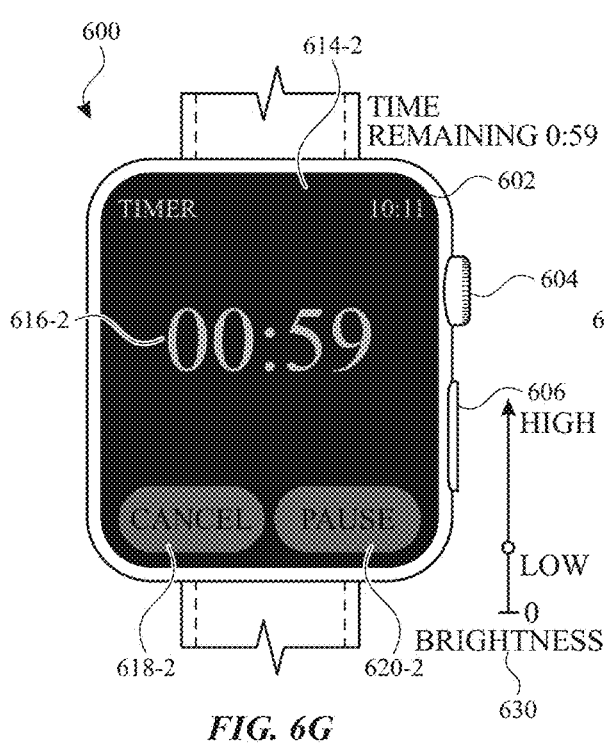

FIG. 6G illustrates device 600 after determining that one or more time-sensitive update criteria have been met while device 600 is operating in the low power display mode. In FIG. 6G, the one or more time-sensitive update criteria includes a criterion that is met when there is less than a threshold amount of time remaining in the countdown timer (e.g., less than 1 minute remaining). In response to determining that the one or more time-sensitive update criteria have been met, device 600 periodically updates timer indication 616-2 at a third update frequency (e.g., more than once a second, every second, every half second, and/or every tenth of a second) that is greater than the second update frequency. In some embodiments, the third update frequency is equal to the first update frequency. In some embodiments, the third update frequency is less than the first update frequency.

In FIG. 6G, in response to determining that one or more time-sensitive update criteria have been met while device 600 is operating in the low power mode, device 600 also displays timer indication 616-2 at a third level of precision (e.g., minutes and seconds) that is more precise than the second level of precision e.g., minutes). In the depicted embodiment, the third level of precision is the same as the first level of precision that was utilized while device 600 was in the standard display mode. In FIG. 6G, timer indication 616-2 indicates that there are 59 seconds remaining in the countdown timer.

Figure 6H:
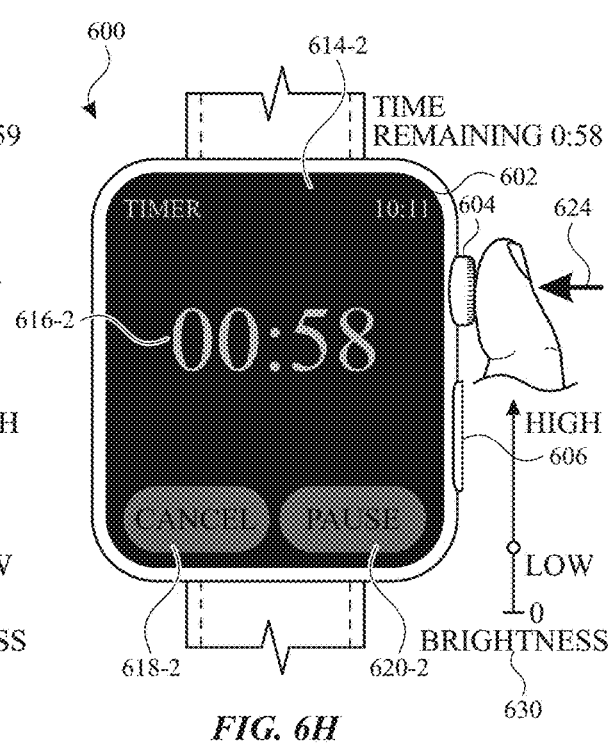
Figure 6I:
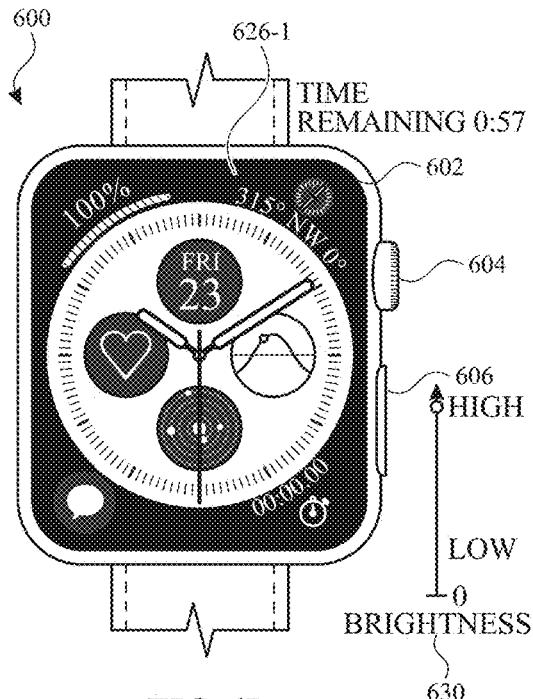

At FIG. 6H, device 600 continues to periodically update timer indication 616-2 at the third update frequency (e.g., because the one or more time-sensitive update criteria continue to be met). In FIG. 6H, device 600 has updated timer indication 616-2 to indicate that there are 58 seconds remaining in the countdown timer.

By increasing the update frequency of timer indication 616-2. (e.g., from the second update frequency to the third update frequency) when one or more time-sensitive update criteria are satisfied, device 600 can conserve power with less frequent updates when frequent updates are not needed (e.g., updating once every 25 seconds when there is greater than one minute remaining in the timer), and can also provide more useful information and/or a greater level of accuracy by increasing the frequency of updates in more time-sensitive scenarios (e.g., updating once every half second in the last minute of the timer). In some embodiments, the timer application and/or one or more elements of timer user interface 614-2 are updated at a higher frequency than the second update frequency (e.g., at the first update frequency, at the third update frequency, and/or a different update frequency) while the timer indication 616-2 is updated at the second update frequency. For example, in some embodiments, the timer application and/or one or more elements of timer user interface 614-2 are updated at a higher frequency than the second update frequency when there are less than two minutes remaining on the timer, and/or for all time periods (e.g., whereas the timer indication 616-2 is updated at the second update frequency for all time periods except for when there is less than one minute remaining on the timer).

At FIG. 6H, while displaying timer user interface 614-2 and while operating in the low power display mode, device 600 detects input 624 (e.g., a depression of rotatable and depressible input mechanism 604). At FIG. 6I, in response to detecting input 624, device 600 transitions from the low power display mode to the standard display mode. Additionally, in response to detecting input 624, device 600 replaces display of timer user interface 614-2 with clock face user interface 626-1. In FIG. 6I, the timer application continues to run in the background while clock face user interface 626-1 is displayed in the foreground. More details pertaining to the clock face user interface 626-1 are discussed below with reference to clock face user interface 650-1 and clock face user interface 650-2 in FIGS. 6P-6V.

Figure 6J:
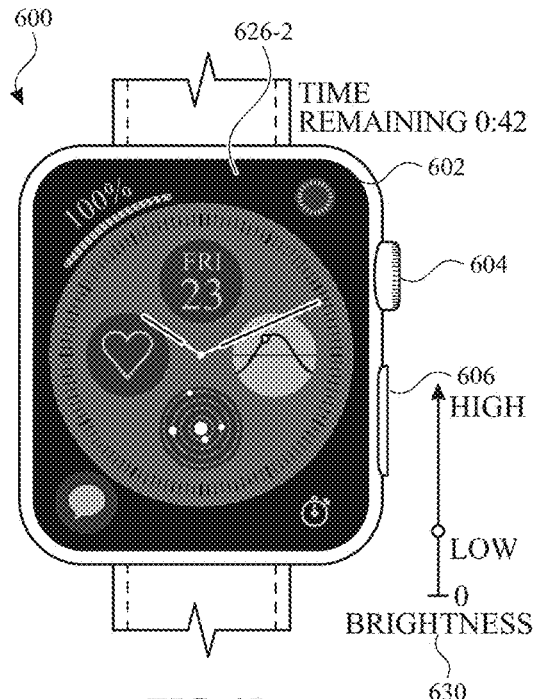

FIG. 6J illustrates device 600 after determining that one or more mode change criteria have been met (e.g., detecting a wrist-down gesture using, for example, motion sensors; and/or no input of certain types for a threshold duration of time) and, in response, transitioning out of the standard display mode and into the low power display mode. In FIG. 6J, in response to determining that the one or more mode change criteria have been met, device 600 replaces display of clock face user interface 626-1 (e.g., a higher power consumption user interface) with clock face user interface 626-2 (e.g., a lower power consumption user interface). Clock face user interface 626-2 is displayed at a lower brightness level than clock face user interface 626-1 in a manner similar to that described above with reference to timer user interface 614-1 and timer user interface 614-2.

In FIG. 6J, while device 600 is operating in the low power display mode, the countdown timer continues to run, and still has less than one minute remaining. However, in some embodiments, including the depicted embodiment, the one or more time-sensitive update criteria includes a criterion that is met when the application that is in a time-sensitive situation (in this case, the timer application) is a foregrounded application, and that is not met when the application is not foregrounded (e.g., is backgrounded). In the scenario depicted in FIG. 6J, although the timer application has less than one minute remaining in the countdown timer, because the timer application is backgrounded, the one or more time-sensitive update criteria are not met, and display 602 is not updated at the third update frequency (e.g., is updated at an update frequency that is lower than the third update frequency (e.g., the second update frequency)).

Figure 6K:
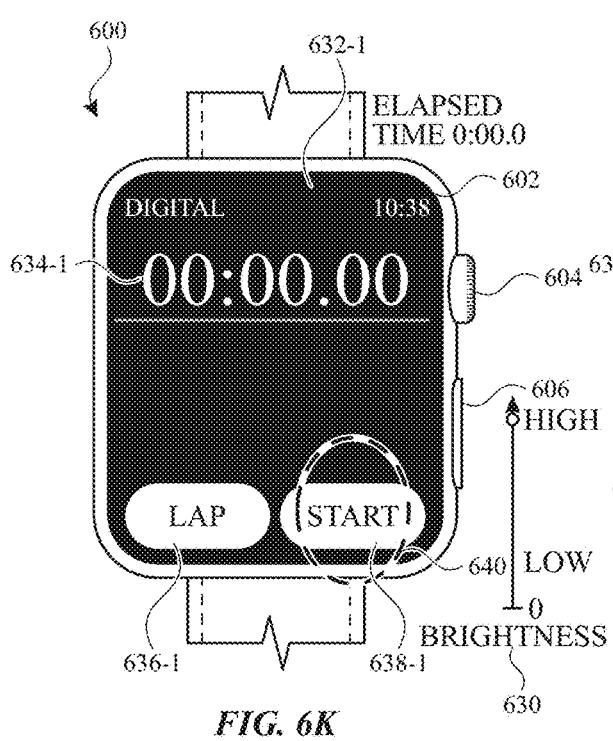
Figure 6L:
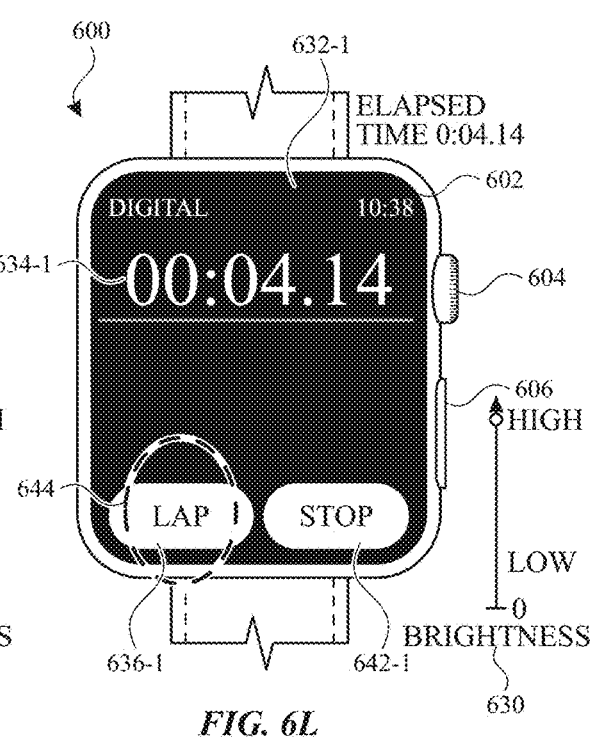
Figure 6M:
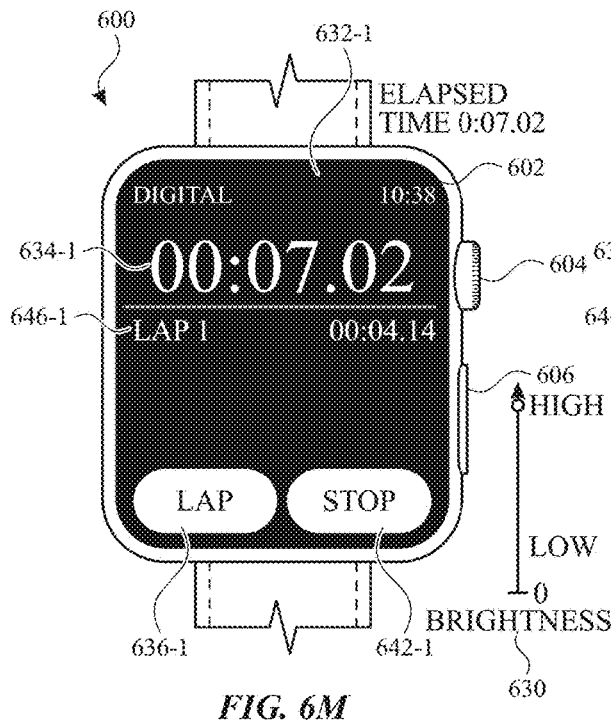
Figure 6N:
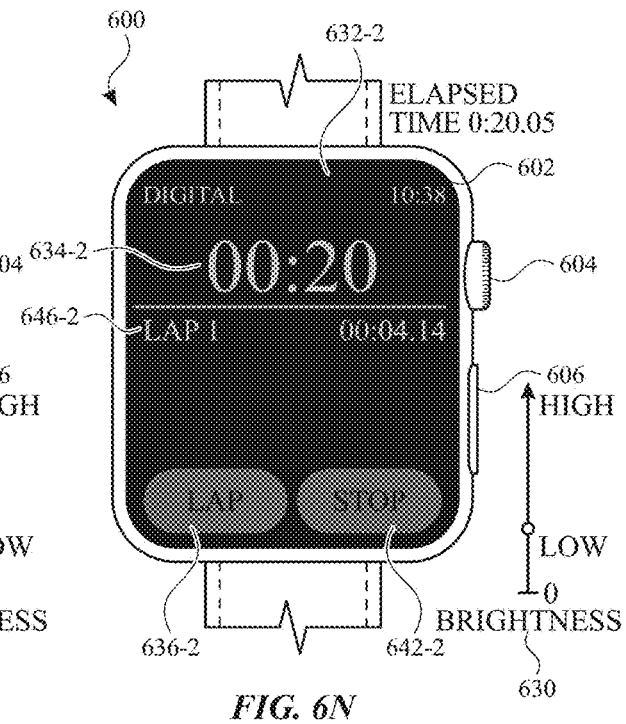
Figure 6O:
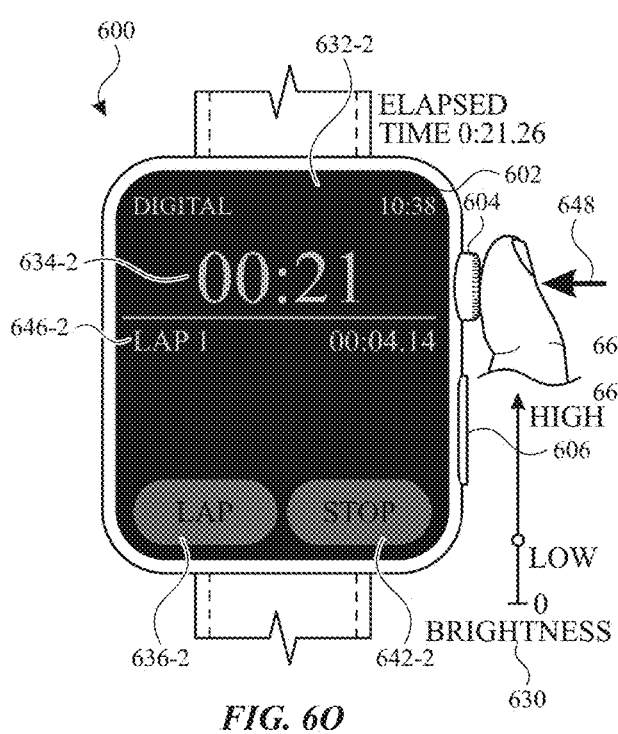
Figure 6P:
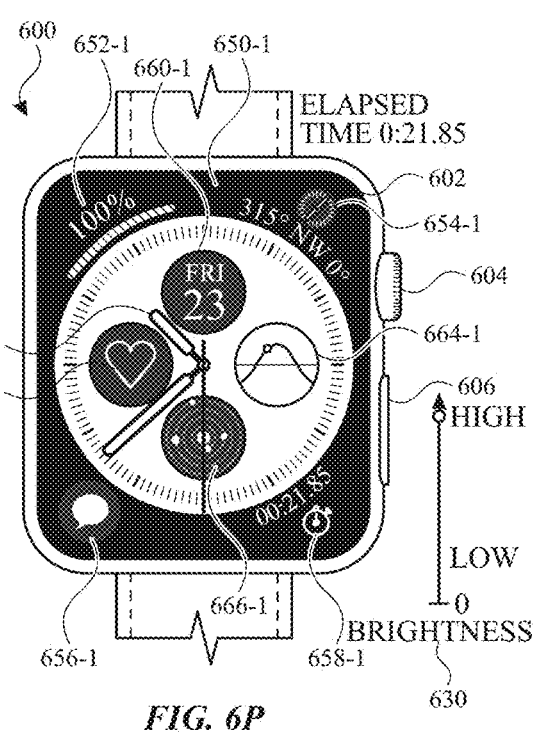
Figure 6Q:
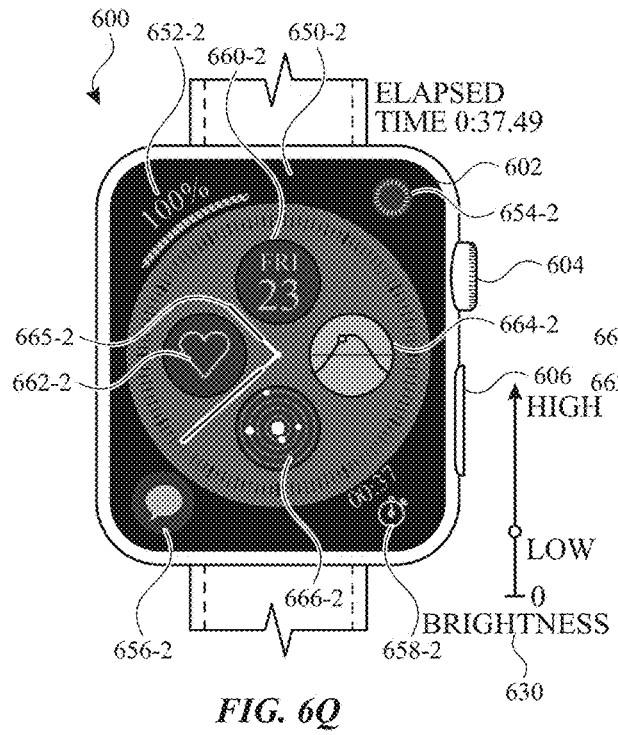
Figure 6R:
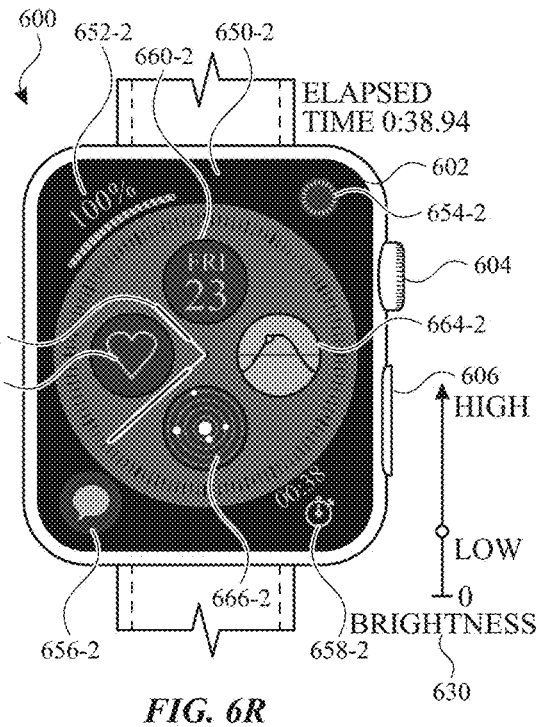
Figure 6S:
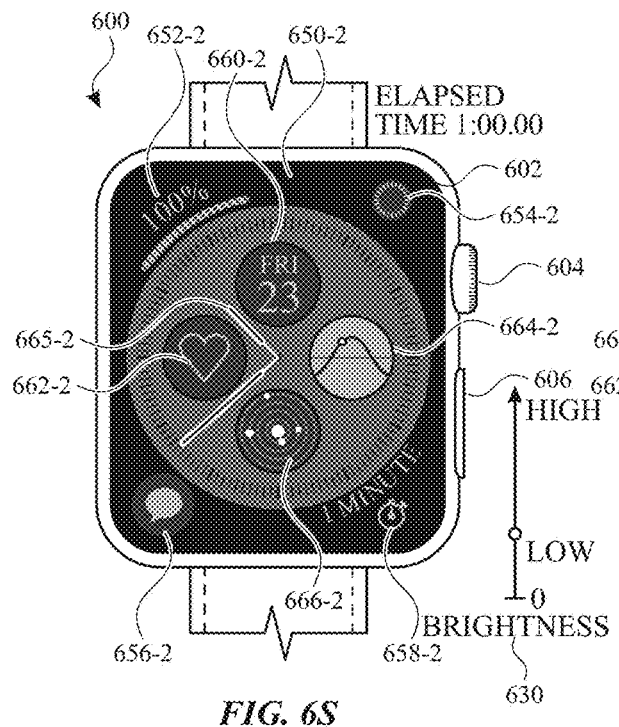
Figure 6T:
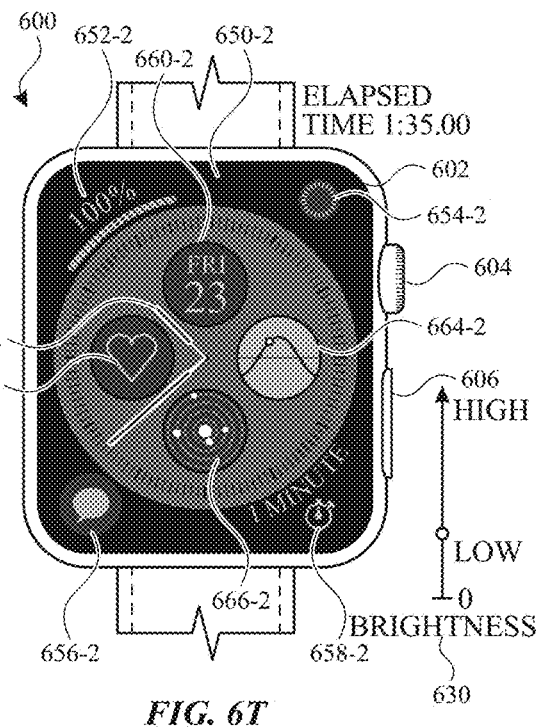
Figure 6U:
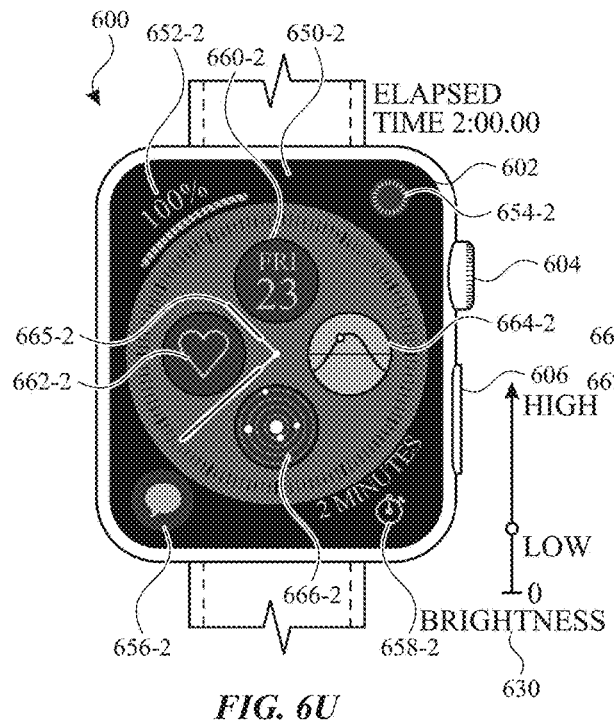
Figure 6V:
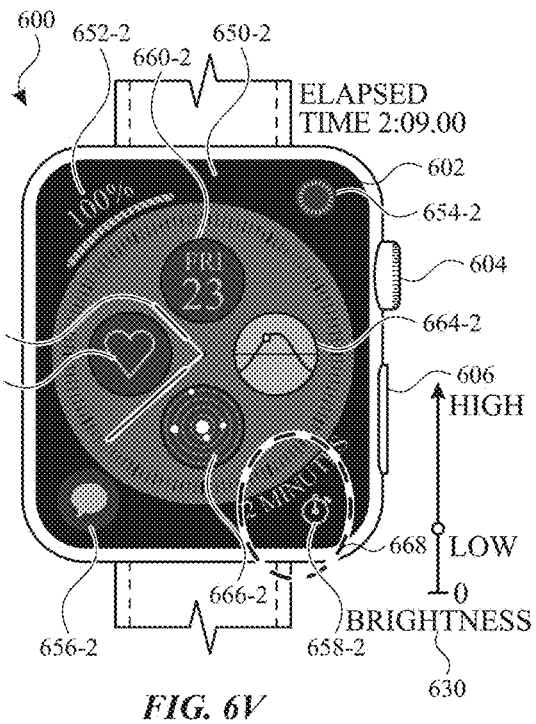
Figure 6W:
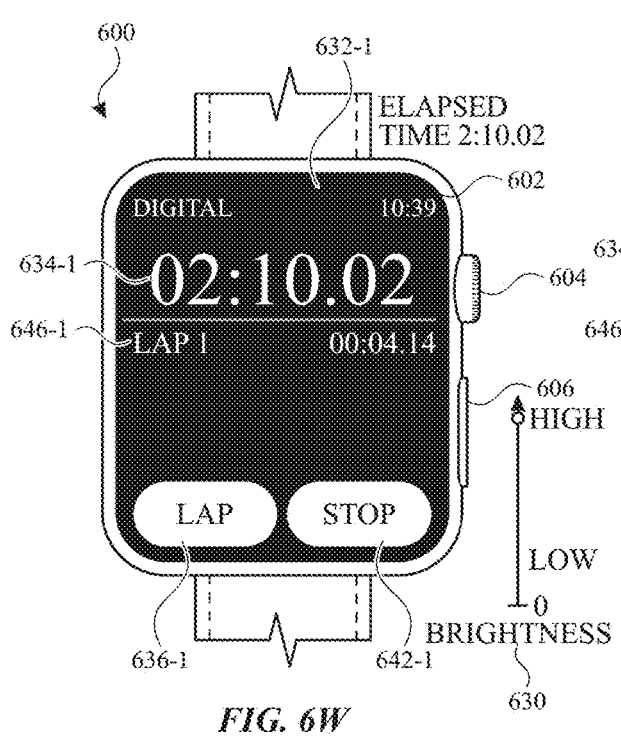
Figure 6X:
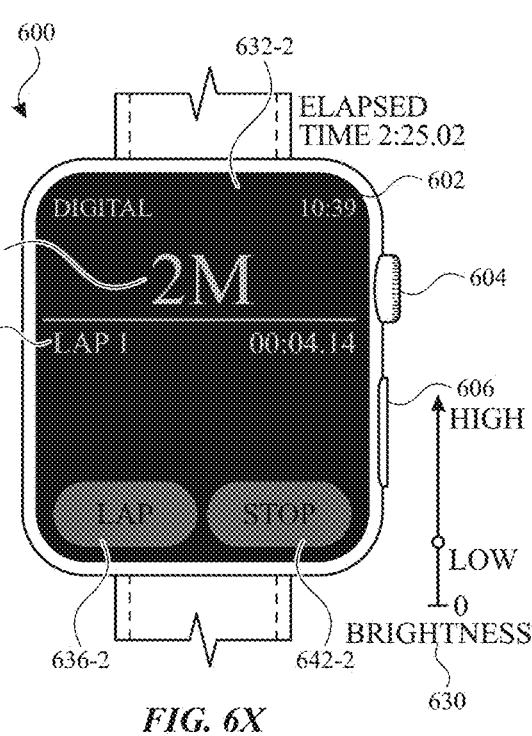

FIGS. 6K-6X illustrate an example scenario involving a stopwatch application running on device 600. At FIG. 6K, while operating in the standard display mode (e.g., a higher power consumption display mode), device 600 displays stopwatch user interface 632-1 (e.g., a higher power consumption user interface) on display 602 at a standard brightness level. As illustrated in FIG. 6K, stopwatch user interface 632-1 includes elapsed time indication 634-1, lap button 636-1, and start button 638-1. Elapsed time indication 634-1 depicts the amount of time that has elapsed since starting the stopwatch (e.g., how much time has elapsed after a user input is received on start button 638-1). Lap button 636-1 is selectable to record the elapsed stopwatch time when the lap button 636-1 is selected (e.g., while continuing to have the stopwatch run). Start button 638-1 is selectable to start the stopwatch.

In some embodiments, while device 600 is operating in the standard display mode, device 600 periodically updates one or more elements of stopwatch user interface 632-1 (e.g., elapsed time indication 634-1) at a first update frequency (e.g., more than once per second, every hundredth of a second, and/or every twentieth of a second). Additionally, while device 600 is operating in the standard display mode, device 600 displays elapsed time indication 634-1 at a first level of precision. In FIG. 6L, the first level of precision is to a hundredth of a second.

At FIG. 6K, device 600 detects input 640 (e.g., a tap input and/or a non-tap input) at a location corresponding to start button 638-1. In response to detecting input 640, device 600 starts the stopwatch, and elapsed time indication 634-1 displays the elapsed time.

At FIG. 6L, device 600 continues to operate in the standard display mode, and continues to display stopwatch user interface 632-1 at the standard brightness level. In FIG. 6L, in response to detecting input 640, device 600 replaces start button 638-1 with stop button 642-1. At FIG. 6L, 4.14 seconds have elapsed since the stopwatch was started (e.g., since device 600 detected input 640), as indicated by elapsed time indication 634-1.

At FIG. 6L, device 600 detects input 644 (e.g., a tap input and/or a non-tap input) at a location corresponding to lap button 636-1. At FIG. 6M, in response to detecting input 644, device 600 displays lap time indication 646-1 within stopwatch user interface 632-1. Lap time indication 646-1 indicates that a user input was received on lap button 636-1 when 4.14 seconds had elapsed on the stopwatch. In FIG. 6M, elapsed time indication 634-1 indicates that 7.02 seconds have elapsed since the stopwatch was started.

FIG. 6N illustrates device 600 after determining that one or more mode change criteria have been met and, in response, transitioning out of the standard display mode and into the low power display mode (e.g., from a higher power consumption mode to a lower power consumption mode).

At FIG. 6N, while operating in the low power display mode, and in response to determining that one or more mode change criteria have been met, device 600 ceases display of stopwatch user interface 632-1 and displays stopwatch user interface 632-2 (e.g., a lower power consumption user interface) on display 602 (e.g., replaces display of stopwatch user interface 632-1 with stopwatch user interface 632-2). Stopwatch user interface 632-2 is displayed at a lower brightness level than stopwatch user interface 632-1. In some embodiments, stopwatch user interface 632-2 is displayed at a fixed percentage of the brightness level at which device 600 displays stopwatch user interface 632-1. In some embodiments, stopwatch user interface 632-2 is displayed at a brightness level based at least in part on an ambient light level detected by one or more sensors of device 600 (e.g., higher ambient light levels result in higher brightness levels while in low power display mode).

As discussed above, corresponding elements in stopwatch user interface 632-2 are displayed by device 600 differently than they were previously displayed in stopwatch user interface 632-1. In FIG. 6N, elapsed time indication 634-2 is displayed at a lower brightness level (e.g., in a darker color) than elapsed time indication 634-1 was displayed (e.g., elapsed time indication 634-2 is displayed in gray, while elapsed time indication 634-1 was displayed in white). Similarly, lap button 636-2 and stop button 642-2 are also displayed at lower brightness levels than lap button 636-1 and stop button 642-1 were previously displayed.

In some embodiments, the change in brightness levels between corresponding elements (e.g., affordances and/or objects) in stopwatch user interfaces 632-1 and 632-2 are not uniform. In some embodiments, one or more elements in stopwatch user interface 632-2 are displayed at a reduced size compared to their corresponding elements in stopwatch user interface 632-1.

While device 600 was operating in the standard display mode, device 600 periodically updated elapsed time indication 634-1 at a first update frequency (e.g., more than once a second, every hundredth of a second, and/or every twentieth of a second). As discussed above with reference to FIGS. 6A-6J, in some embodiments, the update frequency while the device 600 is operating in the low power display mode depends on whether one or more time-sensitive update criteria have been met. If the one or more time-sensitive update criteria are not met, device 600 periodically updates elapsed time indication 634-2 (e.g., updates stopwatch user interface 632-2 and/or one or more elements of stopwatch user interface 632-2) at a second update frequency that is less than the first update frequency (e.g., once every minute, once every thirty seconds, and/or once every ten seconds). If the one or more time-sensitive update criteria are met, device 600 periodically updates elapsed time indication 634-2 (e.g., updates stopwatch user interface 632-2 and/or one or more elements of stopwatch user interface 632-2) at a third update frequency that is greater than the second update frequency (e.g., once every second and/or once every half second). In some embodiments, the third update frequency is greater than the second update frequency, and less than the first update frequency. In some embodiments, the third update frequency is equal to the first update frequency.

Furthermore, in some embodiments, as also discussed above with reference to FIGS. 6A-6J, when device 600 is operating in the low power display mode, elapsed time indication 634-2 is displayed at different levels of precision based on whether the one or more time-sensitive update criteria have been met. If the one or more time-sensitive update criteria are not met, device 600 displays elapsed time indication 634-2 at a second level of precision that is less precise than the first level of precision that was applied while the device 600 was operating in the standard display mode. If the one or more time-sensitive update criteria are met, device 600 displays elapsed time indication 634-2 at a third level of precision that is more precise than the second level of precision. In some embodiments, the third level of precision is more precise than the second level of precision and less precise than the first level of precision. In some embodiments, the third level of precision is equal to the first level of precision.

In the example scenario depicted in FIGS. 6K-6X, the one or more time-sensitive update criteria includes a criterion that is met when device 600 is operating in the low power mode and less than a threshold amount of time has elapsed in the stopwatch application (e.g., less than one minute of elapsed time has been measured by the stopwatch application).

In FIG. 6N, device 600 is operating in the low power mode, and less than one minute has elapsed in the stopwatch application. Accordingly, device 600 displays elapsed time indication 634-2 at the third level of precision (e.g., seconds) and periodically updates elapsed time indication 634-2 at the third update frequency (e.g., every second, every half second, and/or every tenth of second). In the depicted example, the third update frequency is less than the first update frequency, but greater than the second update frequency.

In the depicted embodiment, while certain non-static content in stopwatch user interface 632-2, such as elapsed time indication 634-2, is shown at a lower level of precision compared to stopwatch user interface 632-1 (e.g., shown at a lower level of precision when device 600 is in the low power display mode than when device 600 is in the standard display mode), static content is shown at the same level of precision as stopwatch user interface 632-1 (e.g., static content is shown at the same level of precision regardless of whether device 600 is in the low power display mode or in the standard display mode). For example, lap time indication 646-2 is shown at the same level of precision as lap time indication 646-1 (e.g., with lap time shown to the hundredth of a second).

At FIG. 6O, device 600 continues to operate in the low power display mode and continues to display stopwatch user interface 632-2. In FIG. 6O, 21.26 seconds have elapsed on the stopwatch timer. At FIG. 6O, in response to the one or more time-sensitive update criteria being met, device 600 displays elapsed time indication 634-2 at the third level of precision (e.g., rounded to seconds) and also periodically updates elapsed time indication 634-2 at the third update frequency (e.g., every second, every half second, and/or every tenth of a second).

At FIG. 6O, while operating in the low power display mode and displaying stopwatch user interface 632-2, device 600 detects input 648 (e.g., a depression of rotatable and depressible input mechanism 604). At FIG. 6P, in response to input 648, device 600 transitions from the low power display mode to the standard display mode, and replaces display of stopwatch user interface 632-2 with clock face user interface 650-1. In FIG. 6P, the stopwatch application continues to run, and the elapsed time is shown in stopwatch complication 658-1.

As shown in FIG. 6P, clock face user interface 650-1 (e.g., a higher power consumption user interface) that is displayed while device 600 operates in the standard display mode, includes analog time indication 665-1 (e.g., a representation of analog clock hands displaying current hour, minute, and second values) and multiple affordances (e.g., clock face complications). In some embodiments, each affordance is associated with an application on device 600 (e.g., the affordance launches an associated application upon selection and/or the affordance displays information from the associated application). In FIG. 6P, the affordances include battery level complication 652-1, compass complication 654-1, messages complication 656-1, stopwatch complication 658-1, calendar complication 660-1, heartrate complication 662-1, solar complication 664-1, and solar system complication 666-1. In the depicted embodiment, based on device 600 operating in the standard display mode, device 600 displays stopwatch complication 658-1 at the first level of precision (e.g., to hundredths of a second) and periodically updates stopwatch complication 658-1 at the first update frequency.

FIG. 6Q illustrates device 600 after determining that one or more mode change criteria have been met and, in response, transitioning out of the standard display mode and into the low power display mode (e.g., from a higher power consumption mode to a lower power consumption mode). At FIG. 6Q, while operating in the low power display mode, device 600 displays clock face user interface 650-2 (e.g., a lower power consumption user interface) on display 602. Clock face user interface 650-2 is displayed at a lower brightness level than clock face user interface 650-1. Clock face user interface 650-2 includes analog time indication 665-2, which is a low power version of analog time indication 665-1. Clock face user interface 650-2 also includes a plurality of affordances (e.g., battery level complication 652-2, compass complication 654-2, messages complication 656-2, stopwatch complication 658-2, calendar complication 660-2, heartrate complication 662-2, solar complication 664-2, and solar system complication 666-2) which correspond to the plurality of affordance in clock face user interface 650-1 and represent low power display mode versions of those affordances.

Stopwatch complication 658-2 is displayed at a lower brightness level than stopwatch complication 658-1. In FIG. 6Q, device 600 is operating in the low power display mode, and the stopwatch application has measured an elapsed time of less than one minute. Accordingly, the one more time-sensitive update criteria are met. In accordance with this determination, device 600 displays stopwatch complication 658-2 at the third level of precision (e.g., seconds) and periodically updates stopwatch complication 658-2 at the third update frequency (e.g., every half second and/or every second).

At FIG. 6R, device 600 continues to operate in the low power display mode and continues to display clock face user interface 650-2. In FIG. 6R, 38.94 seconds have elapsed on the stopwatch timer. The one or more time-sensitive update criteria continue to be met. Accordingly, device 600 displays stopwatch complication 658-2 at the third level of precision (e.g., seconds), showing 38 seconds elapsed, and periodically updates stopwatch complication 658-2 at the third update frequency (e.g., every half second and/or every second).

At FIG. 6S, one minute has elapsed in the stopwatch timer. Accordingly, the time-sensitive update criteria are no longer met. In response to this determination, device 600 stops updating stopwatch complication 658-2 at the third update frequency, and begins updating stopwatch complication 658-2 at the second update frequency (e.g., every thirty seconds and/or every minute) that is less than the third update frequency. In the depicted embodiment, the second update frequency is one minute. Furthermore, because the time-sensitive update criteria are no longer met, device 600 stops displaying stopwatch complication 658-2 at the third level of precision (e.g., seconds), and displays stopwatch complication 658-2 at the second level of precision (e.g., minutes).

At FIG. 6T, thirty-five seconds have elapsed from FIG. 6S such that one minute and thirty-five seconds of elapsed time has been measured by the stopwatch application. However, because device 600 is updating stopwatch complication 658-2 once per minute, and stopwatch complication 658-2 is displayed at the second level of precision (e.g., minutes), stopwatch complication 658-2 continues to display "1 MINUTE."

At FIG. 6U, the stopwatch application has measured two minutes of elapsed time, such that twenty-five seconds have elapsed from FIG. 6T, and one minute has elapsed from the last update of stopwatch complication 568-2 (e.g., in FIG. 6S). Accordingly, device 600 updates stopwatch complication 658-2 to display "2 MINUTES."

At FIG. 6V, nine seconds have elapsed from FIG. 6U such that two minutes and nine seconds of elapsed time has been measured by the stopwatch application. However, because device 600 is updating stopwatch complication 658-2 once per minute, and stopwatch complication 658-2 is displayed at the second level of precision (e.g., minutes), stopwatch complication 658-2 continues to display "2 MINUTES."

At FIG. 6V, while displaying clock face user interface 650-2, device 600 detects input 668 at a location corresponding to stopwatch complication 658-2.

At FIG. 6W, in response to detecting input 668, device 600 transitions from the low power display mode to the standard display mode, and replaces display of clock face user interface 650-2 with stopwatch user interface 632-1. As discussed above, while device 600 is operating in the standard display mode, device 600 displays elapsed time indication 634-1 at a standard brightness level and with the first level of precision (hundredths of a second), and periodically updates elapsed time indication 634-1 at the first update frequency (e.g., multiple times a second and/or every hundredth of a second).

FIG. 6X illustrates device 600 after determining that one or more mode change criteria have been met and, in response, transitioning out of the standard display mode and into the low power display mode and replacing display of stopwatch user interface 632-1 with stopwatch user interface 632-2. In FIG. 6X, the time-sensitive update criteria are no longer met, as the elapsed time measured by the stopwatch application exceeds one minute. Accordingly, device 600 displays elapsed time indication 634-2 at the second level of precision (e.g., minutes) and periodically updates elapsed time indication 634-2 at the second update frequency (e.g., every thirty seconds and/or every minute).

Figure 6Y:
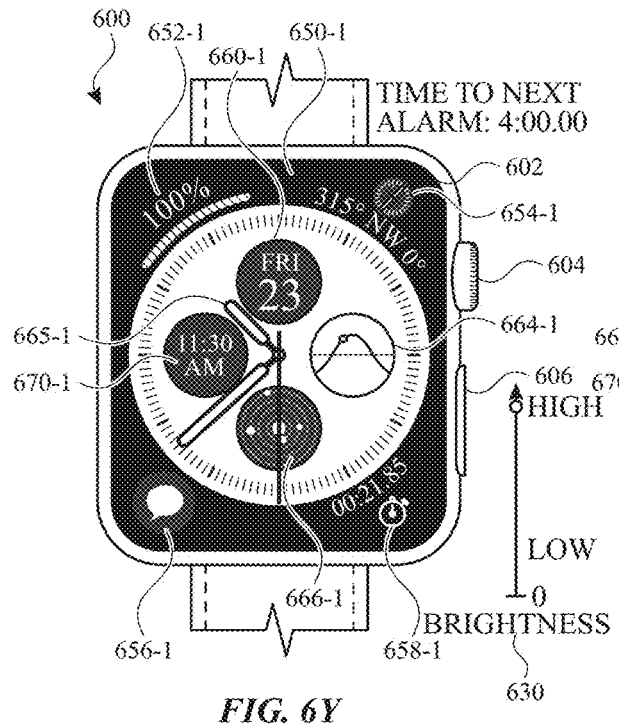

FIGS. 6Y-6AB illustrate an example scenario involving an alarm clock application running on device 600. At FIG. 6Y, while operating in a standard display mode (e.g., a higher power consumption display mode), device 600 displays clock face user interface 650-1 (e.g., a higher power consumption user interface) on display 602 at a standard brightness level. As illustrated in FIG. 6Y, clock face user interface 650-1 includes analog time indication 665-1 (e.g., a representation of analog clock hands displaying current hour, minute, and second values) and multiple affordances (e.g., clock face complications). In some embodiments, each affordance is associated with an application on device 600 (e.g., the affordance launches an associated application upon selection and/or the affordance displays information from the associated application). In FIG. 6Y, the affordances include battery level complication 652-1, compass complication 654-1, messages complication 656-1, stopwatch complication 658-1, calendar complication 660-1, alarm clock complication 670-1, solar complication 664-1, and solar system complication 666-1.

In FIG. 6Y, the current time is 11:26 a.m., and alarm clock complication 670-1 shows a next scheduled alarm at 11:30 a.m. (four minutes from the current time). While device 600 is operating in the standard display mode, device 600 periodically updates display of alarm clock complication 670-1 at a first update frequency (e.g., more than once a second, every tenth of a second, every hundredth of a second, and/or every thousandth of a second).

Figure 6Z:
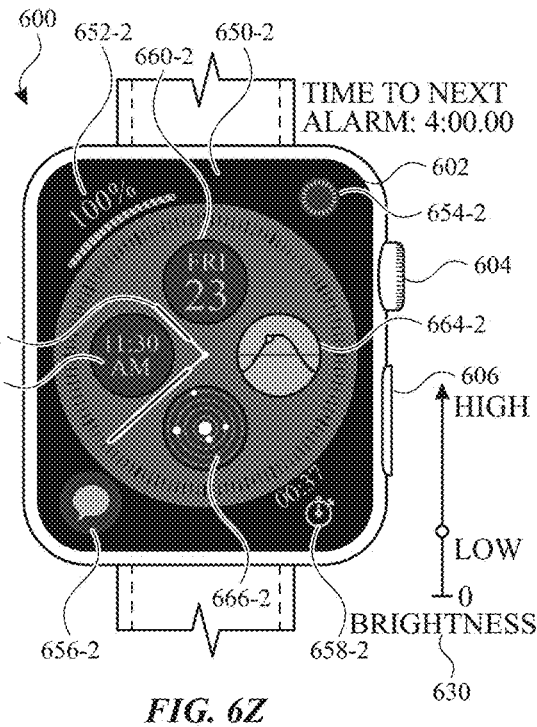
Figure 6A:
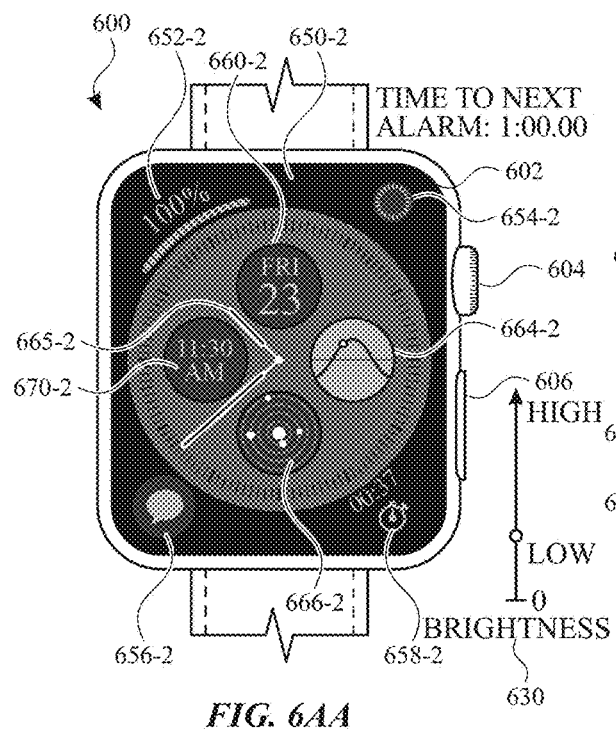
Figure 6A:
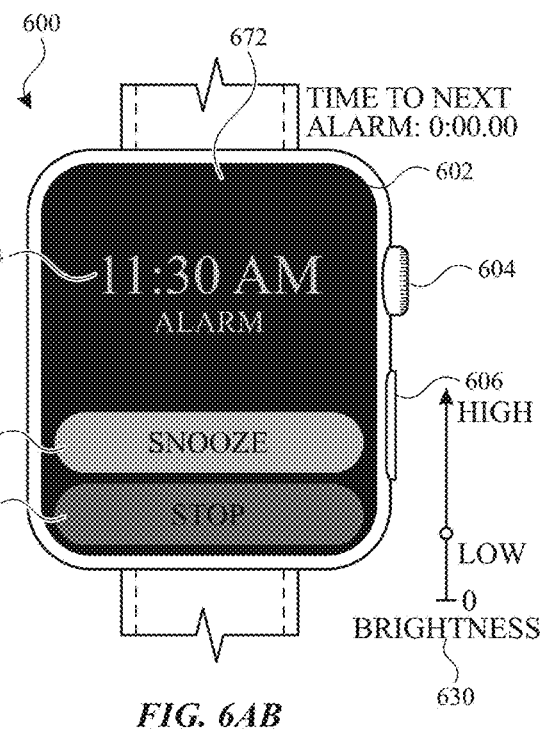
Figure 6A:
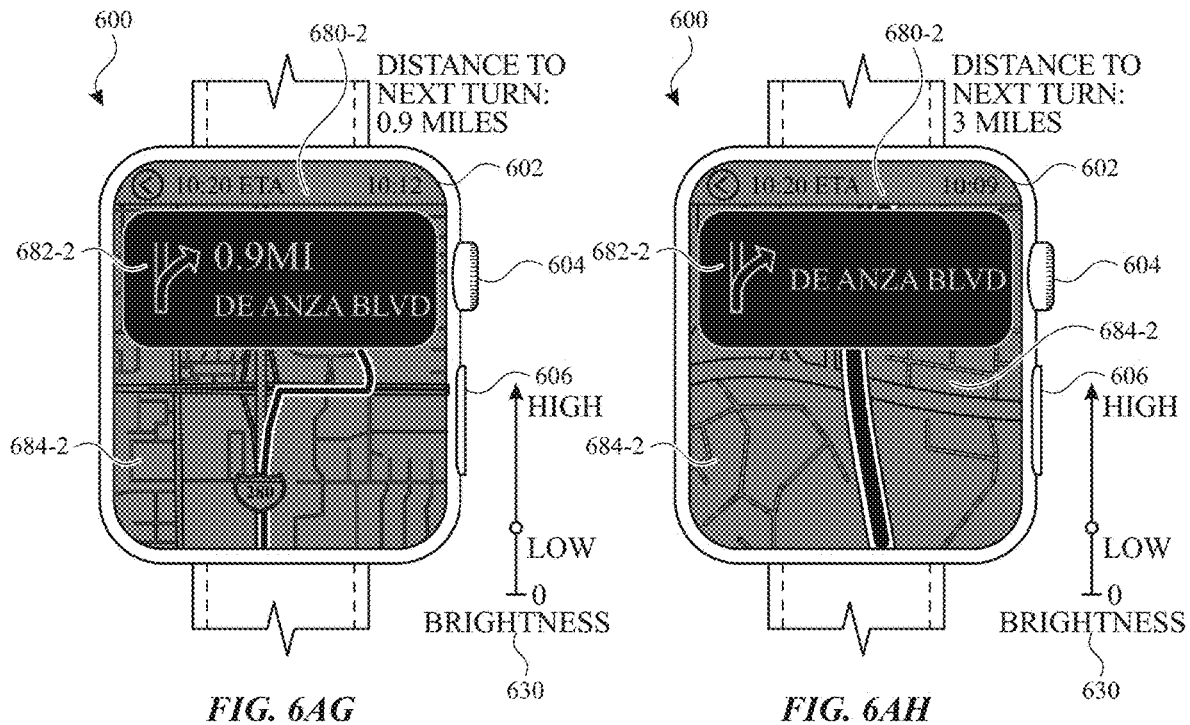
Figure 6A:
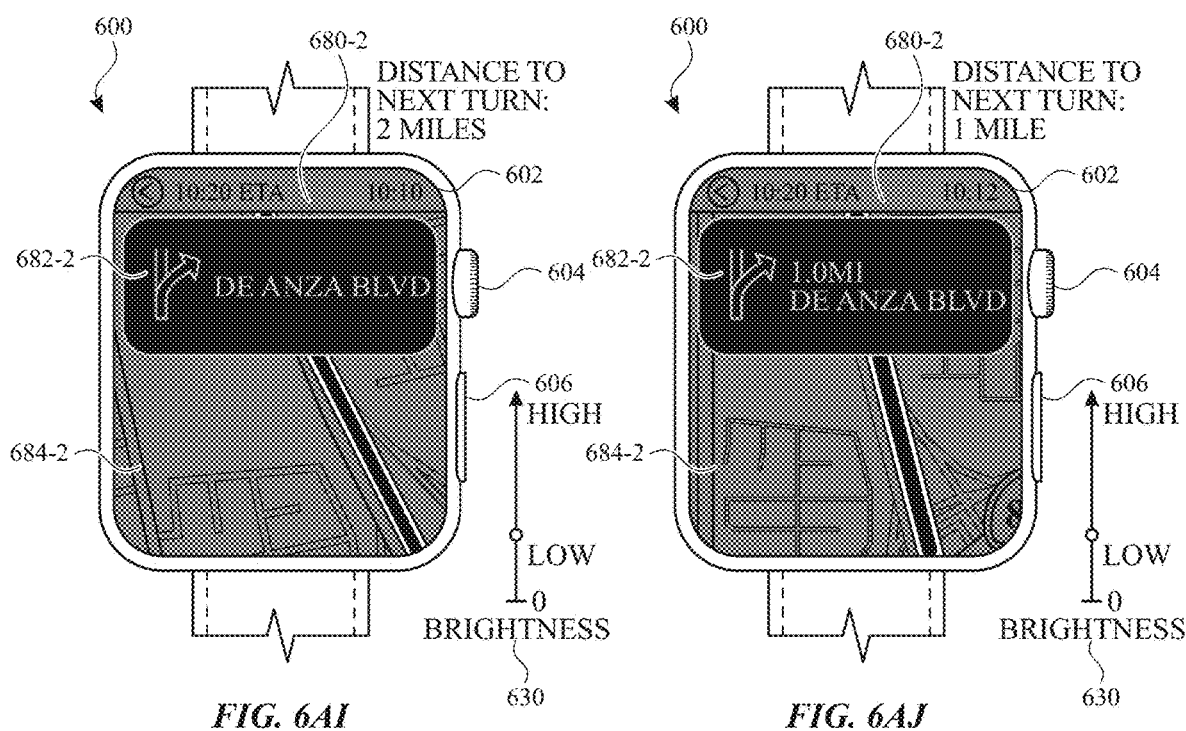
Figure 6A:
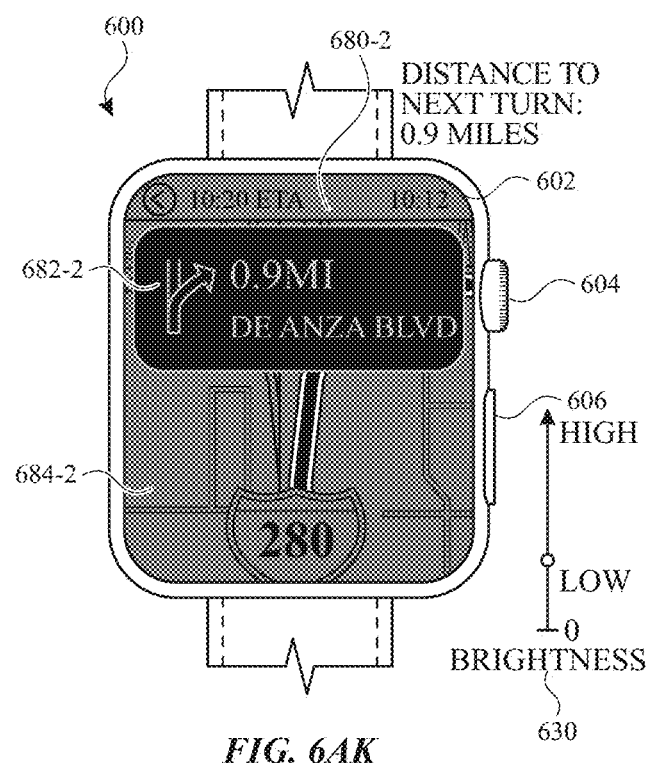

FIG. 6Z illustrates device 600 after determining that one or more mode change criteria have been met and, in response, transitioning out of the standard display mode and into the low power display mode (e.g., from a higher power consumption mode to a lower power consumption mode). At FIG. 6Z, in response to determining that the one or more mode change criteria have been met, device 600 replaces display of clock face user interface 650-1 (e.g., a higher power consumption user interface) with clock face user interface 650-2 (e.g., a lower power consumption user interface). Clock face user interface 650-2 is displayed at a lower brightness level than clock face user interface 650-1. Clock face user interface 650-2 includes analog time indication 665-2, which is a low power version of analog time indication 665-1. Clock face user interface 650-2 also includes a plurality of affordances (e.g., battery level complication 652-2, compass complication 654-2, messages complication 656-2, stopwatch complication 658-2, calendar complication 660-2, alarm clock complication 670-2, solar complication 664-2, and solar system complication 666-2) which correspond to the plurality of affordance in clock face user interface 650-1 and represent low power display mode versions of those affordances.

In the depicted example, one or more time-sensitive update criteria include a criterion that is satisfied when less than a threshold amount of time remains until a next scheduled alarm (e.g., less than one minute until the next scheduled alarm). In FIG. 6Z, there are still four minutes remaining until the next scheduled alarm. As such, the one or more time-sensitive update criteria are not met. In accordance with a determination that the one or more time-sensitive update criteria are not met, device 600 periodically updates display of alarm clock complication 670-2 (e.g., periodically updates display of clock face user interface 650-2 and/or periodically updates display of one or more elements of clock face user interface 650-2) at a second update frequency that is lower than (e.g., less frequent than) the first update frequency (e.g., the second update frequency is once a minute, every thirty seconds, and/or every ten seconds).

At FIG. 6AA, three minutes have elapsed since FIG. 6Z, and there is now only one minute remaining until the next scheduled alarm and the one or more time-sensitive update criteria are met. Accordingly, device 600 begins periodically updating display of alarm clock complication 670-2 at a third update frequency (e.g., once every second and/or once every half second) that is greater than the second update frequency. In some embodiments, the third update frequency is less than the first update frequency. In some embodiments, the third update frequency is equal to the first update frequency.

At FIG. 6AB, the current time is 11:30 am. In accordance with a determination that the current time corresponds to a next scheduled alarm time, device 600 displays alarm clock user interface 672. Alarm clock user interface 672 includes alarm time indication 672, snooze button 676, and stop button 678.

FIGS. 6AC-6AK illustrate an example scenario involving a navigation application running on device 600. At FIG. 6AC, while operating in a standard display mode (e.g., a higher power consumption display mode), device 600 displays navigation user interface 680-1 (e.g., a higher power consumption user interface) on display 602 at a standard brightness level. As shown in FIG. 6AC, navigation user interface 680-1 includes next direction indication 682-1, map 684-1, and current location indication 686. Next direction indication 682-1 displays information pertaining to a next upcoming navigation instruction, including the distance to the next upcoming navigation instruction, the direction of the next upcoming navigation instruction (e.g., straight, left, right), and a street name for the next upcoming navigation instruction. Current location indication 686 indicates on map 684-1 a current geographic location of device 600.

In some embodiments, while device 600 is operating in the standard display mode, device 600 periodically updates one or more elements of navigation user interface 680-1 (e.g., next direction indication 682-1, map 684-1, and/or current location indication 686) at a first update frequency (e.g., more than once per second, every hundredth of a second, and/or every twentieth of a second).

FIG. 6AD illustrates device 600 after determining that one or more mode change criteria have been met and, in response, transitioning out of the standard display mode and into the low power display mode (e.g., from a higher power consumption mode to a lower power consumption mode). At FIG. 6AD, in response to determining that the one or more mode change criteria have been met, device 600 replaces display of navigation user interface 680-1 (e.g., a higher power consumption user interface) with navigation user interface 680-2 (e.g., a lower power consumption user interface).

Navigation user interface 680-2 is displayed at a lower brightness level than navigation user interface 680-1. Navigation user interface 680-2 includes next direction indication 682-2 and map 684-2. In the depicted embodiment, while operating in the low power display mode, device 600 does not display a current location indicator as part of navigation user interface 680-2.

In some embodiments, when operating in the standard display mode, device 600 displays map 684-1 at a first zoom level, and when operating in the low power display mode, device 600 displays map 684-2 at a second zoom level different from the first zoom level, wherein the second zoom level represents a zoomed out zoom level compared to the first zoom level. An example of such an implementation is depicted in FIGS. 6AD-6AG. In some embodiments, when operating in the low power display mode, device 600 displays map 684-2 at the same zoom level as map 684-1 (e.g., the first zoom level). An example of such an implementation is depicted in FIGS. 6AH-6AK. FIGS. 6AH-6AK are identical to FIGS. 6AD-6AG except for the zoom level of map 684-2.

In the depicted example, one or more time-sensitive update criteria include a criterion that is met when less than a threshold distance remains until a next navigation instruction (e.g., less than one mile until the next navigation instruction). In FIG. 6AD (and also in FIG. 6AH), there are three miles until the next navigation instruction. As such, the one or more time-sensitive update criteria are not met. In accordance with a determination that the one or more time-sensitive update criteria are not met, device 600 periodically updates one or more elements of navigation user interface 680-2 (e.g., next direction indication 682-2 and/or map 684-2) at a second update frequency (e.g., once every 30 seconds and/or once every minute) that is less than the first update frequency. Furthermore, in accordance with the determination that the one or more time-sensitive update criteria are not met, device 600 displays next direction indication 682-2 without displaying the distance to the next upcoming navigation direction.

In 6AE (and also in FIG. 6AI), there are two miles until the next navigation instruction, and the one or more time-sensitive update criteria are still not met. As such, device 600 continues to periodically update one or more elements of navigation user interface 680-2 at the second update frequency.

In FIG. 6AF (and also in FIG. 6AJ), there is one mile until the next navigation instruction, and device 600 determines that the one or more time-sensitive update criteria are met. In response to determining that the one or more time-sensitive update criteria are met, device 600 periodically updates the one or more elements of navigation user interface 680-2 at a third update frequency (e.g., once every second, once every half second, and/or once every tenth of a second) that is greater than the second update frequency. Furthermore, in FIG. 6AF (and also in FIG. 6AJ), device 600 displays next direction indication 682-2 such that next direction indication 682-2 includes the distance to the next upcoming navigation instruction (e.g., "1.0 MI").

In FIG. 6AG (and also in FIG. 6AK), there are 0.9 miles until the next navigation instruction, and the one or more time-sensitive update criteria continue to be met. Accordingly, device 600 continues to periodically update the one or more elements of navigation user interface 680-2 at the third update frequency, and continues to display the distance to the next upcoming navigation instruction (e.g., "0.9 MI") in the next direction indication 682-2.

FIGS. 7A-7B are a flow diagram illustrating a method for managing display usage using an electronic device in accordance with some embodiments. Method 700 is performed at a device (e.g., 100, 300, 500) with a display. Some operations in method 700 are, optionally, combined, the orders of some operations are, optionally, changed, and some operations are, optionally, omitted.

As described below, method 700 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

In some embodiments, a computer system (e.g., a smart phone, a smart watch, and/or a tablet) that is in communication with a display generation component (e.g., a display controller; a touch-sensitive display system; and/or a display (e.g., integrated and/or connected)), while the computer system is in a first mode (702) (e.g., a higher power consumption mode (e.g., a mode that corresponds to a brighter display, increased performance, and/or more frequent display updates)), displays (704), via the display generation component, a first user interface (e.g., 614-1, 626-1, 632-1, 650-1, and/or 680-1) that includes one or more user interface elements including a first user interface element (e.g., 616-1, 634-1, 658-1, 670-1, 682-1, and/or 684-1), where the user interface is associated with a first application (e.g., a timer application, a stopwatch application, an alarm clock application, and/or a navigation application).

While displaying the first user interface in the first mode (706), the computer system detects (708) that the computer system has met one or more criteria for transitioning from the first mode to a second mode, wherein the second mode is a lower power mode (e.g., reaching a duration of time since a last input, a wrist down gesture, and/or a hand cover gesture).

In response to detecting that the computer system has met one or more criteria for transitioning from the first mode to the second mode (710), the computer system enters the second mode, including displaying a second user interface (e.g., a low power user interface) (e.g., 614-2, 626-2, 632-2, 650-2, and/or 680-2) that is associated with the first application where the second user interface corresponds to the first user interface and is displayed at a location that occupies at least a portion of a display region that was occupied by the first user interface and includes one or more user interface elements including a second user interface element (e.g., 616-2, 634-2, 658-2, 670-2, 682-2, and/or 684-2). In some embodiments, the second user interface is a low power version of the first user interface. In some embodiments, the second user interface differs from the first user interface in one or more visual characteristics (e.g., size of elements, color, hue, saturation, opacity, shape). In some embodiments, the second user interface element corresponds to the first user interface element (e.g., is a low power version of the first user interface element). In some embodiments, the second user interface element differs from the first user interface element in one or more visual characteristics (e.g., brightness, size, color, hue, saturation, opacity, shape). In some embodiments, displaying the second user interface includes replacing display of the first user interface with the second user interface.

While the computer system is in the second mode (714), the computer system updates (716) an appearance of the second user interface element (e.g., 616-2, 634-2, 658-2, 670-2, 682-2, and/or 684-2) (in some embodiments, updating an appearance of the one or more user interface elements of the second user interface) periodically while maintaining the computer system in the second mode (e.g., while maintaining a dimmer display, decreased performance and/or less frequent display updates).

In accordance with a determination that one or more time-sensitive update criteria are not satisfied (e.g., in accordance with a determination that a time-sensitive update has not been detected) (718), the appearance of the second user interface element (in some embodiments, the appearance of the one or more user interface elements of the second user interface) is periodically updated at a first update frequency (e.g., 30 seconds, 1 minute, 2 minutes) (e.g., FIGS. 6C, 6E, 6F, 6S, 6T, 6U, 6V, 6X, 6Z, 6AD, 6AE 6AH, and/or 6AI). In accordance with a determination that the one or more time-sensitive update criteria are satisfied (e.g., in accordance with a determination that one or more time-sensitive updates have been detected) (720), the appearance of the second user interface element (in some embodiments, the appearance of the one or more user interface elements of the second user interface) is periodically updated at a second update frequency (e.g., a fraction of a second and/or a second) different from the first update frequency, wherein the second update frequency is greater than the first update frequency (e.g., FIGS. 6G, 6F1, 6N, 6O, 6Q, 6R, 6AA, 6AF, 6AG, 6AJ, and/or 6AK). Updating the second user interface element at a reduced update frequency when time-sensitive update criteria are not satisfied reduces power usage and improves the battery life of the device, while still providing periodic updates to the second user interface element. Updating the second user interface element at an increased update frequency when time-sensitive update criteria are satisfied provides more timely visual updates to the user when such timely feedback is needed (e.g., when displaying time-sensitive information), thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system is in the first mode and the first user interface is displayed (e.g., user interface 614-1 in FIG. 6B, user interface 631-2. In FIGS. 6K-6M, user interface 650-1 in FIG. 6P, user interface 680-1 in FIG. 6AC), the first user interface element is periodically updated at a third update frequency (e.g., different from the first update frequency and/or the second update frequency). In some embodiments, the third update frequency is greater than the first update frequency. In some embodiments, the third update frequency is greater than the second update frequency and the first update frequency.

In some embodiments, after periodically updating the appearance of the second user interface element (in some embodiments, the appearance of the one or more user interface elements of the second user interface) one or more times at the second update frequency (e.g., while the one or more time-sensitive update criteria are satisfied) (e.g., while also maintaining the computer system in the second mode), the computer system detects that the one or more time-sensitive update criteria are no longer satisfied (e.g., determining that one or more time-sensitive updates are no longer detected); and, in response to detecting that the one or more time-sensitive update criteria are no longer satisfied, the computer system periodically updates the appearance of the second user interface element (in some embodiments, the appearance of the one or more user interface elements of the second user interface) at the first update frequency while the one or more time-sensitive update criteria are not satisfied) (e.g., while also maintaining the computer system in the second mode).

In some embodiments, after periodically updating the appearance of the second user interface element (in some embodiments, the appearance of the one or more user interface elements of the second user interface) one or more times at the first update frequency (e.g., while the one or more time-sensitive update criteria are not satisfied) (e.g., while also maintaining the computer system in the second mode), the computer system detects that the one or more time-sensitive update criteria are satisfied (e.g., detecting one or more time-sensitive updates); and, in response to detecting that the one or more time-sensitive update criteria are satisfied, the computer system periodically updates the appearance of the second user interface element (in some embodiments, the appearance of the one or more user interface elements of the second user interface) at the second update frequency (e.g., while the one or more time-sensitive update criteria are satisfied) (e.g., while also maintaining the computer system in the second mode).

In some embodiments, while the computer system is in the second mode, the computer system detects that the computer system has met one or more criteria for transitioning from the second mode to the first mode (e.g., a higher power consumption mode (e.g., higher power consumption in the second mode than in the first mode)) (e.g., a wrist raise gesture, and/or a user input (e.g., a touch-screen user input, a user input via a rotatable and/or depressible input mechanism)); and, in response to detecting that the computer system has met one or more criteria for transitioning from the second mode to the first mode, the computer system enters the first mode; and, while the computer system is in the first mode, the computer system updates the appearance of the first user interface element (in some embodiments, the appearance of the one or more user interface elements of the first user interface) over time according to a third update frequency that is different from the first update frequency, wherein the third update frequency corresponds to a greater update frequency than the first update frequency. In some embodiments, the third update frequency corresponds to a greater update frequency than the first update frequency and the second update frequency.

In some embodiments, the one or more time-sensitive update criteria includes a first criterion that is satisfied when the first application is a foreground application (722) (e.g., an application operating in the foreground) (e.g., wherein the first criterion is not satisfied when the first application is not a foreground application (e.g., is a background application)) (e.g., FIGS. 6G-6H, timer application is foreground application, and FIG. 6J, timer application is background application). In some embodiments, if a time-sensitive update corresponding to the first application is detected while the first application is in the foreground, the second user interface element is periodically updated at the second update frequency. In some embodiments, if a time-sensitive update corresponding to the first application is detected while the first application is not in the foreground, the second user interface element is periodically updated at the first update frequency. Updating the second user interface element at an increased update frequency when the first application is a foreground application provides more timely visual updates to the user when such timely feedback is needed, thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Updating the second user interface element at a decreased update frequency when the first application is a background application reduces power usage and improves the battery life of the device, while still providing periodic updates to the second user interface element.

In some embodiments, the second user interface element is a complication (e.g., 658-2) corresponding to the first application (724) (e.g., a complication that displays data received from the first application). In some embodiments, a complication refers to a clock face feature other than those used to indicate the hours, minutes, or seconds of a current time associated with the device. In some embodiments, complications provide data obtained from an application. In some embodiments, a complication includes an affordance that when selected launches a corresponding application. In some embodiments, a complication is displayed at a fixed, predefined location on the display while the device is in a particular power consumption mode. In some embodiments, in response to detecting a sequence of one or more inputs, the device may change or edit an aspect of a complication. For example, this could be used to change application data displayed by an application complication. In some embodiments, the complication may indicate a first set of information obtained by an application (e.g., application data) (for example, if the application is a weather application, a set of information could be a forecasted weather condition, a current temperature, etc), and upon editing, the complication could be updated to indicate a second set of information from the same application (e.g., if the application is a weather application, the display could be edited from showing a current temperature to showing current precipitation). In some embodiments, in response to detecting a sequence of one or more inputs, the device may change or edit a complication to indicate a set of information from a different application (e.g., if the application is a weather application, the display could be edited from showing weather to showing data from a calendar application). Updating a complication at a reduced update frequency when time-sensitive update criteria are not satisfied reduces power usage and improves the battery life of the device, while still providing periodic updates to the second user interface element. Updating a complication at an increased update frequency when time-sensitive update criteria are satisfied provides more timely visual updates to the user when such timely feedback is needed (e.g., when displaying time-sensitive information), thereby providing the user with improved visual feedback. Providing improved visual feedback to the user enhances the operability of the device and makes the user-device interface more efficient by helping the user to provide proper inputs and reducing user mistakes when operating/interacting, with the device) which, additionally, reduces power usage and improves battery life of the device by enabling the user to use the device more quickly and efficiently.

In some embodiments, the first application is a timer application (e.g., an application that counts down from a starting time) (e.g., FIGS. 6A-6H); and the determination that the one or more time-sensitive update criteria are satisfied comprises a determination that the timer application has less than a predetermined amount of time remaining (e.g., the last minute of a timer, the last 30 seconds of a timer, the last 10 seconds of a timer) (e.g., FIGS. 6G-6H). In some embodiments, the determination that one or more time-sensitive update criteria are not satisfied comprises a determination that the tinier application has greater than the predetermined amount of time remaining (e.g., more than one minute remaining, more than 30 second remaining, more than 10 seconds remaining). For example, for the last time period (e.g., the last minute, last 30 seconds, last 15 seconds) of a timer, progress of the timer is updated more frequently than for portions of the timer before the last time period of the timer. Updating the second user interface element at a reduced update frequency when a timer application has greater than a threshold amount of time remaining reduces power usage and improves the battery life of the device, while still providing periodic updates to the second user interface element. Updating the second user interface element at an increased update frequency when a timer application has less than a threshold amount of time remaining provides more timely visual updates to the user when such timely feedback is needed (e.g., when the timer application is approaching the end of the timer), thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first application is a stopwatch application (e.g., an application that measures how much time has elapsed from a starting condition (e.g., from a start input provided by a user)) (e.g., FIGS. 6K-6X); and the determination that the one or more time-sensitive update criteria are satisfied comprises a determination that the stopwatch application has measured less than a predetermined period of time (e.g., the first minute of a stopwatch, the first 30 seconds of a stopwatch) (e.g., FIGS. 6N, 6O, 6Q, 6R). In some embodiments, the determination that one or more time-sensitive update criteria are not satisfied comprises a determination that the stopwatch application has measured greater than the predetermined period of time (e.g., more than one minute, more than 30 seconds). For example, for the initial time period (e.g., the first minute, first 30 seconds, first 15 seconds) of a stopwatch, progress of the stopwatch is updated more frequently than for portions of the stopwatch after the initial time period of the stopwatch. Updating the second user interface element at a reduced update frequency when a stopwatch application has measured greater than a threshold amount of time reduces power usage and improves the battery life of the device, while still providing periodic updates to the second user interface element. Updating the second user interface element at an increased update frequency when a stopwatch application has measured less than a threshold amount of time provides more timely visual updates to the user when such timely feedback is needed (e.g., when the stopwatch application has measured less than one minute of time), thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first application is an alarm clock application (e.g., an application that causes the computer system to output an alarm (e.g., a visual output, an auditory output, and/or a haptic output) at a predefined (e.g., user-defined) time) (e.g., FIGS. 6Y-6AB); and the determination that the one or more time-sensitive update criteria are satisfied comprises a determination that less than a predetermined amount of time remains until a next alarm is scheduled to be output by the computer system (e.g., less than one minute until the next alarm, less than 30 seconds until the next alarm) (e.g., FIG. 6AA). In some embodiments, the determination that one or more time-sensitive update criteria are not satisfied comprises a determination that greater than the predetermined amount of time remains until the next alarm is scheduled to be output by the computer system (e.g., greater than one minute until the next alarm, greater than 30 seconds until the next alarm). For example, for a period of time immediately preceding a scheduled time when an alarm is scheduled to be output (e.g., the last minute before the alarm is scheduled to be output, last 30 seconds, last 15 seconds), the second user interface element and/or the second user interface are updated more frequently than for other periods of time that do not immediately precede a schedule alarm time. Updating the second user interface element at a reduced update frequency when an alarm clock application has greater than a threshold amount of time remaining until a next alarm is scheduled to be output reduces power usage and improves the battery life of the device, while still providing periodic updates to the second user interface element. Updating the second user interface element at an increased update frequency when an alarm clock application has less than a threshold amount of time remaining until a next alarm is scheduled to be output provides more timely visual updates to the user when such timely feedback is needed (e.g., when an alarm is imminent), thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while in the second mode: at a first time, in accordance with a determination that the one or more time-sensitive update criteria are not satisfied, the computer system updates the appearance of the second user interface element (e.g., 616-2) periodically at the first update frequency while maintaining the computer system in the second mode (e.g., 616-2 in FIGS. 6E and 6F), wherein the second user interface element corresponds to the first user interface element (e.g., 616-1) (e.g., displays information corresponding to information displayed by the first user interface element) (e.g., the second user interface element is a low power version of the first user interface element) and is different from the first user interface element in one or more visual characteristics (e.g., brightness, position, size, color, hue, saturation, opacity, and/or shape) (e.g., 616-2 is displayed in a darker color than 616-1). While in the second mode, and at a second time subsequent to the first time, in accordance with a determination that the one or more time-sensitive update criteria are satisfied, updating the appearance of the second user interface element periodically at the second update frequency while maintaining the computer system in the second mode and while maintaining at least some of the one or more visual characteristics that are different from the first user interface element (e.g., maintaining brightness, position, size, color, huge, saturation, opacity, and/or shape) (e.g., 616-2 in FIGS. 6G and 6H). Maintaining one or more low power visual characteristics, such as a reduced brightness or decreased element size, even when updating the second user interface element at an increased update frequency, reduces power usage and improves the battery life of the device, while still providing periodic updates to the second user interface element.

In some embodiments, the second user interface element (e.g., 616-2) corresponds to the first user interface element (e.g., 616-1) (e.g., displays information corresponding to information displayed by the first user interface element) (e.g., is a low power version of the first user interface element) and is different from the first user interface element in one or more visual characteristics (e.g., brightness, position, size, color, hue, saturation, opacity, and/or shape) (e.g., 616-2 differs in color and/or brightness from 616-1); and updating the appearance of the second user interface element periodically while maintaining the computer system in the second mode comprises updating the appearance of the second user interface element periodically (e.g., regardless of whether at the first update frequency or at the second update frequency) while maintaining at least some of the one or more visual characteristics that are different from the first user interface element (e.g., 616-2 in FIGS. 6E-6H) (e.g., maintaining a reduced brightness, a different position, a reduced size, a different color scheme, a different hue, a reduced saturation, a reduced opacity, and/or a smaller shape relative to the first user interface element) (e.g., updating information presented by the second user interface element periodically while maintaining at least some of the one or more visual characteristics that are different from the first user interface element). Maintaining one or more low power visual characteristics, such as a reduced brightness or decreased element size, even when updating the second user interface element at an increased update frequency, reduces power usage and improves the battery life of the device, while still providing periodic updates to the second user interface element.

In some embodiments, while in the second mode: at a first time, in accordance with a determination that the one or more time-sensitive update criteria are not satisfied, the computer system updates the appearance of the second user interface element periodically at the first update frequency while maintaining the computer system in the second mode (e.g., 616-2 in FIGS. 6E and 6F), wherein: the second user interface element displays a first set of information, and while the appearance of the second user interface element is updated at the first, update frequency, the first set of information is displayed at a first level of precision (e.g., a degree of accuracy or exactness of a value (e.g., a time value, a measurement value)) (e.g., 616-2 displayed in minutes in FIGS. 6E and 6F). While in the second mode, and at a second time subsequent to the first time, in accordance with a determination that the one or more time-sensitive update criteria are satisfied, the computer system updates the appearance of the second user interface element periodically at the second update frequency while maintaining the computer system in the second mode (e.g., 616-2 in FIGS. 6G and 614), wherein: while the appearance of the second user interface element is updated at the second update frequency, the first set of information is displayed at a second level of precision that is more precise than the first level of precision (e.g., a greater degree of accuracy or a greater degree of exactness of a value) (e.g., 616-2 displayed in seconds in FIGS. 6G and 6H). Reducing the precision of displayed information when one or more time-sensitive update criteria are not satisfied enables the device to perform less operations to determine the displayed information and/or allows the display to display less information (e.g., do not display seconds when displaying time), thereby providing the user with valuable feedback while reducing processing resource usage and/or reducing display brightness (e.g., turning off pixels that would otherwise be used to display greater precision information). Reducing processing resource usage and reducing display brightness reduces power usage and improves the battery life of the device.

In some embodiments, the second user interface comprises a third user interface element (e.g., 646-2) (e.g., different from and/or separate from the second user interface element). The third user interface element displays a second set of information (e.g., different from the first set of information). At the first time, while the appearance of the second user interface element (e.g., 634-2) is updated periodically at the first update frequency and the first set of information is displayed at the first level of precision (e.g., 634-2 in FIG. 6X, shown in minutes), the second set of information is displayed at a third level of precision (e.g., 646-2 in FIG. 6X, shown to hundredths of a second); and at the second time, while the appearance of the second user interface element is updated periodically at the second update frequency and the first set of information is displayed at the second level of precision that is more precise than the first level of precision (e.g., 634-2 in FIG. 6O, shown in seconds), display of the second set of information is maintained at the third level of precision (e.g., 646-2 in FIG. 6O, shown to hundredths of a second). In some embodiments, the third level of precision is more precise than the first level of precision (e.g., a greater degree of accuracy or a greater degree of exactness of a value). For example, the first level of precision may include display in a first unit of measurement (e.g., minutes) and the third level of precision may include display in a second unit of measurement that is more precise than the first unit of measurement (e.g., seconds, tenths of a second, hundredths of a second); or the first level of precision may include display of a certain number of significant digits (e.g., tenths of a unit) and the third level of precision may include display of a different number of significant digits that is more precise than the first level of precision (e.g., hundredths of a unit, thousandths of a unit). Maintaining the level of precision of the third user interface element while the level of precision of the second user interface element is being changed enables the computer system to display the appropriate level of precision for different user interface elements, thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first application is a turn-by-turn navigation application (e.g., an application that provides turn-by-turn navigation directions for a user (e.g., navigation directions that are periodically and/or automatically updated based on a current position and/or location of the computer system)) (e.g., FIGS. 6AC-6AK); and the determination that the one or more time-sensitive update criteria are satisfied comprises a determination that a next upcoming turn is less than a threshold distance (e.g., less than 1 mile away, less than 2 miles away) or a threshold time (e.g., less than 1 minute away, less than 2 minutes away) away from the computer system (e.g., FIGS. 6AF, 6AG, 6AJ, 6AK). In some embodiments, the determination that one or more time-sensitive update criteria are not satisfied comprises a determination that the next upcoming turn is greater than a threshold distance (e.g., more than 1 mile away, more than 2 miles away) or a threshold time (e.g., greater than 1 minute away, greater than 2 minutes away) away from the computer system. Updating the second user interface element at a reduced update frequency when a turn-by-turn navigation application detects greater than a threshold distance or threshold time remaining until a next upcoming turn reduces power usage and improves the battery life of the device, while still providing periodic updates to the second user interface element. Updating the second user interface element at an increased update frequency when a turn-by-turn navigation application detects less than a threshold distance or threshold time remaining until a next upcoming turn provides more timely visual updates to the user when such timely feedback is needed (e.g., when a next turn is imminent), thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIGS. 7A-7B) are also applicable in an analogous manner to the methods described below. For example, methods 900 and/or 1100 optionally include one or more of the characteristics of the various methods described above with reference to method 700. For example, in some embodiments, the first mode is the same throughout these methods and the second mode is the same throughout these methods. For brevity, these details are not repeated below.

FIGS. 8A-8AD illustrate exemplary user interfaces with managed display usage, in accordance with some embodiments. The user interfaces in these figures are used to illustrate the processes described below, including the processes in FIGS. 9A-9B.

In particular, FIGS. 8A-8AD illustrate techniques for managing display usage by altering one or more aspects (e.g., visual characteristics) of a displayed user interface upon determining that the device has met mode change criteria, such as the mode change criteria described in greater detail above.

In some embodiments disclosed below, in response to determining that one or more mode change criteria have been met, a device transitions from a standard display mode (e.g., a higher power consumption mode) into a low power display mode (e.g., a lower power consumption mode), and replaces display of a higher power consumption user interface with a lower power consumption user interface. In some embodiments, the lower power consumption user interface varies based on whether a corresponding lower power consumption user interface is available for the higher power consumption user interface. In some embodiments, the lower power consumption user interface also varies based on whether the device (and/or an application) is authorized to display certain types of information while in the low power display mode. For example, if the device is displaying a higher power consumption user interface associated with (e.g., generated by) a first application when the one or more mode change criteria are met, and a corresponding lower power consumption user interface is not available, in some embodiments, the device displays a default lower power consumption user interface e.g., that is not generated by the application). In contrast, if a corresponding lower power consumption user interface is available, a determination is made as to whether the device and/or the first application are permitted to display the corresponding lower power consumption user interface (e.g., based on one or more user settings set by a user) and, if so permitted, a further determination is made as to whether the device and/or the first application are permitted to display all of the information that is displayed in the higher power consumption user interface in the lower power consumption user interface, or only a subset of the information. The examples shown in FIGS. 8A-8AD and described below provide further details on these features.

At FIG. 8A, while operating in a standard display mode (e.g., a higher power consumption display mode), device 600 displays wallet user interface 802-1 (e.g., a higher power consumption user interface) on display 602 at a standard display brightness level. Wallet user interface 802-1 corresponds to (e.g., is generated by) a wallet application running on device 600.

As illustrated in FIG. 8A, wallet user interface 802-1 includes a plurality of user interface elements, including current time indication 803-1, string 804A-1, balance indication 804B-1, and button 804C-1. Current time indication 803-1 displays a current time. Balance indication 804B-1 displays the amount of currency a user has in an account, and button 804C-1 is selectable by a user to initiate a process for adding currency to the account.

While displaying wallet user interface 802-1, device 600 determines that one or more mode change criteria have been met (e.g., detecting a wrist-down gesture using, for example, motion sensors; and/or no input of certain types for a threshold duration of time). In response to determining that the one or more mode change criteria have been met, device 600 transitions out of the standard display mode and into a low power display mode (e.g., from a higher power consumption mode to a lower power consumption mode). Furthermore, in response to determining that the one or more mode change criteria have been met, device 600 replaces display of wallet user interface 802-1 (e.g., a higher power consumption user interface) with a lower power consumption user interface. In some embodiments, the lower power consumption user interface varies based on various determinations. FIGS. 8B-8F illustrate various example scenarios and different lower power consumption user interfaces in accordance with various embodiments.

FIG. 8B depicts an example scenario in which wallet user interface 802-1 has a corresponding lower power consumption user interface (e.g., wallet user interface 802-2) (e.g., a corresponding lower power consumption user interface that is specified by, provided by, and/or generated by the wallet application). Furthermore, in FIG. 8B, device 600 and the wallet application are authorized to display application information pertaining to the wallet application (e.g., one or more user interfaces generated by and/or provided by the wallet application) while in the low power display mode. In some embodiments, authorization to display application information pertaining to the wallet application is specified by a user (e.g., via one or more user settings). In FIG. 8B, device 600 and the wallet application are also authorized to display all of the information displayed in wallet user interface 802-1 while in the low power display mode. In various embodiments, authorization to display the various types of information displayed in the higher power consumption user interface can be specified by a user (e.g., via one or more user settings) and/or by the application (e.g., via code in the application permitting or prohibiting display of certain types of information while device 600 is in the low power display mode). In accordance with these determinations, and in response to determining that the one or more mode change criteria have been met, device 600 displays wallet user interface 802-2 without any redactions, as depicted in FIG. 8B. In the depicted embodiment, wallet user interface 802-2 includes all of the information depicted in wallet user interface 802-1. Wallet user interface 802-2 is displayed at a lower brightness level than wallet user interface 802-1 (e.g., the overall brightness level or the average of the brightness values of pixels constituting wallet user interface 802-2 on display 602 is less than the brightness level of wallet user interface 802-1 on display 602 as depicted in FIG. 8A).

Corresponding elements in wallet user interface 802-2 are displayed by device 600 differently than they were previously displayed in wallet user interface 802-1. In FIG. 8B, current time indication 803-2, string 804A-2, balance indication 804B-2, and button 804C-2 are displayed at lower brightness levels (e.g., in darker colors) than corresponding elements current time indication 803-1, string 804A-1, balance indication 804B-1, and button 804C-1, respectively.

In some embodiments, the change in brightness levels between corresponding elements (e.g., affordances and/or objects) in wallet user interfaces 802-1 and 802-2 are not uniform. In some embodiments, device 600 displays one or more elements in wallet user interface 802-2 at a reduced size compared to their corresponding elements in wallet user interface 802-1.

Figures 8C, 8D:
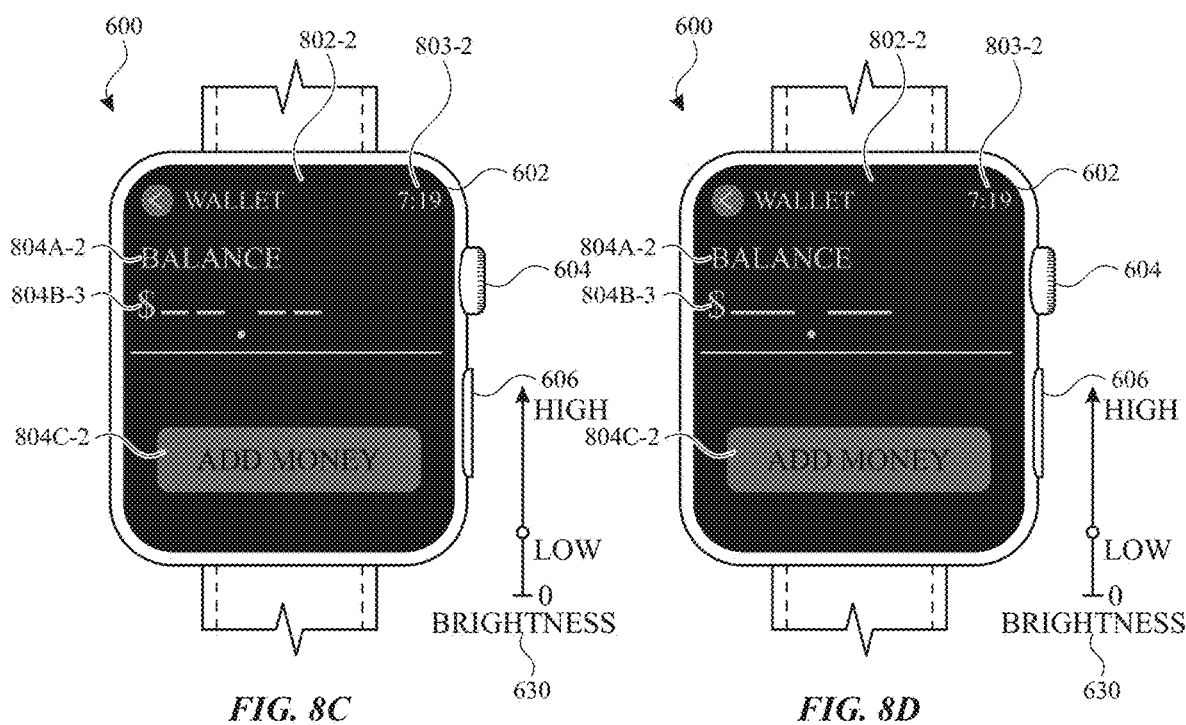
Figure 8E:
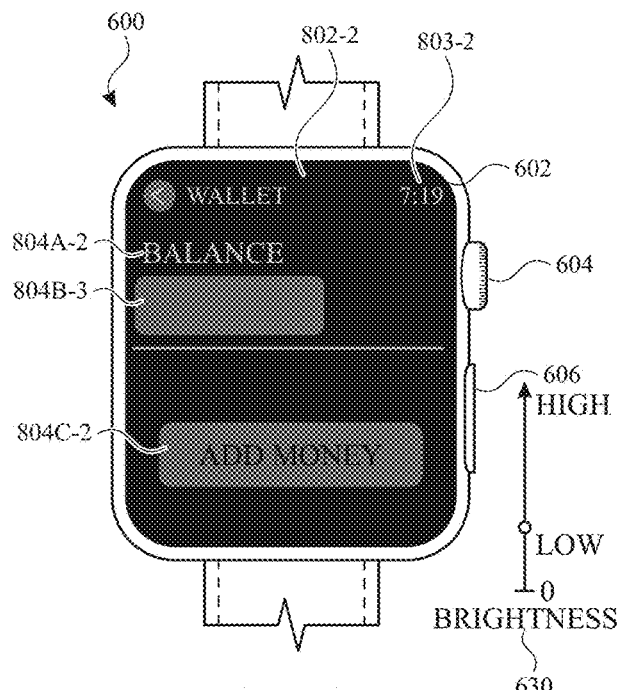

FIGS. 8C-8E each depict an example scenario in which wallet user interface 802-1 has a corresponding lower power consumption user interface (e.g., wallet user interface 802-2), and device 600 and the wallet application are authorized to display application information pertaining to the wallet application (e.g., one or more user interfaces corresponding to and/or generated by the wallet application) while in the low power display mode. However, in FIGS. 8C-8E, device 600 (e.g., and/or the wallet application) is not authorized to display balance information while in the low power display mode. As discussed above, such a restriction can be applied, in various embodiments, by a user and/or by the application. In accordance with these determinations, and in response to determining that the one or more mode change criteria have been met, device 600 displays wallet user interface 802-2 with redaction representation 804B-3 in place of balance indication 804B-2, as depicted in FIGS. 8C-8E. Accordingly, in FIGS. 8C-8E, wallet user interface 802-2 does not include and/or display the balance information that was displayed in wallet user interface 802-1.

In FIG. 8C, redaction representation 804B-3 depicts a character-by-character redaction of balance information. In FIG. 8D, redaction representation 804B-3 depicts a string-by-string redaction of balance information. In FIG. 8E, redaction representation 804B-3 redacts the entirety of a display region corresponding to (e.g., previously occupied by) balance indication 804B-1. In some embodiments, information to be redacted is specified by the application (e.g., the wallet application). In some embodiments, information to be redacted is specified by a user (e.g., via one or more user settings).

Figure 8F:
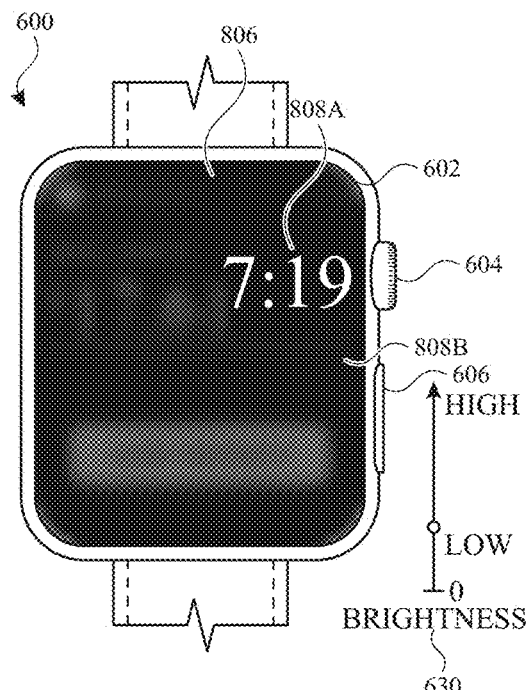

FIG. 8F depicts an example scenario in which wallet user interface 802-1 does not have a corresponding lower power consumption user interface (e.g., the wallet application does not specify a corresponding lower power consumption user interface for wallet user interface 802-1). In FIG. 8F, in accordance with a determination that wallet user interface 802-1 does not have a corresponding lower power consumption user interface, and in response to determining that the one or more mode change criteria have been met, device 600 replaces display of wallet user interface 802-1 with user interface 806. User interface 806 is displayed at a lower brightness level than wallet user interface 802-1 (e.g., the overall brightness level or the average of the brightness values of pixels constituting user interface 806 on display 602 is less than the brightness level of wallet user interface 802-1 on display 602 as depicted in FIG. 8A).

As shown in FIG. 8F, user interface 806 includes a current time overlay 808A overlaid on a background portion 808B. In the depicted embodiment, the background portion 808B is a blurred representation of wallet user interface 802-1. As will be demonstrated in later figures, in some embodiments, user interface 806 represents a default low power consumption user interface to be used in scenarios in which a higher power consumption user interface does not have a corresponding lower power consumption user interface. In some embodiments, in such scenarios, device 600 overlays a current time indication on a blurred representation of the higher power consumption user interface.

In some embodiments, even if wallet user interface 802-1 does have (e.g., does provide and/or define) a corresponding lower power consumption user interface (e.g., wallet user interface 802-2), device 600 displays user interface 806 in accordance with a determination that device 600 (e.g., and/or the wallet application) is not authorized to display application information pertaining to the wallet application (e.g., one or more user interfaces provided by and/or generated by the wallet application) when in the low power display mode. In some embodiments, user interface 806 represents a default low power consumption user interface to be used in scenarios in which device 600 and/or an application are not authorized to display application information pertaining to the application when device 600 is in the low power display mode. In some embodiments, such restrictions can be specified by a user (e.g., via one or more user settings), FIGS. 8G-8J depict various example scenarios pertaining to a messaging application, in accordance with various embodiments. At FIG. 8G, while operating in a standard display mode (e.g., a higher power consumption display mode), device 600 displays messaging user interface 810-1 on display 602 at a standard display brightness level. Messaging user interface 810-1 corresponds to (e.g., is generated by) a messaging application running on device 600.

Figure 8G:
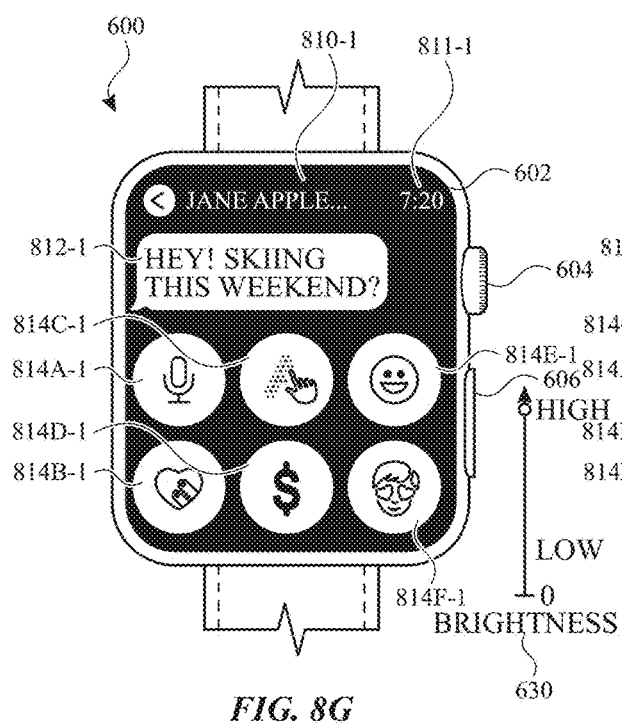

As illustrated in FIG. 8G, messaging user interface 810-1 includes a plurality of user interface elements, including current time indication 811-1, message 812-1, voice input option 814A-1, touch input option 814B-1, draw option 814C-1, payment option 814D-1, emoji option 814E-1, and avatar option 814F-1.

Figure 8H:
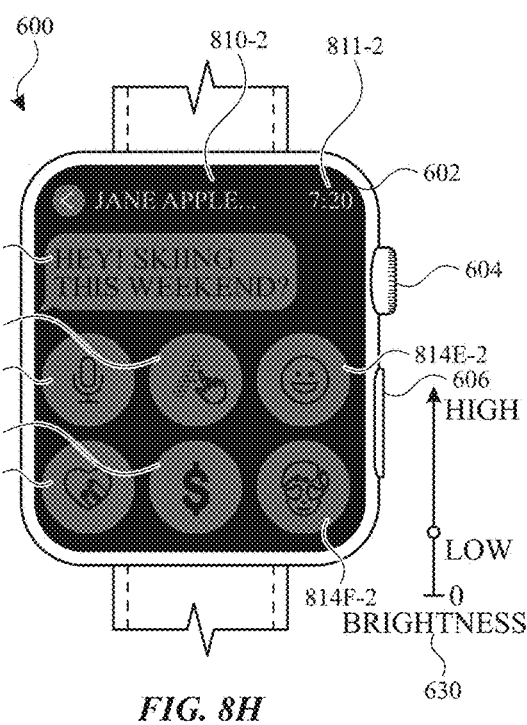
Figure 8I:
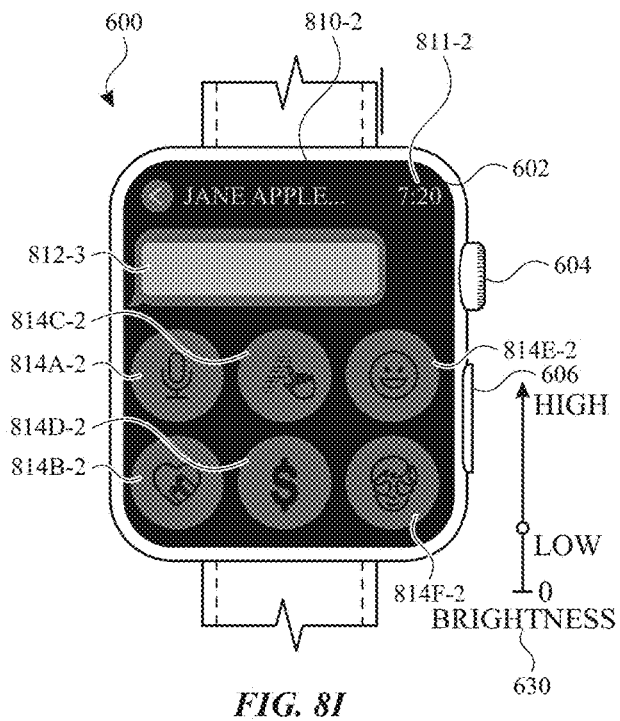
Figure 8J:
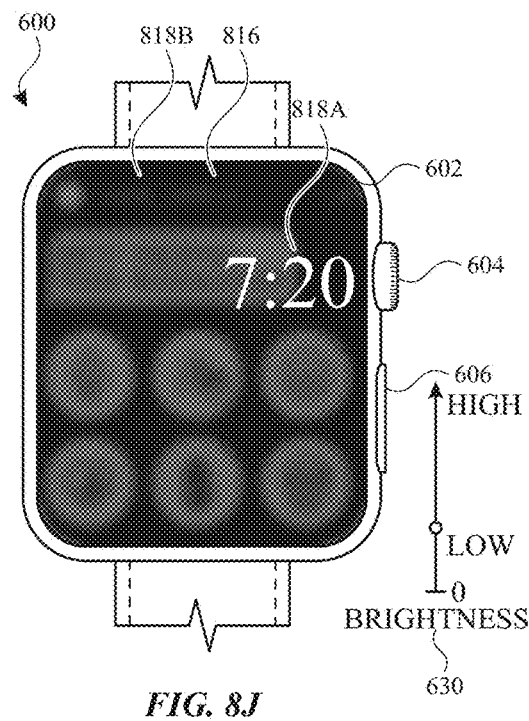

While displaying messaging user interface 810-1, device 600 determines that one or more mode change criteria have been met. In response to determining that the one or more mode change criteria have been met, device 600 transitions out of the standard display mode and into a low power display mode (e.g., from a higher power consumption mode to a lower power consumption mode). Furthermore, in response to determining that the one or more mode change criteria have been met, device 600 replaces display of messaging user interface 810-1 (e.g., a higher power consumption user interface) with a lower power consumption user interface. As discussed above, in some embodiments, the lower power consumption user interface varies based on various determinations. FIGS. 8H-8J illustrate various example scenarios, and different lower power consumption user interfaces in accordance with various embodiments.

FIG. 8H depicts an example scenario in which messaging user interface 810-1 has a corresponding lower power consumption user interface (e.g., messaging user interface 810-2) (e.g., a corresponding lower power consumption user interface that is specified by, provided by, and/or generated by the messaging application). Furthermore, in FIG. 8H, device 600 is authorized (e.g., and/or the messaging application is authorized) to display application information pertaining to the messaging application (e.g., one or more user interfaces provided by and/or generated by the messaging application) while in the low power display mode. In some embodiments, authorization to display application information pertaining to the messaging application is specified by a user (e.g., via one or more user settings). In FIG. 8H, device 600 is also authorized (e.g., and/or the messaging application is authorized) to display all of the information displayed in messaging user interface 810-1 while in the low power display mode. In accordance with these determinations, and in response to determining that the one or more mode change criteria have been met, device 600 displays messaging user interface 810-2 without any redactions, as depicted in FIG. 8H. In the depicted embodiment, messaging user interface 810-2 includes all of the information depicted in messaging user interface 810-1. Messaging user interface 810-2 is displayed at a lower brightness level than messaging user interface 810-1 (e.g., the overall brightness level or the average of the brightness values of pixels constituting messaging user interface 810-2 on display 602 is less than the brightness level of messaging user interface 810-1 on display 602).

Corresponding elements in messaging user interface 810-2 are displayed by device 600 differently than they were previously displayed in messaging user interface 810-1. In FIG. 8H, the user interface elements of messaging user interface 810-2 (e.g., current time indication 811-2, message 812-2, and options 814A-2, 814B-2, 814C-2, 814D-2, 814E-2, 814F-2) are displayed at lower brightness levels (e.g., in darker colors) than corresponding elements in messaging user interface 810-1 (e.g., current time indication 811-1, message 812-1, and options 814A-1, 814B-1, 814C-1, 814D-1, 814E-1, 814F-1, respectively).

In some embodiments, the change in brightness levels between corresponding elements (e.g., affordances and/or objects) in messaging user interfaces 810-1 and 810-2 are not uniform. In some embodiments, device 600 displays one or more elements in messaging user interface 810-2 at a reduced size compared to their corresponding elements in messaging user interface 810-1.

FIG. 8I depicts an example scenario in which messaging user interface 810-1 has a corresponding lower power consumption user interface (e.g., messaging user interface 810-2), and device 600 is authorized (e.g., and/or the messaging application is authorized) to display application information pertaining to the messaging application while in the low power mode. However, in FIG. 8I, device 600 is not authorized (e.g., and/or the messaging application is not authorized) to display message content while in the low power display mode (e.g., the actual content of messages shared between users using the messaging application). As discussed above, such a restriction can be applied, in various embodiments, by a user and/or by the application. In accordance with these determinations, and in response to determining that the one or more mode change criteria have been met, device 600 displays wallet user interface 810-2 with redaction representation 812-3 in place of message 812-2. In FIG. 8I, redaction representation 812-3 redacts an entire display region corresponding to (e.g., previously occupied by) message 812-1. While FIG. 8I depicts redaction of the entire display region, in various embodiments, redaction representation 812-2 redacts message 812-1 on a character-by-character basis and/or on a string-by-string basis.

FIG. 8J depicts an example scenario in which messaging user interface 810-1 does not have a corresponding lower power consumption user interface (e.g., the messaging application does not specify and/or provide a corresponding lower power consumption user interface for messaging user interface 810-1). In FIG. 8J, in accordance with a determination that messaging user interface 810-1 does not have a corresponding lower power consumption user interface, and in response to determining that the one or more mode change criteria have been met, device 600 replaces display of messaging user interface 810-1 with user interface 816. User interface 816 is displayed at a lower brightness level than messaging user interface 810-1 (e.g., the overall brightness level or the average of the brightness values of pixels constituting user interface 816 on display 602 is less than the brightness level of messaging user interface 810-1 on display 602).

As shown in FIG. 8J, user interface 816 includes a current time overlay 818A overlaid on a background portion 818B. In the depicted embodiment, the background portion 818B is a blurred representation of messaging user interface 810-1. As discussed above, in some embodiments, user interface 816 represents a default low power consumption user interface to be used in scenarios in which a higher power consumption user interface does not have a corresponding lower power consumption user interface. In some embodiments, in such scenarios, device 600 overlays a current time indication on a blurred representation of the higher power consumption user interface.

In some embodiments, even if messaging user interface 810-1 does have a corresponding lower power consumption user interface (e.g., messaging user interface 810-2), device 600 displays user interface 816 in accordance with a determination that device 600 is not authorized (e.g., and/or the messaging application is not authorized) to display application information pertaining to the messaging application. In some embodiments, such restrictions can be specified by a user (e.g., via one or more user settings).

Figure 8K:
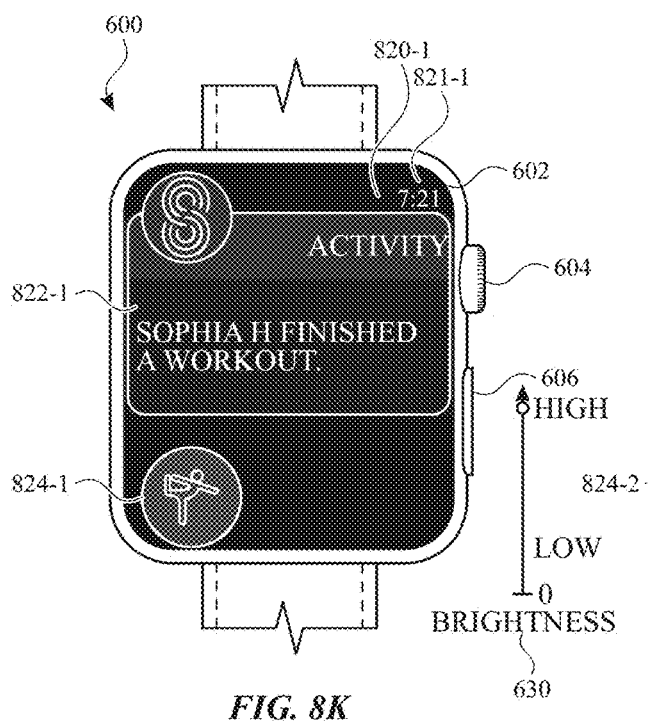
Figure 8L:
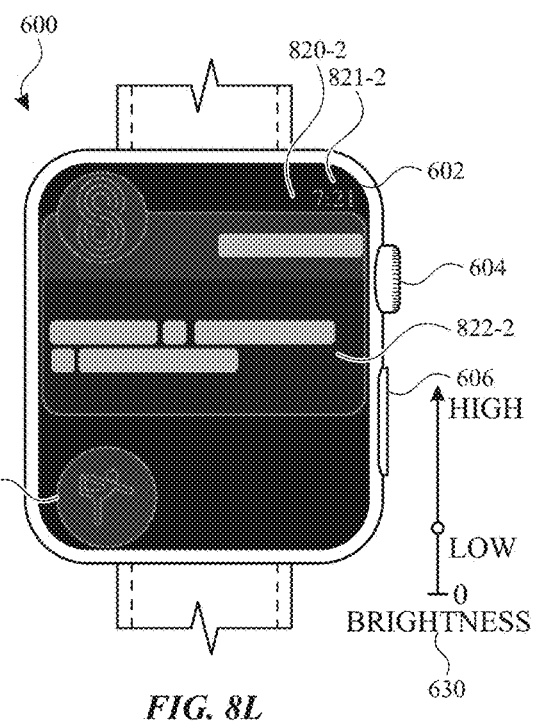
Figure 8M:
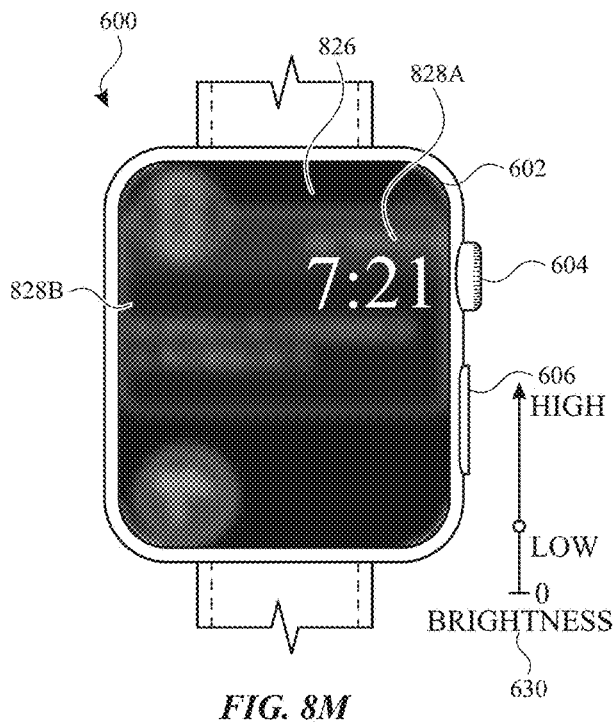

FIGS. 8K-8M depict various example scenarios pertaining to a fitness application, in accordance with various embodiments. At FIG. 8K, while operating in a standard display mode (e.g., a higher power consumption display mode), device 600 displays fitness user interface 820-1 on display 602 at a standard display brightness level. Fitness user interface 820-1 corresponds to (e.g., is generated by) a fitness application running on device 600. As illustrated in FIG. 8K, fitness user interface 820-1 includes a plurality of user interface elements, including current time indication 821-1, fitness notification 822-1, and workout icon 824-1.

While displaying fitness user interface 820-1, device 600 determines that one or more mode change criteria have been met. In response to determining that the one or more mode change criteria have been met, device 600 transitions out of the standard display mode and into a low power display mode (e.g., from a higher power consumption mode to a lower power consumption mode). Furthermore, in response to determining that the one or more mode change criteria have been met, device 600 replaces display of fitness user interface 820-1 (e.g., a higher power consumption user interface) with a lower power consumption user interface. As introduced above, in some embodiments, the lower power consumption user interface varies based on various determinations. FIGS. 8L and 8M illustrate various example scenarios, and different lower power consumption user interfaces in accordance with various embodiments.

FIG. 8L depicts an example scenario in which fitness user interface 820-1 has a corresponding lower power consumption user interface (e.g., fitness user interface 810-2) (e.g., the fitness application specifies and/or provides a corresponding lower power consumption user interface). Furthermore, in FIG. SL, device 600 is authorized (e.g., and/or the fitness application is authorized) to display application information pertaining to the fitness application (e.g., one or more user interfaces generated by and/or provided by the fitness application) while in the low power display mode. However, in FIG. 8L, device 600 is not authorized (e.g., and/or the fitness application is not authorized) to display notifications associated with (e.g., generated by) the fitness application while in the low power display mode. In accordance with these determinations, and in response to determining that the one or more mode change criteria have been met, device 600 displays fitness user interface 520-2 with redacted notification representation 822-2. As such, when device 600 is in the low power display mode, notifications associated with the fitness application are not displayed in fitness user interface 820-2. In FIG. 8L, the notification that was previously displayed in notification 822-1 is redacted on a string-by-string basis in redacted notification representation 822-2. However, in various embodiments, redacted notification representation 822-2 redacts the fitness notification information on a character-by-character basis and/or by redacting the entire display region corresponding to (e.g., previously occupied by) fitness notification 822-1. Fitness user interface 820-2 is displayed at a lower brightness level than fitness user interface 820-1 (e.g., the overall brightness level or the average of the brightness values of pixels constituting fitness user interface 820-2 on display 602 is less than the brightness level of fitness user interface 820-1 on display 602).

FIG. 8M depicts an example scenario in which fitness user interface 820-1 does not have a corresponding lower power consumption user interface (e.g., the fitness application does not specify and/or provide a corresponding lower power consumption user interface for fitness user interface 820-1). In FIG. 8M, in accordance with a determination that fitness user interface 520-1 does not have a corresponding lower power consumption user interface, and in response to determining that the one or more mode change criteria have been met, device 600 replaces display of fitness user interface 820-1 with user interface 826. User interface 826 is displayed at a lower brightness level than fitness user interface 820-1 (e.g., the overall brightness level or the average of the brightness values of pixels constituting user interface 826 on display 602 is less than the brightness level of fitness user interface 820-1 on display 602).

As shown in FIG. 8M, user interface 826 includes a current time overlay 828A overlaid on a background portion 828B. In the depicted embodiment, the background portion 828B is a blurred representation of fitness user interface 820-1. As discussed above, in some embodiments, user interface 826 represents a default low power consumption user interface to be used in scenarios in which a higher power consumption user interface does not have a corresponding lower power consumption user interface. In some embodiments, in such scenarios, device 600 overlays a current time indication on a blurred representation of the higher power consumption user interface.

In some embodiments, even if fitness user interface 820-1 does have a corresponding lower power consumption user interface (e.g., fitness user interface 820-2), device 600 displays user interface 826 in accordance with a determination that device 600 is not authorized (e.g., and/or the fitness application is not authorized) to display application information pertaining to the fitness application. In some embodiments, such restrictions can be specified by a user (e.g., via one or more user settings).

Figure 8N:
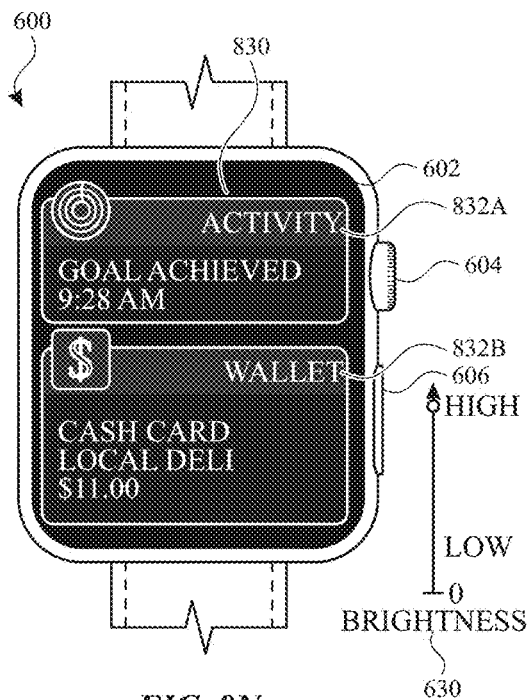
Figure 8O:
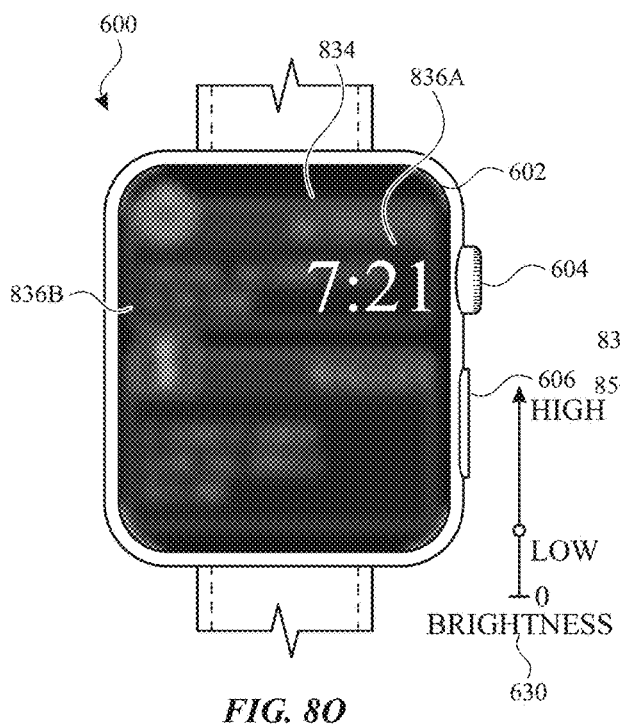

FIGS. 8N-8O depict an example scenario pertaining to a notification center, in accordance with various embodiments. At FIG. 8N, while operating in a standard display mode (e.g., a higher power consumption display mode), device 600 displays notification center user interface 830 on display 602 at a standard display brightness level. In some embodiments, notification center user interface 830 corresponds to (e.g., is generated by) an operating system running on device 600.

As illustrated in FIG. 8N, notification center user interface 830 displays a plurality of notifications corresponding to (e.g., pertaining to) a plurality of applications, including notification 832A corresponding to a fitness application, and notification 832B corresponding to a wallet application.

While displaying notification center user interface 830, device 600 determines that one or more mode change criteria have been met. In response to determining that the one or more mode change criteria have been met, device 600 transitions out of the standard display mode and into a low power display mode (e.g., from a higher power consumption mode to a lower power consumption mode). Furthermore, in response to determining that the one or more mode change criteria have been met, device 600 replaces display of notification center user interface 830 (e.g., a higher power consumption user interface) with a lower power consumption user interface.

FIG. 8O depicts an example scenario in which notification center user interface 830 does not have a corresponding lower power consumption user interface (e.g., the operating system does not specify a corresponding lower power consumption user interface for notification center user interface 830). In FIG. 8O, in accordance with a determination that notification center user interface 830 does not have a corresponding lower power consumption user interface, and in response to determining that the one or more mode change criteria have been met, device 600 replaces display of notification center user interface 830 with user interface 834. User interface 832 is displayed at a lower brightness level than notification center user interface 830 (e.g., the overall brightness level or the average of the brightness values of pixels constituting user interface 834 on display 602 is less than the brightness level of notification center user interface 830 on display 602).

As shown in FIG. 8O, user interface 834 includes a current time overlay 836A overlaid on a background portion 836B. In the depicted embodiment, the background portion 836B is a blurred representation of notification center user interface 830. As discussed above, in some embodiments, user interface 834 represents a default low power consumption user interface to be used in scenarios in which a higher power consumption user interface does not have a corresponding lower power consumption user interface. In some embodiments, in such scenarios, device 600 overlays a current time indication on a blurred representation of the higher power consumption user interface.

In some embodiments, even if notification center user interface 830 does have a corresponding lower power consumption user interface, device 600 displays user interface 834 in accordance with a determination that device 600 is not authorized to display application information pertaining to the notification center. In some embodiments, such restrictions can be specified by a user (e.g., via one or more user settings).

In some embodiments, device 600 provides users with one or more user settings that can be manipulated by a user to define whether notification information for certain applications can be displayed while device 600 is in the lower power display mode (see, e.g., FIGS. 8X, 8AA, 8AC, and 8AD, discussed below).

Even if device 600 is authorized to display application information and/or notification information for one or more applications in the low power display mode, in some embodiments, device 600 is not authorized to display notification information in notification center user interface 830 while operating in the low power display mode. For example, in the example scenario depicted in FIG. 8N, notification center user interface 830 displays notification 832A corresponding to a fitness application, and notification 832B corresponding to a wallet application. In some embodiments, a user can enable display of notifications pertaining to the fitness application and/or the wallet application when device 600 is in the low power display mode. In such scenarios, if display 600 is displaying a notification pertaining to the fitness application (e.g., FIG. 8K) when transitioning to the low power display mode, display 600 will display a low power representation of the fitness application notification. However, if display 600 is displaying notification center user interface 830 (including notification 832A pertaining to the fitness application) when transitioning to the low power display mode, device 600 will display user interface 834, and will not display notification information pertaining to notification 832A in the low power display mode.

Figure 8P:
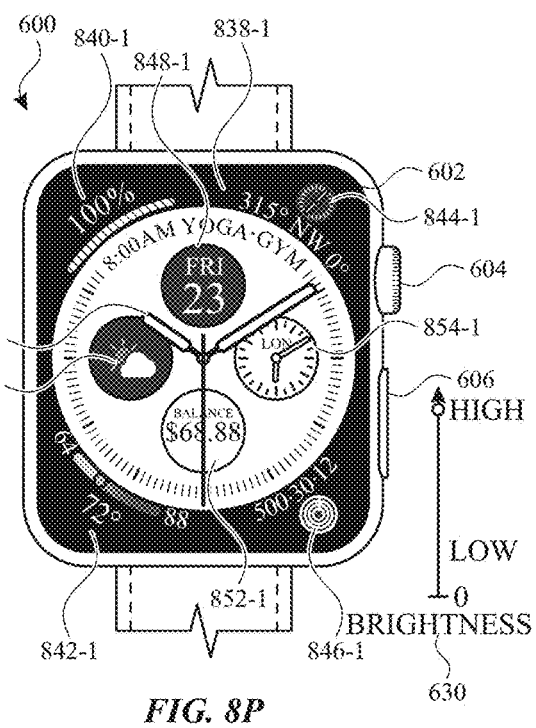
Figure 8Q:
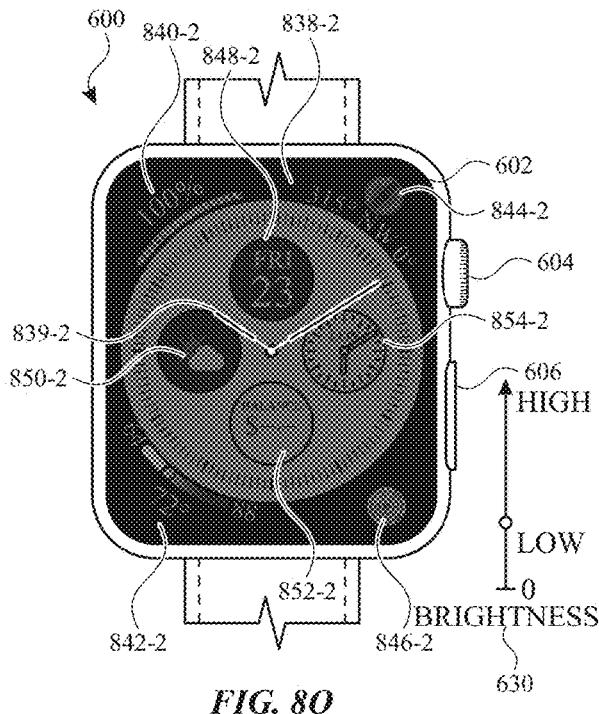
Figure 8R:
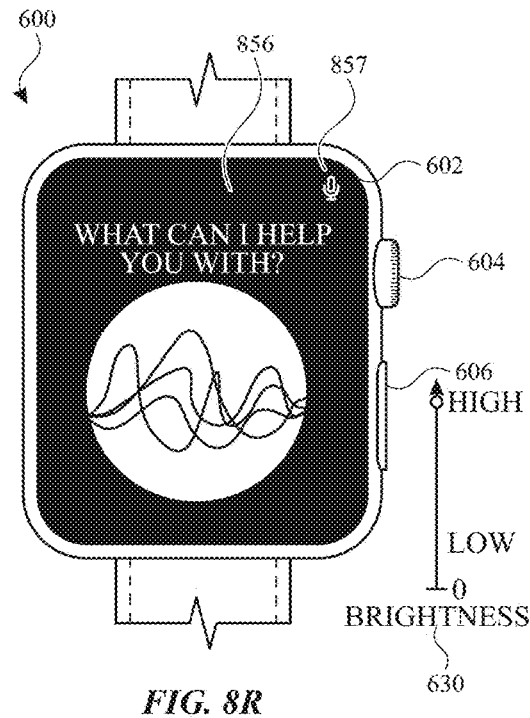

FIGS. 8P and 8Q depict an example scenario pertaining to protection of sensitive information when transitioning to a low power display mode, in accordance with various embodiments. At FIG. 8P, while operating in a standard display mode (e.g., a higher power consumption display mode), device 600 displays clock face user interface 838-1 on display 602 at a standard display brightness level. As illustrated in FIG. 8P, clock face user interface 838-1 includes a plurality of user interface elements, including analog time indication 839-1 (e.g., a representation of analog clock hands displaying current hour, minute, and second values) and multiple affordances (e.g., clock face complications). In some embodiments, each clock face complication is associated with an application on device 600 (e.g., the affordance launches an associated application upon selection and/or the affordance displays information from the associated application). In FIG. 8P, the affordances include battery level complication 840-1, temperature complication 842-1, compass complication 844-1, physical activity complication 846-1, calendar complication 848-1, weather complication 850-1, wallet complication 852-1, and world clock complication 854-1.

At FIG. 8Q, while displaying clock face user interface 838-1, device 600 determines that one or more mode change criteria have been met. In response to determining that the one or more mode change criteria have been met, device 600 transitions out of the standard display mode and into the low power display mode (e.g., from a higher power consumption mode to a lower power consumption mode). Furthermore, in response to determining that the one or more mode change criteria have been met, device 600 replaces display of clock face user interface 838-1 with clock face user interface 838-2. Clock face user interface 838-2 is displayed at a lower brightness level than clock face user interface 838-1 (e.g., the overall brightness level or the average of the brightness values of pixels constituting clock face user interface 838-2 on display 602 is less than the brightness level of clock face user interface 838-1 on display 602).

Corresponding elements in clock face user interface 838-2 are displayed by device 600 differently than they were previously displayed in clock face user interface 838-1. In FIG. 8Q, the user interface elements of clock face user interface 838-2 (e.g., analog time indication 839-2, battery level complication 840-2, temperature complication 842-2, compass complication 844-2, physical activity complication 846-2, calendar complication 848-2, weather complication 850-2, wallet complication 852-2, and world clock complication 854-2) are displayed at lower brightness levels (e.g., in darker colors) than corresponding elements in clock face user interface 838-1 (e.g., analog time indication 839-1, battery level complication 840-1, temperature complication 842-1, compass complication 844-1, physical activity complication 846-1, calendar complication 848-1, weather complication 850-1, wallet complication 852-1, and world clock complication 854-1). In some embodiments, the change in brightness levels between corresponding elements (e.g., affordances and/or objects) in clock face user interfaces 838-1 and 838-2 are not uniform. In some embodiments, device 600 displays one or more elements in clock face user interface 838-2 at a reduced size compared to their corresponding elements in clock face user interface 838-1.

In addition to being displayed at a lower brightness level, clock face user interface 838-2 includes less content than clock face user interface 838-1. For example, in FIG. 8P, calendar complication 848-1 displays a next upcoming calendar appointment (e.g., "8:00 AM YOGA*GYM"), physical activity complication 846-1 displays personal physical activity information (e.g., "500*30*12" indicating that the user has burned 500 calories today, exercised for 30 minutes today, and stood for a threshold portion of 12 hours today), and wallet complication 852-1 displays personal financial information (e.g., a balance if "$68.88"). In FIG. 8Q, device 600 is not permitted (e.g., and/or the various applications that generate the clock face complications are not permitted) to display certain types of information (e.g., sensitive information and/or personal information) while in the low power display mode, such as personal financial information, personal schedule information, and/or personal health information. Such restrictions, in various embodiments, are imposed and/or specified by applications (e.g., a physical activity application, a wallet application, and/or a calendar application) and/or by users (e.g., via one or more user settings). In accordance with these restrictions and determinations, in FIG. 8P, corresponding calendar complication 848-2 does not display the next upcoming calendar appointment, physical activity complication 846-2 does not display the personal physical activity information, and wallet complication 852-2 does not display personal financial information. Although device 600 is not authorized to display certain types of information while in the low power display mode, device 600 is authorized to display other types of information, such as publicly available information or other non-sensitive information. Accordingly, battery complication 840-2 continues to display battery level information, compass complication 844-2 continues to display bearing information, world clock complication 854-2 continues to display world time information, and temperature complication 842-2 continues to display temperature information.

FIGS. 8R-8V depict various example scenarios pertaining to a virtual assistant application, in accordance with various embodiments. At FIG. 8R, while operating in a standard display mode (e.g., a higher power consumption display mode), device 600 displays virtual assistant user interface 856 at a standard brightness level. Virtual assistant user interface 856 corresponds to (e.g., is generated by) a virtual assistant application running on device 600. Virtual assistant user interface 856 includes audio input indication 857 that is displayed to indicate that the virtual assistant application is prepared to receive audio input (e.g., via one or more microphones on device 600).

In some embodiments, device 600 maintains display of virtual assistant user interface 856 until device 600 determines that a voice input from a user is completed (e.g., a threshold amount of time has passed without audio input) and/or until a user provides a user input (e.g., a gesture) corresponding to a request to cease display of virtual assistant user interface 856. In some embodiments, while virtual assistant user interface 856 is displayed, device 600 is prevented from transitioning from the standard display mode to the low power display mode. For example, in some embodiments, the one or more mode change criteria includes a criterion that is met when virtual assistant user interface 856 is not displayed and/or when the virtual assistant application is not actively receiving an audio input.

Figure 8S:
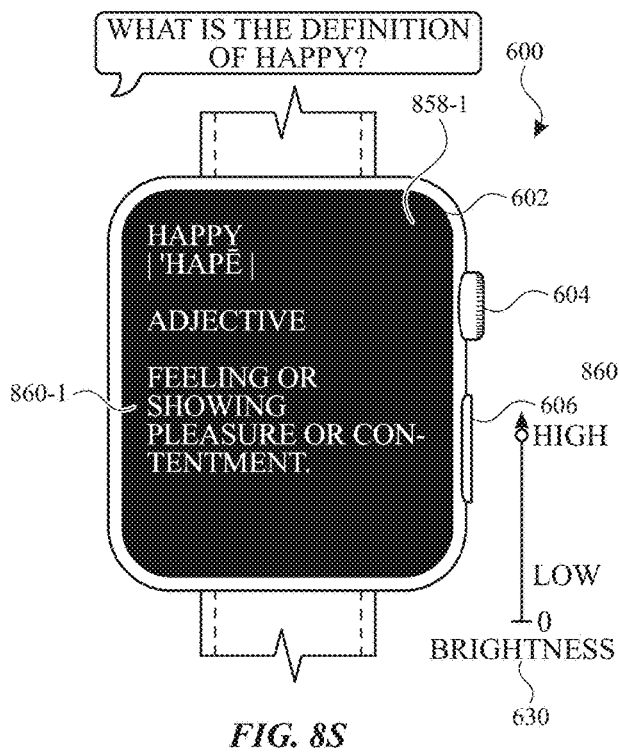

At FIG. 8S, device 600 has received an audio input of "What is the definition of happy?" In response to detecting and/or receiving the audio input, device 600 displays user interface 858-1 that displays result 860-1 in response to the received audio input. In FIG. 8S, device 600 is authorized (and/or the virtual to display information presented in result 860-1 when in the low power display mode.

Figure 8T:
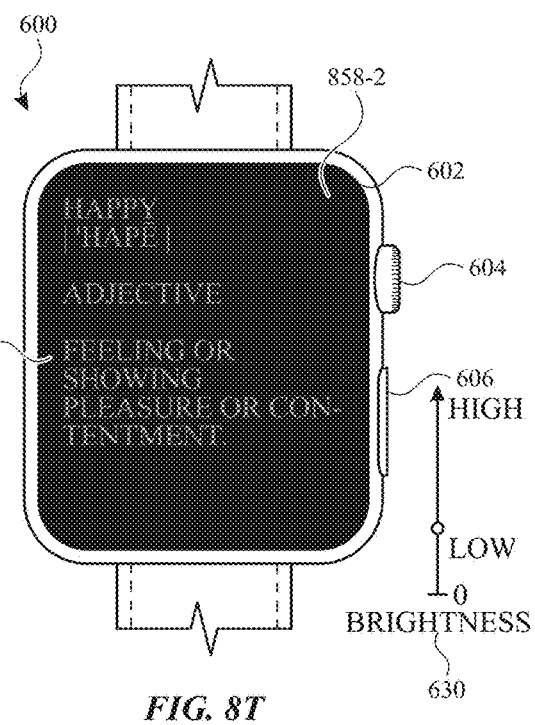

At FIG. 8T, while in the standard display mode and displaying user interface 858-1 (e.g., a higher power consumption user interface), device 600 determines that one or more mode change criteria have been met. In response to determining that the one or more mode change criteria have been met, device 600 transitions out of the standard display mode into a low power display mode. Furthermore, in response to determining that the one or more mode change criteria are met, and in accordance with a determination that device 600 is permitted (e.g., and/or the virtual assistant application is permitted) to display application information pertaining to the virtual assistant application, and in accordance with a determination that device 600 is permitted (e.g., and/or the virtual assistant application is permitted) to display result information corresponding to result 860-1 (e.g., result 860-1 does not contain sensitive, personal, and/or otherwise prohibited information), device 600 replaces display of user interface 858-1 (e.g., a higher power consumption user interface) with user interface 858-2 (e.g., a lower power consumption user interface), wherein user interface 858-2 includes result 860-2 with result information corresponding to result 860-1.

FIG. 8U depicts an alternative scenario in which device 600, while displaying virtual assistant user interface 856, has received an audio input of "What is my next appointment?" In response to detecting and/or receiving the audio input, device 600 displays user interface 862-1 that displays result 864-1 in response to the received audio input. In FIG. 8U, response 864-1 includes personal calendar information, and device 600 is not authorized (e.g., and/or the virtual assistance application is not authorized) to display the information presented in response 864-1 when in the low power display mode.

At FIG. 8V, while in the standard display mode and displaying user interface 862-1 (e.g., a higher power consumption user interface), device 600 determines that one or more mode change criteria have been met. In response to determining that the one or more mode change criteria have been met, device 600 transitions out of the standard display mode into a low power display mode. Furthermore, in response to determining that the one or more mode change criteria are met, and in accordance with a determination that device 600 is permitted (e.g., and/or the virtual assistant application is permitted) to display application information pertaining to the virtual assistant application, but also in accordance with a determination that device 600 is not permitted (e.g., and/or the virtual assistant application is not permitted) to display result information corresponding to result 864-1 (e.g., result 864-1 contains sensitive, personal, and/or otherwise prohibited information), device 600 replaces display of user interface 862-1 (e.g., a higher power consumption user interface) with user interface 862-2 (e.g., a lower power consumption user interface), wherein user interface 862-2 includes redacted representation 864-2, and does not display result information pertaining to result 864-1.

FIGS. 8W-8AD depict various user setting user interfaces that, in various embodiments, are presented by device 600 and can be utilized by a user to enable and/or disable presentation of certain user interfaces and/or certain types of information when device 600 is in the low power display mode.

At FIG. 8W, device 600 displays user interface 866. User interface 866 includes option 867 that is selectable to return to a previous user interface. User interface 866 also includes brightness indication 868A that indicates a current brightness level setting for device 600 and display 602. User interface 866 also includes selectable options 868B-868G. Option 868B is selectable to initiate a process for adjusting a text display size for device 600. Option 868C is selectable to enable or disable bolded text on device 600. Option 868D is selectable to access "always on" user interface 872 (shown in FIG. 8X). Option 868E is selectable to enable or disable transitioning of device 600 from the low power display mode to the standard display mode in response to detection of a wrist raise gesture. Option 868F is selectable to enable or disable transitioning of device 600 from the low power display mode to the standard display mode in response to a rotational input via rotatable and depressible input mechanism 604, Option 868E is selectable to access "wake duration" user interface 878 (shown in FIG. 8Y).

FIG. 8W shows two different user inputs (e.g., tap inputs and/or non-tap inputs) 870A, 870B. In FIG. 8W, while displaying user interface 866, device 600 detects input 870B at a location corresponding to option 868G. In FIG. 8Y, in response to detecting input 870B, device 600 displays user interface 878. User interface 878 includes option 879 that is selectable to return to user interface 866. User interface 878 also includes options 880A and 880B that are selectable to define a threshold duration of time that device 600 will remain in the standard display mode without receiving certain types of inputs before transitioning to the low power display mode. Selection of option 880A sets the threshold duration of time to 15 seconds, and selection of option 880B sets the threshold duration of time to 70 seconds.

Returning to FIG. 8W, while displaying user interface 866, device 600 detects input 870A at a location corresponding to option 868D. In FIG. 8X, in response to detecting input 870A, device 600 displays user interface 872. User interface 872 includes option 873 that is selectable to return to user interface 866. User interface 872 also includes option 874A that is selectable to enable and/or disable an "always on display" setting. If the "always on display" setting is enabled, device 600 transitions between a standard display mode and a low power display mode when mode change criteria are met (e.g., when mode change criteria are met, device 600 displays a low power consumption user interface). However, if the "always on display" setting is disabled, when the one or more mode change criteria (e.g., and/or different criteria) are net, rather than transitioning from the standard display mode to the low power display mode (e.g., rather than displaying a low power consumption user interface), device 600 turns off display 602 and/or does not display any content on display 602.

User interface 872 also includes options 875A, 875B, and 875C. Option 875A is selectable to enable or disable displaying complication data when device 600 is in the low power display mode. If option 875A is disabled, device 600 is not authorized to display any complication data for any application when device 600 is in the low power display mode. If option 875A is enabled, device 600 is authorized to display complication data for applications that are individually authorized (e.g., via options 887A-887G in FIG. 8Z) to display complication data when device 600 is in the low power display mode. Option 875B is selectable to enable or disable display of notifications when device 600 is in the low power display mode. If option 875B is disabled, device 600 is not authorized to display notifications for any application when device 600 is in the low power display mode. If option 875B is enabled, device 600 is authorized to display notifications for applications that are individually authorized (e.g., options 891A-891G in FIG. 8AA) to display notifications when device 600 is in the low power display mode. Option 875C is selectable to enable or disable displaying application information (e.g., data generated by an application, and/or one or more user interfaces generated by an application) when device 600 is in the low power display mode. If option 875C is disabled, device 600 is not authorized to display application information (e.g., application information for any applications (e.g., any user interfaces provided by and/or generated by any applications)) when device 600 is in the low power display mode. If option 875C is enabled, device 600 is authorized to display application information corresponding to applications that are individually authorized (e.g., via options 895A-895G in FIG. 8AB) when device 600 is in the low power display mode. User interface 872 also includes options 874B, 874C, and 874D that are selectable to access different user interfaces and different user settings, as will be described in greater detail below.

FIG. 8X shows three different user inputs (e.g., tap inputs and/or non-tap inputs) 876A, 876B, 876C. In FIG. 8X, while displaying user interface 872, device 600 detects input 876A (e.g., a tap input and/or a non-tap input) at a location corresponding to option 874B. At FIG. 8Z, in response to detecting input 876A, device 600 displays user interface 884. User interface 884 includes option 885 that is selectable to return to user interface 872. User interface 884 also includes option 886 that is selectable to enable or disable displaying complication data when device 600 is in the low power display mode. If option 886 is disabled, device 600 is not authorized to display any complication data for any application when device 600 is in the low power display mode. If option 886 is enabled, device 600 is authorized to display complication data for applications that are individually authorized (e.g., via options 887A-887G) to display complication data when device 600 is in the low power display mode, User interface 884 also includes options 887A-887G that are selectable to selectively enable or disable display of complication data for individual applications when device 600 is in the low power display mode, Each option 887A-887G corresponds to a respective application. For example, option 887A corresponds to a physical activity application, option 887B corresponds to an alarms application, option 887C corresponds to an app store application, and so forth. Device 600 is authorized (e.g., and/or the physical activity application is authorized) to display complication data for the physical activity application when device 600 is in the low power display mode if both option 886 and option 887A are enabled. If option 886 is disabled, no applications are authorized to display complication data when device 600 is in the low power display mode. If option 886 is enabled, but option 887A is disabled, device 600 is not authorized (e.g., and/or the physical activity application is not authorized) to display complication data for the physical activity application when device 600 is in the low power display mode. In FIG. 8Z, options 887A, 887B, 887D, 887E, 887F, and 887G are in the enabled state, while option 887C is in the disabled state.

Returning to FIG. 8X, while displaying user interface 872, device 600 detects input 876B (e.g., a tap input and/or a non-tap input) at a location corresponding to option 874O. At FIG. 8AA, in response to detecting input 876B, device 600 displays user interface 888. User interface 888 includes option 889 that is selectable to return to user interface 872. User interface 888 also includes option 890 that is selectable to enable or disable display of notifications when device 600 is in the low power display mode. If option 890 is disabled, device 600 is not authorized to display notifications for any application when device 600 is in the low power display mode. If option 890 is enabled, device 600 is authorized to display notifications for applications that are individually authorized (e.g., via options 891A-891G) to display notifications when device 600 is in the low power display mode.

User interface 888 also includes options 891A-891G that are selectable to selectively enable or disable display of notifications for individual applications when device 600 is in the low power display mode. Each option 891A-891G corresponds to a respective application. For example, option 891A corresponds to a physical activity application, option 891B corresponds to an alarms application, option 891C corresponds to an app store application, and so forth. Device 600 is authorized (e.g., and/or the physical activity application is authorized) to display notifications for the physical activity application when device 600 is in the low power display mode if both option 890 and option 891A are enabled. If option 890 is disabled, no applications are authorized to display notifications when device 600 is in the low power display mode. If option 890 is enabled, but option 891A is disabled, device 600 is not authorized (e.g., and/or the physical activity application is not authorized) to display notifications for the physical activity application when device 600 is in the low power display mode. In FIG. 8AA, options 891A, 891B, 891D, 891E, 891F, and 891G are in the enabled state, while option 891C is in the disabled state.

Returning to FIG. 8X, while displaying user interface 872, device 600 detects input 876C (e.g., a tap input and/or a non-tap input) at a location corresponding to option 874D. At FIG. 8AB, in response to detecting input 876C, device 600 displays user interface 892. User interface 892 includes option 893 that is selectable to return to user interface 872. User interface 892 also includes option 894 that is selectable to enable or disable displaying application information (e.g., data generated by an application, and/or one or more user interfaces generated by an application) when device 600 is in the low power display mode. If option 894 is disabled, device 600 is not authorized to display application information (e.g., application information for any applications (e.g., any user interfaces provided by and/or generated by any applications)) when device 600 is in the low power display mode. If option 894 is enabled, device 600 is authorized to display application information corresponding to applications that are individually authorized (e.g., via options 895A-895G) when device 600 is in the low power display mode. User interface 892 also includes options 895A-895G that are selectable to selectively enable or disable displaying application information for individual applications when device 600 is in the low power display mode. Each option 895A-895G corresponds to a respective application. For example, option 895A corresponds to a physical activity application, option 895B corresponds to an alarms applications, option 895C corresponds to an app store application, and so forth. Device 600 is authorized to display (e.g., and/or the physical activity application is authorized to display) application information corresponding to (e.g., generated by) the physical activity application when device 600 is in the low power display mode if both option 894 and option 895A are enabled. If option 894 is disabled, no applications are authorized to display application information when device 600 is in the low power display mode. If option 894 is enabled, but option 895A is disabled, device 600 is not authorized (e.g., and/or the physical activity application is not authorized) to display application information corresponding to the physical activity application when device 600 is in the low power display mode. In FIG. 8AB, options 895B, 895C, 895D, 895E, 895F, and 895G are in the enabled state, while option 895A is in the disabled state.

In FIG. 8AC, device 600 displays settings user interface 896 corresponding to a physical activity application. User interface 896 allows a user to control what types of information corresponding to (e.g., generated by) the physical activity application can be displayed by device 600 while device 600 is in the low power display mode. User interface 896 includes option 897A that is selectable by a user to return to a previous user interface. User interface 896 also includes options 897B, 897C, and 897D. Option 897B is selectable by a user to enable or disable displaying complication data corresponding to (e.g., generated by) the physical activity application while device 600 is in the low power display mode. Option 897C is selectable by a user to enable or disable displaying notifications (e.g., notification information) corresponding to (e.g., generated by) the physical activity application while device 600 is in the low power display mode. Option 897D is selectable by a user to enable or disable displaying application information (e.g., one or more application user interfaces) corresponding to (e.g., generated by) the physical activity application while device 600 is in the low power display mode. In FIG. 8AC, options 897B and 897C are in an enabled state, while option 897D is in a disabled state.

In FIG. 8AD, device 600 displays settings user interface 898 corresponding to an alarms application. User interface 898 allows a user to control what types of information corresponding to (e.g., generated by) the alarms application can be displayed by device 600 while device 600 is in the low power display mode. User interface 898 includes option 899A that is selectable by a user to return to a previous user interface. User interface 898 also includes options 899B, 899C, and 899D. Option 899B is selectable by a user to enable or disable displaying complication data corresponding to (e.g., generated by) the alarms application while device 600 is in the low power display mode. Option 899C is selectable by a user to enable or disable displaying notifications (e.g., notification information) corresponding to (e.g., generated by) the alarms application while device 600 is in the low power display mode. Option 899D is selectable by a user to enable or disable displaying application information (e.g., one or more application user interfaces) corresponding to (e.g., generated by) the alarms application while device 600 is in the low power display mode. In FIG. 8AD, options 899B, 899C, and 899B are all in the enabled state.

FIGS. 9A-9B are a flow diagram illustrating a method for managing display usage using an electronic device in accordance with some embodiments. Method 900 is performed at a device (e.g., 100, 300, 500) with a display. Some operations in method 900 are, optionally, combined, the orders of some operations are, optionally, changed, and some operations are, optionally, omitted.

As described below, method 900 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

In some embodiments, a computer system (e.g., a smart phone, a smart watch, and/or a tablet) that is in communication with a display generation component (e.g., a display controller; a touch-sensitive display system; and/or a display (e.g., integrated and/or connected)), while the computer system is in a first mode (902) (e.g., a higher power consumption mode (e.g., a mode that corresponds to higher power consumption than a lower power consumption mode) (e.g., a mode that corresponds to a brighter display, increased performance, and/or more frequent display updates)), displays (904), via the display generation component, a first user interface (e.g., 802-1, 810-1, 820-1, 830, 838-1, 858-1, 862-1) that is associated with (e.g., generated by) a first application and that includes a plurality of user interface elements including a first user interface element depicting a first set of information (e.g., a number, a set of characters, and/or a string) (e.g., 804B-1, 812-1, 822-1, 832A, 832B, 840-1, 842-1, 844-1, 846-1, 848-1, 850-1, 852-1, 852-1, 854-1, 860-1, 864-1).

While displaying the first user interface (906), the computer system detects (908) that the computer system has met one or more criteria for transitioning from the first mode to a second mode (e.g., a lower power consumption mode (e.g., lower power consumption in the second mode than in the first mode)) (e.g., reaching a duration of time since a last input, a wrist down gesture, and/or a hand cover gesture). In response to detecting that the computer system has met the one or more criteria for transitioning from the first mode to the second mode (910), and in accordance with a determination that the first application is authorized to display the first set of information while the computer system is in the second mode (912), the computer system displays (914) a second user interface (e.g., 802-2 in FIG. 8B, 810-2 in FIG. 8H, 858-2 in FIG. 8T) associated with (e.g., generated by) the first application, wherein: the second user interface corresponds to the first user interface and is displayed at a location that occupies at least a portion of a display region that was occupied by the first user interface (in some embodiments, the second user interface is a low power version of the first user interface) (in some embodiments, the second user interface differs from the first user interface in one or more visual characteristics (e.g., size of elements, color, hue, saturation, opacity, shape)), the second user interface is darker than the first user interface, and the second user interface includes a second user interface element depicting the first set of information (e.g., 804B-2, 812-2, 860-2). In some embodiments, the second user interface element corresponds to the first user interface element. In some embodiments, the second user interface element is a low power version of the first user interface element. In some embodiments, the second user interface element differs from the first user interface element in one or more visual characteristics (size, color, hue, saturation, opacity, and/or shape).

In response to detecting that the computer system has met the one or more criteria for transitioning from the first mode to the second mode (910), and in accordance with a determination that the first application is not authorized to display the first set of information while the computer system is in the second mode (916), the computer system displays (918) a third user interface (e.g., 802-2 in FIGS. 8C-8E, 806, 810-2 in FIG. 8I, 816, 820-2 in FIG. 8L, 826, 834, 862-2) different from the first user interface and the second user interface, wherein: the third user interface is displayed at a location that occupies at least a portion of the display region that was occupied by the first user interface, and the third user interface does not include (e.g., obscures, omits, and/or hides)(e.g., does not display) the first set of information. In some embodiments, the third user interface is darker than the first user interface. In some embodiments, the third user interface corresponds to the first user interface (e.g., includes a blurred and/or dimmed version of at least a portion of the first user interface). In some embodiments, the third user interface is associated with (e.g., generated by) the first application and/or corresponds to the second user interface (e.g., is a redacted version of the second user interface) (e.g., includes a subset of information displayed in the second user interface). In some embodiments, the third user interface is not associated with (e.g., is not generated by) the first application. In some embodiments, the third user interface does not include any information that is displayed in the first user interface and/or the second user interface.

In some embodiments, the determination that the first application is not authorized to display the first set of information while the computer system is in the second mode comprises a determination that the first application is not associated with (e.g., does not have, does not specify, is not configured to generate) a corresponding low power state user interface. In some embodiments, the determination that the first application is authorized to display the first set of information while the computer system is in the second mode comprises a determination that the first application is associated with (e.g., has, specifies, is configured to generate) a corresponding low power state user interface.

In some embodiments, displaying the second user interface associated with the first application includes replacing display of the first user interface with the second user interface. In some embodiments, displaying the third user interface includes replacing display of the first user interface with the third user interface. In some embodiments, the method further comprises: after displaying the third user interface (e.g., in accordance with the determination that the first application is not authorized to display the first set of information while the computer system in the second mode), detecting that the computer system has met one or more criteria for transitioning from the second mode to the first mode (e.g., a wrist up gesture, a tap input, a button input, and/or a rotatable and/or depressible input mechanism input); and in response to detecting that the computer system has met the one or more criteria for transitioning from the second mode to the first mode, displaying the first user interface (e.g., replacing display of the third user interface with the first user interface), wherein the first user interface includes the first user interface element depicting the first set of information.

In some embodiments, the method further comprises: after displaying the second user interface in accordance with the determination that the first application is authorized to display the first set of information while the computer system is in the second mode), detecting that the computer system has met one or more criteria for transitioning from the second mode to the first mode (e.g., a wrist up gesture, a tap input, a swipe input, a button input, and/or a rotatable and/or depressible input mechanism input); and in response to detecting that the computer system has met the one or more criteria for transitioning from the second mode to the first mode, displaying the first user interface (e.g., replacing display of the second user interface with the first user interface), wherein the first user interface includes the first user interface element depicting the first set of information.

Displaying a third user interface that does not include the first set of information when it is determined that the first application is not authorized to display the first set of information while the computer system is in the second mode enhances security and can prevent unauthorized users from viewing sensitive information. Displaying a third user interface that does not include the first set of information when it is determined that the first application is not authorized to display the first set of information while the computer system is in the second mode also enhances the operability of the device and makes the user-device interface more efficient (e.g., by restricting unauthorized access)

which, additionally, reduces power usage and improves battery life of the device by limiting the performance of restricted operations.

Displaying a second user interface and/or a third user interface in response to a determination that the computer system has met one or more criteria for transitioning from the first mode to the second mode provides the user with visual feedback about the state of the device (e.g., that the device is operating in a second mode (e.g., a lower power consumption mode)). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the third user interface includes displaying (920), at a location in the third user interface that corresponds to a location of the first set of information in the first user interface, a user interface element (e.g., 804B-3, 812-3, 822-2, 864-2) that does not convey the substance of the first set of information (e.g., a redaction element or an obscured (e.g., redacted) representation of the first set of information). In some embodiments, the user interface element that is displayed at the location that corresponds to the first set of information in the first user interface is displayed along with user interface elements that convey the substance of second information that was displayed in the first user interface (e.g., displaying the redaction element or the obscured representation of the first set of information while concurrently displaying a non-obscured representation of the second set of information) (e.g., one or more blocks of color (e.g., one or more solid blocks of color), and/or a blurred representation) (e.g., a representation of the first set of information that prevents a user (e.g., makes it impossible for a user) from seeing the first set of information) (e.g., a representation of the first set of information that represents the first set of information, but does not display the first set of information (e.g., a solid block of color that represents the first set of information)).

In some embodiments, if the first application is authorized to display the first set of information while the computer system is in the second mode, the second user interface displays the first set of information at a first position (e.g., within a first region) of the display generation component. If the first application is not authorized to display the first set of information while the computer system is in the second mode, the third user interface displays an obscured representation of the first set of information at the first position (e.g., within the first region) of the display generation component.

Obscuring the first set of information when it is determined that the first application is not authorized to display the first set of information while the computer system is in the second mode enhances security and can prevent unauthorized users from viewing sensitive information. Obscuring the first set of information when it is determined that the first application is not authorized to display the first set of information while the computer system is in the second mode also enhances the operability of the device and makes the user-device interface more efficient (e.g., by restricting unauthorized access) which, additionally, reduces power usage and improves battery life of the device by limiting the performance of restricted operations.

In some embodiments, the first user interface (e.g., 802-1, 810-1, 820-1, 838-1) includes a third user interface element (e.g., 804A-1, 804C-1, 814A-1, 814B-1, 814C-1, 814D-1, 814E-1, 814F-1, 824-1, 840-1, 854-1) depicting a second set of information, and displaying the third user interface comprises: in accordance with a determination that the first application is not authorized to display the first set of information while the computer system is in the second mode and that the first application is authorized to display the second set of information while the computer system is in the second mode, the third user interface does not include (e.g., does not display) the first set of information and the third user interface includes a fourth user interface element (e.g., 804A-2, 804C-2, 814A-2, 814B-2, 814C-2, 814D-2, 814E-2, 814F-2, 824-2, 840-2, 854-2) depicting (e.g., displaying) the second set of information. In some embodiments, displaying the second user interface associated with the first application further comprises: in accordance with a determination that the first application is authorized to display the first set of information while the computer system is in the second mode and is not authorized to display the second set of information while the computer system is in the second mode, the second user interface includes the second user interface element depicting the first set of information and does not include (e.g., does not display) the second set of information.

Displaying a third user interface that does not include the first set of information when it is determined that the first application is not authorized to display the first set of information while the computer system is in the second mode enhances security and can prevent unauthorized users from viewing sensitive information. Displaying a third user interface that does not include the first set of information when it is determined that the first application is not authorized to display the first set of information while the computer system is in the second mode also enhances the operability of the device and makes the user-device interface more efficient (e.g., by restricting unauthorized access) which, additionally, reduces power usage and improves battery life of the device by limiting the performance of restricted operations.

In some embodiments, the first set of information (e.g., 804B-1) comprises a plurality of characters including a first character and a second character; and the user interface element (e.g., 804B-3) that does not convey the substance of the first set of information comprises an obscured representation of the first set of information, including: an Obscured representation of the first character, and an obscured representation of the second character (e.g., 804B-3 in FIG. 8C) (e.g., distinct from and/or separate from the obscured representation of the first character). In some embodiments, the number of characters in the first set of information can be determined while the first set of information is obscured in the third user interface, so that a number and location of characters are visible in the obscured representation of the first information is visible without the content of the characters being visible. Obscuring each character of the first set of information when it is determined that the first application is not authorized to display the first set of information while the computer system is in the second mode enhances security and can prevent unauthorized users from viewing sensitive information. Obscuring each character of the first set of information when it is determined that the first application is not authorized to display the first set of information while the computer system is in the second mode also enhances the operability of the device and makes the user-device interface more efficient (e.g., by restricting unauthorized access)

which, additionally, reduces power usage and improves battery life of the device by limiting the performance of restricted operations.

In some embodiments, the first set of information (e.g., 804B-1, 8221) comprises a plurality of strings including a first string and a second string; and the user interface element (e.g., 804B-3, 822-2) that does not convey the first set of information comprises an obscured representation of the first set of information, including: an obscured representation of the first string, and an obscured representation of the second string (e.g., 804B-3 in FIG. 8D, 822-2) (e.g., distinct from and/or separate from the obscured representation of the first string). In some embodiments, the number of strings in the first set of information can be determined while the first set of information is obscured in the third user interface, so that a number and location of strings are visible in the obscured representation of the first set of information is visible without the content of the strings being visible. Obscuring each string of the first set of information when it is determined that the first application is not authorized to display the first set of information while the computer system is in the second mode enhances security and can prevent unauthorized users from viewing sensitive information. Obscuring each string of the first set of information when it is determined that the first application is not authorized to display the first set of information while the computer system is in the second mode also enhances the operability of the device and makes the user-device interface more efficient (e.g., by restricting unauthorized access) which, additionally, reduces power usage and improves battery life of the device by limiting the performance of restricted operations.

In some embodiments, while the computer system is in the first mode and the first user interface (e.g., 802-1, 862-1) is displayed, the first set of information occupies a first region of the display generation component that includes one or more other graphical elements other than the first set of information, and displaying the third user interface comprises displaying an obscured representation (e.g., 804B-3 in FIG. 8E, 864-2) of the first set of information and the one or more other graphical elements at the first region of the display generation component (922) (e.g., the obscured representation of the first set of information occupies at least a portion of the first region of the display generation component). Obscuring the first set of information when it is determined that the first application is not authorized to display the first set of information while the computer system is in the second mode enhances security and can prevent unauthorized users from viewing sensitive information. Obscuring the first set of information when it is determined that the first application is not authorized to display the first set of information while the computer system is in the second mode also enhances the operability of the device and makes the user-device interface more efficient (e.g., by restricting unauthorized access) which, additionally, reduces power usage and improves battery life of the device by limiting the performance of restricted operations.

In some embodiments, while the computer system is in the first mode, the computer system displays, via the display generation component, a fourth user interface (e.g., 802-1, 810-1, 820-1, 830, 838-1, 858-1, 862-1) that is associated with a second application different from the first application and that includes a plurality of user interface elements including a fifth user interface element (e.g., 804B-1, 812-1, 822-1, 832A, 832B, 840-1, 842-1, 844-1, 846-1, 848-1, 850-1, 852-1, 852-1, 854-1, 860-1, 864-1) depicting a third set of information. While displaying the fourth user interface, the computer system detects that the computer system has met one or more criteria for transitioning from the first mode to the second mode. In response to detecting that the computer system has met the one or more criteria for transitioning from the first mode to the second mode, and in accordance with a determination that the second application is authorized to display the third set of information, the computer system displays a fifth user interface (e.g., 802-2 in FIG. 8B, 810-2 in FIG. 8H, 858-2 in FIG. 8T) associated with the second application, wherein: the fifth user interface corresponds to the fourth user interface and is displayed at a location that occupies at least a portion of the display region that was occupied by the fourth user interface, the fifth user interface is darker than the fourth user interface, and the fifth user interface includes a sixth user interface element (e.g., 804B-2, 812-2, 860-2) depicting the third set of information. In response to detecting that the computer system has met the one or more criteria for transitioning from the first mode to the second mode, and in accordance with a determination that the second application is not authorized to display the third set of information while the computer system is in the second mode, the computer system displays a sixth user interface (e.g., 802-2 in FIGS. 8C-8E, 806, 810-2 in FIG. 8I, 816, 820-2 in FIG. 8L, 826, 834, 862-2), wherein: the sixth user interface is displayed at a location that occupies at least a portion of the display region that was occupied by the fourth user interface, and the sixth user interface does not include the third set of information.

In some embodiments, the third user interface and the sixth user interface are substantially similar. In some embodiments, for a plurality of applications that are not associated with (e.g., do not have, do not specify, and/or are not configured to generate) a corresponding low power state user interface, when the device transitions from the first mode to the second mode (e.g., a lower power consumption mode), the device displays a substantially similar low power state user interface. For example, in some embodiments, the low power state user interface includes a blurred representation of a previously displayed user interface in a background portion overlaid by a time indicator. For example, in some embodiments, the third user interface includes a blurred representation of the first user interface overlaid by a time indicator, and the sixth user interface includes a blurred representation of the fourth user interface overlaid by the time indicator.

Providing a third user interface that omits and/or obscures sensitive information for a plurality of applications enhances security and can prevent unauthorized users from viewing sensitive information. Providing a third user interface that omits and/or obscures sensitive information for a plurality of applications also enhances the operability of the device and makes the user-device interface more efficient (e.g., by restricting unauthorized access) which, additionally, reduces power usage and improves battery life of the device by limiting the performance of restricted operations.

In some embodiments, the third user interface includes an obscured version of content from the first user interface that is obscured in a respective manner (e.g., blurred representation 808B) and the sixth user interface includes an Obscured version of content from the fourth user interface that is obscured in the respective manner (e.g., blurred representations 818B, 828B, 836B).

In some embodiments, the third user interface comprises: an obscured representation (e.g., a blurred representation) of at least a portion of the first user interface (e.g., 808B, 818B,

828B, 836B); and a time indicator (e.g., 808A, 818A, 828A, 836A) at a position on the display generation component overlapping at least a portion of the obscured representation of the at least a portion of the first user interface (e.g., a time indicator overlaid on the obscured representation of the first user interface); and the sixth user interface comprises: an obscured representation (e.g., a blurred representation) of at least a portion of the fourth user interface (e.g., 808B, 818B, 828B, 836B); and a time indicator (e.g., 808A, 818A, 828A, 836A) at a position on the display generation component overlapping at least a portion of the obscured representation of the at least a portion of the fourth user interface (e.g., a time indicator overlaid on the obscured representation of the fourth user interface). Obscuring the first user interface that includes sensitive information enhances security and can prevent unauthorized users from viewing sensitive information. Obscuring the first user interface that includes sensitive information also enhances the operability of the device and makes the user-device interface more efficient (e.g., by restricting unauthorized access) which, additionally, reduces power usage and improves battery life of the device by limiting the performance of restricted operations. Displaying a third user interface that includes an obscured representation of the first user interface also provides the user with visual feedback about the state of the device (e.g., that the device is operating in a second mode (e.g., a lower power consumption mode)). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the respective manner of obscuring content that is used for the third user interface and the sixth user interface is used for a plurality of applications (e.g., FIGS. 8F, 8J, 8M, 8O) (e.g., applications that are not associated with (e.g., do not have, do not specify, are not permitted to and/or are not configured to generate) a corresponding low power state user interface specific to the application). In some embodiments, for the plurality of applications that are not associated with a corresponding low power state user interface, if a respective user interface corresponding to a respective application of the plurality of applications is displayed while the computer system is in the first mode, and it is detected that the computer system has met the one or more criteria for transitioning from the first mode to the second mode while the respective user interface is displayed, the computer system displays the third user interface (e.g., replaces display of the respective user interface with the third user interface) in response to detecting that the computer system has met the one or more criteria for transitioning from the first mode to the second mode. Providing a third user interface that omits and/or obscures sensitive information for a plurality of applications that are not associated with a corresponding low power state user interface enhances security and can prevent unauthorized users from viewing sensitive information, Providing a third user interface that omits and/or obscures sensitive information for a plurality of applications that are not associated with a corresponding low power state user interface also enhances the operability of the device and makes the user-device interface more efficient (e.g., by restricting unauthorized access) which, additionally, reduces power usage and improves battery life of the device by limiting the performance of restricted operations.

In some embodiments, while the computer system is in the first mode, the computer system displays a settings user interface (e.g., different from the first user interface, the second user interface, and/or the third user interface) comprising a plurality of selectable options (e.g., 895A-895G) corresponding to a plurality of applications (e.g., a plurality of applications installed on the computer system), including a first selectable option (e.g., 895A-895G) corresponding to (e.g., corresponding uniquely to) the first application and a second selectable option (e.g., 895A-895G) corresponding to (e.g., corresponding uniquely to) a second application different from the first application, wherein: the first selectable option has a state selected from a plurality of states including an enabled state and a disabled state, wherein the enabled state of the first selectable option authorizes the first application to display one or more low power user interfaces corresponding to (e.g., generated by) the first application when the computer system is in the second mode and the disabled state of the first selectable option prohibits the first application from displaying one or more low power user interfaces corresponding to (e.g., generated by) the first application when the computer system is in the second mode, and the second selectable option has a state selected from a plurality of states including an enabled state and a disabled state, wherein the enabled state of the second selectable option authorizes the second application to display one or more low power user interfaces corresponding to (e.g., generated by) the second application when the computer system is in the second mode, and the disabled state of the second selectable option prohibits the second application from displaying one or more low power user interfaces corresponding to (e.g., generated by) the second application when the computer system is in the second mode.

In some embodiments, the determination that the first application is authorized to display the first set of information while the computer system is in the second mode comprises a determination that the first selectable option is enabled. In some embodiments, the determination that the first application is not authorized to display the first set of information while the computer system is in the second mode comprises a determination that the first selectable option is disabled (e.g., is not enabled). Providing options that enable a user to identify specific applications that are authorized to display low power user interfaces when the computer system is in the second mode enhances security and can prevent unauthorized users from viewing sensitive information (e.g., by allowing a user to select certain applications that are authorized display low power user interfaces, and allowing a user to specify certain applications that are not authorized to display low power user interface). Providing options that enable a user to identify specific applications that are authorized to display low power user interfaces when the computer system is in the second mode also enhances the operability of the device and makes the user-device interface more efficient (e.g., by restricting unauthorized access) which, additionally, reduces power usage and improves battery life of the device by limiting the performance of restricted operations.

In some embodiments, while the computer system is in the first mode, the computer system displays a second settings user interface (e.g., 872) (e.g., the settings user interface, a second settings user interface different from the settings user interface) (e.g., different from the first user interface, the second user interface, and/or the third user interface) comprising a third selectable option (e.g., 874A) that has a state selected from a plurality of states including an enabled state and a disabled state, wherein: the enabled state of the third selectable option enables the computer system to display content via the display generation component when the computer system is in the second mode (e.g., display content in a low power mode, display one or more low power user interfaces) (e.g., the enabled state of the third selectable option enables an always on display setting), and the disabled state of the third selectable option prohibits the computer system from displaying content via the display generation component (e.g., turns off the display generation component) when the computer system is in the second mode (e.g., the disabled state of the third selectable option disables an always on display setting).

In some embodiments, the third selectable option corresponds to an always on display option, wherein enabling the always on display option causes the display to remain on (e.g., display content) in the second mode (e.g., remain on in a low power state), and disabling the always on display option causes the display to turn off (e.g., cease displaying content) in the second mode. In some embodiments, the method further comprises: while the computer system is in the first mode, displaying first content via the display generation component; while displaying the first content, detecting that the computer system has met one or more criteria for transitioning from the first mode to the second mode; and in response to detecting that the computer system has met the one or more criteria for transitioning from the first mode to the second mode: in accordance with a determination that the third selectable option is in the enabled state, displaying second content while the computer system is in the second mode; and in accordance with a determination that the third selectable option is in the disabled state, ceasing display of content via the display generation component (e.g., turning off the display, entering a sleep state) (not displaying content, displaying no content) while the computer system is in the second mode. Providing an option that enables a user to enable or disable an always on display enhances security and can prevent unauthorized users from viewing sensitive information e.g., by allowing a user to disable the always on display). Providing an option that enables a user to enable or disable an always on display also enhances the operability of the device and makes the user-device interface more efficient (e.g., by restricting unauthorized access) which, additionally, reduces power usage and improves battery life of the device by limiting the performance of restricted operations. Providing an option that enables a user to enable or disable an always on display reduces power usage and improves the battery life of the device.

In some embodiments, while the computer system is in the first mode, the computer system displays a third settings user interface (e.g., 884) (e.g., the settings user interface, the second settings user interface, a third settings user interface different from the settings user interface and/or the second settings user interface) (e.g., different from the first user interface, the second user interface, and/or the third user interface) comprising a fourth selectable option (e.g., 886, 887A-887G) that has a state selected from a plurality of states including an enabled state and a disabled state, wherein: the enabled state of the fourth selectable option enables the computer system to display one or more complications (e.g., a watch face complication; an element of the watch face that is not associated with providing an indication of time)(e.g., one or more complications corresponding to one or more applications) when the computer system is in the second mode, and the disabled state of the fourth selectable option prohibits the computer system from displaying the one or more complications when the computer system is in the second mode.

In some embodiments, the method further comprises: while the computer system is in the first mode, displaying a first complication via the display generation component; while displaying the first complication, detecting that the computer system has met one or more criteria for transitioning from the first mode to the second mode; and in response to detecting that the computer system has met the one or more criteria for transitioning from the first mode to the second mode: in accordance with a determination that the fourth selectable option is in the enabled state, displaying a second complication (e.g., a second complication corresponding to the first complication (e.g., a lower power version of the first complication)) while the computer system is in the second mode; and in accordance with a determination that the fourth selectable option is in the disabled state, ceasing display of the first complication (e.g., without displaying the second complication) while the computer system is in the second mode. Providing an option that enables a user to enable or disable complications when the computer system is in the second mode enhances security and can prevent unauthorized users from viewing sensitive information (e.g., by allowing a user to disable display of complications in the second mode). Providing an option that enables a user to enable or disable complications when the computer system is in the second mode also enhances the operability of the device and makes the user-device interface more efficient (e.g., by restricting unauthorized access) which, additionally, reduces power usage and improves battery life of the device by limiting the performance of restricted operations. Providing an option that enables a user to enable or disable complications when the computer system is in the second mode also reduces power usage and improves the battery life of the device (e.g., by allowing a user to disable display of complications in the second mode, which conserves energy by conserving computing resources required to compute and/or display the complications).

In some embodiments, the enabled state of the fourth selectable option (e.g., 886) enables the computer system to display a plurality of complications corresponding to a plurality of applications (e.g., a plurality of applications installed on the computer system, and/or a plurality of applications installed on the computer system configured to generate complications) when the computer system is in the second mode, and the disabled state of the fourth selectable option prohibits the computer system from displaying the plurality of complications corresponding to the plurality of applications when the computer system is in the second mode (e.g., the fourth selectable option controls display of complications in the second mode for a plurality of applications (e.g., but does not control display of complications for the plurality of applications when the computer system is in the first mode)).

In some embodiments, the method further comprises: while the computer system is in the first mode, displaying a first plurality of complications corresponding to a plurality of applications via the display generation component; while displaying the first plurality of complications, detecting that the computer system has met one or more criteria for transitioning from the first mode to the second mode; and in response to detecting that the computer system has met the one or more criteria for transitioning from the first mode to the second mode: in accordance with a determination that the fourth selectable option is in the enabled state, displaying a second plurality of complications corresponding to the plurality of applications (e.g., a second plurality of complications corresponding to the first plurality of complications (e.g., lower power versions of the first plurality of complications)) while the computer system is in the second mode; and in accordance with a determination that the fourth selectable option is in the disabled state, ceasing display of the first plurality of complications (e.g., without displaying the second plurality of complications) while the computer system is in the second mode.

Providing an option that enables a user to enable or disable complications when the computer system is in the second mode enhances security and can prevent unauthorized users from viewing sensitive information (e.g., by allowing a user to disable display of complications in the second mode). Providing an option that enables a user to enable or disable complications when the computer system is in the second mode also enhances the operability of the device and makes the user-device interface more efficient (e.g., by restricting unauthorized access) which, additionally, reduces power usage and improves battery life of the device by limiting the performance of restricted operations. Providing an option that enables a user to enable or disable complications when the computer system is in the second mode also reduces power usage and improves the battery life of the device (e.g., by allowing a user to disable display of complications in the second mode, which conserves energy by conserving computing resources required to compute and/or display the complications).

In some embodiments, the third settings user interface (e.g., 884) further comprises a plurality of selectable options (e.g., 887A-887G) including a fifth selectable option (e.g., 887A-887G) and a sixth selectable option (e.g., 887A-887G) (e.g., different from the fourth selectable option); the fifth selectable option corresponds to (e.g., corresponds uniquely to) the first application and has a state selected from a plurality of states including an enabled state and a disabled state; the enabled state of the fifth selectable option enables the computer system to display one or more complications corresponding to the first application when the computer system is in the second mode; the disabled state of the fifth selectable option prohibits the computer system from displaying the one or more complications corresponding to the first application when the computer system is in the second mode; the sixth selectable option corresponds to (e.g., corresponds uniquely to) a second application different from the first application and has a state selected from a plurality of states including an enabled state and a disabled state; the enabled state of the sixth selectable option enables the computer system to display one or more complications corresponding to the second application when the computer system is in the second mode; and the disabled state of the sixth selectable option prohibits the computer system from displaying the one or more complications corresponding to the second application when the computer system is in the second mode.

In some embodiments, the third settings user interface comprises a respective selectable option for each application of a plurality of applications (e.g., a plurality of applications installed on the computer system, and/or a plurality of applications installed on the computer system and configured to generate watch face complications), wherein an enabled state of a respective selectable option corresponding to (e.g., corresponding uniquely to) a respective application enables the computer system to display one or more complications corresponding to the respective application when the computer system is in the second mode, and a disabled state of the respective selectable option prohibits the computer system from displaying the one or more complications corresponding to the respective application when the computer system is in the second mode.

In some embodiments, the method further comprises: while the computer system is in the first mode, displaying a first complication associated with (e.g., corresponding uniquely to) the first application via the display generation component; while displaying the first complication, detecting that the computer system has met one or more criteria for transitioning from the first mode to the second mode; and in response to detecting that the computer system has met the one or more criteria for transitioning from the first mode to the second mode: in accordance with a determination that the fifth selectable option is in the enabled state, displaying a second complication associated with (e.g., corresponding uniquely to) the first application while the computer system is in the second mode (e.g., a second complication corresponding to the first complication (e.g., a lower power version of the first complication)); and in accordance with a determination that the fifth selectable option is in the disabled state, ceasing display of the first complication (e.g., without displaying the second complication) while the computer system is in the second mode.

In some embodiments, the method further comprises: while the computer system is in the first mode, displaying a third complication associated with (e.g., corresponding uniquely to) the second application via the display generation component; while displaying the third complication, detecting that the computer system has met one or more criteria for transitioning from the first mode to the second mode; and in response to detecting that the computer system has met the one or more criteria for transitioning from the first mode to the second mode: in accordance with a determination that, the sixth selectable option is in the enabled state, displaying a fourth complication associated with (e.g., corresponding uniquely to) the second application while the computer system is in the second mode (e.g., a fourth complication corresponding to the third complication (e.g., a lower power version of the third complication)); and in accordance with a determination that the sixth selectable option is in the disabled state, ceasing display of the third complication (e.g., without displaying the fourth complication) while the computer system is in the second mode.

Providing options that enable a user to enable or disable complications for individual applications when the computer system is in the second mode enhances security and can prevent unauthorized users from viewing sensitive information (e.g., by allowing a user to disable display of complications for certain applications in the second mode). Providing an option that enables a user to enable or disable complications for individual applications when the computer system is in the second mode also enhances the operability of the device and makes the user-device interface more efficient (e.g., by restricting unauthorized access) which, additionally, reduces power usage and improves battery life of the device by limiting the performance of restricted operations.

Providing options that enable a user to enable or disable complications for individual applications when the computer system is in the second mode also reduces power usage and improves the battery life of the device (e.g., by allowing a user to disable display of complications for one or more applications in the second mode, which conserves energy by conserving computing resources required to compute and/or display the complications).

In some embodiments, while the computer system is in the first mode, the computer system displays a fourth settings user interface (e.g., 888) (e.g., the settings user interface, the second settings user interface, the third settings user interface, and/or a fourth settings user interface different from the settings user interface, the second settings user interface, and/or the third settings user interface) (e.g., different from the first user interface, the second user interface, and/or the third user interface) comprising a seventh selectable option (e.g., 890) that has a state selected from a plurality of states including an enabled state and a disabled state, wherein: the enabled state of the seventh selectable option enables the computer system to display notifications (e.g., one or more notifications corresponding to one or more applications) when the computer system is in the second mode, and the disabled state of the seventh selectable option prohibits the computer system from displaying notifications when the computer system is in the second mode.

In some embodiments, the method further comprises: while the computer system is in the second mode, receiving notification information; and in response to receiving the notification information: in accordance with a determination that the seventh selectable option is in the enabled state, displaying a notification corresponding to the notification information while the computer system is in the second mode; and in accordance with a determination that the seventh selectable option is in the disabled state, forgoing displaying the notification corresponding to the notification while the computer system is in the second mode.

Providing an option that enables a user to enable or disable notifications when the computer system is in the second mode enhances security and can prevent unauthorized users from viewing sensitive information (e.g., by allowing a user to disable display of notifications in the second mode). Providing an option that enables a user to enable or disable notifications when the computer system is in the second mode also enhances the operability of the device and makes the user-device interface more efficient (e.g., by restricting unauthorized access) which, additionally, reduces power usage and improves battery life of the device by limiting the performance of restricted operations.

Providing an option that enables a user to enable or disable notifications when the computer system is in the second mode also reduces power usage and improves the battery life of the device (e.g., by allowing a user to disable display of notifications in the second mode, which conserves energy by conserving computing resources required to compute and/or display the notifications).

In some embodiments, the enabled state of the seventh selectable option (e.g., 890) enables the computer system to display notifications corresponding to a plurality of applications (e.g., a plurality of applications installed on the computer system, and/or a plurality of applications installed on the computer system configured to generate notifications) when the computer system is in the second mode, and the disabled state of the seventh selectable option prohibits the computer system from displaying notifications corresponding to the plurality of applications when the computer system is in the second mode (e.g., the seventh selectable option controls display of notifications for a plurality of applications while the computer system is in the second mode (e.g., but does not control display of notifications for the plurality of applications while the computer system is in the first mode)).

In some embodiments, the method further comprises: while the computer system is in the second mode, receiving notification information corresponding to a respective application of the plurality of applications; and in response to receiving the notification information corresponding to the respective application: in accordance with a determination that the seventh selectable option is in the enabled state, displaying a notification corresponding to the notification information while the computer system is in the second mode; and in accordance with a determination that the seventh selectable option is in the disabled state, forgoing displaying the notification corresponding to the notification information while the computer system is in the second mode.

Providing an option that enables a user to enable or disable notifications when the computer system is in the second mode enhances security and can prevent unauthorized users from viewing sensitive information (e.g., by allowing a user to disable display of notifications in the second mode), Providing an option that enables a user to enable or disable notifications when the computer system is in the second mode also enhances the operability of the device and makes the user-device interface more efficient (e.g., by restricting unauthorized access) which, additionally, reduces power usage and improves battery life of the device by limiting the performance of restricted operations.

Providing an option that enables a user to enable or disable notifications when the computer system is in the second mode also reduces power usage and improves the battery life of the device (e.g., by allowing a user to disable display of notifications in the second mode, which conserves energy by conserving computing resources required to compute and/or display the notifications).

In some embodiments, the fourth settings user interface (e.g., 888) further comprises a plurality of selectable options (e.g., 891A-891G), including an eighth selectable option (e.g., 891A-891G) and a ninth selectable option (e.g., 891A-891G) (e.g., different from the seventh selectable option); the eighth selectable option corresponds to (e.g., corresponds uniquely to) the first application and has a state selected from a plurality of states including an enabled state and a disabled state; the enabled state of the eighth selectable option enables the computer system to display notifications corresponding to the first application when the computer system is in the second mode; the disabled state of the eighth selectable option prohibits the computer system from displaying notifications corresponding to the first application when the computer system is in the second mode; the ninth selectable option corresponds to (e.g., corresponds uniquely to) a second application different from the first application and has a state selected from a plurality of states including an enabled state and a disabled state; the enabled state of the ninth selectable option enables the computer system to display notifications corresponding to the second application when the computer system is in the second mode; and the disabled state of the ninth selectable option prohibits the computer system from displaying notifications corresponding to the second application when the computer system is in the second mode.

In some embodiments, the fourth settings user interface comprises a respective selectable option for each application of a plurality of applications (e.g., a plurality of applications installed on the computer system, and/or a plurality of applications installed on the computer system configured to generate notifications), wherein an enabled state of a respective selectable option corresponding to (e.g., corresponding uniquely to) a respective application enables the computer system to display notifications corresponding to the respective application when the computer system is in the second mode, and a disabled state of the respective selectable option prohibits the computer system from displaying notifications corresponding to the respective application when the computer system is in the second mode.

In some embodiments, the method further comprises: while the computer system is in the second mode, receiving notification information corresponding to the first application; and in response to receiving the notification information: in accordance with a determination that the eighth selectable option is in the enabled state (e.g., regardless of the state of the ninth selectable option), displaying a notification corresponding to the notification information while the computer system is in the second mode; and in accordance with a determination that the eighth selectable option is in the disabled state (e.g., regardless of the state of the ninth selectable option), forgoing displaying the notification corresponding to the notification information while the computer system is in the second mode.

In some embodiments, the method further comprises: while the computer system is in the second mode, receiving notification information corresponding to the second application; and in response to receiving the notification information: in accordance with a determination that the ninth selectable option is in the enabled state (e.g., regardless of the state of the eighth selectable option), displaying a notification corresponding to the notification information while the computer system is in the second mode; and in accordance with a determination that the ninth selectable option is in the disabled state (e.g., regardless of the state of the eighth selectable option), forgoing displaying the notification corresponding to the notification information while the computer system is in the second mode.

Providing an option that enables a user to enable or disable notifications for individual applications when the computer system is in the second mode enhances security and can prevent unauthorized users from viewing sensitive information (e.g., by allowing a user to disable display of notifications for one or more applications in the second mode). Providing an option that enables a user to enable or disable notifications for individual applications when the computer system is in the second mode also enhances the operability of the device and makes the user-device interface more efficient (e.g., by restricting unauthorized access) which, additionally, reduces power usage and improves battery life of the device by limiting the performance of restricted operations.

Providing an option that enables a user to enable or disable notifications for individual applications when the computer system is in the second mode also reduces power usage and improves the battery life of the device (e.g., by allowing a user to disable display of notifications for one or more applications in the second mode, which conserves energy by conserving computing resources required to compute and/or display the notifications).

In some embodiments, while the computer system is in the first mode, the computer system displays a fifth settings user interface (e.g., 892) (e.g., the settings user interface, the second settings user interface, the third settings user interface, the fourth settings user interface, and/or a fifth settings user interface different from the settings user interface, the second settings user interface, the third settings user interface, and/or the fourth settings user interface) (e.g., different from the first user interface, the second user interface, and/or the third user interface) comprising a tenth selectable option (e.g., 894) that has a state selected from a plurality of states including an enabled state and a disabled state, wherein: the enabled state of the tenth selectable option enables the computer system to display application user interfaces (e.g., one or more application user interfaces corresponding to (e.g., generated by) one or more applications) (e.g., one or more low power application user interfaces) when the computer system is in the second mode, and the disabled state of the tenth selectable option prohibits the computer system from displaying application user interfaces when the computer system is in the second mode.

In some embodiments, the method further comprises: while the computer system is in the first mode, displaying a first application user interface corresponding to (e.g., generated by) a respective application via the display generation component; while displaying the first application user interface, detecting that the computer system has met one or more criteria for transitioning from the first mode to the second mode; and in response to detecting that the computer system has met the one or more criteria for transitioning from the first mode to the second mode: in accordance with a determination that the tenth selectable option is in the enabled state, displaying a second application user interface corresponding to (e.g., generated by) the respective application (e.g., a second application user interface corresponding to the first application user interface (e.g., a low power version of the first application user interface)) while the computer system is in the second mode; and in accordance with a determination that the tenth selectable option is in the disabled state, forgoing display of the second application user interface while the computer system is in the second mode (e.g., displaying a user interface that does not correspond to (e.g., is not generated by) the respective application, and/or forgoing displaying any content).

In some embodiments, the determination that the first application is authorized to display the first set of information while the computer system is in the second mode comprises a determination that the tenth selectable option is in the enabled state. In some embodiments, the determination that the first application is not authorized to display the first set of information while the computer system is in the second mode comprises a determination that the tenth selectable option is in the disabled state.

Providing an option that enables a user to enable or disable display of application user interfaces when the computer system is in the second mode enhances security and can prevent unauthorized users from viewing sensitive information (e.g., by allowing a user to disable display of application user interfaces in the second mode). Providing an option that enables a user to enable or disable display of application user interfaces when the computer system is in the second mode also enhances the operability of the device and makes the user-device interface more efficient (e.g., by restricting unauthorized access) which, additionally, reduces power usage and improves battery life of the device by limiting the performance of restricted operations. Providing an option that enables a user to enable or disable display of application user interfaces when the computer system is in the second mode also reduces power usage and improves the battery life of the device (e.g., by allowing a user to disable display of application user interfaces in the second mode, which conserves energy by conserving computing resources required to compute and/or display the application user interfaces).

In some embodiments, the enabled state of the tenth selectable option (e.g., 894) enables the computer system to display application user interfaces (e.g., one or more low power application user interfaces) corresponding to a plurality of applications (e.g., a plurality of applications installed on the computer system, and/or a plurality of applications installed on the computer system configured to generate low power user interfaces) when the computer system is in the second mode, and the disabled state of the tenth selectable option prohibits the computer system from displaying application user interfaces corresponding to the plurality of applications when the computer system is in the second mode (e.g., the tenth selectable option controls display of application user interfaces for a plurality of applications while the computer system is in the second mode (e.g., but does not control display of application user interfaces for the plurality of applications while the computer system is in the first mode)).

In some embodiments, the method further comprises: while the computer system is in the first mode, displaying a first application user interface corresponding to (e.g., generated by) a respective application of the plurality of applications via the display generation component; while displaying the first application user interface, detecting that the computer system has met one or more criteria for transitioning from the first mode to the second mode; and in response to detecting that the computer system has met the one or more criteria for transitioning from the first mode to the second mode: in accordance with a determination that the tenth selectable option is in the enabled state, displaying a second application user interface corresponding to (e.g., generated by) the respective application (e.g., a second application user interface corresponding to the first application user interface (e.g., a low power version of the first application user interface)) while the computer system is in the second mode; and in accordance with a determination that the tenth selectable option is in the disabled state, forgoing display of the second application user interface while the computer system is in the second mode (e.g., displaying a user interface that does not correspond to (e.g., is not generated by) the respective application, and/or forgoing displaying any content).

In some embodiments, the determination that the first application is authorized to display the first set of information while the computer system is in the second mode comprises a determination that the tenth selectable option is in the enabled state. In some embodiments, the determination that the first application is not authorized to display the first set of information while the computer system is in the second mode comprises a determination that the tenth selectable option is in the disabled state.

Providing an option that enables a user to enable or disable display of application user interfaces when the computer system is in the second mode enhances security and can prevent unauthorized users from viewing sensitive information (e.g., by allowing a user to disable display of application user interfaces in the second mode), Providing an option that enables a user to enable or disable display of application user interfaces when the computer system is in the second mode also enhances the operability of the device and makes the user-device interface more efficient (e.g., by restricting unauthorized access) which, additionally, reduces power usage and improves battery life of the device by limiting the performance of restricted operations.

Providing an option that enables a user to enable or disable display of application user interfaces when the computer system is in the second mode also reduces power usage and improves the battery life of the device (e.g., by allowing a user to disable display of application user interfaces in the second mode, which conserves energy by conserving computing resources required to compute and/or display the application user interfaces).

In some embodiments, the fifth settings user interface (e.g., 892) further comprises a plurality of selectable options (e.g., 895A-895G), including an eleventh selectable option (e.g., 895A-895G) and a twelfth selectable option (e.g., 895A-895G) (e.g., different from the tenth selectable option); the eleventh selectable option corresponds to (e.g., corresponds uniquely to) the first application and has a state selected from a plurality of states including an enabled state and a disabled state; the enabled state of the eleventh selectable option enables the computer system to display application user interfaces (e.g., one or more low power application user interfaces) corresponding to (e.g., generated by) the first application when the computer system is in the second mode; the disabled state of the eleventh selectable option prohibits the computer system from displaying application user interfaces corresponding to the first application when the computer system is in the second mode; the twelfth selectable option corresponds to (e.g., corresponds uniquely to) a second application different from the first application and has a state selected from a plurality of states including an enabled state and a disabled state; the enabled state of the twelfth selectable option enables the computer system to display application user interfaces (e.g., one or more low power application user interfaces) corresponding to (e.g., generated by) the second application when the computer system is in the second mode; and the disabled state of the twelfth selectable option prohibits the computer system from displaying application user interfaces corresponding to the second application when the computer system is in the second mode.

In some embodiments, the fifth settings user interface comprises a respective selectable option for each application of a plurality of applications (e.g., a plurality of applications installed on the computer system, and/or a plurality of applications installed on the computer system configured to generate low power state application user interfaces), wherein an enabled state of a respective selectable option corresponding to (e.g., corresponding uniquely to) a respective application enables the computer system to display application user interfaces (e.g., one or more low power application user interfaces) corresponding to the respective application when the computer system is in the second mode, and a disabled state of the respective selectable option prohibits the computer system from displaying application user interfaces corresponding to the respective application when the computer system is in the second mode.

In some embodiments, the method further comprises: while the computer system is in the first mode, displaying a first application user interface corresponding to (e.g., generated by) the first application via the display generation component; while displaying the first application user interface, detecting that the computer system has met one or more criteria for transitioning from the first mode to the second mode; and in response to detecting that the computer system has met the one or more criteria for transitioning from the first mode to the second mode: in accordance with a determination that the eleventh selectable option is in the enabled state (e.g., regardless of the state of the twelfth selectable option), displaying a second application user interface corresponding to (e.g., generated by) the first application while the computer system is in the second mode (e.g., a second application user interface corresponding to the first application user interface (e.g., a low power version of the first application user interface)); and in accordance with a determination that the eleventh selectable option is in the disabled state (e.g., regardless of the state of the twelfth selectable option), forgoing display of the second application user interface while the computer system is in the second mode (e.g., displaying a user interface that does not correspond to (e.g., is not generated by) the first application, and/or forgoing displaying any content).

In some embodiments, the method further comprises: while the computer system is in the first mode, displaying a third application user interface corresponding to (e.g., generated by) the second application via the display generation component; while displaying the third application user interface, detecting that the computer system has met one or more criteria, for transitioning from the first mode to the second mode; and in response to detecting that the computer system has met the one or more criteria for transitioning from the first mode to the second mode: in accordance with a determination that the twelfth selectable option is in the enabled state (e.g., regardless of the state of the eleventh selectable option), displaying a fourth application user interface corresponding to (e.g., generated by) the second application while the computer system is in the second mode (e.g., a fourth application user interface corresponding to the third application user interface (e.g., a low power version of the third application user interface)); and in accordance with a determination that the twelfth selectable option is in the disabled state (e.g., regardless of the state of the eleventh selectable option), forgoing display of the fourth application user interface while the computer system is in the second mode (e.g., displaying a user interface that does not correspond to (e.g., is not generated by) the second application, and/or forgoing displaying any content).

Providing options that enable a user to enable or disable display of application user interfaces for individual applications when the computer system is in the second mode enhances security and can prevent unauthorized users from viewing sensitive information by allowing a user to disable display of application user interfaces for one or more applications in the second mode). Providing options that enable a user to enable or disable display of application user interfaces for individual applications when the computer system is in the second mode also enhances the operability of the device and makes the user-device interface more efficient (e.g., by restricting unauthorized access) which, additionally, reduces power usage and improves battery life of the device by limiting the performance of restricted operations.

Providing options that enable a user to enable or disable display of application user interfaces for individual applications when the computer system is in the second mode also reduces power usage and improves the battery life of the device (e.g., by allowing a user to disable display of application user interfaces for one or more applications in the second mode, which conserves energy by conserving computing resources required to compute and/or display the application user interfaces).

Note that details of the processes described above with respect to method 900 (e.g., FIGS. 9A-9B) are also applicable in an analogous manner to the methods described below and/or above. For example, methods 700 and/or 1100 optionally include one or more of the characteristics of the various methods described above with reference to method 900. For example, in some embodiments, the first mode is the same throughout these methods and the second mode is the same throughout these methods. For brevity, these details are not repeated below.

FIGS. 10A-10K illustrate exemplary user interfaces with managed display usage, in accordance with some embodiments. The user interfaces in these figures are used to illustrate the processes described below, including the processes in FIGS. 11A-11B.

In particular, FIGS. 10A-10K illustrate techniques for managing display usage by altering one or more aspects (e.g., visual characteristics) of a displayed user interface upon determining that the device has met mode change criteria, such as the mode change criteria described in greater detail above.

Figures 10A, 10B:
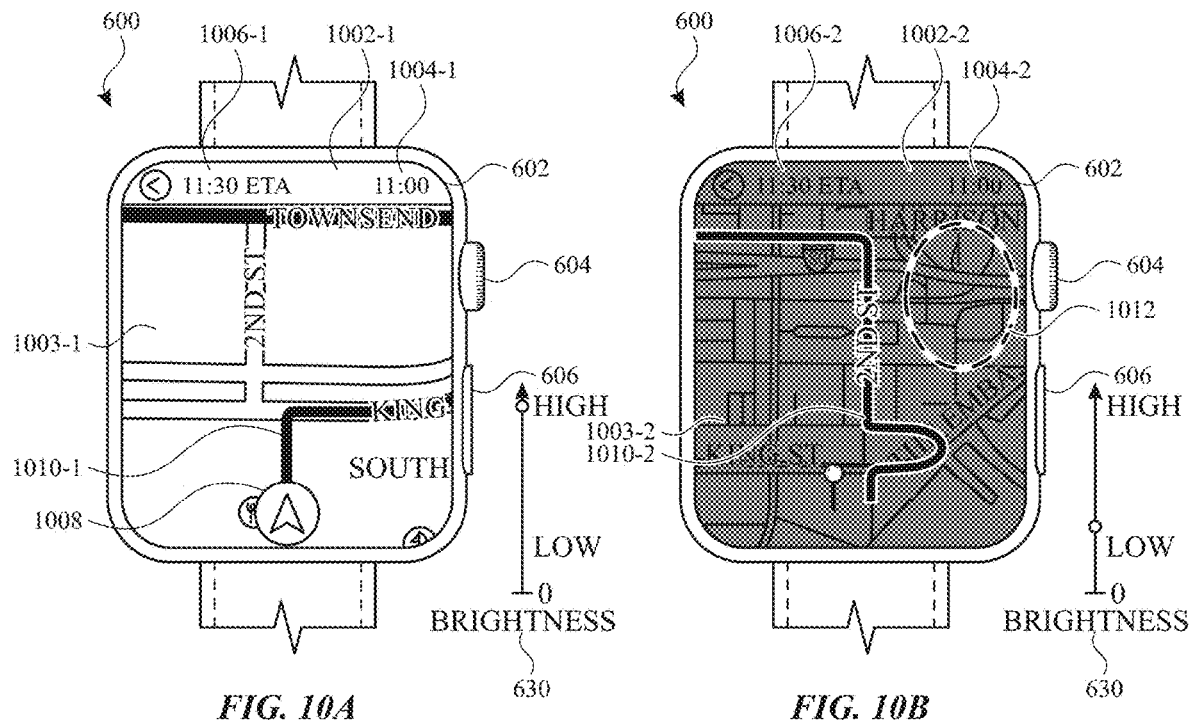
FIGS. 10A-10K illustrate exemplary user interfaces with managed display usage in accordance with some embodiments.

At FIG. 10A, while operating in a standard display mode (e.g., a higher power consumption display mode), device 600 displays map user interface 1002-1 (e.g., a higher power consumption user interface) on display 602 at a standard display brightness level. As illustrated in FIG. 10A, map user interface 1002-1 includes a plurality of user interface elements, including geographic map 1003-1, current time indication 1004-1, estimated arrival time indication 1006-1, current location indication 1008, and route indication 1010-1. Current time indication 1004-1 displays a current time. Route indication 1010-1 displays, on geographic map 1003-1, a proposed route from a starting location to a destination location. Estimated arrival time indication 1006-1 indicates an estimated time at which a user of device 600 will arrive at the destination location. Current location indication 1008 indicates, on geographic map 1003-1, a current geographic location of device 600.

In FIG. 10A, while device 600 is operating in the standard display mode, device 600 periodically updates an appearance of map user interface 1002-1 (e.g., an appearance of one or more elements of map user interface 1002-1) at a first update frequency (e.g., more than once per second, every tenth of a second, and/or every hundredth of a second). In some embodiments, all elements of map user interface 1002-1 are updated at the first update frequency. In some embodiments, different elements of map user interface 1002-1 are updated at different update frequencies.

FIG. 10B illustrates device 600 after determining that one or more mode change criteria have been met (e.g., detecting a wrist-down gesture using, for example, motion sensors; and/or determining that no input of certain types have been detected and/or received for a threshold duration of time). In response, device 600 transitions out of the standard display mode and into a low power display mode (e.g., from a higher power consumption mode to a lower power consumption mode). Furthermore, in response to determining that the one or more mode change criteria have been met, device 600 ceases to display map user interface 1002-1 (e.g., a higher power consumption user interface), and displays map user interface 1002-2 (e.g., a lower power consumption user interface). Map user interface 1002-2 includes geographic map 1003-2, current time indication 1004-2, estimated arrival time indication 1006-2, and route indication 1010-2. Each of the elements shown in map user interface 1002-2 correspond to a respective element of map user interface 1002-1.

At FIG. 10B, while operating in the low power display mode, device 600 displays map user interface 1002-2 on display 602. Map user interface 1002-2 is displayed at a lower brightness level than map user interface 1002-1 (e.g., the overall brightness level or the average of the brightness values of pixels constituting map user interface 1002-2 on display 602 is less than the brightness level of map user interface 1002-1 on display 602). In some embodiments, map user interface 1002-2 is displayed at a fixed percentage of the brightness level at which device 600 displays map user interface 1002-1. In some embodiments, map user interface 1002-2 is displayed at a brightness level based at least in part on an ambient light level detected by one or more sensors of device 600 (e.g., higher ambient light levels result in higher brightness levels while in low power display mode).

Corresponding elements in map user interface 1002-2 are displayed by device 600 differently than they were previously displayed in map user interface 1002-1. For example, in FIG. 10B, geographic map 1003-2 is displayed at a lower brightness level (e.g., in a darker color and/or in a darker set of colors) than geographic map 1003-1 was displayed.

In some embodiments, the change in brightness levels between corresponding user interface elements in map user interface 1002-1 and 1002-2 are not uniform. In some embodiments, device 600 displays one or more elements in map user interface 1002-2 at a reduced size compared to their corresponding elements in map user interface 1002-1.

Furthermore, as discussed above, while device 600 was operating in the standard display mode, device 600 periodically updated one or more elements of map user interface 1002-1, including geographic map 1003-1, at a first update frequency. In FIG. 10B, while device 600 is operating in the low power display mode, device 600 periodically updates one or more elements of map user interface 1002-2, including geographic map 1003-2, at a second update frequency that is less than the first update frequency (e.g., the second update frequency corresponds to less frequent updates than the first update frequency) (e.g., every 30 seconds and/or every minute).

In addition to displaying geographic map 1003-2 at a lower brightness level than geographic map 1003-1, device 600 also displays geographic map 1003-2 at a different zoom level than geographic map 1003-1 was displayed. In FIG. 10A, while operating in the standard display mode, device 600 displayed geographic map 1003-1 at a first zoom level. As shown in FIG. 10B, when device 600 is operating in the low power display mode, geographic map 1003-2 is displayed at a second zoom level that represents a zoomed out zoom level (e.g., displays a greater geographic area) compared to geographic map 1003-1. In some embodiments, zooming out geographic map 1003-2 works in tandem with the decreased update frequency of geographic map 1003-2 while device 600 is in the low power mode. When device 600 is operating in the standard display mode, and the appearance of geographic map 1003-1 is being updated frequently, geographic map 1003-1 can be zoomed in to a greater degree because geographic map 1003-1 will refresh and update very frequently. However, when device 600 is operating in the low power display mode, geographic map 1003-2 is updated much less frequently (e.g., once every minute). As such, zooming out geographic map 1003-2 will allow a user to view more context (e.g., view a greater geographic region) so that the user will be able to view necessary information even as geographic map 1003-2 is updated less frequently. In the depicted embodiment, geographic map 1003-2 does not include a current location indication, as the infrequent updates to map user interface 1002-2 while device 600 is in the low power display mode will likely lead to current location indication displaying out of date and/or incorrect information.

Figures 10C, 10D:
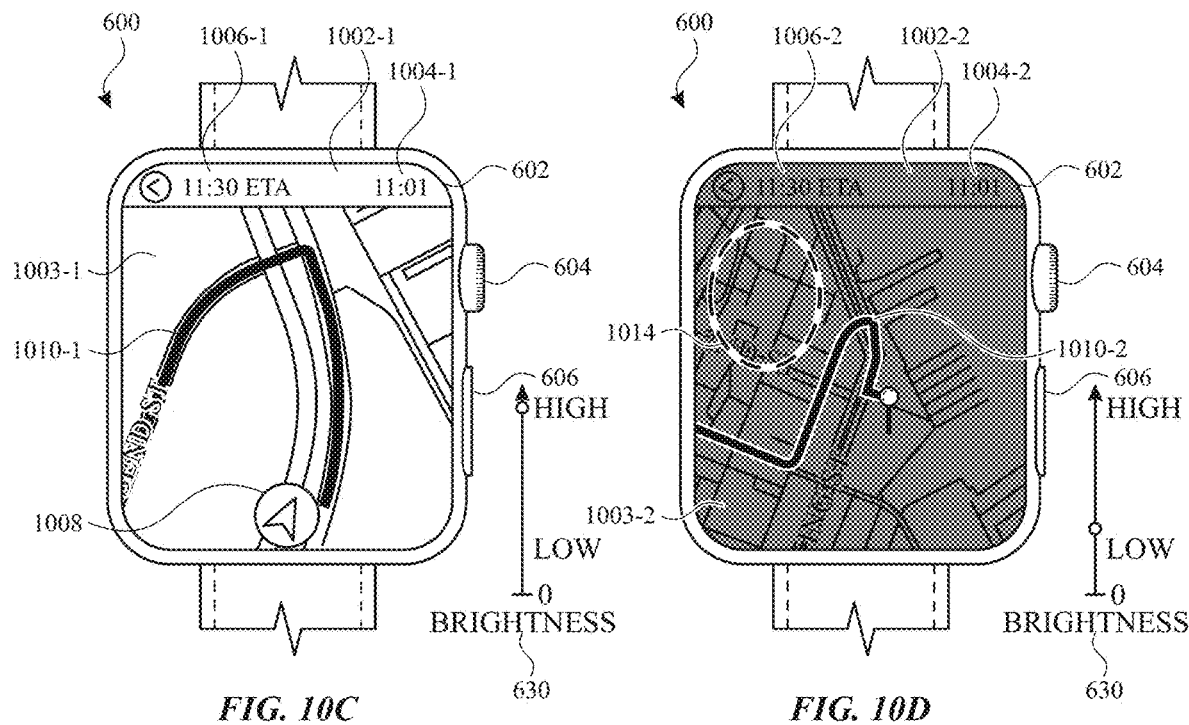

At 1013, while operating in the low power display mode and displaying map user interface 1002-2, device 600 detects input 1012 (e.g., a tap input and/or a non-tap input). At FIG. 10C, in response to detecting input 1012, device 600 transitions from the low power display mode to the standard display mode, and replaces display of map user interface 1002-2 with map user interface 1002-1. Map user interface 1002-1 is displayed at a higher brightness level than map user interface 1002-2 (e.g., the overall brightness level or the average of the brightness values of pixels constituting map user interface 1002-1 on display 602 is greater than the brightness level of map user interface 1002-2 on display 602). In FIG. 10C, device 600 periodically updates the appearance of one or more elements of map user interface 1002-1, including geographic map 1003-1, at the first update frequency, which is greater than the second update frequency, map user interface 1002-1 re-displays current location indication 1008, and map 1010-1 is displayed at the first (e.g., zoomed-in) zoom level, Geographic map 1003-1, in FIG. 10C, has been shifted compared to what was displayed in FIG. 10A in response to device 600's updated current location.

FIG. 10D illustrates device 600 after determining that one or more mode change criteria have been met. Again, in response, device 600 transitions out of the standard display mode and into the low power display mode (e.g., from a higher power consumption mode to a lower power consumption mode). Furthermore, in response to determining that the one or more mode change criteria have been met, device 600 ceases to display map user interface 1002-1 (e.g., a higher power consumption user interface), and displays map user interface 1002-2 (e.g., a lower power consumption user interface). As discussed above, while device 600 operates in the low power display mode, and displays map user interface 1002-2, geographic map 1003-2 is displayed at the second zoom level, and one or more elements of map user interface 1002-2 are updated at the second update frequency that is less than the first update frequency. Geographic map 1003-2, in FIG. 10D, has been shifted compared to what was displayed in FIG. 10B in response to device 600's updated current location.

At FIG. 10D, while operating in the low power display mode and displaying map user interface 1002-2, device 600 detects input 1014 (e.g., a tap input and/or a non-tap input).

Figures 10E, 10F:
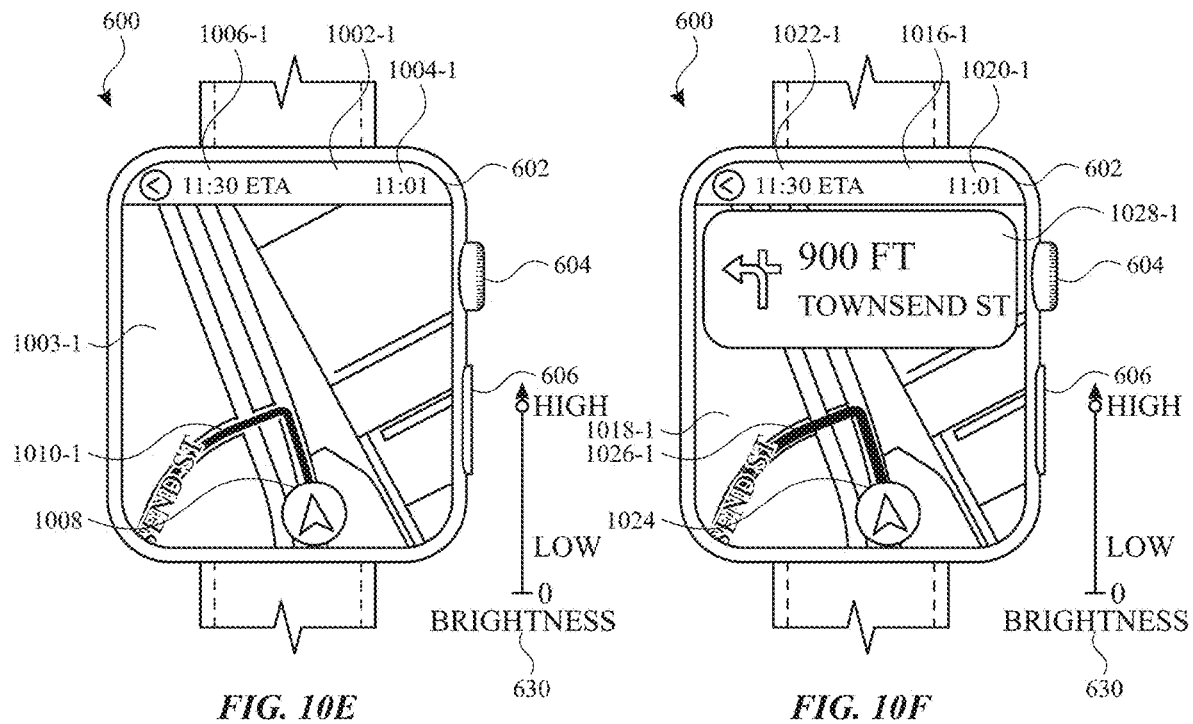

At FIG. 10E, in response to detecting input 1014, device 600 once again transitions from the low power display mode to the standard display mode, and replaces display of map user interface 1002-2 with map user interface 1002-1. Map user interface 1002-1 is displayed at a higher brightness level than map user interface 1002-2. In FIG. 10E, device 600 periodically updates geographic map 1003-1 at the first update frequency, which is greater than the second update frequency, map user interface 1002-1 re-displays current location indication 1008, and map 1010-1 is displayed at the first (e.g., zoomed-in) zoom level. Geographic map 1003-1, in FIG. 10E, has once again been shifted compared to what was displayed in FIG. 10C in response to device 600's updated current location.

FIGS. 10F-10K illustrate various example scenarios and embodiments with reference to example navigation (e.g., turn-by-turn navigation) user interfaces. At FIG. 10F, while operating in a standard display mode (e.g., a higher power consumption display mode), device 600 displays navigation user interface 1016-1 (e.g., a higher power consumption user interface) on display 602 at a standard brightness level. As illustrated in FIG. 10F, navigation user interface 1016-1 includes a plurality of user interface elements, including geographic map 1018-1, current time indication 1020-1, estimated arrival time indication 1022-1, current location indication 1024, route indication 1026-1, and next direction indication 1028-1. Current time indication 1020-1 displays a current time. Route indication 1026-1 displays, on geographic map 1018-1, a proposed route from a starting location to a destination location. Estimated arrival time indication 1022-1 indicates an estimated time at which a user of device 600 will arrive at the destination location. Current location indication 1024 indicates, on geographic map 1018-1, a current geographic location of device 600. Next direction indication 1028-1 displays information pertaining to a next upcoming navigation instruction. In FIG. 10F, while device 600 is operating in the standard display mode, next direction indication 1028-1 includes a direction (e.g., straight, left, right) associated with a next upcoming navigation instruction, a street name associated with the next upcoming navigation instruction (e.g., "Townsend Street"), and a distance to the next upcoming navigation instruction (e.g., "900 ft").

In FIG. 10F, while device 600 is operating in the standard display mode, device 600 periodically updates an appearance of navigation user interface 1016-1 (e.g., an appearance of one or more elements of navigation user interface 1016-1) at a first update frequency (e.g., more than once per second, every tenth of a second, and/or every hundredth of a second). In some embodiments, all elements of navigation user interface 1016-1 are updated at the first update frequency. In some embodiments, different elements of navigation user interface 1016-1 are updated at different update frequencies.

Figures 10G, 10H:
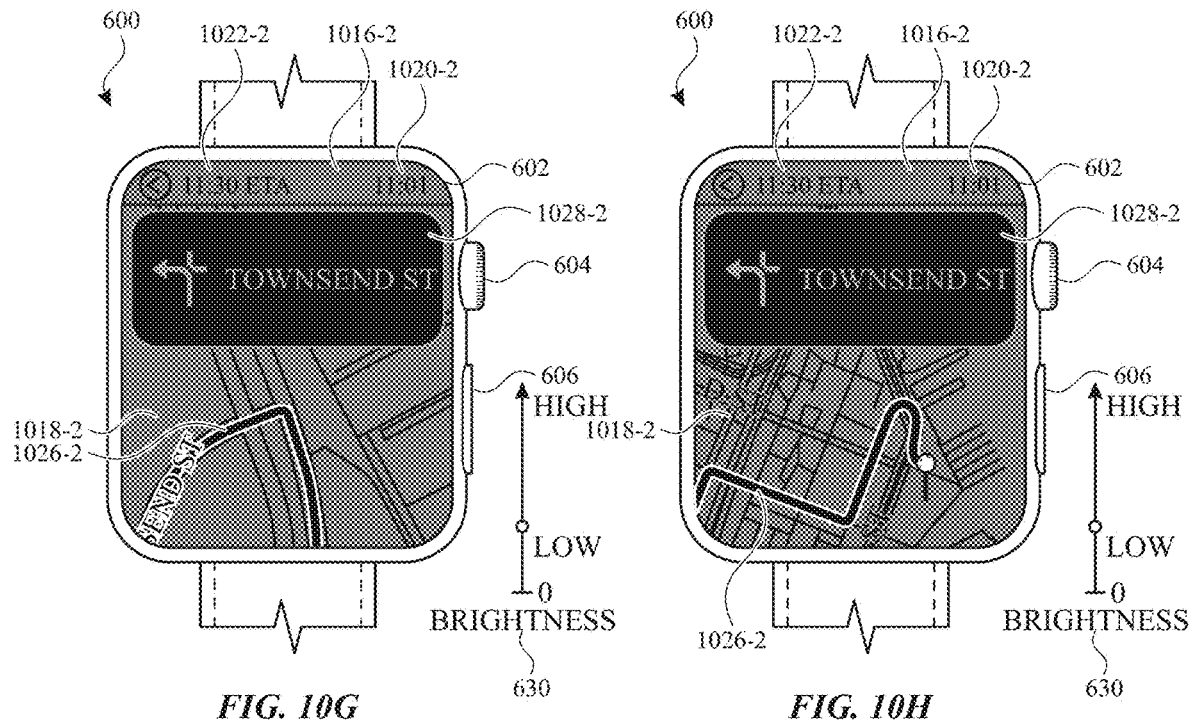

FIG. 10G illustrates device 600 after determining that one or more mode change criteria have been met (e.g., detecting a wrist-down gesture using, for example, motion sensors; and/or determining that no input of certain types have been detected and/or received for a threshold duration of time). In response to determining that the one or more mode change criteria have been met, device 600 transitions out of the standard display mode and into a low power display mode (e.g., from a higher power consumption mode to a lower power consumption mode). Furthermore, in response to determining that the one or more mode change criteria have been met, device 600 ceases to display navigation user interface 1016-1 (e.g., a higher power consumption user interface), and displays navigation user interface 1016-2 (e.g., a lower power consumption user interface). Navigation user interface 1016-2 includes geographic map 1018-2, current time indication 1020-2, estimated arrival time indication 1022-2, route indication 1026-2, and next direction indication 1028-2. Each of the elements shown in navigation user interface 1016-2 correspond to a respective element of navigation user interface 1016-1.

At FIG. 10G, while operating in the low power display mode, device 600 displays navigation user interface 1016-2 on display 602. Navigation user interface 1016-2 is displayed at a lower brightness level than navigation user interface 1016-1 (e.g., the overall brightness level or the average of the brightness values of pixels constituting navigation user interface 1016-2 on display 602 is less than the brightness level of navigation user interface 1016-1 on display 602). In some embodiments, navigation user interface 1016-2 is displayed at a fixed percentage of the brightness level at which device 600 displays navigation user interface 1016-1. In some embodiments, navigation user interface 1016-2 is displayed at a brightness level based at least in part on an ambient light level detected by one or more sensors of device 600 (e.g., higher ambient light levels result in higher brightness levels while in low power display mode).

As discussed above, while device 600 was operating in the standard display mode, device 600 periodically updated the appearance of one or more elements of navigation user interface 1016-1, including geographic map 1018-1, at a first update frequency. In FIG. 10G, while device 600 is operating in the low power display mode, device 600 periodically updates the appearance of one or more elements of navigation user interface 1016-2, including geographic map 1018-2, at a second update frequency that is less than the first update frequency (e.g., the second update frequency corresponds to less frequent updates than the first update frequency) (e.g., every 30 seconds and/or every minute).

Corresponding elements in navigation user interface 1016-2 are displayed by device 600 differently than they were previously displayed in navigation user interface 1016-1. For example, in FIG. 10G, geographic map 1018-2 and next direction indication 1028-2 are displayed at lower brightness levels (e.g., in darker colors and/or in a darker set of colors) than geographic map 1018-1 and next direction indication 1028-1 were displayed. In the depicted embodiment, navigation user interface 1016-2 does not include a current location indication, as the less frequent updates to navigation user interface 1016-2 while device 600 is in the low power display mode may lead to a current location indication displaying out of date and/or incorrect information. Similarly, next direction indication 1028-2 does not include distance information for the next upcoming navigation instruction, which was included in next direction indication 1028-1. Again, due to the less frequent updates to navigation user interface 1016-2 while device 600 is in the low power display mode, it is possible that displaying such distance information could result in inaccurate information.

As discussed above with reference to map user interface 1002-1 and map user interface 1002-2 in FIGS. 10A-10E, in some embodiments and in some scenarios, one or more user interface elements are shown at different zoom levels when transitioning between the standard display mode and the low power display mode. In some embodiments, if device 600 is displaying turn-by-turn navigation directions (e.g., as in navigation user interface 1016-1) when transitioning from the standard display mode to the low power display mode, the corresponding low power consumption user interface that is displayed when device 600 is in the low power display mode does not change zoom levels from the higher power consumption user interface. In accordance with such embodiments, FIG. 10G depicts navigation user interface 1016-2 at the same zoom level as navigation user interface 1016-1 in FIG. 10F. In other embodiments, the low power consumption user interface is displayed at a different zoom level from the higher power consumption user interface in a manner similar to what was described above with reference to map user interface 1002-1 and map user interface 1002-2. In accordance with such embodiments, FIG. 10H depicts navigation user interface 1016-2 at a different zoom level (e.g., at a more zoomed out zoom level) than navigation user interface 1016-1.

Figure 10I:
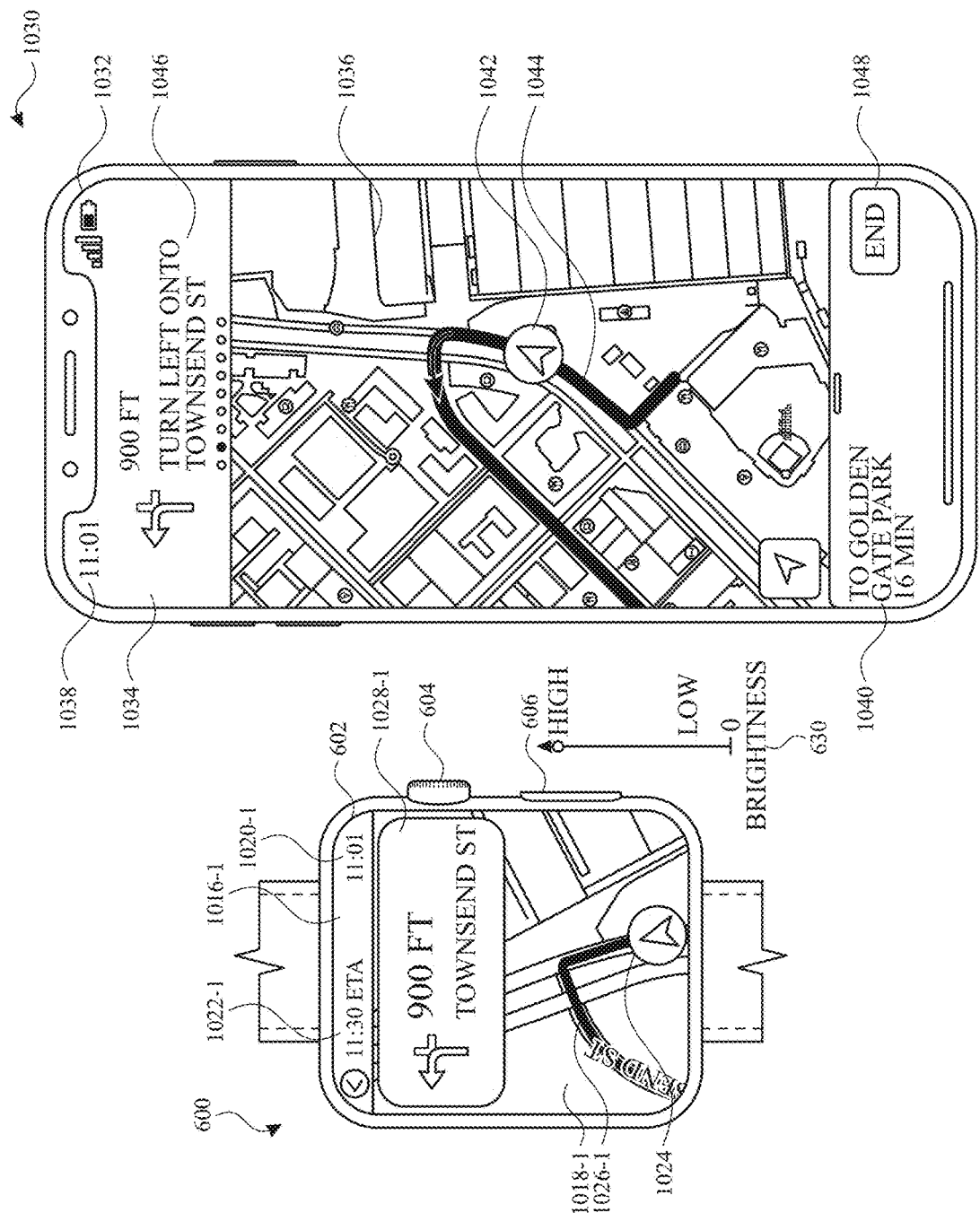
Figure 10J:
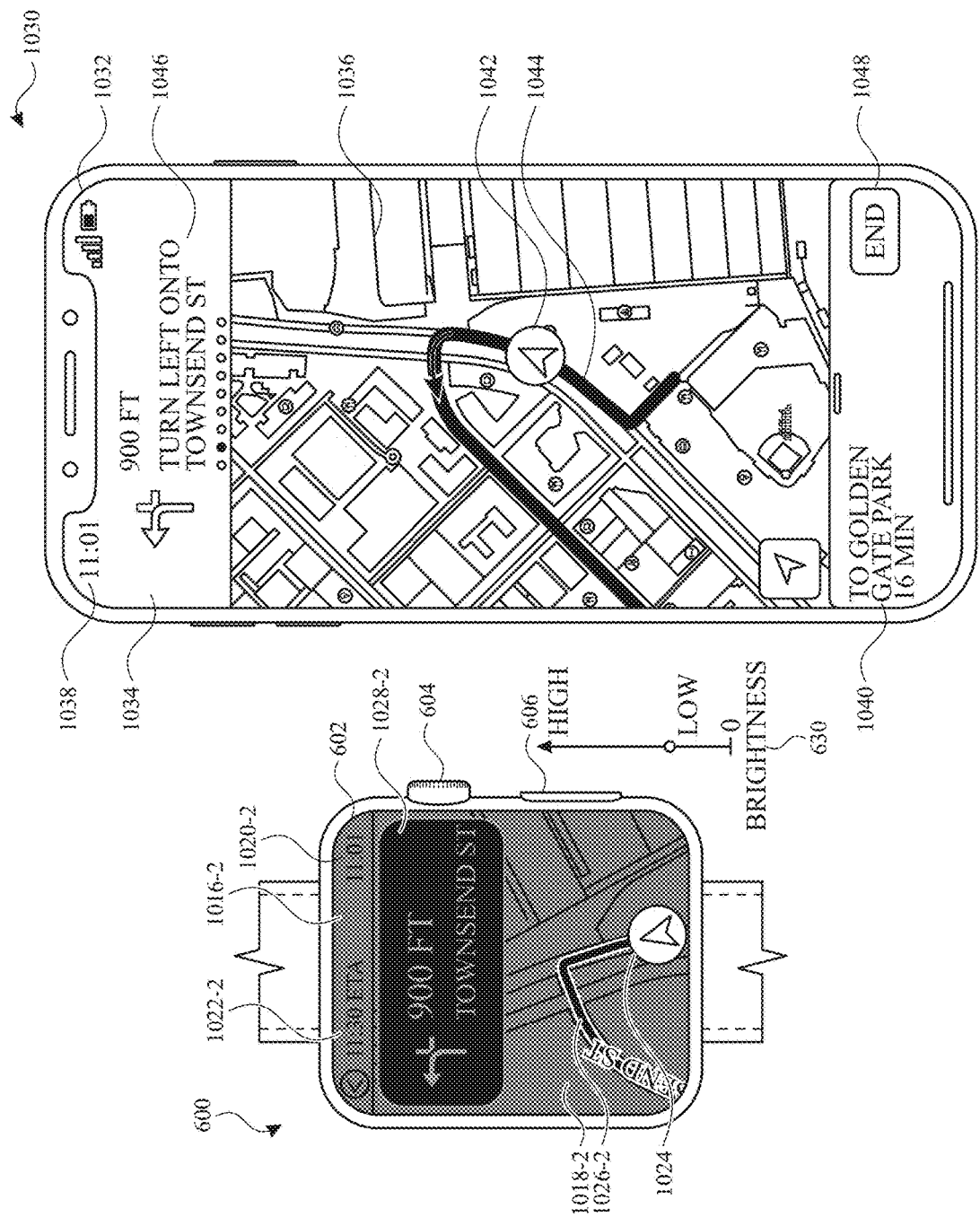
Figure 10K:
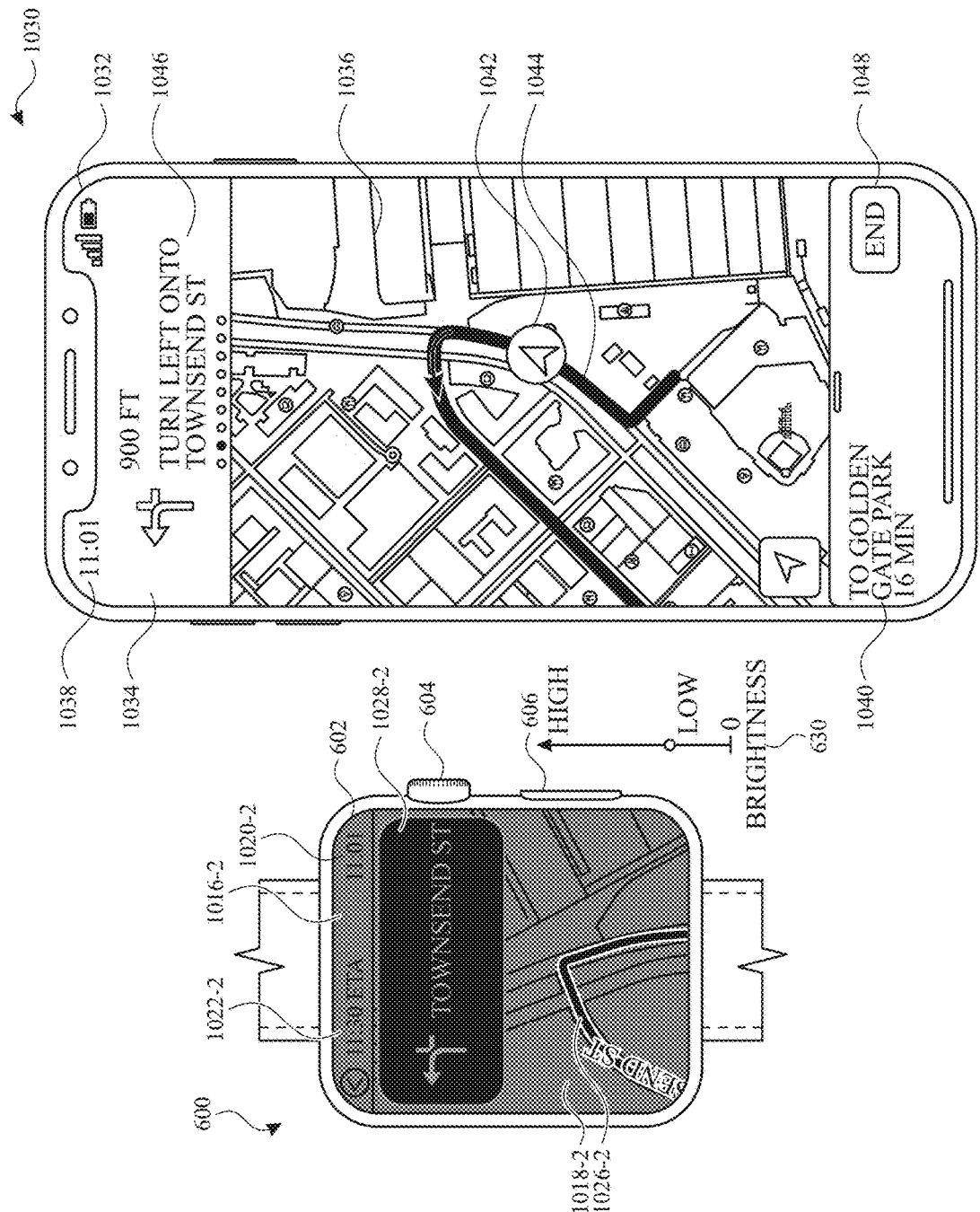

FIGS. 10I-10K depict various example scenarios and embodiments in which device 600 receives information (e.g., navigation information) from another device while device 600 is in the low power display mode. At FIG. 10I, device 600 (e.g., a smartwatch) is wirelessly connected to device 1030 (e.g., a smart phone) that has display 1032. In the depicted embodiment, device 1030 displays, via display 1032, navigation user interface 1034. Navigation user interface 1034 includes geographic map 1036, current time indication 1038, estimated arrival time indication 1040, current location indication 1042, route indication 1044, next direction indication 1046, and button 1048. Device 600, operating in the standard display mode, displays a corresponding navigation user interface 1016-1 at a standard display brightness level. In the depicted scenario, device 600 receives navigation information from device 1030, and displays navigation user interface 1016-1 based on the navigation information received from device 1030. Accordingly, in the example scenario shown in FIG. 10I, device 600 conserves battery power, as it does not have to perform computationally intensive work to calculate and determine navigation information. Rather, device 600 displays navigation user interface 1016-1 based on navigation information received from (e.g., and calculated by) device 1030.

At FIG. 10I, while operating in the standard display mode and displaying navigation user interface 1016-1, device 600 determines that one or more mode change criteria have been met. In response to this determination, device 600 transitions from the standard display mode to a low power display mode. In response to the determination that the one or more mode change criteria have been met, device 600 also ceases display of navigation user interface 1016-1 (e.g., a higher power consumption user interface), and displays navigation user interface 1016-2 (e.g., a lower power consumption user interface). FIGS. 10J and 10K show two different embodiments of navigation user interface 1016-2.

As discussed above, in some embodiments, when device 600 is operating in the standard display mode, device 600 periodically updates the appearance of navigation user interface 1016-1 at a first update frequency, and when device 600 is operating in the low power display mode, device 600 periodically updates the appearance of navigation user interface 1016-2 at a second update frequency that is lower than the first update frequency. In some embodiments, if device 600 is receiving navigation information from the other device (e.g., device 1030) and displaying navigation user interface 1016-2 based on the received navigation information, device 600, while in the low power display mode, periodically updates the appearance of navigation user interface 1016-2 at a third update frequency that is greater than the second update frequency. This may be implemented, for example, to take advantage of the decreased power consumption that is achieved by receiving navigation information from device 1030. In FIG. 10J, device 600, operating in the low power display mode, displays navigation user interface 1016-2, and periodically updates the appearance of navigation user interface 1016-2 at a third update frequency that is greater than the second update frequency. Furthermore, in FIG. 10J, based on device 600 being tethered to device 1030 and receiving navigation information from device 1030, next direction indication 1028-2 includes distance information to a next upcoming navigation direction, and navigation user interface 1016-2 displays current location indication 1024.

In other embodiments, if device 600 is tethered and/or connected to another device, and is receiving navigation information from the other device (e.g., device 1030), device 600, while in the low power display mode, periodically updates the appearance of navigation user interface 1016-2 at a fourth update frequency that is less than the second update frequency. FIG. 10K depicts an example embodiment in which device 600, operating in the low power display mode, displays navigation user interface 1016-2, and periodically updates the appearance of navigation user interface 1016-2 at the fourth update frequency that is less than the second update frequency. This may be implemented, for example, due to the fact that navigation instructions are already being displayed on device 1030 and, as such, it is less important that timely and/or frequently updated navigation instructions also be displayed on device 600. In FIG. 10K, navigation user interface 1016-2 is identical to the embodiment depicted in FIG. 10G, FIGS. 11A-11B are a flow diagram illustrating a method for managing display usage using an electronic device in accordance with some embodiments. Method 1100 is performed at a device (e.g., 100, 300, 500) with a display. Some operations in method 1100 are, optionally, combined, the orders of some operations are, optionally, changed, and some operations are, optionally, omitted.

As described below, method 1100 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

In some embodiments, a computer system (e.g., a smart phone, a smart watch, and/or a tablet) that is in communication with a display generation component (e.g., a display controller; a touch-sensitive display system; and/or a display (e.g., integrated and/or connected)), while the computer system is in a first mode (1102) (e.g., a higher power consumption mode (e.g., a mode that corresponds to higher power consumption than a lower power consumption mode) (e.g., a mode that corresponds to a brighter display, increased performance, and/or more frequent display updates)), displays (1104), via the display generation component, a first user interface (e.g., 1002-1) that is associated with (e.g., generated by) a first application and that includes a first set of one or more user interface elements (e.g., 1004-1, 1006-1, 1010-1, 1003-1, 1008) including a first user interface element, wherein: the appearance of the first user interface element (e.g., 1003-1) is periodically updated at a first update frequency (in some embodiments, the appearance of the first set of one or more user interface elements is updated according to the first update frequency; in some embodiments, the appearance of a subset of the first set of one or more user interface elements is updated according to the first update frequency), and the first user interface is displayed at a first zoom level (e.g., FIG. 10A).

While displaying the first user interface (1106) (e.g., 1002-1), the computer system detects (1108) that the computer system has met one or more criteria for transitioning from the first mode to a second mode (e.g., a lower power consumption mode (e.g., lower power consumption in the second mode than in the first mode)) (e.g., reaching a duration of time since a last input, a wrist down gesture, and/or a hand cover gesture).

In response to detecting that the computer system has met the one or more criteria for transitioning from the first mode to the second mode (1110), the computer system displays (1112) a second user interface (e.g., 1002-2) that is different from the first user interface and is associated with (e.g., generated by) the first application, wherein: the second user interface corresponds to the first user interface and is displayed at a location that occupies at least a portion of a display region that was occupied by the first user interface, the second user interface includes a second set of one or more user interface elements (e.g., 1004-2, 1006-2, 1003-2, 1010-2) including a second user interface element (e.g., 1003-2) (in some embodiments, at least some of the second set of one or more user interface elements correspond to at least some of the first set of one or more user interface elements) (in some embodiments, the second user interface element corresponds to the first user interface element (e.g., is a low power version of the first user interface element)), the appearance of the second user interface element is periodically updated at a second update frequency that is different from the first update frequency and corresponds to a lower update frequency than the first update frequency, and the second user interface is displayed at a second zoom level different from the first zoom level. In some embodiments, the second user interface represents a zoomed out view of the first user interface.

In some embodiments, the second user interface is a lower power user interface and the first user interface is a higher power user interface (in some embodiments, the lower power user interface differs from the higher power interface in one or more visual characteristics (e.g., size of elements, color, hue, saturation, opacity, shape, and/or frequency of updates))). In some embodiments, displaying the second user interface includes replacing display of the first user interface with the second user interface.

In some embodiments, the method further comprises: after displaying the second user interface at the second zoom level, detecting that the computer system has met one or more criteria for transitioning from the second mode to the first mode (e.g., a wrist up gesture, a tap input, a button input, a rotatable and/or depressible input mechanism input); and in response to detecting that the computer system has met the one or more criteria for transitioning from the second mode to the first mode, displaying the first user interface (e.g., replacing display of the second user interface with the first user interface), wherein the first user interface corresponds to the second user interface and is displayed at a location that occupies at least a portion of a display region that was occupied by the second user interface; the first user interface includes the first set of one or more user interface elements including the first user interface element, the first user interface element is periodically updated at the first update frequency; and the first user interface is displayed at the first zoom level.

Updating the second user interface element at a reduced update frequency when the computer system is in the second mode reduces power usage and improves the battery life of the device, while still providing periodic updates to the second user interface element.

Changing a zoom level of the user interface when the computer system is in the second mode and when the second user interface element is updated at a reduced update frequency provides the user with more visual context when additional context may be needed (e.g., when updates are provided less frequency, additional context provides the user with more information that may be required between update intervals), thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second zoom level represents a zoomed out zoom level relative to the first zoom level (e.g., map 1003-2 in FIG. 10B is zoomed out compared to map 1003-1 in FIG. 10A) (e.g., the first user interface displayed at the first zoom level displays a first set of content, and the second zoom level displays additional content surrounding the first set of content). Zooming out the user interface when the computer system is in the second mode and when the second user interface element is updated at a reduced update frequency provides the user with more visual context when additional context may be needed (e.g., when updates are provided less frequency than they are in the higher power state, additional context provides the user with more information that may be required between update intervals), thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user interface (e.g., 1002-1) comprises a first geographic map (e.g., 1003-1), Updating a geographic map at a reduced update frequency when the computer system is in the second mode reduces power usage and improves the battery life of the device, while still providing periodic updates to the geographic map.

In some embodiments, the second user interface (e.g., 1002-2) comprises a second geographic map (e.g., 1003-2) that uses a different color scheme than the first geographic map (e.g., 1003-1) (e.g., a second geographic map different from the first geographic map) (e.g., a second geographic map that corresponds to the first geographic map) (in some embodiments, the second geographic map is a zoomed out version of the first geographic map (e.g., the first geographic map depicts a first geographic region, and the second geographic map includes the first geographic region, and also includes an additional region adjacent to and/or surrounding the first geographic region). Updating a geographic map at a reduced update frequency when the computer system is in the second mode reduces power usage and improves the battery life of the device, while still providing periodic updates to the geographic map.

In some embodiments, the first geographic map (e.g., 1003-1) comprises a location indicator user interface element (e.g., 1008) indicative of a current location of the computer system within the first geographic map; and the second geographic map (e.g., 1003-2) does not include the location indicator user interface element (e.g., FIG. 10B). In some embodiments, the second geographic map does not include any location indicator user interface element indicative of the current location of the computer system. In some embodiments, the second geographic map includes a location indicator that indicates a less precise location than the location indicator in the first geographic map. Ceasing display of a location indicator user interface element when the computer system is in the second mode reduces power usage and improves the battery life of the device (e.g., by devoting fewer computing resources to determining the current location of the computer system and/or by displaying fewer user interface elements). Ceasing display of the location indicator user interface element when the second user interface element is being updated at a decreased frequency also provides more accurate visual feedback to the user by ensuring that the user is not presented with an out of date or inaccurate location indicator, thereby providing the user with improved visual feedback. Providing improved visual feedback to the user enhances the operability of the device and makes the user-device interface more efficient (e.g., by helping the user to provide proper inputs and reducing user mistakes when operating/interacting; with the device) which, additionally, reduces power usage and improves battery life of the device by enabling the user to use the device more quickly and efficiently.

In some embodiments, the first user interface comprises one or more geographic navigation directions (e.g., 1010-1, 1028-1) (e.g., route directions from a starting destination to a final destination, and/or turn-by-turn directions). Updating a user interface with one or more geographic navigation directions at a reduced update frequency when the computer system is in the second mode reduces power usage and improves the battery life of the device.

In some embodiments, while the computer system is in the first mode, the computer system displays, via the display generation component, a third user interface (e.g., 1016-1) that is associated with a second application, wherein: the third user interface includes turn by turn navigation directions (e.g., 1028-1) (e.g., navigation directions that are periodically and/or automatically updated based on a current position of the computer system), and the third user interface is displayed at a third zoom level (e.g., FIG. 10F). While displaying the third user interface, the computer system detects that the computer system has met one or more criteria for transitioning from the first mode to the second mode. In response to detecting that the computer system has met one or more criteria for transitioning from the first mode to the second mode, the computer system displays a fourth user interface (e.g., 1016-2) that is different from the third user interface and is associated with (e.g., generated by) the second application, wherein: the fourth user interface corresponds to the third user interface and is displayed at a location that occupies at least a portion of a display region that was occupied by the third user interface, the fourth user interface includes turn by turn navigation directions (e.g., 1028-2), and the fourth user interface is displayed at the third zoom level (e.g., FIG. 10G). In some embodiments, if a user interface displayed in the first mode (e.g., a higher power consumption mode) includes turn by turn navigation directions, a corresponding user interface in the second mode (e.g., a lower power consumption mode) (e.g., a lower power version of the user interface) is displayed at the same zoom level as the user interface in the first mode. Forgoing changing the zoom level when the third user interface includes turn by turn navigation directions enhances the operability of the device and makes the user-device interface more efficient (e.g., by ensuring that the user is not disoriented or confused by a change in zoom level, by helping the user to provide proper inputs and reducing user mistakes when operating/interacting with the device) which, additionally, reduces power usage and improves battery life of the device by enabling the user to use the device more quickly and efficiently.

In some embodiments, displaying the first user interface (e.g., 1016-1) includes displaying turn by turn navigation directions (e.g., 1028-1) (e.g., navigation directions that are periodically and/or automatically updated based on a current position of the computer system), including concurrently displaying: a direction corresponding to a next upcoming navigation instruction (e.g., a left turn indication in 1028-1 in FIG. 10F) (e.g., turn left, turn right, merge) a street name corresponding to the next upcoming navigation instruction (e.g., "TOWNSEND ST" in 1028-1 in FIG. 10F); and a distance to the next upcoming navigation instruction (e.g., "900 FT" in 1028-1 in FIG. 10F). In some embodiments, displaying the second user interface (e.g., 1016-2) includes displaying turn by turn navigation directions (e.g., 1028-2), including displaying directions corresponding to the next upcoming navigation instruction (e.g., left turn indication in 1028-2 in FIGS. 10G and 10H) and the street name corresponding to the next upcoming navigation instruction (e.g., "TOWNSEND ST" in FIGS. 10G and 10H) without displaying the distance to the next upcoming navigation instruction (e.g., 1028-2 in FIGS. 10G and 10H). Ceasing display of the distance to the next upcoming navigation instruction when the second user interface element is being updated at a decreased frequency provides more accurate visual feedback to the user by ensuring that the user is not presented with out of date or inaccurate information with respect to distance remaining to a next upcoming navigation instruction, thereby providing the user with improved visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the second user interface is displayed at the second zoom level (e.g., FIGS. 10B, 10D), the computer system detects that the computer system has met one or more criteria for transitioning from the second mode to the first mode (e.g., a wrist raise gesture, and/or a user input (e.g., a touch-screen user input, and/or a user input via a rotatable and/or depressible input mechanism)) (e.g., user inputs 1012, 1014). In response to detecting that the computer system has met the one or more criteria for transitioning from the second mode to the first mode, the computer system displays the first user interface (e.g., replacing display of the second user interface with the first user interface) at the first zoom level (e.g., 1002-1 in FIGS. 10C and 10E).

In some embodiments, the first user interface, when displayed prior to displaying the second user interface, includes (e.g., displays) a first set of information, and the first user interface, when displayed after displaying the second user interface, includes (e.g., displays) a second set of information. In some embodiments, the second set of information is different from the first set of information (e.g., the first user interface at the later point in time after displaying the second user interface displays different information from what was displayed at the earlier point in time when the first user interface was displayed prior to displaying the second user interface). For example, the first user interface prior to displaying the second set of information may display a first map portion based on the device's geographic position at that time, and the first user interface after displaying the second user interface may display a second, different map portion based on the device's new and/or updated geographic position at that later time. Zooming in the user interface when the computer system is in the first mode provides the user with more visual precision and detail when appropriate (e.g., providing a greater level of precision and detail when the computer system is in the first mode and the user interface is being updated at a greater frequency), thereby providing the user with improved visual feedback. Providing improved visual feedback to the user enhances the operability of the device and makes the user-device interface more efficient (e.g., by helping the user to provide proper inputs and reducing user mistakes when operating/interacting, with the device) which, additionally, reduces power usage and improves battery life of the device by enabling the user to use the device more quickly and efficiently.

In some embodiments, the first user interface is displayed (e.g., while the computer system is in the first mode) at a first brightness level (e.g., 1002-1 in FIG. 10A), and the second user interface is displayed (e.g., while the computer system is in the second mode) at a second brightness level different from the first brightness level, wherein the second brightness level is dimmer less bright) than the first brightness level (e.g., 1002-2 in FIG. 10B).

In some embodiments, the first user interface is displayed at a brighter brightness level than the second user interface by increasing a brightness (e.g., a brightness setting) of the display generation component when transitioning from the second mode to the first mode. In some embodiments, the first user interface is displayed at a brighter brightness level than the second user interface by replacing one or more user interface elements of the second user interface with brighter versions of those user interface elements (e.g., user interface elements having a different (e.g., brighter) set of colors). In some embodiments, the first user interface is displayed at a brighter brightness level than the second user interface by both increasing a brightness of the display generation component and replacing one or more user interface elements of the second user interface with brighter versions of those user interface elements.

In some embodiments, when the computer system is in the first mode, the display generation is component is set to a first brightness level, and when the computer system is in the second mode, the display generation component is set to a second brightness level that is dimmer (e.g., less bright) than the first brightness level. In some embodiments, the first user interface is displayed at the first brightness level prior to detecting that the computer system has met the one or more criteria for transitioning from the first mode to the second mode, the second user interface is displayed at the second brightness level after detecting that the computer system has met the one or more criteria for transitioning from the first mode to the second mode and prior to detecting that the computer system has met the one or more criteria for transitioning from the second mode to the first mode, and the first user interface is displayed at the first brightness level after detecting that the computer system has met the one or more criteria for transitioning from the second mode to the first mode.

Dimming the display when the computer system is in the second mode reduces power usage and improves the battery life of the device, while still providing periodic updates to the second user interface element.

In some embodiments, the second user interface element (e.g., 1003-2) corresponds to the first user interface element (e.g., 1003-1) (e.g., is displayed at roughly the same position as the first user interface element; the first user interface element displays a first set of information and the second user interface element displays a second set of information that corresponds to the first set of information; and/or when transitioning from the first user interface to the second user interface, the second user interface element replaces display of the first user interface element). While the computer system is in the first mode, the first user interface element is displayed with a first color (e.g., a first set of colors) (e.g., 1003-1 in FIG. 10A), and while the computer system is in the second mode, the second user interface element is displayed with a second color different from the first color (e.g., a second set of colors different from the first set of colors) (e.g., 1003-2 in FIG. 10B). In some embodiments, transitioning from the first user interface element to the second user interface element and/or transitioning from the first mode to the second mode comprises changing (e.g., replacing) the first color with the second color (e.g., changing the first color in the first user interface element to the second color in the second user interface element). In some embodiments, the first user interface element is displayed with the first color prior to detecting that the computer system has met the one or more criteria for transitioning from the first mode to the second mode, the second user interface element is displayed with the second color after detecting that the computer system has met the one or more criteria for transitioning from the first mode to the second mode and prior to detecting that the computer system has met the one or more criteria for transitioning from the second mode to the first mode, and the first user interface is displayed with the first color after detecting that the computer system has met the one or more criteria for transitioning from the second mode to the first mode. Changing certain colored elements to a different color allows the device reduce the brightness of elements that more significantly affect battery consumption and to mitigate the negative effects of displaying bright content at the same location on the display, such as display burn-in, while at the same time reducing the display brightness, which reduces power usage and improves the battery life of the device.

In some embodiments, the second update frequency is an update frequency of one update per minute. Updating the second user interface element at a reduced update frequency of one update per minute when the computer system is in the second mode reduces power usage and improves the battery life of the device, while still providing periodic updates to the second user interface element.

In some embodiments, in accordance with a determination that the computer system (e.g., 600) is receiving update information for updating the second user interface element (e.g., 1018-2) from an external computer system (e.g., 1030) (e.g., an external computer system that is in communication with (e.g., wirelessly connected to) the computer system), the second update frequency is a third update frequency (e.g., a third update frequency that is different from the first update frequency, and corresponds to a lower update frequency than the first update frequency), and in accordance with a determination that the computer system is not receiving update information for updating the second user interface element from an external computer system (e.g., in accordance with a determination that the computer system is generating update information for updating the second user interface element), the second update frequency is a fourth update frequency different from the third update frequency (e.g., a fourth update frequency that is different from the first update frequency, and corresponds to a lower update frequency than the first update frequency). Modifying an update frequency for the second user interface element based on whether the computer system is receiving update information from an external computer system reduces power usage and improves the battery life of the device, while still providing periodic updates to the second user interface element.

In some embodiments, the third update frequency corresponds to a greater update frequency than the fourth update frequency (e.g., when the computer system is receiving update information from an external computer system, the second user interface element is updated with greater frequency). Increasing an update frequency when the computer system is receiving update information from an external computer system provides the user with more visual precision and detail when appropriate (e.g., providing greater update frequency when other computing resources are being conserved by the computer system because the external computer system is expending its own computing resources to generate and provide update information). Accordingly, the user is provided with improved visual feedback while also optimizing power usage and battery life. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third update frequency corresponds to a lower update frequency than the fourth update frequency (e.g., when the computer system is receiving update information from an external computer system, the second user interface element is updated with lesser frequency). Decreasing an update frequency for the second user interface element when the computer system is receiving update information from an external computer system reduces power usage and improves the battery life of the device, while still providing periodic updates to the second user interface element.

Note that details of the processes described above with respect to method 1100 (e.g., FIGS. 11A-1.1B) are also applicable in an analogous manner to the methods described above. For example, methods 700 and/or 900 optionally include one or more of the characteristics of the various methods described above with reference to method 1100. For example, in some embodiments, the first mode is the same throughout these methods and the second mode is the same throughout these methods. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to manage display usage. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present user interfaces that provide users with relevant information. Accordingly, use of such personal information data enables users to have calculated control of the delivered information. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of display user interfaces with managed display usage, the present technology can be configured to allow users to select to "opt in" or "opt out" of participation in the collection of personal information data during registration for services or anytime thereafter. In another example, users can select certain types of information that is permissible to be displayed (e.g., permissible to be displayed in a low power mode) and can identify other types of information that are not permitted to be displayed (e.g., that are not permitted to be displayed in a low power mode). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the computer system, or publicly available information.

What is claimed is:

1. A computer system that is in communication with a display generation component, comprising:
    one or more processors; and
    memory storing one or more programs configured to be executed by the one or more processors, the one or more programs including instructions for:
        while the computer system is in a first mode, displaying, via the display generation component, a first user interface that includes one or more user interface elements including a first user interface element, where the first user interface is associated with a first application;
        while displaying the first user interface in the first mode, detecting that the computer system has met one or more criteria for transitioning from the first mode to a second mode, wherein the second mode is a lower power mode than the first mode;
        in response to detecting that the computer system has met the one or more criteria for transitioning from the first mode to the second mode, entering the second mode, including displaying a second user interface that is associated with the first application, wherein:
            the second user interface corresponds to the first user interface and is displayed at a location that occupies at least a portion of a display region that was occupied by the first user interface and includes the one or more user interface elements including a second user interface element; and
            the second user interface element includes a displayed numerical value; and
        while the computer system is in the second mode, updating an appearance of the second user interface element periodically while maintaining the computer system in the second mode, wherein:
            in accordance with a determination that one or more time-sensitive update criteria are not satisfied, the appearance of the second user interface element is periodically updated at a first update frequency, including updating the appearance of the second user interface element multiple times at the first update frequency while maintaining the computer system in the second mode; and
            in accordance with a determination that the one or more time-sensitive update criteria are satisfied, wherein the one or more time-sensitive update criteria includes a first criterion that is satisfied when the displayed numerical value is less than a predetermined numerical threshold, the appearance of the second user interface element is periodically updated at a second update frequency different from the first update frequency, wherein the second update frequency is greater than the first update frequency, including updating the appearance of the second user interface element multiple times at the second update frequency while maintaining the computer system in the second mode.

2. The computer system of claim 1, wherein the one or more time-sensitive update criteria includes a respective criterion that is satisfied when the first application is a foreground application.

3. The computer system of claim 1, wherein the second user interface element is a complication corresponding to the first application.

4. The computer system of claim 1, wherein:
    the first application is a timer application; and
    the determination that the one or more time-sensitive update criteria are satisfied comprises a determination that the timer application has less than a predetermined amount of time remaining.

5. The computer system of claim 1, wherein:
    the first application is a stopwatch application; and
    the determination that the one or more time-sensitive update criteria are satisfied comprises a determination that the stopwatch application has measured less than a predetermined period of time.

6. The computer system of claim 1, wherein:
    the first application is an alarm clock application; and
    the determination that the one or more time-sensitive update criteria are satisfied comprises a determination that less than a predetermined amount of time remains until a next alarm is scheduled to be output by the computer system.

7. The computer system of claim 1, the one or more programs further including instructions for:
    while in the second mode:
        at a first time, in accordance with the determination that the one or more time-sensitive update criteria are not satisfied, updating the appearance of the second user interface element periodically at the first update frequency while maintaining the computer system in the second mode, wherein the second user interface element corresponds to the first user interface element and is different from the first user interface element in one or more visual characteristics; and
        at a second time subsequent to the first time, in accordance with the determination that the one or more time-sensitive update criteria are satisfied, updating the appearance of the second user interface element periodically at the second update frequency while maintaining the computer system in the second mode and while maintaining at least some of the one or more visual characteristics that are different from the first user interface element.

8. The computer system of claim 1, wherein:
    the second user interface element corresponds to the first user interface element and is different from the first user interface element in one or more visual characteristics; and
    updating the appearance of the second user interface element periodically while maintaining the computer system in the second mode comprises updating the appearance of the second user interface element periodically while maintaining at least some of the one or more visual characteristics that are different from the first user interface element.

9. The computer system of claim 1, the one or more programs further including instructions for:
    while in the second mode:
        at a first time, in accordance with the determination that the one or more time-sensitive update criteria are not satisfied, updating the appearance of the second user interface element periodically at the first update frequency while maintaining the computer system in the second mode, wherein:
the second user interface element displays a first set of information, and
while the appearance of the second user interface element is updated at the first update frequency, the first set of information is displayed at a first level of precision; and
at a second time subsequent to the first time, in accordance with the determination that the one or more time-sensitive update criteria are satisfied, updating the appearance of the second user interface element periodically at the second update frequency while maintaining the computer system in the second mode, wherein:
while the appearance of the second user interface element is updated at the second update frequency, the first set of information is displayed at a second level of precision that is more precise than the first level of precision.

10. The computer system of claim 9, wherein:
the second user interface comprises a third user interface element;
the third user interface element displays a second set of information;
at the first time, while the appearance of the second user interface element is updated periodically at the first update frequency and the first set of information is displayed at the first level of precision, the second set of information is displayed at a third level of precision; and
at the second time, while the appearance of the second user interface element is updated periodically at the second update frequency and the first set of information is displayed at the second level of precision that is more precise than the first level of precision, display of the second set of information is maintained at the third level of precision.

11. The computer system of claim 1, wherein:
the first application is a turn-by-turn navigation application; and
the determination that the one or more time-sensitive update criteria are satisfied comprises a determination that a next upcoming turn is less than a threshold distance or a threshold time away from the computer system.

12. The computer system of claim 1, wherein the one or more time-sensitive update criteria includes a respective criterion that is satisfied when a predetermined amount of time has elapsed or remains.

13. The computer system of claim 1, the one or more programs including instructions for:
while displaying the first user interface in the first mode, updating an appearance of the first user interface element multiple times at the second update frequency.

14. The computer system of claim 1, the one or more programs including instructions for:
while displaying the first user interface in the first mode, updating an appearance of the first user interface element multiple times at a third update frequency that is greater than the first update frequency and the second update frequency.

15. A non-transitory computer-readable storage medium storing one or more programs configured to be executed by one or more processors of a computer system that is in communication with a display generation component, the one or more programs including instructions for:
while the computer system is in a first mode, displaying, via the display generation component, a first user interface that includes one or more user interface elements including a first user interface element, where the first user interface is associated with a first application;
while displaying the first user interface in the first mode, detecting that the computer system has met one or more criteria for transitioning from the first mode to a second mode, wherein the second mode is a lower power mode than the first mode;
in response to detecting that the computer system has met the one or more criteria for transitioning from the first mode to the second mode, entering the second mode, including displaying a second user interface that is associated with the first application, wherein:
the second user interface corresponds to the first user interface and is displayed at a location that occupies at least a portion of a display region that was occupied by the first user interface and includes the one or more user interface elements including a second user interface element; and
the second user interface element includes a displayed numerical value; and
while the computer system is in the second mode, updating an appearance of the second user interface element periodically while maintaining the computer system in the second mode, wherein:
in accordance with a determination that one or more time-sensitive update criteria are not satisfied, the appearance of the second user interface element is periodically updated at a first update frequency, including updating the appearance of the second user interface element multiple times at the first update frequency while maintaining the computer system in the second mode; and
in accordance with a determination that the one or more time-sensitive update criteria are satisfied, wherein the one or more time-sensitive update criteria includes a first criterion that is satisfied when the displayed numerical value is less than a predetermined numerical threshold, the appearance of the second user interface element is periodically updated at a second update frequency different from the first update frequency, wherein the second update frequency is greater than the first update frequency, including updating the appearance of the second user interface element multiple times at the second update frequency while maintaining the computer system in the second mode.

16. The non-transitory computer-readable storage medium of claim 15, wherein the one or more time-sensitive update criteria includes a respective criterion that is satisfied when the first application is a foreground application.

17. The non-transitory computer-readable storage medium of claim 15, wherein the second user interface element is a complication corresponding to the first application.

18. The non-transitory computer-readable storage medium of claim 15, wherein:
the first application is a timer application; and
the determination that the one or more time-sensitive update criteria are satisfied comprises a determination that the timer application has less than a predetermined amount of time remaining.

19. The non-transitory computer-readable storage medium of claim 15, wherein:
the first application is a stopwatch application; and
the determination that the one or more time-sensitive update criteria are satisfied comprises a determination that the stopwatch application has measured less than a predetermined period of time.

20. The non-transitory computer-readable storage medium of claim 15, wherein:
the first application is an alarm clock application; and
the determination that the one or more time-sensitive update criteria are satisfied comprises a determination that less than a predetermined amount of time remains until a next alarm is scheduled to be output by the computer system.

21. The non-transitory computer-readable storage medium of claim 15, the one or more programs further including instructions for:
while in the second mode:
at a first time, in accordance with the determination that the one or more time-sensitive update criteria are not satisfied, updating the appearance of the second user interface element periodically at the first update frequency while maintaining the computer system in the second mode, wherein the second user interface element corresponds to the first user interface element and is different from the first user interface element in one or more visual characteristics; and
at a second time subsequent to the first time, in accordance with the determination that the one or more time-sensitive update criteria are satisfied, updating the appearance of the second user interface element periodically at the second update frequency while maintaining the computer system in the second mode and while maintaining at least some of the one or more visual characteristics that are different from the first user interface element.

22. The non-transitory computer-readable storage medium of claim 15, wherein:
the second user interface element corresponds to the first user interface element and is different from the first user interface element in one or more visual characteristics; and
updating the appearance of the second user interface element periodically while maintaining the computer system in the second mode comprises updating the appearance of the second user interface element periodically while maintaining at least some of the one or more visual characteristics that are different from the first user interface element.

23. The non-transitory computer-readable storage medium of claim 15, the one or more programs further including instructions for:
while in the second mode:
at a first time, in accordance with the determination that the one or more time-sensitive update criteria are not satisfied, updating the appearance of the second user interface element periodically at the first update frequency while maintaining the computer system in the second mode, wherein:
the second user interface element displays a first set of information, and
while the appearance of the second user interface element is updated at the first update frequency, the first set of information is displayed at a first level of precision; and
at a second time subsequent to the first time, in accordance with the determination that the one or more time-sensitive update criteria are satisfied, updating the appearance of the second user interface element periodically at the second update frequency while maintaining the computer system in the second mode, wherein:
while the appearance of the second user interface element is updated at the second update frequency, the first set of information is displayed at a second level of precision that is more precise than the first level of precision.

24. The non-transitory computer-readable storage medium of claim 23, wherein:
the second user interface comprises a third user interface element;
the third user interface element displays a second set of information;
at the first time, while the appearance of the second user interface element is updated periodically at the first update frequency and the first set of information is displayed at the first level of precision, the second set of information is displayed at a third level of precision; and
at the second time, while the appearance of the second user interface element is updated periodically at the second update frequency and the first set of information is displayed at the second level of precision that is more precise than the first level of precision, display of the second set of information is maintained at the third level of precision.

25. The non-transitory computer-readable storage medium of claim 15, wherein:
the first application is a turn-by-turn navigation application; and
the determination that the one or more time-sensitive update criteria are satisfied comprises a determination that a next upcoming turn is less than a threshold distance or a threshold time away from the computer system.

26. The non-transitory computer-readable storage medium of claim 15, wherein the one or more time-sensitive update criteria includes a respective criterion that is satisfied when a predetermined amount of time has elapsed or remains.

27. The non-transitory computer-readable storage medium of claim 15, the one or more programs further including instructions for:
while displaying the first user interface in the first mode, updating an appearance of the first user interface element multiple times at the second update frequency.

28. The non-transitory computer-readable storage medium of claim 15, the one or more programs further including instructions for:
while displaying the first user interface in the first mode, updating an appearance of the first user interface element multiple times at a third update frequency that is greater than the first update frequency and the second update frequency.

29. A method, comprising:
at a computer system that is in communication with a display generation component:
while the computer system is in a first mode, displaying, via the display generation component, a first user interface that includes one or more user interface elements including a first user interface element, where the first user interface is associated with a first application;

while displaying the first user interface in the first mode, detecting that the computer system has met one or more criteria for transitioning from the first mode to a second mode, wherein the second mode is a lower power mode than the first mode;

in response to detecting that the computer system has met the one or more criteria for transitioning from the first mode to the second mode, entering the second mode, including displaying a second user interface that is associated with the first application, wherein:

the second user interface corresponds to the first user interface and is displayed at a location that occupies at least a portion of a display region that was occupied by the first user interface and includes the one or more user interface elements including a second user interface element; and the second user interface element includes a displayed numerical value; and while the computer system is in the second mode, updating an appearance of the second user interface element periodically while maintaining the computer system in the second mode, wherein:

in accordance with a determination that one or more time-sensitive update criteria are not satisfied, the appearance of the second user interface element is periodically updated at a first update frequency, including updating the appearance of the second user interface element multiple times at the first update frequency while maintaining the computer system in the second mode; and in accordance with a determination that the one or more time-sensitive update criteria are satisfied, wherein the one or more time-sensitive update criteria includes a first criterion that is satisfied when the displayed numerical value is less than a predetermined numerical threshold, the appearance of the second user interface element is periodically updated at a second update frequency different from the first update frequency, wherein the second update frequency is greater than the first update frequency, including updating the appearance of the second user interface element multiple times at the second update frequency while maintaining the computer system in the second mode.

30. The method of claim 29, wherein the one or more time-sensitive update criteria includes a respective criterion that is satisfied when the first application is a foreground application.

31. The method of claim 29, wherein the second user interface element is a complication corresponding to the first application.

32. The method of claim 29, wherein:
the first application is a timer application; and
the determination that the one or more time-sensitive update criteria are satisfied comprises a determination that the timer application has less than a predetermined amount of time remaining.

33. The method of claim 29, wherein:
the first application is a stopwatch application; and
the determination that the one or more time-sensitive update criteria are satisfied comprises a determination that the stopwatch application has measured less than a predetermined period of time.

34. The method of claim 29, wherein:
the first application is an alarm clock application; and
the determination that the one or more time-sensitive update criteria are satisfied comprises a determination that less than a predetermined amount of time remains until a next alarm is scheduled to be output by the computer system.

35. The method of claim 29, further comprising:
while in the second mode:
at a first time, in accordance with the determination that the one or more time-sensitive update criteria are not satisfied, updating the appearance of the second user interface element periodically at the first update frequency while maintaining the computer system in the second mode, wherein the second user interface element corresponds to the first user interface element and is different from the first user interface element in one or more visual characteristics; and
at a second time subsequent to the first time, in accordance with the determination that the one or more time-sensitive update criteria are satisfied, updating the appearance of the second user interface element periodically at the second update frequency while maintaining the computer system in the second mode and while maintaining at least some of the one or more visual characteristics that are different from the first user interface element.

36. The method of claim 29, wherein:
the second user interface element corresponds to the first user interface element and is different from the first user interface element in one or more visual characteristics; and
updating the appearance of the second user interface element periodically while maintaining the computer system in the second mode comprises updating the appearance of the second user interface element periodically while maintaining at least some of the one or more visual characteristics that are different from the first user interface element.

37. The method of claim 29, further comprising:
while in the second mode:
at a first time, in accordance with the determination that the one or more time-sensitive update criteria are not satisfied, updating the appearance of the second user interface element periodically at the first update frequency while maintaining the computer system in the second mode, wherein:
the second user interface element displays a first set of information, and
while the appearance of the second user interface element is updated at the first update frequency, the first set of information is displayed at a first level of precision; and
at a second time subsequent to the first time, in accordance with the determination that the one or more time-sensitive update criteria are satisfied, updating the appearance of the second user interface element periodically at the second update frequency while maintaining the computer system in the second mode, wherein:
while the appearance of the second user interface element is updated at the second update frequency, the first set of information is displayed at a second level of precision that is more precise than the first level of precision.

38. The method of claim 37, wherein:
the second user interface comprises a third user interface element;
the third user interface element displays a second set of information;
at the first time, while the appearance of the second user interface element is updated periodically at the first update frequency and the first set of information is displayed at the first level of precision, the second set of information is displayed at a third level of precision; and
at the second time, while the appearance of the second user interface element is updated periodically at the second update frequency and the first set of information is displayed at the second level of precision that is more precise than the first level of precision, display of the second set of information is maintained at the third level of precision.

39. The method of claim 29, wherein:
the first application is a turn-by-turn navigation application; and
the determination that the one or more time-sensitive update criteria are satisfied comprises a determination that a next upcoming turn is less than a threshold distance or a threshold time away from the computer system.

40. The method of claim 29, wherein the one or more time-sensitive update criteria includes a respective criterion that is satisfied when a predetermined amount of time has elapsed or remains.

41. The method of claim 29, further comprising:
while displaying the first user interface in the first mode, updating an appearance of the first user interface element multiple times at the second update frequency.

42. The method of claim 29, further comprising:
while displaying the first user interface in the first mode, updating an appearance of the first user interface element multiple times at a third update frequency that is greater than the first update frequency and the second update frequency.

\* \* \* \* \*